US 12,491,325 B2

(12) United States Patent
Shahaf et al.

(10) Patent No.: US 12,491,325 B2
(45) Date of Patent: Dec. 9, 2025

(54) DRUG DELIVERY DEVICES AND METHODS FOR ADMINISTERING SUBSTANCES TO A BODY CAVITY BY HETEROGENOUS AEROSOLIZATION FOR TREATMENT OF BINGE-EATING DISORDERS AND/OR OBESITY

(71) Applicant: APTARGROUP, INC., Crystal Lake, IL (US)

(72) Inventors: Daniel Shahaf, Kibbutz Dganiya B (IL); Iris Shichor, Zichron Yaakov (IL)

(73) Assignee: AptarGroup, Inc., Crystal Lake, IL (US)

( * ) Notice: Subject to any disclaimer, the term of this patent is extended or adjusted under 35 U.S.C. 154(b) by 1370 days.

(21) Appl. No.: 16/892,605

(22) Filed: Jun. 4, 2020

(65) Prior Publication Data
US 2020/0306463 A1 Oct. 1, 2020

Related U.S. Application Data

(63) Continuation-in-part of application No. 16/810,226, filed on Mar. 5, 2020, and a continuation-in-part of
(Continued)

(30) Foreign Application Priority Data
Dec. 16, 2013 (DE) .......................... 2020131057150

(51) Int. Cl.
*A61M 11/00* (2006.01)
*A61K 9/00* (2006.01)
(Continued)

(52) U.S. Cl.
CPC ........... *A61M 11/007* (2014.02); *A61M 11/02* (2013.01); *A61M 15/0045* (2013.01);
(Continued)

(58) Field of Classification Search
CPC .............. A61M 11/007; A61M 11/006; A61M 11/008; A61M 11/02; A61M 11/06;
(Continued)

(56) References Cited

U.S. PATENT DOCUMENTS

| 462,990 A | 11/1891 | Oppenheimer |
| 3,921,637 A | 11/1975 | Bennie et al. |

(Continued)

FOREIGN PATENT DOCUMENTS

| CN | 1981886 | 6/2007 |
| CN | 104520198 | 4/2015 |

(Continued)

OTHER PUBLICATIONS

PCT International Preliminary Report on Patentability for International Application No. PCT/IL2014/050752, dated Feb. 23, 2016.
(Continued)

*Primary Examiner* — Joseph D. Boecker
*Assistant Examiner* — Brian T Khong
(74) *Attorney, Agent, or Firm* — Foley & Lardner LLP

(57) ABSTRACT

The present invention provides means and methods for delivering a predetermined volume of a substance, within at least one body cavity of a subject, comprising a predefined volume for containing the predetermined volume of the at least one substance; a delivery end for placement in proximity to the body cavity; the delivery end comprises at least one orifice of diameter D [mm]; a valve mechanically connectable to the container, characterized by at least two configurations: (i) an ACTIVE CONFIGURATION in which the valve enables delivery of predetermined volume $V_{sub}$ [ml] of the substance; and, (ii) an INACTIVE CONFIGURATION, in which the valve prevents delivery of the predetermined volume $V_{sub}$ [ml] of the substance from the container to the body cavity; and a fluid tight chamber (Continued)

configured to contain predetermined volume $V_{gas}$ [ml] of pressurized gas at a predetermined pressure, $P_{gas}$ [barg].

46 Claims, 46 Drawing Sheets

Related U.S. Application Data application No. 16/810,096, filed on Mar. 5, 2020, now abandoned, which is a continuation-in-part of application No. 15/982,630, filed on May 17, 2018, now Pat. No. 11,278,682, said application No. 16/810,226 is a continuation-in-part of application No. 15/982,996, filed on May 17, 2018, now Pat. No. 11,471,618, said application No. 15/982,630 is a continuation-in-part of application No. 14/733,143, filed on Jun. 8, 2015, now Pat. No. 11,116,914, which is a continuation-in-part of application No. 14/433,048, filed as application No. PCT/IL2014/050752 on Aug. 21, 2014, now Pat. No. 11,383,048.

(60) Provisional application No. 62/526,386, filed on Jun. 29, 2017, provisional application No. 62/507,816, filed on May 18, 2017, provisional application No. 62/117,986, filed on Feb. 19, 2015, provisional application No. 62/077,246, filed on Nov. 9, 2014, provisional application No. 61/868,627, filed on Aug. 22, 2013, provisional application No. 61/868,614, filed on Aug. 22, 2013.

(51) Int. Cl.
| | | |
|---|---|---|
| *A61M 11/02* | (2006.01) | |
| *A61M 15/00* | (2006.01) | |
| *A61M 15/08* | (2006.01) | |
| *A61M 21/02* | (2006.01) | |
| *A61M 31/00* | (2006.01) | |
| *B05B 7/04* | (2006.01) | |
| *B05B 7/14* | (2006.01) | |
| *B05B 11/10* | (2023.01) | |
| *A61M 21/00* | (2006.01) | |

(52) U.S. Cl.
CPC ...... *A61M 15/0065* (2013.01); *A61M 15/009* (2013.01); *A61M 15/0098* (2014.02); *A61M 15/08* (2013.01); *A61M 21/02* (2013.01); *A61M 31/00* (2013.01); *B05B 7/0416* (2013.01); *B05B 7/1486* (2013.01); *B05B 11/1091* (2023.01); *A61K 9/0043* (2013.01); *A61M 15/0003* (2014.02); *A61M 15/0021* (2014.02); *A61M 15/003* (2014.02); *A61M 2021/0016* (2013.01); *A61M 2202/064* (2013.01); *A61M 2202/30* (2013.01); *A61M 2205/073* (2013.01); *A61M 2205/3331* (2013.01); *A61M 2205/3379* (2013.01); *A61M 2205/7545* (2013.01); *A61M 2206/16* (2013.01); *A61M 2209/045* (2013.01); *A61M 2210/0618* (2013.01); *A61M 2210/0625* (2013.01); *A61M 2210/065* (2013.01); *A61M 2210/0662* (2013.01); *A61M 2210/1067* (2013.01); *A61M 2210/1089* (2013.01); *A61M 2210/1475* (2013.01)

(58) Field of Classification Search
CPC ............ A61M 15/003; A61M 15/0031; A61M 15/0035; A61M 15/0036; A61M 15/0038; A61M 15/004; A61M 15/0041; A61M 15/0043; A61M 15/0045; A61M 15/0046; A61M 15/08; A61M 15/085; A61M 31/00; A61M 31/002; B05B 7/02; B05B 7/025; B05B 7/04; B05B 7/0408; B05B 7/0416; B05B 7/0425; B05B 7/0433; B05B 7/0441; B05B 7/1254; B05B 7/1263; B05B 7/1272; B05B 7/1281; B05B 7/129; B05B 7/14; B05B 7/1404; B05B 7/1413; B05B 7/1431; B05B 7/1436; B05B 7/144; B05B 7/1481; B05B 7/2402; B05B 7/2405; B05B 7/2408; B05B 7/241; B05B 7/2413; A61K 9/0043
See application file for complete search history.

(56) References Cited

U.S. PATENT DOCUMENTS

| | | | |
|---|---|---|---|
| 4,017,007 A | 4/1977 | Riccio | |
| 4,114,615 A | 9/1978 | Wetterlin et al. | |
| 4,620,670 A | 11/1986 | Hughes | |
| 5,048,729 A | 9/1991 | Pritchard | |
| 5,307,953 A * | 5/1994 | Regan | A61M 15/0036 604/203 |
| 5,740,794 A | 4/1998 | Smith et al. | |
| 6,123,228 A | 9/2000 | Hippensteel | |
| 6,186,141 B1 * | 2/2001 | Pike | A61M 15/0028 128/203.12 |
| 6,398,074 B1 | 6/2002 | Bruna et al. | |
| 6,708,846 B1 * | 3/2004 | Fuchs | B05B 11/1091 222/386 |
| 6,971,385 B1 | 12/2005 | Flora | |
| 7,497,390 B2 | 3/2009 | Beller | |
| 7,726,308 B1 | 6/2010 | Flora | |
| 7,802,569 B2 | 9/2010 | Yeates et al. | |
| 7,900,659 B2 | 3/2011 | Whitley et al. | |
| 8,360,056 B2 | 1/2013 | Ishizeki et al. | |
| 2001/0008637 A1 | 7/2001 | Hochrainer et al. | |
| 2002/0023641 A1 | 2/2002 | Stadelhofer | |
| 2002/0092520 A1 | 7/2002 | Casper | |
| 2002/0092521 A1 * | 7/2002 | Sullivan | A61M 15/0033 128/200.24 |
| 2002/0092524 A1 | 7/2002 | Lockhart et al. | |
| 2003/0079743 A1 | 5/2003 | Genova et al. | |
| 2003/0127533 A1 | 7/2003 | Stihl | |
| 2003/0181917 A1 * | 9/2003 | Gertner | A61M 15/0066 604/24 |
| 2003/0187404 A1 | 10/2003 | Waldenburg | |
| 2003/0209455 A1 | 11/2003 | Pynson et al. | |
| 2004/0050885 A1 | 3/2004 | Stradella | |
| 2004/0153033 A1 * | 8/2004 | Mazzoni | B05B 11/1091 604/232 |
| 2005/0028812 A1 | 2/2005 | Djupesland | |
| 2006/0067911 A1 | 3/2006 | Nilsson | |
| 2006/0107957 A1 | 5/2006 | Djupesland | |
| 2006/0151629 A1 | 7/2006 | Vedrine et al. | |
| 2006/0213514 A1 | 9/2006 | Price et al. | |
| 2006/0254583 A1 | 11/2006 | Deboeck et al. | |
| 2006/0254585 A1 | 11/2006 | Ishizeki et al. | |
| 2007/0051362 A1 * | 3/2007 | Sullivan | A61M 31/00 128/200.23 |
| 2007/0060868 A1 | 3/2007 | Tsutsui | |
| 2007/0125371 A1 | 6/2007 | Djupesland | |
| 2007/0151562 A1 | 7/2007 | Jones et al. | |
| 2007/0154407 A1 | 7/2007 | Peters et al. | |
| 2007/0256688 A1 | 11/2007 | Schuster et al. | |
| 2008/0029084 A1 | 2/2008 | Costantino et al. | |
| 2008/0092887 A1 | 4/2008 | Hodson et al. | |
| 2008/0210229 A1 | 9/2008 | Corbacho | |
| 2009/0166379 A1 * | 7/2009 | Wright | A61M 15/0036 604/58 |
| 2009/0275668 A1 * | 11/2009 | Kamishita | A61K 31/4709 514/769 |
| 2009/0285849 A1 | 11/2009 | Barsanti et al. | |
| 2009/0314293 A1 | 12/2009 | Djupesland | |
| 2010/0083963 A1 | 4/2010 | Wharton et al. | |
| 2010/0282246 A1 | 11/2010 | Djupesland | |

(56) References Cited

U.S. PATENT DOCUMENTS

| | | | |
|---|---|---|---|
| 2010/0331765 A1* | 12/2010 | Sullivan | A61M 15/0056 604/93.01 |
| 2011/0048414 A1 | 3/2011 | Hoekman | |
| 2011/0088690 A1 | 4/2011 | Djupesland et al. | |
| 2011/0168172 A1 | 7/2011 | Patton | |
| 2011/0283996 A1 | 11/2011 | Abrams | |
| 2012/0291779 A1 | 11/2012 | Haartsen et al. | |
| 2013/0096495 A1 | 4/2013 | Holmqvist et al. | |
| 2013/0180524 A1 | 7/2013 | Shahaf | |
| 2013/0267864 A1 | 10/2013 | Addington et al. | |
| 2013/0299607 A1 | 11/2013 | Wilkerson et al. | |
| 2013/0345673 A1 | 12/2013 | Ferreri et al. | |
| 2014/0060532 A1 | 3/2014 | Hodges et al. | |
| 2015/0122257 A1 | 5/2015 | Winkler et al. | |
| 2015/0144129 A1 | 5/2015 | Djupesland | |
| 2015/0174343 A1 | 6/2015 | Muellinger et al. | |
| 2015/0209325 A1 | 7/2015 | Najarian et al. | |
| 2015/0258287 A1 | 9/2015 | Shahaf et al. | |
| 2015/0297845 A1 | 10/2015 | Shahaf et al. | |
| 2016/0129205 A1 | 5/2016 | Shahaf et al. | |
| 2018/0072480 A1 | 3/2018 | Genosar | |
| 2018/0110922 A1 | 4/2018 | Dunki-Jacobs et al. | |
| 2019/0015613 A1 | 1/2019 | Shahaf et al. | |
| 2019/0060168 A1 | 2/2019 | Koska | |
| 2020/0197631 A1 | 6/2020 | Stedman et al. | |
| 2020/0197633 A1 | 6/2020 | Shahaf et al. | |
| 2020/0289768 A1 | 9/2020 | Shahaf et al. | |
| 2020/0289769 A1 | 9/2020 | Poullain | |
| 2020/0306463 A1 | 10/2020 | Shahaf et al. | |

FOREIGN PATENT DOCUMENTS

| | | |
|---|---|---|
| CN | 107580513 | 1/2018 |
| DE | 19502725 | 8/1996 |
| DE | 19 70 806 | 9/1998 |
| DE | 202013105715 U1 | 2/2014 |
| EP | 1 023 098 B1 | 9/2004 |
| EP | 1 752 176 A1 | 2/2007 |
| EP | 2 002 856 A1 | 12/2008 |
| EP | 2030645 A1 | 3/2009 |
| EP | 2 922 770 | 9/2015 |
| GB | 724974 | 2/1953 |
| GB | 2415376 A | 12/2005 |
| JP | 2002-505981 A | 2/2002 |
| WO | 90/12567 A1 | 11/1990 |
| WO | WO-99/46055 | 9/1999 |
| WO | WO-99/58180 | 11/1999 |
| WO | WO-02/055133 A2 | 7/2002 |
| WO | WO-02/060517 A2 | 8/2002 |
| WO | WO-2009/002267 | 12/2008 |
| WO | 2012/029064 A1 | 3/2012 |
| WO | WO-2012/105236 A1 | 8/2012 |
| WO | 2013/0128447 A1 | 9/2013 |
| WO | WO-2015/025324 A1 | 2/2015 |
| WO | WO-2016/054742 | 4/2016 |
| WO | WO-2016/071914 A1 | 5/2016 |
| WO | WO-2016/199135 A1 | 12/2016 |
| WO | WO-2018/051371 | 3/2018 |
| WO | WO-2019/003216 A1 | 1/2019 |
| WO | WO-2019/073165 | 4/2019 |
| WO | WO-2019/079335 | 4/2019 |
| WO | WO-2019/220443 A1 | 11/2019 |
| WO | WO-2020/154182 | 7/2020 |

OTHER PUBLICATIONS

PCT International Search Report for International Application No. PCT/IL2014/050752, dated Dec. 18, 2014.

PCT International Written Opinion for International Application No. PCT/IL2014/050752, dated Dec. 18, 2014.

Damm et al., "Intranasal Volume and Olfactory Function", Chemical Senses, 2002, pp. 831-839, vol. 27, Oxford University Press.

Derendorf et al., "Molecular and clinical pharmacology of intranasal corticosteroids: clinical and therapeutic implications", Allergy, 2008, pp. 1292-1300, vol. 63, 2008 Blackwell Munksgaard.

Doose et al., "Single-dose pharmacokinetics and effect of food on the bioavailability of topiramate, A novel antiepileptic drug", Journal of Clinical Pharmacology, 1996, pp. 884-891, vol. 36.

Ganger et al., "Tailoring Formulations for Intranasal Nose-to-Brain Delivery: A Review on Architecture, Physico-Chemical Characteristics and Mucociliary Clearance of the Nasal Olfactory Mucosa", Pharmaceutics, 2018, pp. 1-28, vol. 10, No. 116.

Khan et al., "Progress in brain targeting drug delivery system by nasal route", Journal of Controlled Release, 2017, pp. 364-389, vol. 268, Elsevier B.V.

Lammi et al., "Treatment with intranasal iloprost reduces disease manifestations in a murine model of previously established COPD", The American Journal of Physiology—Lung Cellular and Molecular Physiology, 2016, pp. L630-L638, vol. 310, 2016 American Physiological Society.

Leombruni et al., "Treatment of obese patients with binge eating disorder using topiramate: a review", Neuropsychiatric Disease and Treatment, 2009, pp. 385-392, vol. 5, Dove Medical Press Ltd.

Massolt et al., "Appetite suppression through smelling of dark chocolate correlates with changes in ghrelin in young women", Regulatory Peptides, 2010, pp. 81-86, vol. 161, 2010 Elsevier B.V.

Puhakka et al., "The common cold: Effects of intranasal fluticasone propionate treatment", The Journal of Allergy and Clinical Immunology, 1998, pp. 726-731, vol. 101, No. 6, Part 1, Mosby, Inc.

Ramaekers et al., "Odors: appetizing or satiating? Development of appetite during odor exposure over time", International Journal of Obesity, 2014, pp. 650-656, vol. 38, 2014 Macmillan Publishers Limited.

Scheibe et al., "Intranasal Administration of Drugs", Archives of Otolaryngology—Head & Neck Surgery, Jun. 2008, pp. 643-646, vol. 134, No. 6, 2008 American Medical Association.

Schiffman et al., "Taste and smell perception affect appetite and immunity in the elderly", European Journal of Clinical Nutrition, 2000, pp. S54-S63, Suppl 3, 2000 Macmillan Publishers Ltd.

Schriever et al., "Size of nostril opening as a measure of intranasal volume", Physiology & Behavior, 2013, pp. 3-5, vol. 110-111, 2012 Elsevier Inc.

Yeomans, "Olfactory influences on appetite and satiety in humans", Physiology and Behavior, 2006, pp. 1-14, vol. 89, No. 1.

Affidavit of Ms. Lia Kaufman dtd Aug. 3, 2020, pp. 1-9, with Facts and Arguments brief, published Aug. 7, 2020 in the Register of the Opposition proceedings in EP 3400047 B1, available at https://register.epo.org/application?number=EP17711702&Ing=en&tab=doclist (last accessed Nov. 9, 2023).

Pharmaseed Ltd., Author: N/A, Title: Brain and Blood PK Profile Following Intranasal Topirmate Administration—Comparison Between SipNose and Other Nasal Devices ("Pharmaseed"), pp. 1-43, with Petition in response to Patentee's observations (62 pages total), published Mar. 4, 2021 in the Register of the Opposition proceedings in EP 3400047 B1, available at https://register.epo.org/application?number=EP17711702&Ing=en&tab=doclistDdocument E16) (last accessed Nov. 9, 2023).

SipNose, Author: N/A, Title: Preclinical Device S1A2NP8 Batch Release Form ("SipNose"), pp. 1-2, with Petition (21 pages total), published Mar. 4, 2021 in the Register of the Opposition proceedings in EP 3400047 B1, available at https://register.epo.org/application?number=EP17711702&Ing=en&tab=doclist (last accessed Nov. 9, 2023).

Supplemental European Search Report in EP 21764082 DTD Feb. 2, 2024.

* cited by examiner

Fig. 1A

Initial aerosol portion

Steady state aerosol portion

Fig. 1B

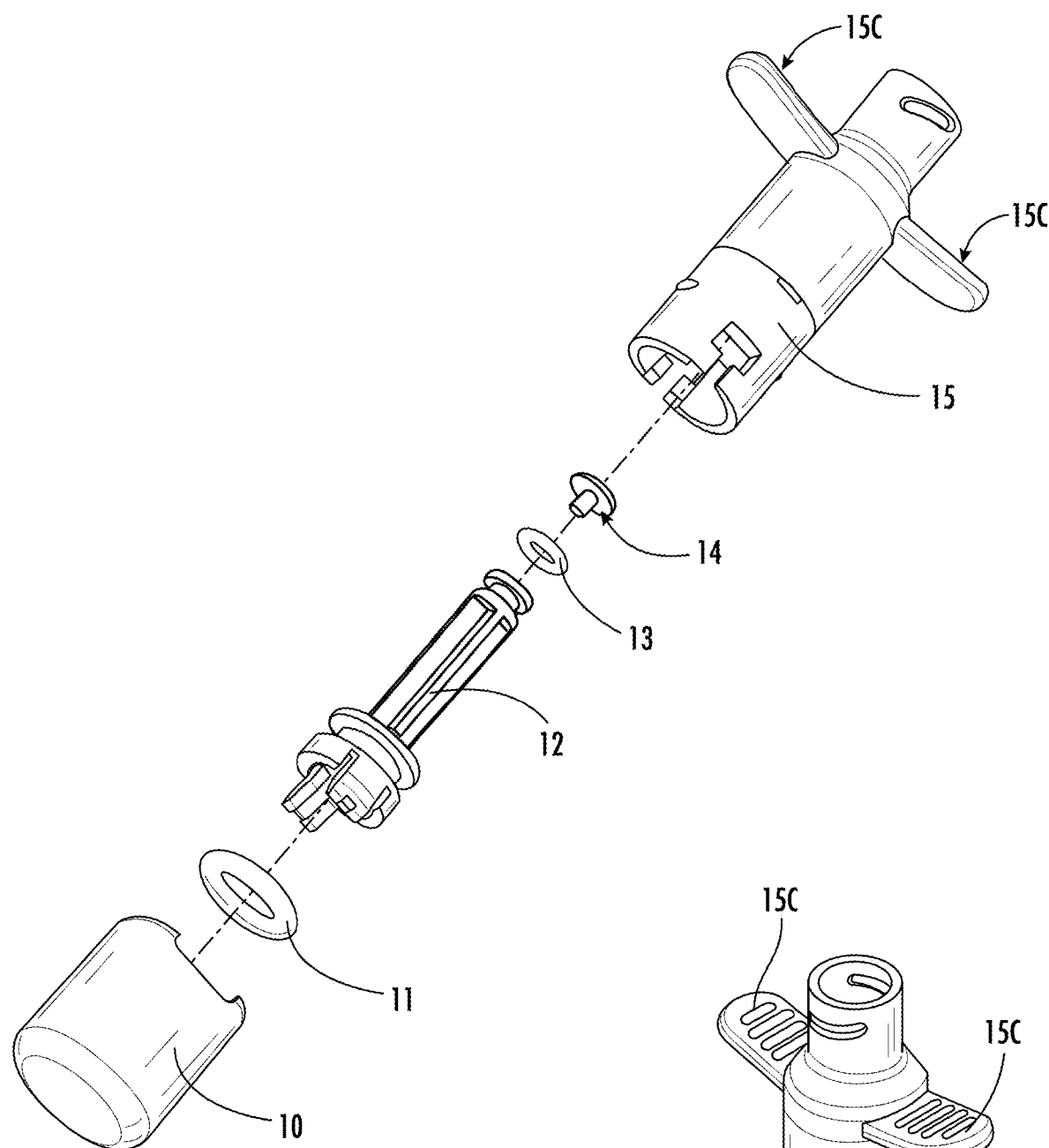
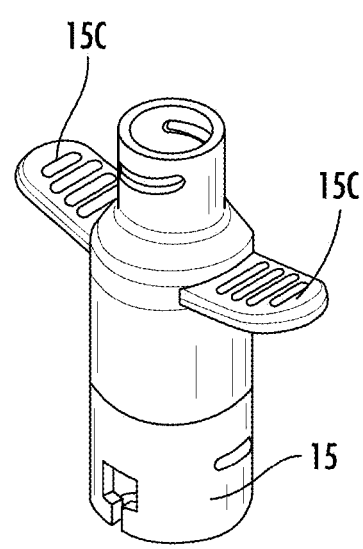
Fig. 1C
Fig. 1D

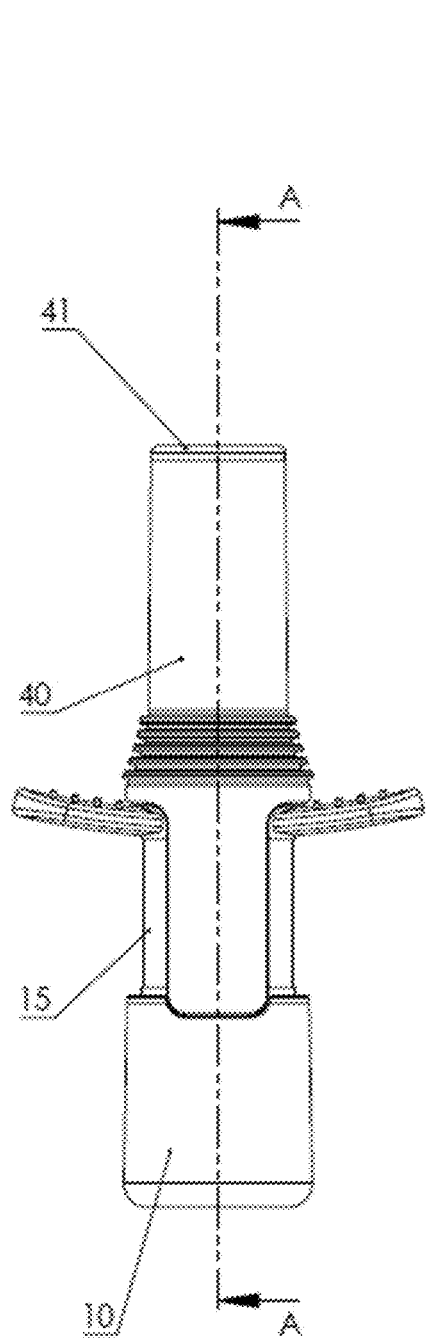
Fig. 1K
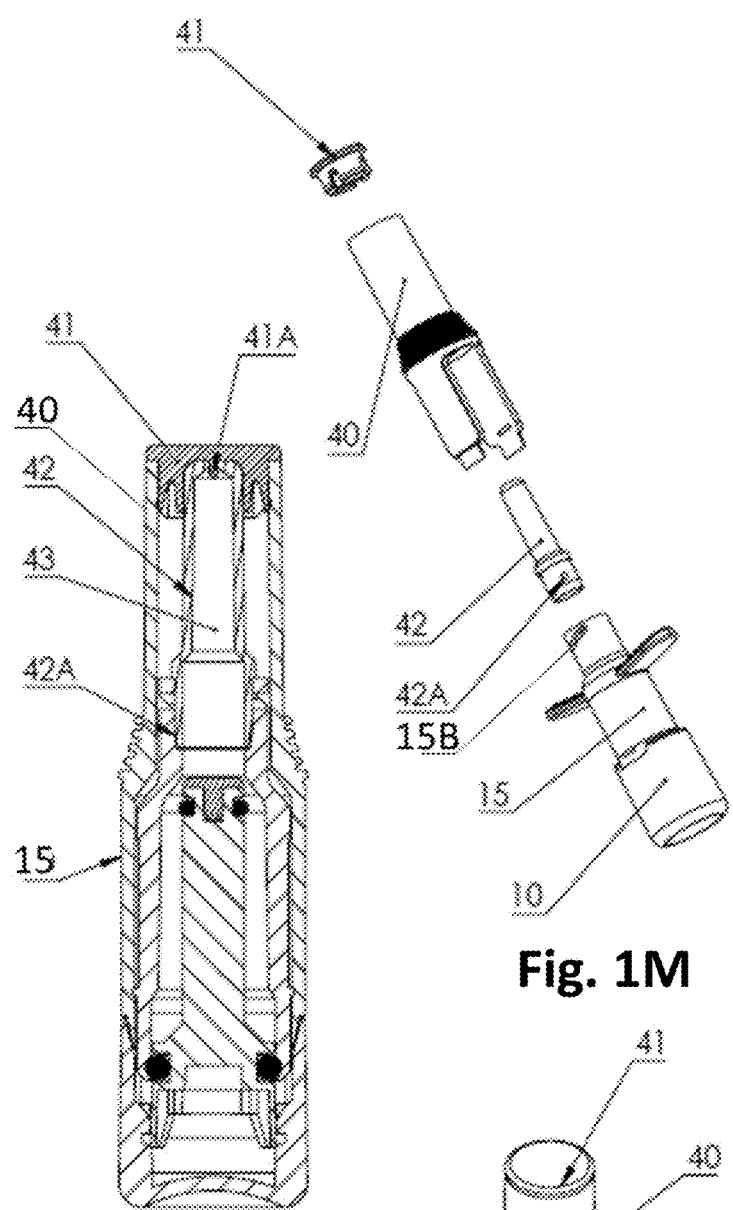
Fig. 1L
Fig. 1M
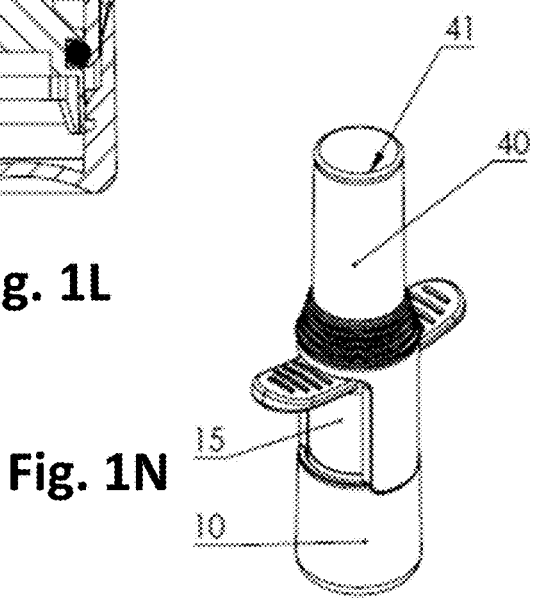
Fig. 1N

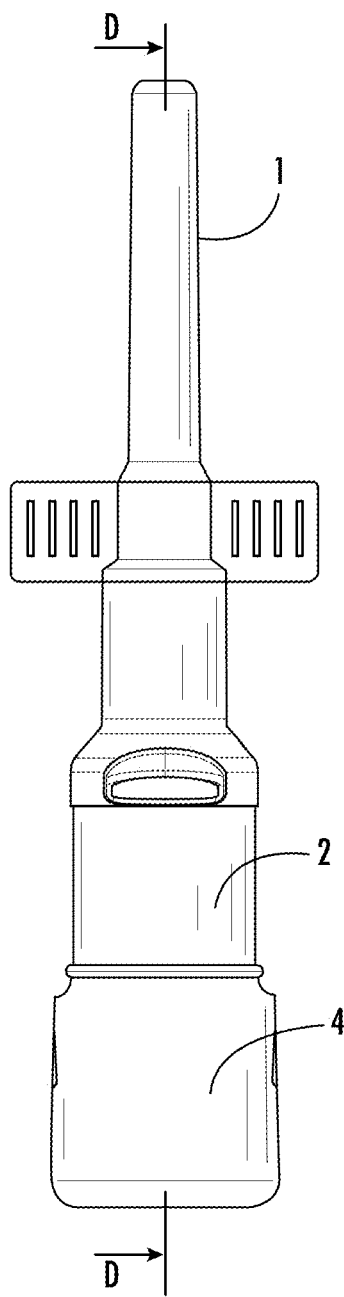
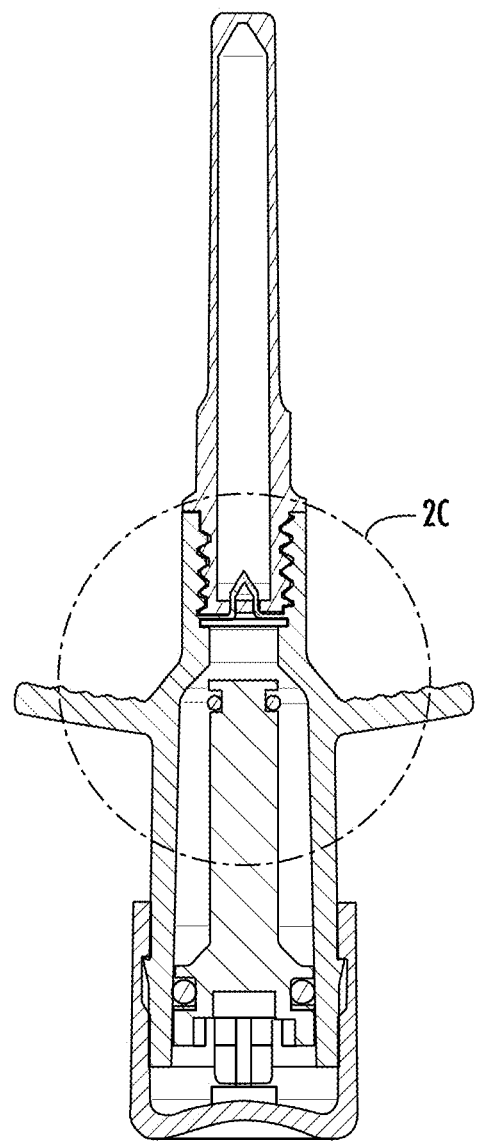
Fig. 1Q
Fig. 1R

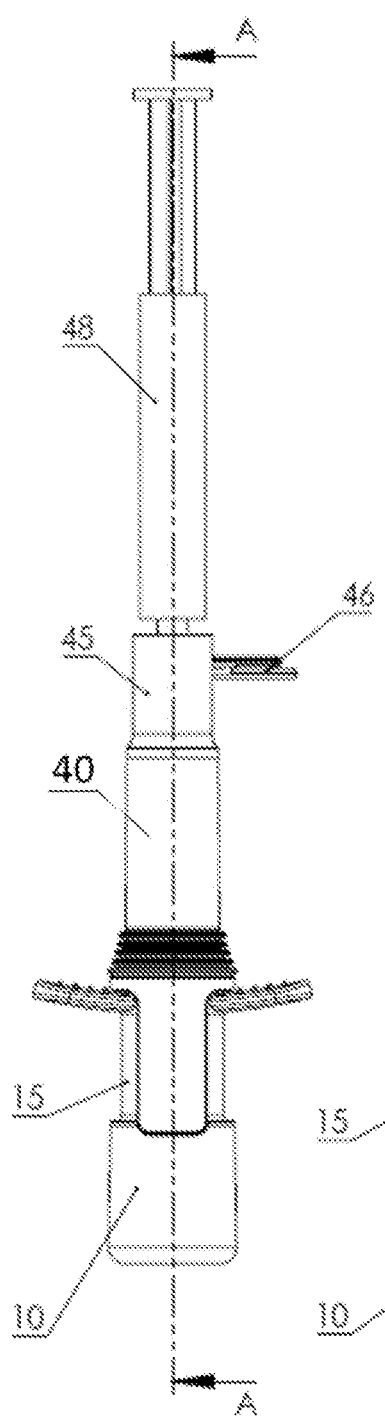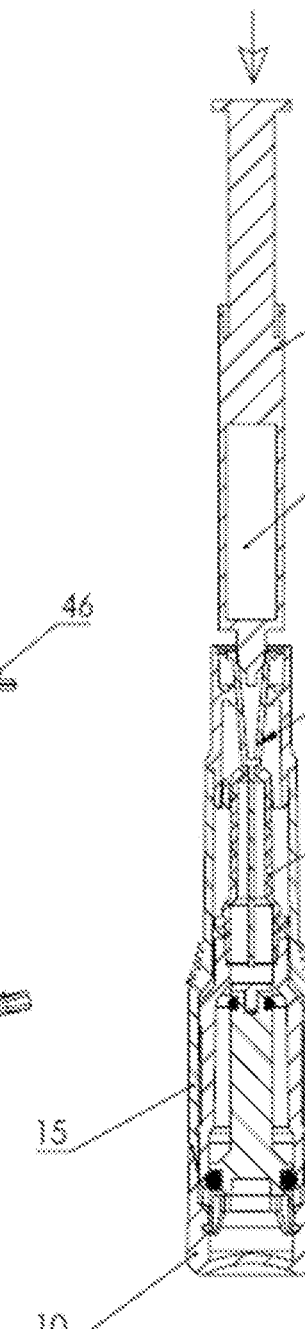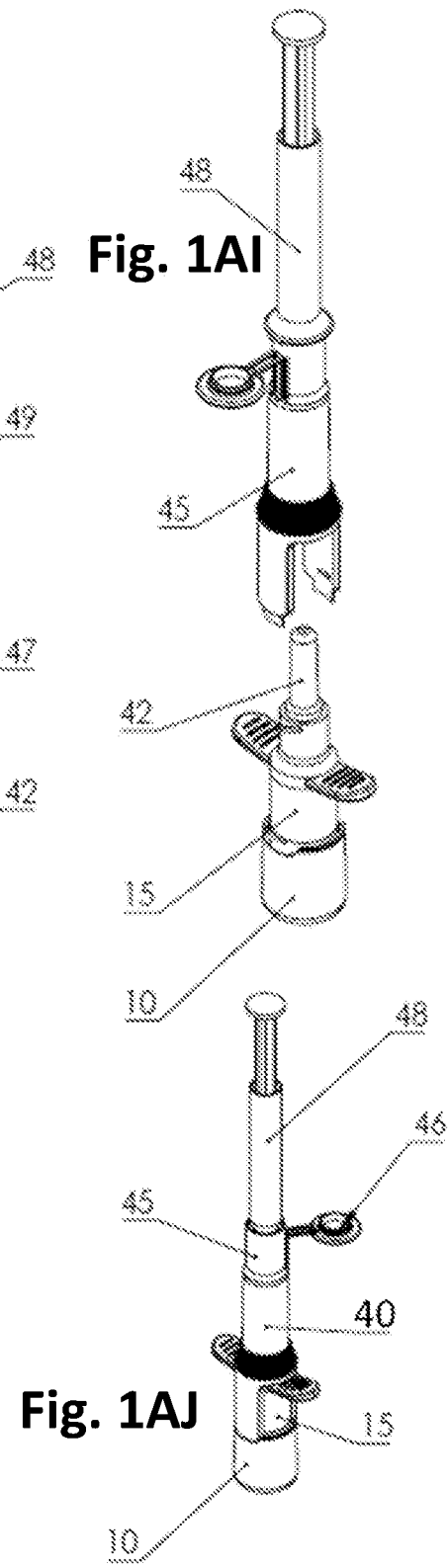
Fig. 1AG
Fig. 1AH
Fig. 1AI
Fig. 1AJ

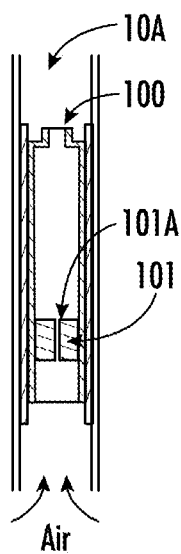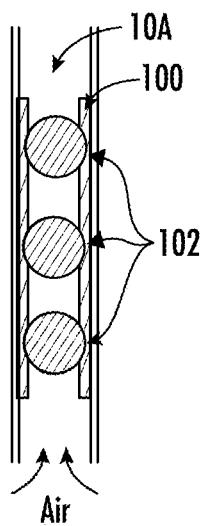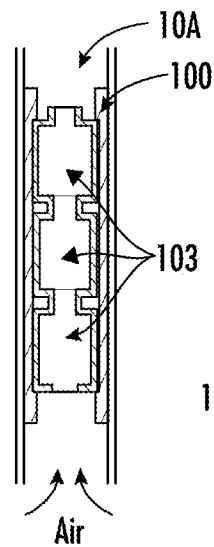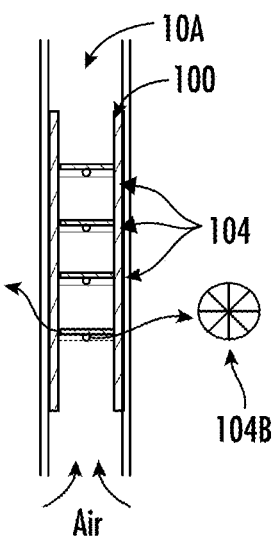
Fig. 1AK  Fig. 1AL  Fig. 1AM  Fig. 1AN
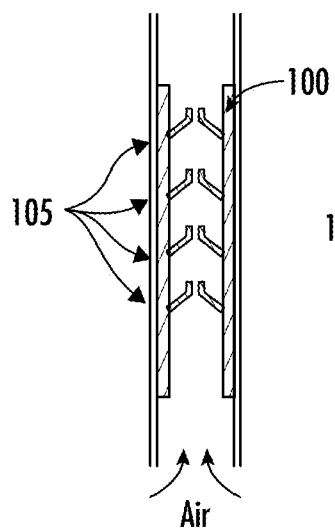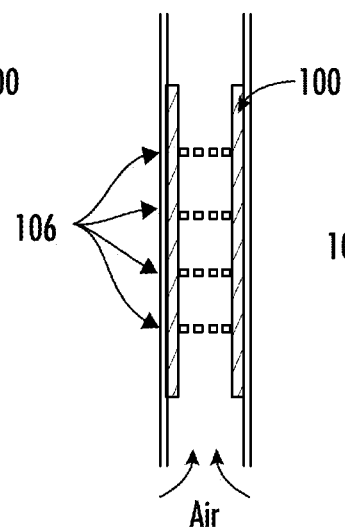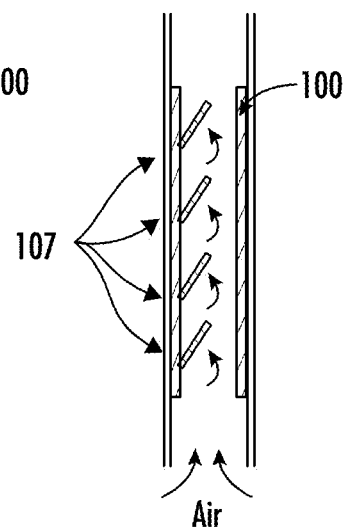
Fig. 1AO  Fig. 1AP  Fig. 1AQ

DRUG DELIVERY DEVICES AND METHODS FOR ADMINISTERING SUBSTANCES TO A BODY CAVITY BY HETEROGENOUS AEROSOLIZATION FOR TREATMENT OF BINGE-EATING DISORDERS AND/OR OBESITY

CROSS REFERENCE TO RELATED APPLICATIONS

This application is a Continuation-in-Part of U.S. application Ser. No. 16/810,096 filed on Mar. 5, 2020 which is a Continuation-in-Part of U.S. application Ser. No. 15/982,630 filed on May 17, 2018 which is a Continuation-in-Part of U.S. application Ser. No. 14/733,143 filed on Jun. 8, 2015 which claims the benefit of and priority to U.S. Provisional Application No. 62/117,986 filed on Feb. 19, 2015 and U.S. Provisional Application No. 62/077,246 filed on Nov. 9, 2014. U.S. application Ser. No. 15/982,630 claims further priority to U.S. Provisional Application No. 62/507,816 filed on May 18, 2017.

Further, this application is a Continuation-in-Part of U.S. application Ser. No. 16/810,226 filed on Mar. 5, 2020 which is a Continuation-in-Part of U.S. application Ser. No. 15/982,996 filed on May 17, 2018 which is a Continuation-in-Part of U.S. application Ser. No. 14/733,143 filed on Jun. 8, 2015 which claims the benefit of and priority to U.S. Provisional Application No. 62/177,986 filed on Feb. 19, 2015 and U.S. Provisional Application No. 62/077,246 filed on Nov. 9, 2014. U.S. application Ser. No. 15/982,996 claims further priority to U.S. Provisional Application No. 62/526,386 filed on Jun. 29, 2017.

This application is a Continuation-in-Part of U.S. application Ser. No. 14/433,048 filed on Apr. 2, 2015, which is National Phase Entry of PCT/IL2014/050752 filed on Aug. 21, 2014, which claims the benefit of and priority to U.S. Provisional Application No. 61/868,614 filed on Aug. 22, 2013 and U.S. Provisional Application No. 61/868,627 filed on Aug. 22, 2013, and German Application No. 2020131057150 filed on Dec. 16, 2013. The contents of the above applications are all incorporated by reference as if fully set forth herein in their entireties.

FIELD OF THE INVENTION

The present invention generally pertains to drug delivery means and methods for administering substances to a body cavity by heterogenous aerosolization. More specifically, the present invention relates to intranasal nose to brain drug delivery.

BACKGROUND OF THE INVENTION

Nasal mucosa and especially the olfactory mucosa are highly suitable for drug delivery. Drug transport via neuronal connections appears to be the most relevant pathway to reach the central nervous system (CNS). Gänger and Schindowski discloses that direct nose to brain (N2B) delivery of therapeutic substances is reported to potentially have a wide range of advantages, such as bypassing the blood-brain barrier and increased patient compliance compared to intrathecal delivery. However, N2B targeting also has its limitations: exact dosing of intranasally applied drugs is still an unsolved challenge. Commonly, intranasally applied substances undergo a rapid elimination by mucociliary clearance and by drainage to the lower part of the nose or to the pharynx. Both mucociliary clearance and by drainage may vary with the dosage form. Furthermore, the anatomy of nasal cavities differs considerably between individuals. Therefore, administration techniques display a broad variation and need to be tailored to an individual's anatomic characteristics. Moreover, the dosage volume is restricted as of limited dispersion of the drug on and in the nasal tissue, that causes dripping and/or swallowing of the liquid formulation. Also, as the upper parts of the nasal cavity are small and narrow, a challenge of reaching this area in a non-invasive procedure arises, and a very efficient delivery is needed. compared to the lower parts of the nose. As for the formulation, in the literature it is disclosed that it is important not to use substances with mucosal toxicity or substances causing irritation or allergic reactions. The health status of the patient is also important, as there may occur problems with the functionality of intranasal delivery devices in patients suffering from allergies or who have a cold. Furthermore, it should be ensured that the frequent use of these devices does not harm the nasal mucosal surface. Another necessity for safe and efficient N2B targeting is reproducibility of drug administration the upper area of the nasal cavity including to the olfactory region. Adjacent regions, such as the respiratory region, have a large concentration of blood vessels and thus favor a systemic uptake. Another unsolved issue is the delivery of high molecular weight substances. Although some studies report substantially weight-independent transport, the permeation of the epithelial barrier of endocytosis usually depends on the hydrodynamic radius. Substances smaller than 400 Daltons will diffuse freely while substances of 1000 Daltons or more appear to become stuck in the mucus. It is suggested that for efficient CNS delivery substances have to be linked to a ligand enhancing bioavailability. Once the CNS is reached, there is still the problem of targeting the drug to the specific site of action, see Gänger, Stella, and Katharina Schindowski. "Tailoring formulations for intranasal nose-to-brain delivery: A review on architecture, physico-chemical characteristics and mucociliary clearance of the nasal olfactory mucosa." *Pharmaceutics* 10.3 (2018): 116. Thus, only highly efficient delivery method will reduce those limitations either with or without specified ligands and/or specified formulations.

Gänger and Schindowski further discloses that nasal pump sprays and droppers are limited to liquid- or lipid-based formulations and that intranasally applied liquids hardly reach the olfactory cleft. If the drug is not able to reach the olfactory region efficiently, it has a reduced chance to be transported to the CNS, but is cleared by mucociliary clearance or absorbed systemically by blood vessels instead, see Scheibe, M.; Bethge, C.; Witt, M.; Hummel, T.; Article, O. Intranasal administration of drugs. *Arch. Otolaryngol; Head. Neck Surg.* 2008, 134, 643-646; Damm, M.; Vent, J.; Schmidt, M.; Theissen, P.; Eckel, H. E.; Lötsch, J.; Hummel, T. Intranasal volume and olfactory function. *Chem. Senses* 2002, 27, 831-839; and Schriever, V. A.; Hummel, T.; Lundström, J. N.; Freiherr, J. Size of nostril opening as a measure of intranasal volume. *Physiol. Behav.* 2013, 110-111.

Onzetra® Xsail®, commercially available from OptiNose AS, Oslo, Norway was reported to deliver a therapeutic agent into the upper posterior sector of the nose and at the same time reduce drug deposition in the lower nasal segments. ViaNase™, commercially available from Kurve Technology, Inc. (US) consists of a sealed nosepiece and a device where an active vortex of nebulized particles is created. Both N2B devices are suitable for particulate formulations, yet currently there are hardly any devices available for the efficient and reproducible administration of formulations.

Currently commercialized pressurized metered dose inhalers (pMDI) comprise a valved holding chamber (VHC) which reduces low-nasal track deposition as the aerosol is not released with a high plume velocity from the spacer. VHCs reduce the speed of the aerosol particles in the mouth and throat region; reduce the total dose available for inhalation due to drug deposition onto the inner wall of the VHC caused by electrostatic charge deposition, sedimentation by gravity, and inertial deposition due to the high plume velocity. More than that, the latest review shows that the shape of the plumes produced by nebulizers, spray pumps and metered dose inhalers does not match the triangular-shaped nasal vestibule and labyrinthine geometry beyond the nasal valve. Particles present in the periphery of the plume penetrate to the lower part of the nasal cavity and result in systemic and pulmonary delivery, but the requirement for efficient nasal delivery to brain is targeting the drug to the upper part of the nasal valve see Khan, Abdur Rauf, et al. "Progress in brain targeting drug delivery system by nasal route." Journal of Controlled Release 268 (2017): 364-389. U.S. Pat. No. 7,802,569 discloses a low-shear aerosol emitter which is configured to reduce the velocity of a large liquid aerosol flow by directing a counterflow air jet into a second direction of flow that is opposed to the first direction of flow against the large liquid aerosol flow and by generating a sheath air flow for minimizing aerosol deposition on the chamber, to enable respirable particles with an aerodynamic diameter of 1 µm-7 µm. This device produces a mushroom-like ever-widening plume which is not suitable for N2B drug delivery.

It is therefore a long felt need to provide a system which can deliver high-plume velocity low shear-pressure drug delivery devices and methods for administering substance to a body cavity.

Binge eating Disorder (BED) is a severe and treatable eating disorder characterized by recurrent episodes of eating large quantities of food (often very quickly and to the point of discomfort); a feeling of a loss of control during the binge; experiencing shame, distress or guilt afterwards; and not regularly using unhealthy compensatory measures (e.g., purging) to counter the binge eating. It is the most common eating disorder in the United States.

BED is one of the newest eating disorders formally recognized in the DSM-5. Before the most recent revision in 2013, BED was listed as a subtype of EDNOS (now referred to as OSFED). The change is important because some insurance companies will not cover eating disorder treatment without a DSM diagnosis.

Topiramate is a sulfamate-substituted monosaccharide. It is an anticonvulsant drug mainly used for the treatment of different types of seizures and for the prophylactic treatment of migraines. It is also indicated (or used off label) for the treatment of bipolar disorder, post-traumatic stress disorder, mood instability disorder, binge-eating disorders, bulimia nervosa and obesity.

Its unique biochemical profile may underlie both its clinical utility and its unique side effects, which include negative effects on cognition, paresthesia, spontaneous glaucoma, weight loss, renal stones, and acidemia. Most, if not all, of the pharmacodynamic properties of topiramate appear to be dose-related within the clinically relevant dosing range of 15-400 mg/day. Tolerance develops to several of the adverse effects of topiramate, which has fostered the practice of initiating therapy at a low dose (15 or 25 mg/day) followed by a gradual increase over a period of weeks to a dose level that is effective and well tolerated.

Topiramate is also proposed its use as a mood stabilizer and have reported its efficacy in reducing impulsiveness and improving mood regulation, possibly via its antagonism to glutamatergic transmission in the lateral hypothalamus, although this indication is still controversial. Weight loss is a side effect consistently reported in the medical literature in patients treated with topiramate. Given its potential role in stabilizing mood and reducing impulse control problems and weight, topiramate has been proposed as a treatment for obese patients with binge eating disorder (BED).

Currently Topiramate is being delivered PO (orally). However, reaching the effective dose requires large doses volume or frequently dosing thereof. Thus, the efficacy of utilizing that rout (PO) is low as the acceptance of the patients is low due to severe side effects Topiramate is known to have.

Thus, there is still a long felt need for a device that allows efficient delivery of Topiramate which is below the dose that causes side effects.

Furthermore, currently Topiramate is administered on a daily basis (so as to reach the effective concentration in the blood which is known to have effect in the brain). Providing a device which will deliver said Topiramate directly to the brain (thus, leaving the PO rout redundant) is likely to enhance efficacy thereof and simultaneously reduce side effects.

SUMMARY OF THE INVENTION

It is an object of the present invention to disclose drug delivery devices and methods for administering substances to a body cavity by heterogenous aerosolization.

It is another object of the present invention to provide a device for delivering Topiramate or formulation thereof within a body cavity of a subject for the treatment of a condition selected from (i) frequent and recurrent binge eating episodes, (ii) behavioral syndromes associated with physiological disturbances and physical factors (F50-F59 under fifth chapter of the ICD-10: Mental and behavioral disorders), (iii) obesity; (iv) OCD; (v) psychiatric conditions and mental disorders; (vi) migraines; (vii) pain; and, (viii) any combination thereof, comprising (a) at least one vial enclosing $V_{sub}$ [ml or mg] of the Topiramate; the vial having at least one fluid inlet port $D_{in}$ [mm] and at least one fluid discharging outlet port $D_{out}$ [mm], configured for placement in proximity to the body cavity of a subject; and (b) activation mechanism adapted to, upon actuation to release the substances within the body cavity in the form of aerosol; wherein the body cavity is the nasal cavity.

It is another object of the present invention to provide the device as defined above, wherein the formulation comprises Topiramate as API.

It is another object of the present invention to provide the device as defined above, wherein the formulation comprises excipients selected from a group consisting of:
(a) chemical permeation enhancer (CPE) selected from a group consisting of Zwitterionic, palmityldimethyl, ammonio propane sulfonate (PPS) or a structural analogs, polysorbate 20, 40, 60, or 80, Hyaluronic acid (also referred to as HA or hyaluronan), poly(ethylene glycol), poly(lactic acid), poly(glycolic acid), poly Acrylic Acid and Poly-(N-isopropylacrylamide), or other biopolymers such as chitosan and alginate; cyclodextrin and modified cyclodextrin, such as but not limited to Captisol;

(b) Permeation enhancers selected from a group containing: a fatty acid, a medium chain glyceride, surfactant, steroidal detergent, an acyl carnitine, Lauroyl-DL-carnitine, an alkanoyl choline, an N-acetylated amino acid, esters, salts, bile salts, sodium salts, nitrogen-containing rings, and derivatives. The enhancer can be an anionic, cationic, zwitterionic, nonionic or combination of both. Anionic can be but not limit to: sodium lauryl sulfate, sodium decyl sulfate, sodium octyl sulfate, N-lauryl sarcosinate, sodium carparate. Cationic can be but not limit to: Cetyltrimethyl ammonium bromide, decyltrimethyl ammonium bromide, benzyldimethyl dodecyl ammonium chloride, myristyltimethyl ammonio chloride, deodecyl pridinium chloride. Zwitterionic can be but not limit to: decyldimethyl ammonio propane sulfonate, palmityldimethyl ammonio propane sulfonate, fatty acid, butyric, caproic, caprylic, pelargonic, capric, lauric, myristic, palmitic, stearic, arachidic, oleic, linoleic, linolinic acid, their salts, derivatives and any combinations or glyceride, monoglyceride, a diglyceride, or triglyceride of those fatty acids. Bile acids or salts, including conjugated or un conjugated bile acids, such as but not limited to: cholate, deoxycholate, tauro-cholate, glycocholate, taurodexycholate, ursodeoxycholate, tauroursodeoxycholate, chenodeoxycholate and their derivates and salts and combinations. Permeation enhancer as comprises a metal chelator, such as EDTA, EGTA, a surfactant, such as sodium dodecyl sulfate, polyethylene ethers or esters, polyethylene glycol-12 lauryl ether, salicylate polysorbate 80, nonylphenoxypolyoxyethylene, dioctyl sodium sulfosuccinate, saponin, palmitoyl carnitine, lauroyl-l-carnitine, dodecyl maltoside, acyl carnitines, alkanoyl cjolline and combinations. Other include but not limited, 3-nitrobenzoate, zoonula occulden toxin, fatty acid ester of lactic acid salts, glycyrrhizic acid salt, hydroxyl beta-cyclodextrin, N-acetylated amino acids such as sodium N-[8-(2-hydroxybenzoyl)amino] caprylate and chitosan, salts and derivates and any combinations;

(c) surfactant of water-in-oil, oil-in-water; emulsions, double emulsions, micro-emulsions, Nano-emulsions of the following (all or parts of the) surfactants, oils, co-surfactants, aqueous phase; to allow-better absorption in the mucosal tissue, better permeation and absorption in the target cells, better stability of the encapsulated drug/active ingredient;

(d) antiadherents selected from magnesium stearate;

(e) binders selected from a group consisting of Saccharides and their derivatives, Disaccharides: sucrose, lactose, Polysaccharides and their derivatives: starches, cellulose or modified cellulose such as microcrystalline cellulose and cellulose ethers such as hydroxypropyl cellulose (HPC), Sugar alcohols such as xylitol, sorbitol or mannitol, Protein: gelatin, polyvinylpyrrolidone (PVP), polyethylene glycol (PEG), gelatin, cellulose, cellulose derivatives, polyvinylpyrrolidone, starch, sucrose and polyethylene glycol, cellulose, methyl cellulose, polyvinylpyrrolidone and polyethylene glycol;

(f) Coatings selected from a group consisting of cellulose ether hydroxypropyl methylcellulose (HPMC), occasionally, synthetic polymers, shellac, corn protein zein, polysaccharides, gelatin;

(g) Enterics selected from a group consisting of fatty acids, waxes, shellac, plastics, and plant fibers;

(h) Disintegrants selected from a group consisting of Crosslinked polymers: crosslinked polyvinylpyrrolidone (crospovidone), crosslinked sodium carboxymethyl cellulose (croscarmellose sodium), modified starch sodium starch glycolate;

(i) Flavors;

(j) Glidants selected from a group consisting of silica gel, fumed silica, talc, and magnesium carbonate, silica gel Glidants such as Syloid® 244 FP and Syloid®;

(k) Lubricants selected from a group consisting of talc or silica, fats, vegetable stearin, magnesium stearate or stearic acid;

(l) Preservatives selected from a group consisting of antioxidants, vitamin A, vitamin E, vitamin C, retinyl palmitate, and selenium, amino acids cysteine and methionine, Citric acid and sodium citrate, parabens: methyl paraben and propyl parabe;

(m) Sorbents;

(n) Sweeteners;

(o) Vehicles selected from a group consisting of Petrolatum, dimethyl sulfoxide and mineral oil are common vehicles.

It is another object of the present invention to provide the device as defined above, wherein the formulation comprises excipients adapted to provide at least one selected from a group consisting of (a) better absorption via the mucosal tissue; (b) faster elimination from the systemic circulation and/or CNS (and more specifically brain) circulation; (c) better user experience (for example as smell added to the formulation, or such as effecting sensation at the time of delivery); (d) better efficacy (for example by adding smells that reduce appetite); (e) increase the stability of the active compound/s; (f) increase the solubility of the active compound/s; (g) increase hygroscopic (in case of dry powder formulation); (h) reduction of aggregation of the powder drug; (i) reduction of sensitivity to light; (j) optimize the plume geometry and/or the particle side distribution to optimize delivery to the target tissue; (k) reduction of the rate of solubility of the active compound in the case of mixing two components at the time of administration; (l) prolong the rate of solubility of the active compound in the case where a slow release of the active compound is desirable; (m) contribution to slow release of the drug in other means (for example biologic glue, adhesive means) that allow the slow release and controlled release manner of the active compound.

It is another object of the present invention to provide the device as defined above, wherein the fluid inlet port configured by means of size and shape to interface with at least one puncturing member, configured to, upon coupling to the fluid inlet port, piercing the same, thereby providing the substances in a fluid communication, by means of an activation mechanism, with at least one chamber configured to accept pressurized fluid at volume $V_{PF}$ [ml] and pressure $P_{PF}$ [barg]; wherein the activation mechanism, upon actuation within a short period of time, <500 milliseconds (dT), enables the pressurized fluid to flow from the chamber, via the fluid inlet port, entrains the substances, erupts via the fluid discharging outlet port to within the body cavity in the form of aerosol, such that the release time of the $V_{sub}$ [ml or mg] of the substances and the $V_{PF}$ [ml] of the pressurized fluid, $dT_{release}$ is less than 500 milliseconds.

It is another object of the present invention to provide the device as defined above, wherein the device is adapted to deliver at least one second substance with the Topiramate.

It is another object of the present invention to provide the device as defined above, wherein at least one of the following is being held true: (a) $V_{PF}$ is in a range of 1 to 50 ml; (b) $V_{sub}$ is in a range of about 0.01 to about 7 ml or 0.1 mg to 7 g; (c) $P_{PF}$ is in a range of about 0 to about 10 barg; further wherein at least one of the following is being held true: (d) $D_{in}$ or $D_{out}$ are in a range of 0.2 to 6 mm; (e) the $dP_{PF}/dT$ or $dP_{PF}/dT_{release}$ is greater than 0.001 barg/ms; (f) the $dP_{PF}/dT$ or $dP_{PF}/dT_{release}$ is greater than 0.01 barg/ms; (g) the volume rate $dV_{sub}/dT$ or $dV_{sub}/dT_{release}$ is greater than 0.0001 ml/ms; (h) the volume rate $dV_{sub}/dT$ or $dV_{sub}/dT_{release}$ is greater than 0.001 ml/ms; (i) the volume rate $dV_{PF}/dT$ or $dV_{PF}/dT_{release}$ is greater than 0.001 ml/ms; (g) the volume rate $dV_{PF}/dT$ or $dV_{PF}/dT_{release}$ is greater than 0.01 ml/ms; and (h) any combination thereof.

It is another object of the present invention to provide the device as defined above, wherein actuation of the activation mechanism is performed within a short period of time (dT); wherein the dT being less than 500 milliseconds.

It is another object of the present invention to provide the device as defined above, wherein the vial selected from a group consisting of a pierceable container, a blow-fill-seal and a form-fill-seal and any combination thereof.

It is another object of the present invention to provide the device as defined above, wherein the device is adapted to deliver a single unit dose or two (or more)-unit doses.

It is another object of the present invention to provide the device as defined above, wherein the substance is selected from a group consisting of proteins; stem-cells; cells, cells secreation/secrotomes, organs, portions, extracts, and isolations thereof; macro-molecules; RNA or other genes and proteins-encoding materials; neurotransmitters; receptor antagonists; hormones; Ketamine; commercially available by Lilly© (US) in the form of Baqsimi® product; Glucagon; substrates to treat one of the followings: anaphylaxis, Parkinson, seizures and opioid overdose; epinephrine; atropine; metoclopramide; commercially available Naloxone or Narcan® products; Esketamine (Spravato®); Radicava® [edaravone]; Ingrezza® [valbenazine]; Austedo® [deutetrabenazine]; Ocrevus® [ocrelizumab]; Xadago® [safinamide]; Spinraza® [nusinersen]; Zinbryta® [daclizumab]; Nuplazid® [pimavanserin]; Aristada® [aripiprazole lauroxil]; Vraylar® [cariprazine]; Rexulti® [brexpiprazole]; Aptiom® [eslicarbazepine acetate]; Vizamyl® [flutemetamol F18 injection]; Brintellix® [vortioxetine]; Tecfidera® [dimethyl fumarate]; Dotarem® [gadoterate meglumine]; Antibody mediated brain targeting drug delivery including aducanumab, gantenerumab, bapineuzumab, solanezumab, ofatumumab CD20, BIIB033, LCN2, HMGB1; insulin; oxytocin; orexin-A; leptin; benzodiazepine (i.e. midazolam); naloxone; perillyl alcohol; camptothecin; phytochemicals including curcumin and chrysin; nucleotides; olanzapine; risperidone; Venlafaxin; GDF-5; zonisamide; ropinirole; plant-originated and synthetically-produced terpenes and cannabinoids, including THC and CBD; valproric acid; rivastigmine; estradiol; topiramate or an equivalent preparation comprising CAS No. 97240-79-4; MFSD2 or MFSD2A or sodium-dependent lysophosphatidylcholine symporter; and any esters, salts, derivatives, mixtures, combinations thereof, with or without a carrier, liposomes, lyophilic or water-miscible solvents, surfactants, cells, cells fractions, cells secreation/secrotomes at a therapeutically effective concentration, Antidepressants such as clomipramine (Anafranil®), fluoxetine (Prozac®), fluvoxamine (Luvox®), paroxetine (Paxil®), sertraline (Zoloft®), Ketamine, Esketamine; Selective serotonin reuptake inhibitors (SSRIs), such as citalopram (Celexa®), escitalopram oxalate (Lexapro®), fluoxetine (Prozac®), fluvoxamine (Luvox®), paroxetine HCl (Paxil®), and sertraline (Zoloft®); Selective serotonin & norepinephrine inhibitors (SNRIs), such as desvenlafaxine (Khedezla®), desvenlafaxine; ccinate (Pristiq®), duloxetine (Cymbalta®), lev omilnacipran (Fetzima®), and venlafaxine (Effexor®); Novel serotonergic drugs such as vortioxetine (Trintellix®-formerly called Brintellix®) or vilazodone (Viibryd®); Older tricyclic antidepressants, such amitriptyline (Elavil®), imipramine (Tofranil®), nortriptyline (Pamelor®), and doxepin (Sinequan®). Drugs that are thought to affect mainly dopamine and norepinephrine such as bupropion (Wellbutrin®). Monoamine oxidase inhibitors (MAOIs), such as isocarboxazid (Marplan®), phenelzine (Nardil®), selegiline (EMSAM®), and tranylcypromine (Parnate®). Tetracyclic antidepressants that are noradrenergic and specific serotonergic antidepressants (NaSSAs), such as mirtazapine (Remeron®). L-methylfolate (Deplin®), sumatriptan (Imitrex®, Alsuma®, Trintellix® STATdose System®, Sumavel® DosePro®, Zecuity®, Treximet®); rizatriptan (Maxalt®, Maxalt-MLT®); eletriptan (Relpax®); zolmitriptan (Zomig®, Zomig-ZMT®); naratriptan Amerge®); almotriptan (Axert®); frovatriptan (Frova®) and any combination thereof.

It is another object of the present invention to provide a method of treating a condition for treating OCD/psychiatric conditions and mental disorders.

It is another object of the present invention to provide a method of treating a condition selected from (i) frequent and recurrent binge eating episodes, (ii) behavioral syndromes associated with physiological disturbances and physical factors (F50-F59 under fifth chapter of the ICD-10: Mental and behavioral disorders), (iii) obesity; (iv) OCD; (v) psychiatric conditions and mental disorders; (vi) migraines; (vii) pain; and, (viii) any combination thereof, comprising two set of steps as follows:

Step(s) of periodically administrating at least one substance at a dose of $V_{sub}^{pre-urge}$ [mg], so that its plasma (blood) concentration (i) is maintained below adverse effects; and (ii) is above an effective level for treating the condition.

Upon sensing at least one selected from a group consisting of an urge for a binge eating episode, physiological disturbance and any combination thereof, immediately delivering Topiramate or formulation thereof at a dose $V_{sub}^{post\ urge}$ [mg] within at least one body cavity.

It is another object of the present invention to provide the method as defined above, wherein the formulation comprises Topiramate as API.

It is another object of the present invention to provide the method as defined above, wherein the formulation comprises excipients selected from (a) chemical permeation enhancer (CPE) selected from a group consisting of Zwitterionic, palmityldimethyl, ammonio propane sulfonate (PPS) or a structural analogs, polysorbate 20, 40, 60, or 80, Hyaluronic acid (also referred to as HA or hyaluronan), poly(ethylene glycol), poly(lactic acid), poly(glycolic acid), poly Acrylic Acid and Poly-(N-isopropylacrylamide), or other biopolymers such as chitosan and alginate; cyclodextrin and modified cyclodextrin, such as but not limited to Captisol;

(b) Permeation enhancers selected from a group containing: a fatty acid, a medium chain glyceride, surfactant, steroidal detergent, an acyl carnitine, Lauroyl-DL-carnitine, an alkanoyl choline, an N-acetylated amino acid, esters, salts, bile salts, sodium salts, nitrogen-containing rings, and derivatives. The enhancer can be an anionic, cationic, zwitterionic, nonionic or combination of both. Anionic can be but not limit to: sodium lauryl sulfate, sodium decyl sulfate, sodium octyl sulfate, N-lauryl sarcosinate, sodium carparate. Cationic can be but not limit to: Cetyltrimethyl ammonium bromide, decyltrimethyl ammonium bromide, benzyldimethyl dodecyl ammonium chloride, myristyltimethyl ammonio chloride, deodecyl pridinium chloride. Zwitterionic can be but not limit to: decyldimethyl ammonio propane sulfonate, palmityldimethyl ammonio propane sulfonate, fatty acid, butyric, caproic, caprylic, pelargonic, capric, lauric, myristic, palmitic, stearic, arachidic, oleic, linoleic, linolinic acid, their salts, derivatives and any combinations or glyceride, monoglyceride, a diglyceride, or triglyceride of those fatty acids. Bile acids or salts, including conjugated or un conjugated bile acids, such as but not limited to: cholate, deoxycholate, tauro-cholate, glycocholate, taurodexycholate, ursodeoxycholate, tauroursodeoxycholate, chenodeoxycholate and their derivates and salts and combinations. Permeation enhancer as comprises a metal chelator, such as EDTA, EGTA, a surfactant, such as sodium dodecyl sulfate, polyethylene ethers or esters, polyethylene glycol-12 lauryl ether, salicylate polysorbate 80, nonylphenoxypolyoxyethylene, dioctyl sodium sulfosuccinate, saponin, palmitoyl carnitine, lauroyl-l-carnitine, dodecyl maltoside, acyl carnitines, alkanoyl cjolline and combinations. Other include but not limited, 3-nitrobenzoate, zoonula occulden toxin, fatty acid ester of lactic acid salts, glycyrrhizic acid salt, hydroxyl beta-cyclodextrin, N-acetylated amino acids such as sodium N-[8-(2-hydroxybenzoyl)amino] caprylate and chitosan, salts and derivates and any combinations;
(c) surfactant of water-in-oil, oil-in-water; emulsions, double emulsions, micro-emulsions, Nano-emulsions of the following (all or parts of the) surfactants, oils, co-surfactants, aqueous phase; to allow-better absorption in the mucosal tissue, better permeation and absorption in the target cells, better stability of the encapsulated drug/active ingredient;
(d) antiadherents selected from magnesium stearate;
(e) binders selected from a group consisting of Saccharides and their derivatives, Disaccharides: sucrose, lactose, Polysaccharides and their derivatives: starches, cellulose or modified cellulose such as microcrystalline cellulose and cellulose ethers such as hydroxypropyl cellulose (HPC), Sugar alcohols such as xylitol, sorbitol or mannitol, Protein: gelatin, polyvinylpyrrolidone (PVP), polyethylene glycol (PEG), gelatin, cellulose, cellulose derivatives, polyvinylpyrrolidone, starch, sucrose and polyethylene glycol, cellulose, methyl cellulose, polyvinylpyrrolidone and polyethylene glycol;
(f) Coatings selected from a group consisting of cellulose ether hydroxypropyl methylcellulose (HPMC), occasionally, synthetic polymers, shellac, corn protein zein, polysaccharides, gelatin;
(g) Enterics selected from a group consisting of fatty acids, waxes, shellac, plastics, and plant fibers;
(h) Disintegrants selected from a group consisting of Crosslinked polymers: crosslinked polyvinylpyrrolidone (crospovidone), crosslinked sodium carboxymethyl cellulose (croscarmellose sodium), modified starch sodium starch glycolate;
(i) Flavors;
(j) Glidants selected from a group consisting of silica gel, fumed silica, talc, and magnesium carbonate, silica gel Glidants such as Syloid® 244 FP and Syloid®;
(k) Lubricants selected from a group consisting of talc or silica, fats, vegetable stearin, magnesium stearate or stearic acid;
(l) Preservatives selected from a group consisting of antioxidants, vitamin A, vitamin E, vitamin C, retinyl palmitate, and selenium, amino acids cysteine and methionine, Citric acid and sodium citrate, parabens: methyl paraben and propyl parabe;
(m) Sorbents;
(n) Sweeteners;
(o) Vehicles selected from a group consisting of Petrolatum, dimethyl sulfoxide and mineral oil are common vehicles.

It is another object of the present invention to provide the method as defined above, wherein the formulation comprises excipients adapted to provide at least one selected from a group consisting of (a) better absorption via the mucosal tissue; (b) faster elimination from the systemic circulation and/or CNS (and more specifically brain) circulation; (c) better user experience (for example as smell added to the formulation, or such as effecting sensation at the time of delivery); (d) better efficacy (for example by adding smells that reduce appetite); (e) increase the stability of the active compound/s; (f) increase the solubility of the active compound/s; (g) increase hygroscopic (in case of dry powder formulation); (h) reduction of aggregation of the powder drug; (i) reduction of sensitivity to light; (j) optimize the plume geometry and/or the particle side distribution to optimize delivery to the target tissue; (k) reduction of the rate of solubility of the active compound in the case of mixing two components at the time of administration; (l) prolong the rate of solubility of the active compound in the case where a slow release of the active compound is desirable; (m) contribution to slow release of the drug in other means (for example biologic glue, adhesive means) that allow the slow release and controlled release manner of the active compound.

It is another object of the present invention to provide the method as defined above, wherein the step of periodically administrating at least one substance at a dose of $V_{sub}^{pre\text{-}urge}$ [mg] is performed by at least one route selected from orally, nasally and any combination thereof.

It is another object of the present invention to provide the method as defined above, wherein the step of upon sensing at least one selected from a group consisting of an urge for a binge eating episode, physiological disturbance and any combination thereof immediately delivering Topiramate at a dose $V_{sub}^{post\ urge}$ [mg] within at least one body cavity is performed on demand.

It is another object of the present invention to provide the method as defined above, wherein the step of upon sensing at least one selected from a group consisting of an urge for a binge eating episode, physiological disturbance and any combination thereof immediately delivering Topiramate at a dose $V_{sub}^{post\ urge}$ [mg] within at least one body cavity is performed by a device comprising: (a) at least one vial enclosing $V_{sub}$ [ml or mg] of the Topiramate; the vial having at least one fluid inlet port $D_{in}$ [mm] and at least one fluid discharging outlet port $D_{out}$ [mm], configured for placement in proximity to the body cavity of a subject; and (b) activation mechanism adapted to, upon actuation to release the substances within the body cavity in the form of aerosol.

It is another object of the present invention to provide the method as defined above, wherein the fluid inlet port configured by means of size and shape to interface with at least one puncturing member, configured to, upon coupling to the fluid inlet port, piercing the same, thereby providing the substances in a fluid communication, by means of an activation mechanism being actuated within a short period of time, <500 milliseconds (dT), with at least one chamber configured to accept pressurized fluid at volume $V_{PF}$ [ml] and pressure $P_{PF}$ [barg]; wherein the activation mechanism, upon actuation, enables the pressurized fluid to flow from the chamber, via the fluid inlet port, entrains the substances, erupts via the fluid discharging outlet port to within the body cavity in the form of aerosol, such that the release time of the $V_{sub}$ [ml or mg] of the Topiramate and the $V_{PF}$ [ml] of the pressurized fluid, $dT_{release}$ is less than 500 milliseconds.

It is another object of the present invention to provide the method as defined above, wherein at least one of the following is being held true: (a) $V_{PF}$ is in a range of 1 to 50 ml; (b) $V_{sub}$ is in a range of about 0.01 to about 7 ml or 0.1 mg to 7 g; (c) $P_{PF}$ is in a range of about 0 to about 10 barg; further wherein at least one of the following is being held true: (d) $D_{in}$ or $D_{out}$ are in a range of 0.2 to 6 mm; (e) the $dP_{PF}/dT$ or $dP_{PF}/dT_{release}$ is greater than 0.001 barg/ms; (f) the $dP_{PF}/dT$ or $dP_{PF}/dT_{release}$ is greater than 0.01 barg/ms; (g) the volume rate $dV_{sub}/dT$ or $dV_{sub}/dT_{release}$ is greater than 0.0001 ml/ms; (h) the volume rate $dV_{sub}/dT$ or $dV_{sub}/dT_{release}$ is greater than 0.001 ml/ms; (i) the volume rate $dV_{PF}/dT$ or $dV_{sub}/dT_{release}$ is greater than 0.001 ml/ms; (j) the volume rate $dV_{PF}/dT$ or $dV_{sub}/dT_{release}$ is greater than 0.01 ml/ms; and (k) any combination thereof.

It is another object of the present invention to provide the method as defined above, wherein actuation of the activation mechanism is performed within a short period of time (dT); wherein the dT being less than 500 milliseconds.

It is another object of the present invention to provide the method as defined above, wherein the vial selected from a group consisting of a pierceable container, a blow-fill-seal and a form-fill-seal and any combination thereof.

It is another object of the present invention to provide the method as defined above, wherein the device is adapted to deliver a single unit dose or two (or more)-unit doses.

It is another object of the present invention to provide the method as defined above. It is another object of the present invention to provide the method as defined above, wherein the body orifice is a nasal cavity, a mouth, a throat, an ear, a vagina, a rectum, a urethra, and any combination thereof.

It is another object of the present invention to provide a method of treating a condition selected from (i) frequent and recurrent binge episodes, (ii) behavioral syndromes associated with physiological disturbances and physical factors (F50-F59 under fifth chapter of the ICD-10: Mental and behavioral disorders), (iii) obesity; (iv) OCD; (v) psychiatric conditions and mental disorders; (vi) migraines; (vii) pain; and, (viii) any combination thereof, comprising step as follows: Upon sensing at least one selected from a group consisting of an urge for a binge eating episode, physiological disturbance and any combination thereof, immediately delivering Topiramate at a dose $V_{sub}^{post\ urge}$ [mg] within at least one body cavity.

It is another object of the present invention to provide the method as defined above, wherein the step of upon sensing at least one selected from a group consisting of an urge for a binge eating episode, physiological disturbance and any combination thereof immediately delivering Topiramate at a dose $V_{sub}^{post\ urge}$ [mg] within at least one body cavity is performed on demand.

It is another object of the present invention to provide the method as defined above, wherein the step of upon sensing at least one selected from a group consisting of an urge for a binge eating episode, physiological disturbance and any combination thereof immediately delivering Topiramate at a dose $V_{sub}^{post\ urge}$ [mg] within at least one body cavity is performed by a device comprising: (a) at least one vial enclosing $V_{sub}$ [ml or mg] of the Topiramate; the vial having at least one fluid inlet port $D_{in}$ [mm] and at least one fluid discharging outlet port $D_{out}$ [mm], configured for placement in proximity to the body cavity of a subject; and (b) activation mechanism adapted to upon actuation within a short period of time of less than 500 milliseconds (dT), to release the substances within the body cavity in the form of aerosol, such that the release time of the $V_{sub}$ [ml or mg] of the Topiramate and the $V_{PF}$ [ml] of the pressurized fluid, $dT_{release}$ is less than 500 milliseconds.

It is another object of the present invention to provide the method as defined above, wherein the fluid inlet port configured by means of size and shape to interface with at least one puncturing member, configured to, upon coupling to the fluid inlet port, piercing the same, thereby providing the substances in a fluid communication, by means of an activation mechanism, with at least one chamber configured to accept pressurized fluid at volume $V_{PF}$ [ml] and pressure $P_{PF}$ [barg]; wherein the activation mechanism, upon actuation, enables the pressurized fluid to flow from the chamber, via the fluid inlet port, entrains the substances, erupts via the fluid discharging outlet port to within the body cavity in the form of aerosol.

It is another object of the present invention to provide the method as defined above, wherein at least one of the following is being held true: (a) $V_{PF}$ is in a range of 1 to 50 ml; (b) $V_{sub}$ is in a range of about 0.01 to about 7 ml or 0.1 mg to 7 g; (c) $P_{PF}$ is in a range of about 0 to about 10 barg; further wherein at least one of the following is being held true: (d) $D_{in}$ or $D_{out}$ are in a range of 0.2 to 6 mm; (e) the $dP_{PF}/dT$ or $dP_{PF}/dT_{release}$ is greater than 0.001 barg/ms; (f) the $dP_{PF}/dT$ or $dP_{PF}/dT_{release}$ is greater than 0.01 barg/ms; (g) the volume rate $dV_{sub}/dT$ or $dV_{sub}/dT_{release}$ is greater than 0.0001 ml/ms; (h) the volume rate $dV_{sub}/dT$ or $dV_{sub}/dT_{release}$ is greater than 0.001 ml/ms; (i) the volume rate $dV_{PF}/dT$ or $dV_{sub}/dT_{release}$ is greater than 0.001 ml/ms; (j) the volume rate $dV_{PF}/dT$ or $dV_{sub}/dT_{release}$ is greater than 0.01 ml/ms; and (k) any combination thereof.

It is another object of the present invention to provide the method as defined above, wherein actuation of the activation mechanism is performed within a short period of time (dT); wherein the dT being less than 500 milliseconds.

It is another object of the present invention to provide the method as defined above, wherein the vial selected from a group consisting of a pierceable container, a blow-fill-seal and a form-fill-seal and any combination thereof.

It is another object of the present invention to provide the method as defined above, wherein the device is adapted to deliver a single unit dose or two (or more)-unit doses.

It is another object of the present invention to provide the method as defined above, additionally administering a second substance.

It is another object of the present invention to provide the method as defined above, wherein the second substance is selected from a group consisting of proteins; stem-cells; cells, cells secreation/secrotomes, organs, portions, extracts, and isolations thereof; macro-molecules; RNA or other genes and proteins-encoding materials; neurotransmitters; receptor antagonists; hormones; Ketamine; commercially available by Lilly© (US) in the form of Baqsimi® product; Glucagon; substrates to treat one of the followings: anaphylaxis, Parkinson, seizures and opioid overdose; epinephrine; atropine; metoclopramide; commercially available Naloxone or Narcan® products; Esketamine (Spravato®); Radicava® [edaravone]; Ingrezza® [valbenazine]; Austedo® [deutetrabenazine]; Ocrevus® [ocrelizumab]; Xadago® [safinamide]; Spinraza® [nusinersen]; Zinbryta® [daclizumab]; Nuplazid® [pimavanserin]; Aristada® [aripiprazole lauroxil]; Vraylar® [cariprazine]; Rexulti® [brexpiprazole]; Aptiom® [eslicarbazepine acetate]; Vizamyl® [flutemetamol F18 injection]; Brintellix® [vortioxetine]; Tecfidera® [dimethyl fumarate]; Dotarem® [gadoterate meglumine]; Antibody mediated brain targeting drug delivery including aducanumab, gantenerumab, bapineuzumab, solanezumab, ofatumumab CD20, BIIB033, LCN2, HMGB1; insulin; oxytocin; orexin-A; leptin; benzodiazepine (i.e. midazolam); naloxone; perillyl alcohol; camptothecin; phytochemicals including curcumin and chrysin; nucleotides; olanzapine; risperidone; Venlafaxin; GDF-5; zonisamide; ropinirole; plant-originated and synthetically-produced terpenes and cannabinoids, including THC and CBD; valproric acid; rivastigmine; estradiol; topiramate or an equivalent preparation comprising CAS No. 97240-79-4; MFSD2 or MFSD2A or sodium-dependent lysophosphatidylcholine symporter; and any esters, salts, derivatives, mixtures, combinations thereof, with or without a carrier, liposomes, lyophilic or water-miscible solvents, surfactants, cells, cells fractions, cells secreation/secrotomes, zonisamide, GLP1 agonists; Vyvanse® lisdexamfetamine dimesylate; Dasotraline, phentermine; bupropion/naltrexone; methamphetamine; orlistat; bupropion; phendimetrazine; peripherally acting antiobesity agents; phentermine, topiramate (Qsymia®); diethylpropion; liraglutide (Saxenda®); lorcaserin; chorionic gonadotropin (Pregnyl®); phendimetrazine (Bontril® PDM); systemic; liraglutide; Lomaira®; amphetamine; benzphetamine; cimetidine (Tagamet® HB); desvenlafaxine; Equaline® Acid Reducer; diethylpropion (Tepanil®); Glucagon-like peptide-1 receptor agonists; Dulaglutide (Trulicity®), Exenatide extended release (Bydureon®), Semaglutide (Ozempic®), Liraglutide (Victoza®), Lixisenatide (Adlyxin®), Exenatide (Byetta®) at a therapeutically effective concentration, Antidepressants such as clomipramine (Anafranil®), fluoxetine (Prozac®), fluvoxamine (Luvox®), paroxetine (Paxil®), sertraline (Zoloft®), Ketamine, Esketamine; Selective serotonin reuptake inhibitors (SSRIs), such as citalopram (Celexa®), escitalopram oxalate (Lexapro®), fluoxetine (Prozac®), fluvoxamine (Luvox®), paroxetine HCI (Paxil®), and sertraline (Zoloft®); Selective serotonin & norepinephrine inhibitors (SNRIs), such as desvenlafaxine (Khedezla®), desvenlafaxine; ccinate (Pristiq®), duloxetine (Cymbalta®), lev omilnacipran (Fetzima®), and venlafaxine (Effexor®); Novel serotonergic drugs such as vortioxetine (Trintellix®-formerly called Brintellix®) or vilazodone (Viibryd®); Older tricyclic antidepressants, such amitriptyline (Elavil®), imipramine (Tofranil®), nortriptyline (Pamelor®), and doxepin (Sinequan®). Drugs that are thought to affect mainly dopamine and norepinephrine such as bupropion (Wellbutrin®). Monoamine oxidase inhibitors (MAOIs), such as isocarboxazid (Marplan®), phenelzine (Nardil®), selegiline (EMSAM®), and tranylcypromine (Parnate®). Tetracyclic antidepressants that are noradrenergic and specific serotonergic antidepressants (NaSSAs), such as mirtazapine (Remeron®). L-methylfolate (Deplin®), sumatriptan (Imitrex®, Alsuma®, Imitrex® STATdose System®, Sumavel® DosePro®, Zecuity®, Treximet®); rizatriptan (Maxalt®, Maxalt-MLT®); eletriptan (Relpax®); zolmitriptan (Zomig®, Zomig-ZMT®); naratriptan Amerge®); almotriptan (Axert®); frovatriptan (Frova®) and any combination thereof.

It is another object of the present invention to provide the method as defined above, wherein the body orifice is a nasal cavity, a mouth, a throat, an ear, a vagina, a rectum, a urethra, and any combination thereof.

It is another object of the present invention to provide the method as defined above, wherein the plasma concentration of the topiramate is in the range of 1 order of magnitude of 1.73 (μg/ml) which results in a sufficient brain concentration effectivity, with minimal adverse side effects.

It is another object of the present invention to disclose a device for delivering either one or more substances within at least one body cavity, characterized by a vial comprising $V_{sub}$ [ml] of the substances; the vial selected from a pierceable container, a container in a fluid connection with an open-closed valve (e.g., such as a valve configured to allow passage of powder, fluids etc.), a blow-fill-seal and a form-fill-seal, having fluid inlet and a fluid discharging outlet of diameter D [mm], configured for placement in proximity to the body cavity; the fluid inlet configured by means of size and shape to interface in a sealable manner a puncturing member, configured to, upon coupling to the fluid inlet, piercing the same, thereby providing the substances in a fluid communication, via a valve, with a chamber configured to accept pressurized fluid at volume $V_{PF}$ [ml] and pressure $P_{PF}$ [barg]; the valve is reconfigurable from a CLOSED to an OPEN CONFIGURATION within a short period of time, (Δt); in the OPEN CONFIGURATION, the pressurized fluid flows at a rate of $F_R$ [m/sec] from the chamber, via the fluid inlet, entrains the substances and emitted via the fluid discharging outlet to within the body cavity wherein at least one of the following is true: (A) the pressurized fluid flow is configured to deliver Topiramate intranasally such that plasma (rabbit) concentration is greater than 5,000 ng/ml in less than 2 min, Δt<2. (B) the pressurized fluid flow is configured to deliver Topiramate intranasally such that the brain (rabbit) concentration is greater than 2,000 ng/ml in less than 2 min, Δt<2. (C) the pressurized fluid flow is configured to deliver Topiramate intranasally such that plasma (rabbit) concentration is greater than 15,000 ng/ml in less than 5 min, Δt<5. (D) the pressurized fluid flow is configured to deliver Topiramate intranasally such that the brain (rabbit) concentration is greater than 5,000 ng/ml in less than 5 min, Δt<5. (E) the pressurized fluid flow is configured to deliver Topiramate intranasally such that plasma (rabbit) concentration is greater than 20,000 ng/ml in less than 30 min, Δt<30. (F) the pressurized fluid flow is configured to deliver Topiramate intranasally such that the brain (rabbit) concentration is greater than 7,500 ng/ml in less than 30 min, Δt<30. (G) substance' brain concentration after 2 min of administration is <25% of its concentration after 30 min, and (H) substance' brain concentration after 5 min of administration is <70% of its concentration after 30 min.

It is another object of the present invention to disclose a device as defined in any of the above, wherein at least one of the following is true: the body orifice is a nasal cavity, a mouth, a throat, an ear, a vagina, a rectum, a urethra, and any combination thereof; the pressurized gas is selected from a group consisting of air, nitrogen, oxygen, carbon dioxide, helium, neon, xenon and any combination thereof; during dispensing of the at least one substance, a mixture of the predetermined volume $V_{gas}$ [ml] of the pressurized gas with the predetermined volume $V_{sub}$ [ml] of the substance entrained within it forms a plume of aerosol; the aerosol having a predetermined distribution, the distribution being either homogeneous or heterogeneous, the heterogeneous distribution is selected from a group consisting of: an arbitrary distribution, a distribution in which the density of the at least one substance within the mixture follows a predetermined pattern, and any combination thereof; characteristics of the aerosol selected from a group consisting of:

particle size, particle shape, particle distribution, and any combination thereof, are determinable from characteristics of the device selected from a group consisting of: the predetermined volume of the pressurized gas, the predetermined volume of the substance, the predetermined pressure of the pressurized gas, the predetermined orifice size, and any combination thereof; at least one the substance is selected from a group consisting of a gas, a liquid, a powder, an aerosol, a slurry, a gel, a suspension and any combination thereof; at least one the substance is stored under one of the followings: an inert atmosphere; under vacuum and a pressure above ambient pressure to prevent reactions during storage; a dose-response curve is substantially linear for brain concentration of the substance when administered nasally via the device; and a dose-response curve for brain concentration having a fit selected from a group consisting of logarithmic, parabolic, exponential, sigmoid, power-low, and any combination thereof; of the substance when administered nasally via the device.

It is another object of the present invention to disclose a device as defined in any of the above, wherein the container is a capsule having a main longitudinal axis, the capsule comprising a number n of compartments, the capsule configured to contain the predetermined volume $V_{sub}$ [ml] of the at least one substance, the volume $V_{sub}$ [ml] of the at least one substance containable in at least one of the n compartments; at least one of the following being true: the number n of the compartments is an integer greater than or equal to 1; at least one the compartment has cross-section with shape selected from a group consisting of: wedge shaped, circular, oval, elliptical, polygonal, annular, and any combination thereof; for the number n of compartments being an integer greater than 1, at least two the compartments have different volumes; for the number n of compartments being an integer greater than 1, at least two the compartments have the same volume; for the number n of compartments being an integer greater than 1, at least two the compartments have different cross-sectional areas; for the number n of compartments being an integer greater than 1, at least two the compartments have the same cross-sectional area; for the number n of compartments being an integer greater than 1, at least two the compartments contain different substances; for the number n of compartments being an integer greater than 1, at least two the compartments contain the same substance; for the number n of compartments being an integer greater than 1, at least two the compartments are disposed coaxially around the main longitudinal axis of the capsule; for the number n of compartments being an integer greater than 1, at least two the compartments are disposed sequentially along the main longitudinal axis of the capsule; for the number n of compartments greater than 1, the plurality of substances mix during the dispensing; and for the number n of compartments greater than 1, the plurality of substances react during the dispensing.

It is another object of the present invention to disclose a device as defined in any of the above, wherein the container comprises a port fluidly connectable to the exterior of the device, the port configured such that the at least one substance is insertable into the chamber via the port.

It is another object of the present invention to disclose a device as defined in any of the above, wherein the device comprises a port cover configured to provide an air-tight closure for the port, the port cover slidable along the device, rotatable around the device, rotatable around a hinge on the exterior of the device and any combination thereof.

It is another object of the present invention to disclose a device as defined in any of the above, wherein the pressurized fluid entrains the substance in a pulsed manner, such that a plurality of portions $V_{PF}$ are emitted via the fluid discharging outlet to within the body cavity.

It is another object of the present invention to disclose a device as defined in any of the above, wherein the substance is selected from a group consisting of proteins; stem-cells; cells, cells secreation/secrotomes, organs, portions, extracts, and isolations thereof; macro-molecules; RNA or other genes and proteins-encoding materials; neurotransmitters; receptor antagonists; hormones; Ketamine; Baqsimi product commercially available by Lilly® (US); Glucagon; substrates to treat one of the followings: anaphylaxis, Parkinson, seizures and opioid overdose; epinephrine; atropine; metoclopramide; commercially available Naloxone or Narcan® products; Esketamine (Spravato®); Radicava® [edaravone]; Ingrezza® [valbenazine]; Austedo® [deutetrabenazine]; Ocrevus® [ocrelizumab]; Xadago® [safinamide]; Spinraza® [nusinersen]; Zinbryta® [daclizumab]; Nuplazid® [pimavanserin]; Aristada® [aripiprazole lauroxil]; Vraylar® [cariprazine]; Rexulti® [brexpiprazole]; Aptiom® [eslicarbazepine acetate]; Vizamyl® [flutemetamol F18 injection]; Brintellix® [vortioxetine]; Tecfidera® [dimethyl fumarate]; Dotarem® [gadoterate meglumine]; Antibody mediated brain targeting drug delivery including aducanumab, gantenerumab, bapineuzumab, solanezumab, ofatumumab CD20, BIIB033, LCN2, HMGB1; insulin; oxytocin; orexin-A; leptin; benzodiazepine (i.e. midazolam); perillyl alcohol; camptothecin; phytochemicals including curcumin and chrysin; nucleotides; olanzapine; risperidone; Venlafaxin; GDF-5; zonisamide; ropinirole; plant-originated and synthetically-produced terpenes and cannabinoids, including THC and CBD; valproric acid; rivastigmine; estradiol; topiramate or an equivalent preparation comprising CAS No. 97240-79-4; MFSD2 or MFSD2A or sodium-dependent lysophosphatidylcholine symporter; and any esters, salts, derivatives, mixtures, combinations thereof, with or without a carrier, liposomes, lyophilic or water-miscible solvents, surfactants, cells, cells fractions, cells secreation/secrotomes at a therapeutically effective concentration, Antidepressants such as clomipramine (Anafranil®), fluoxetine (Prozac®), fluvoxamine (Luvox®) paroxetine (Paxil®), sertraline (Zoloft®), Ketamine, Esketamine; Selective serotonin reuptake inhibitors (SSRIs), such as citalopram (Celexa®), escitalopram oxalate (Lexapro®), fluoxetine (Prozac®), fluvoxamine (Luvox®), paroxetine HCI (Paxil®), and sertraline (Zoloft®); Selective serotonin & norepinephrine inhibitors (SNRIs), such as desvenlafaxine (Khedezla®), desvenlafaxine; ccinate (Pristiq®), duloxetine (Cymbalta®), lev omilnacipran (Fetzima®), and venlafaxine (Effexor®); Novel serotonergic drugs such as vortioxetine (Trintellix®-formerly called Brintellix®) or vilazodone (Viibryd®; Older tricyclic antidepressants, such amitriptyline (Elavil®), imipramine (Tofranil®), nortriptyline (Pamelor®), and doxepin (Sinequan®). Drugs that are thought to affect mainly dopamine and norepinephrine such as bupropion (Wellbutrin®). Monoamine oxidase inhibitors (MAOIs), such as isocarboxazid (Marplan®), phenelzine (Nardil®), selegiline (EMSAM®), and tranylcypromine (Parnate®). Tetracyclic antidepressants that are noradrenergic and specific serotonergic antidepressants (NaSSAs), such as mirtazapine (Remeron®). L-methylfolate (Deplin®), sumatriptan (Imitrex®, Alsuma®, Imitrex® STATdose System®, Sumavel® DosePro®, Zecuity®, Treximet®); rizatriptan (Maxalt®, Maxalt-MLT®); eletriptan (Relpax®); zolmitriptan (Zomig®, Zomig-ZMT®); naratriptan Amerge®); almotriptan (Axert®); frovatriptan (Frova®) and any combination thereof.

Another object of eth invention is to disclose a method for delivering either one or more substances within at least one body cavity, characterized by steps of providing a vial with $V_{sub}$ [ml] of the substances; the vial selected from a pierceable container, a blow-fill-seal and a form-fill-seal, further providing the vial with a fluid inlet and a fluid discharging outlet of diameter D [mm], configured for placement in proximity to the body cavity; configuring the fluid inlet by means of size and shape to interface a puncturing member, so that upon coupling to the fluid inlet, piercing of the same, thereby providing the substances in a fluid communication, via a valve, with a chamber configured to accept pressurized fluid at volume $V_{PF}$ [ml] and pressure $P_{PF}$ [barg]; the valve is commutable from a CLOSED to an OPEN CONFIGURATION within a short period of time, <500 milliseconds (dT); in the OPEN CONFIGURATION, facilitating the flow of the pressurized fluid from the chamber via the fluid inlet, thereby emitting the substances via the fluid discharging outlet to within the body cavity.

It is another object of the present invention to disclose a method as defined above, wherein the method is provided useful for the delivery of the predetermined volume $V_{sub}$ [ml] of the substance and the predetermined volume $V_{gas}$ of the pressurized gas through the orifice of diameter D [mm] in a pressure rate of $dP_{gas}/dT$ is provided; and further wherein at least one of the following is held true: the method comprises a step of providing $P_{gas}$ (or $P_{PF}$) is in a range of about 0 to about 10 barg; the method comprises a step of providing $V_{gas}$ (or $V_{PF}$) is in a range of about 1 to about 50 ml; the method comprises a step of providing $V_{sub}$ is in a range of about 0.01 to about 7 ml or 0.1 mg to 7 g; the method comprises a step of providing D is in a range of 0.2 to about 6 mm; the method comprises a step of providing the pressure rate, $dP/dT \rightarrow \infty$; the method comprises a step of providing the pressure rate greater than about 0.001 barg/ms; the method comprises a step of providing the volume rate $dV_{sub}/dT$ is greater than about 0.0001 ml/ms; the method comprises a step of providing the volume rate $dV_{gas}/dT$ is greater than about 0.001 ml/ms; the method comprises a step of providing the predetermined period of time, $\Delta t \rightarrow 0$; and the method comprises a step of providing $\Delta T$ is in a range of about 0 to 500 milliseconds.

It is another object of the present invention to disclose a method as defined in any of the above, wherein additionally the method comprising at least one of the following steps: selecting the body orifice from a group consisting of a nasal cavity, the mouth, the throat, an ear, the vagina, the rectum, the urethra, and any combination thereof; selecting the gas from a group consisting of: air, nitrogen, oxygen, carbon dioxide, helium, neon, xenon and any combination thereof; dispensing the at least one substance, and during the step of dispensing, forming a plume of aerosol with predetermined distribution from a mixture of the predetermined volume $V_{gas}$ [ml] of the pressurized gas and the predetermined volume $V_{sub}$ [ml] entrained within it; selecting the predetermined distribution from a group consisting of: a homogeneous distribution, a heterogeneous distribution; selecting the heterogeneous distribution from a group consisting of: an arbitrary distribution, a distribution in which the density of the at least one substance within the mixture follows a predetermined pattern, and any combination thereof; selecting characteristics of the aerosol from a group consisting of: particle size, particle shape, particle distribution, and any combination thereof, are determinable from characteristics of the device selected from a group consisting of: the predetermined volume of the pressurized gas, the predetermined volume of the substance, the predetermined pressure of the pressurized gas, the predetermined orifice size, and any combination thereof; selecting the substance from a group consisting of: a gas, a liquid, a powder, a slurry, a gel, a suspension, and any combination thereof; storing at least one the substance under one of the followings: an inert atmosphere; under vacuum; and at a pressure above ambient pressure to prevent reactions during storage; characterizing a dose-response curve for brain concentration of the substance to be of substantially linear form; and providing the administration with a dose-response curve for brain concentration having a fit selected from a group consisting of logarithmic, parabolic, exponential, sigmoid, power-low, and any combination thereof; of the substance when administered nasally via the device.

It is another object of the present invention to disclose a method as defined above, wherein the method is provided useful for treating a condition selected from (i) frequent and recurrent binge episodes, (ii) behavioral syndromes associated with physiological disturbances and physical factors (F50-F59 under fifth chapter of the ICD-10: Mental and behavioral disorders or by DSM-5: Diagnostic and Statistical Manual of Mental Disorders scale (American Psychiatric Association. Diagnostic and Statistical Manual of Mental Disorders, Fourth Edition, Text Revision. Washington, DC, American Psychiatric Association 2000), (iii) obesity; (iv) OCD; (v) psychiatric conditions and mental disorders; (vi) migraines; (vii) pain; and (viii) any combination thereof. In DSM-5, BED is defined as ≥1 binge eating episode per week over a ≥3-month period. Binge eating episodes are defined as eating in a discrete period of time an amount of food that is definitely larger than most people would eat in a similar period under similar circumstances and with a sense of lack of control over eating during the episode]), comprising two set of steps: periodically administering a substance selected from a group consisting of at least one first substance and at least one second substance, so that its plasma (blood) concentration is maintained below (i) showing adverse effects; and (ii) providing an effective level for treating the condition when a post urge administration will be delivered; the dose of the periodically administered substance is $V_{sub}^{pre-urge}$ [ml]; and, upon sensing an urge, immediately delivering the a substance within at least one body cavity, the substance selected from a group consisting of at least one first substance and at least one second substance, the dose of the post urge administered substance is $V_{sub}^{post\ urge}$ [ml]; $V_{sub}^{pre-urge} + V_{sub}^{post-urge} \geq V_{sub}^{effective\ dose}$, the $V_{sub}^{effective\ dose}$ is a dose for applying an efficient treatment for the condition without having adverse effects.

It is another object of the present invention to disclose a method as defined above, wherein the post-urge substance is delivered by a device, characterized by a vial comprising $V_{sub}$ [ml] of the substances; the vial selected from a pierceable container, a blow-fill-seal and a form-fill-seal, having fluid inlet and a fluid discharging outlet of diameter D [mm], configured for placement in proximity to the body cavity; the fluid inlet configured by means of size and shape to interface in a sealable manner a puncturing member, configured to, upon coupling to the fluid inlet, piercing the same, thereby providing the substances in a fluid communication, via a valve, with a chamber configured to accept pressurized fluid at volume $V_{PF}$ [ml] and pressure $P_{PF}$ [barg]; the valve is commutable from a CLOSED to an OPEN CONFIGURATION within a short period of time, ($\Delta t$); in the OPEN CONFIGURATION, the pressurized fluid flows at a rate of $F_R$ [m/sec] from the chamber, via the fluid inlet, entrains the substances and emitted via the fluid discharging outlet to within the body cavity.

It is another object of the present invention to disclose the method as defined above, wherein the device is configured so that at least one of the following is true: the pressurized fluid flow rate ($F_R$) is in a rang selected from a group consisting of about 10.8 m/s to about 13.8 m/s; about 13.9 m/s to about 17.1 m/s; about 17.2 m/s to 20.7 m/s; and 20.8 m/s or more; the pressurized fluid flow is configured to deliver Topiramate intranasally such that plasma (rabbit) concentration is greater than 5,000 ng/ml in less than 2 min, $\Delta t<2$; the pressurized fluid flow is configured to deliver Topiramate intranasally such that the brain (rabbit) concentration is greater than 2,000 ng/ml in less than 2 min, $\Delta t<2$; the pressurized fluid flow is configured to deliver Topiramate intranasally such that plasma (rabbit) concentration is greater than 15,000 ng/ml in less than 5 min, $\Delta t<5$; the pressurized fluid flow is configured to deliver Topiramate intranasally such that the brain (rabbit) concentration is greater than 5,000 ng/ml in less than 5 min, $\Delta t<5$; the pressurized fluid flow is configured to deliver Topiramate intranasally such that plasma (rabbit) concentration is greater than 20,000 ng/ml in less than 30 min, $\Delta t<30$; the pressurized fluid flow is configured to deliver Topiramate intranasally such that the brain (rabbit) concentration is greater than 7,500 ng/ml in less than 30 min, $\Delta t<30$; substance' brain concentration after 2 min of administration was at least about 25% of its concentration after 30 min, and substance' brain concentration after 5 min of administration at least about 65% of its concentration after 30 min.

It is another object of the present invention to disclose a method for treating a condition selected from (i) frequent and recurrent binge episodes, (ii) behavioral syndromes associated with physiological disturbances and physical factors (F50-F59 under fifth chapter of the ICD-10: Mental and behavioral disorders or by DSM-5: Diagnostic and Statistical Manual of Mental Disorders scale (American Psychiatric Association. Diagnostic and Statistical Manual of Mental Disorders, Fourth Edition, Text Revision. Washington, DC, American Psychiatric Association 2000).]), (iii) obesity; (iv) OCD; (v) psychiatric conditions and mental disorders; (vi) migraines; (vii) pain; and, (viii) any combination thereof, comprising two set of steps: periodically administering a substance selected from a group consisting of at least one first substance and at least one second substance, so that its plasma (blood) concentration is maintained below (i) showing adverse effects; and (ii) providing an effective level for treating the condition when a post urge administration will be delivered; the dose of the periodically administered substance is $V_{sub}^{pre-urge}$ [ml]; and, upon sensing an urge, immediately delivering the a substance within at least one body cavity by a device, the substance selected from a group consisting of at least one first substance and at least one second substance, the dose of the post urge administrated substance is $V_{sub}^{post\ urge}$ [ml]; $V_{sub}^{pre-urge} + V_{sub}^{post-urge} \geq V_{sub}^{effective\ dose}$, the $V_{sub}^{effective\ dose}$ is a dose for applying an efficient treatment for the condition without having adverse effects.

It is another object of the present invention to disclose a method above, wherein the device is a unit dose device for delivering a predetermined amount $M_{sub}$ of at least one substance, within at least one body cavity of a subject, the unit dose device comprising: at least one predefined volume sized and shaped for containing the predetermined amount $M_{sub}$ of the at least one substance; a delivery end for placement in proximity to the body cavity, the delivery end being in fluid communication with the container; the delivery end comprises at least one orifice of diameter D; at least one valve mechanically connectable to the container, characterized by at least two configurations: (i) an active configuration in which the valve enables delivery of predetermined amount $M_{sub}$ of the substance from the container to the body cavity via the delivery end; and, (ii) an inactive configuration, in which the valve prevents delivery of the predetermined amount $M_{sub}$ of the substance from the container to the body cavity; the valve is reconfigurable from the inactive configuration to the active configuration within a predetermined period of time, dT, in response to activation of the same; and It is another object of the present invention to disclose a method as defined above, wherein the unit dose device has a configuration selected from a group consisting of configured to deliver a single unit dose or configured to deliver two (or more)-unit doses.

It is another object of the present invention to disclose a method as defined above, wherein the unit dose device is configured to deliver the predetermined amount $M_{sub}$ of the substance and the predetermined volume $V_{gas}$ of the pressurized gas through the orifice of diameter D in (a) pressure rate of $dP_{gas}/dT$; (b) volume rate of $dV_{gas}/dT$; and (c) amount rate of $dM_{sub}/dT$; at least one of the following being held true: $P_{gas}$ is in a range of 0 to 10 barg; $V_{gas}$ is in a range of 1 to 50 ml; D is in a range of 0.2 to 6 mm; dP gas/dT is greater than 0.001 barg/ms; the amount rate $dM_{sub}/dT$ is greater than 0.0001 ml/ms or greater than 0.0001 mg/ms; the volume rate $dV_{gas}/dT$ is greater than 0.001 ml/ms; dT is in a range of 0 to 500 millisecond; and any combination thereof.

It is still another object of the present invention to disclose a method as defined in any of the above, wherein the substance is selected from a group consisting of proteins; stem-cells; cells, cells secreation/secrotomes, organs, portions, extracts, and isolations thereof; macro-molecules; RNA or other genes and proteins-encoding materials; neurotransmitters; receptor antagonists; hormones; Ketamine; commercially available by Lilly® (US) available in the form of Baqsimi® product; Glucagon; substrates to treat one of eth followings: anaphylaxis, Parkinson, seizures and opioid overdose; epinephrine; atropine; metoclopramide; commercially available Naloxone or Narcan® products; Esketamine (Spravato®); Radicava® [edaravone]; Ingrezza® [valbenazine]; Austedo® [deutetrabenazine]; Ocrevus® [ocrelizumab]; Xadago® [safinamide]; Spinraza® [nusinersen]; Zinbryta® [daclizumab]; Nuplazid® [pimavanserin]; Aristada® [aripiprazole lauroxil]; Vraylar® [cariprazine]; Rexulti® [brexpiprazole]; Aptiom® [eslicarbazepine acetate]; Vizamyl® [flutemetamol F18 injection]; Brintellix® [vortioxetine]; Tecfidera® [dimethyl fumarate]; Dotarem® [gadoterate meglumine]; Antibody mediated brain targeting drug delivery including aducanumab, gantenerumab, bapineuzumab, solanezumab, ofatumumab CD20, BIIB033, LCN2, HMGB1; insulin; oxytocin; orexin-A; leptin; benzodiazepine (i.e. midazolam); perillyl alcohol; camptothecin; phytochemicals including curcumin and chrysin; nucleotides; olanzapine; risperidone; Venlafaxin; GDF-5; zonisamide; ropinirole; plant-originated and synthetically-produced terpenes and cannabinoids, including THC and CBD; valproric acid; rivastigmine; estradiol; topiramate or an equivalent preparation comprising CAS No. 97240-79-4; MFSD2 or MFSD2A or sodium-dependent lysophosphatidylcholine symporter; and any esters, salts, derivatives, mixtures, combinations thereof, with or without a carrier, liposomes, lyophilic or water-miscible solvents, surfactants, cells, cells fractions, cells secreation/secrotomes at a therapeutically effective concentration, Antidepressants such as clomipramine (Anafranil®), fluoxetine (Prozac®), fluvoxamine (Luvox®), paroxetine (Paxil®), sertraline (Zoloft®), Ketamine, Esketamine; Selective serotonin reuptake inhibitors (SSRIs), such as citalopram (Celexa®), escitalopram oxalate (Lexapro®), fluoxetine (Prozac®), fluvoxamine (Luvox®), paroxetine HCI (Paxil®), and sertraline (Zoloft®); Selective serotonin & norepinephrine inhibitors (SNRIs), such as desvenlafaxine (Khedezla®), desvenlafaxine; ccinate (Pristiq®), duloxetine (Cymbalta®), lev omilnacipran (Fetzima®), and venlafaxine (Effexor®); Novel serotonergic drugs such as vortioxetine (Trintellix®- formerly called Brintellix®) or vilazodone (Viibryd®); Older tricyclic antidepressants, such amitriptyline (Elavil®), imipramine (Tofranil®), nortriptyline (Pamelor®), and doxepin (Sinequan®). Drugs that are thought to affect mainly dopamine and norepinephrine such as bupropion (Wellbutrin®). Monoamine oxidase inhibitors (MAOIs), such as isocarboxazid (Marplan®), phenelzine (Nardil®), selegiline (EMSAM®), and tranylcypromine (Parnate®). Tetracyclic antidepressants that are noradrenergic and specific serotonergic antidepressants (NaSSAs), such as mirtazapine (Remeron®). L-methylfolate (Deplin®), sumatriptan (Imitrex®, Alsuma®, Imitrex® STATdose System®, Sumavel® DosePro®, Zecuity®, Treximet®); rizatriptan (Maxalt®, Maxalt-MLT®); eletriptan (Relpax®); zolmitriptan (Zomig®, Zomig-ZMT (®); naratriptan Amerge®); almotriptan (Axert®); frovatriptan (Frova®) and any combination thereof.

It is lastly another object of the present invention to disclose a method as defined in any of the above, wherein the body orifice is a nasal cavity, a mouth, a throat, an ear, a vagina, a rectum, a urethra, and any combination thereof.

BRIEF DESCRIPTION OF THE DRAWINGS

The invention is herein described, by way of example only, with reference to the accompanying drawings, wherein.

DETAILED DESCRIPTION OF THE PREFERRED EMBODIMENTS

Figure 1E:
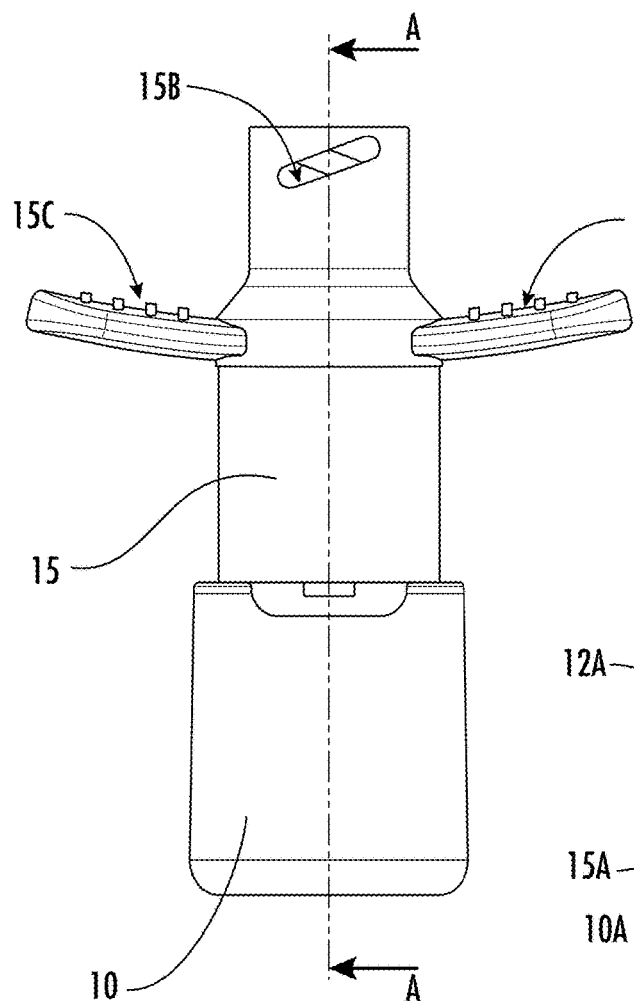
FIGS. 1A-1BB disclose an example of the intranasal delivery device of this invention (1A) and plume thereof (1B), according to several embodiments of the invention.

The following description is provided, alongside all chapters of the present invention, so as to enable any person skilled in the art to make use of the invention and sets forth the best modes contemplated by the inventor of carrying out this invention. Various modifications, however, will remain apparent to those skilled in the art, since the generic principles of the present invention have been defined specifically to provide a device capable of improving the transfer of medicament to a predetermined desired location and to provide a device capable of improving the delivery of medicament through the tissue.

In the present invention, a combination of parameters and forces such as pressure, gas/air volume and orifice diameter and duration of the process (t) enable the formation of optimized aerosol characteristics for both improved delivery of aerosol to the target area (such as the olfactory epithelium in the nasal cavity) and enhanced absorption at that area for better delivery to a desired tissue (such as the brain).

The present invention aims to treat a condition selected from (i) frequent and recurrent binge eating episodes, (ii) behavioral syndromes associated with physiological disturbances and physical factors (F50-F59 under fifth chapter of the ICD-10: Mental and behavioral disorders), (iii) obesity; (iv) OCD; (v) psychiatric conditions and mental disorders; (vi) migraines; (vii) pain; and, (viii) any combination thereof; by means of Topiramate (or topiramate formulation).

According to one embodiment, the treatment is provided on demand (when needed) or periodically. According to another embodiment, the topiramate is delivered along with a second medicament/substance.

It is another object of the present invention, where the second substance is selected from a group consisting of proteins; stem-cells; cells, cells secreation/secrotomes, organs, portions, extracts, and isolations thereof; macromolecules; RNA or other genes and proteins-encoding materials; neurotransmitters; receptor antagonists; hormones; Ketamine; commercially available by Lilly® (US) in the form of Baqsimi® product; Glucagon; substrates to treat one of the followings: anaphylaxis, Parkinson, seizures and opioid overdose; epinephrine; atropine; metoclopramide; commercially available Naloxone or Narcan® products; Esketamine (Spravato®); Radicava® [edaravone]; Ingrezza® [valbenazine]; Austedo® [deutetrabenazine]; Ocrevus® [ocrelizumab]; Xadago® [safinamide]; Spinraza® [nusinersen]; Zinbryta® [daclizumab]; Nuplazid® [pimavanserin]; Aristada® [aripiprazole lauroxil]; Vraylar® [cariprazine]; Rexulti® [brexpiprazole]; Aptiom® [eslicarbazepine acetate]; Vizamyl® [flutemetamol F18 injection]; Brintellix® [vortioxetine]; Tecfidera® [dimethyl fumarate]; Dotarem® [gadoterate meglumine]; Antibody mediated brain targeting drug delivery including aducanumab, gantenerumab, bapineuzumab, solanezumab, ofatumumab CD20, BIIB033, LCN2, HMGB1; insulin; oxytocin; orexin-A; leptin; benzodiazepine (i.e. midazolam); naloxone; perillyl alcohol; camptothecin; phytochemicals including curcumin and chrysin; nucleotides; olanzapine; risperidone; Venlafaxin; GDF-5; zonisamide; ropinirole; plant-originated and synthetically-produced terpenes and cannabinoids, including THC and CBD; valproric acid; rivastigmine; estradiol; topiramate or an equivalent preparation comprising CAS No. 97240-79-4; MFSD2 or MFSD2A or sodium-dependent lysophosphatidylcholine symporter; and any esters, salts, derivatives, mixtures, combinations thereof, with or without a carrier, liposomes, lyophilic or water-miscible solvents, surfactants, cells, cells fractions, cells secreation/secrotomes, zonisamide, GLP1 agonists; Vyvanse® lisdexamfetamine dimesylate; Dasotraline®, phentermine; bupropion/naltrexone; methamphetamine; orlistat; bupropion; phendimetrazine; peripherally acting anti-obesity agents; phentermine, topiramate (Qsymia®); diethylpropion; liraglutide (Saxenda®); lorcaserin; chorionic gonadotropin (Pregnyl®); phendimetrazine (Bontril® PDM); systemic; liraglutide; Lomaira®; amphetamine; benzphetamine; cimetidine (Tagamet® HB); desvenlafaxine;

Equaline® Acid Reducer; diethylpropion (Tepanil®); Glucagon-like peptide-1 receptor agonists; Dulaglutide (Trulicity®), Exenatide extended release (Bydureon®), Semaglutide (Ozempic®), Liraglutide (Victoza®), Lixisenatide (Adlyxin®), Exenatide (Byetta®) at a therapeutically effective concentration, Antidepressants such as clomipramine (Anafranil®), fluoxetine (Prozac®), fluvoxamine (Luvox®), paroxetine (Paxil®), sertraline (Zoloft®), Ketamine, Esketamine; Selective serotonin reuptake inhibitors (SSRIs), such as citalopram (Celexa®), escitalopram oxalate (Lexapro®), fluoxetine (Prozac®), fluvoxamine (Luvox®), paroxetine HCl (Paxil®), and sertraline (Zoloft®); Selective serotonin & norepinephrine inhibitors (SNRIs), such as desvenlafaxine (Khedezla®), desvenlafaxine; ccinate (Pristiq®), duloxetine (Cymbalta®), lev omilnacipran (Fetzima®), and venlafaxine (Effexor®); Novel serotonergic drugs such as vortioxetine (Trintellix®-formerly called Brintellix®) or vilazodone (Viibryd®); Older tricyclic antidepressants, such amitriptyline (Elavil®), imipramine (Tofranil®), nortriptyline (Pamelor®), and doxepin (Sinequan®). Drugs that are thought to affect mainly dopamine and norepinephrine such as bupropion (Wellbutrin®). Monoamine oxidase inhibitors (MAOIs), such as isocarboxazid (Marplan®), phenelzine (Nardil®), selegiline (EMSAM®), and tranylcypromine (Parnate®). Tetracyclic antidepressants that are noradrenergic and specific serotonergic antidepressants (NaSSAs), such as mirtazapine (Remeron®). L-methylfolate (Deplin®), sumatriptan (Imitrex®, Alsuma®, Imitrex® STATdose System®, Sumavel® DosePro®, Zecuity®, Treximet®); rizatriptan (Maxalt®, Maxalt-MLT®); eletriptan (Relpax®); zolmitriptan (Zomig®, Zomig-ZMT®); naratriptan Amerge®); almotriptan (Axert®); frovatriptan (Frova®) and any combination thereof.

According to another embodiment, at least one odorant is deliverable at the time of delivery of said at least one substance; an odor of said at least one odorant is selected from a group consisting of: grapefruit, lemon, vanilla, green apple, banana, peppermint, fennel, patchouli, bergamot and any combination thereof.

According to another embodiment, a component of said at least one odorant is selected from a group consisting of: a natural smell molecule, a synthetic smell molecule and any combination thereof.

According to another embodiment, said odorant is held in a manner selected from a group consisting of: stored in/with said pressurized gas/fluid, stored in at least one of said at least one substance, stored/integrated in/within said device, and any combination thereof.

According to another embodiment, the pressurized gas/fluid may include flavor/aromatic/odorant molecules that will be discharged at activation into the body cavity (namely, the nasal cavity).

According to another embodiment, any part of the device (nose piece/drug compartment parts/chamber of the pressurized fluid) may include/integrated with flavor/aromatic/odorant molecules that will be discharged at activation into the body cavity (namely, the nasal cavity).

According to another embodiment, the vial may include flavor/aromatic/odorant molecules, that will be mixed with the other components and will be discharged at activation into the nasal cavity. The release of flavor/aromatic/odorant molecules is beneficial for:

A. improving user compliance and user experience.
B. improving efficacy of the device, for example odors are known to reduce appetite in the case of topiramate for the treatment of BED/Obesity indications.

The term 'µl' or 'ul' hereinafter refers to the unit micro liters.

The term 'capsule' or 'container' hereinafter refers to a container configured to contain a flowable substance.

The term 'Blow-Fill-Seal (BFS)' refers hereinafter to a technology is a manufacturing technique used to produce small: (0.1 ml) and large volume, (500 ml) liquid-filled containers. The basic concept of blow-fill-seal and form-fill-seal (FFS), interchangeably refers hereinafter as BFS, is that a container is formed, filled, and sealed in a continuous process without human intervention, in a sterile enclosed area inside a machine. Thus, this technology can be used to aseptically manufacture sterile pharmaceutical liquid dosage forms. The process is multi-stepped: first: pharmaceutical-grade plastic resin is vertically heat extruded through a circular throat to form a hanging tube (parison). This extruded tube is then enclosed within a two-part mold and the tube is cut above the mold. The mold is transferred to the filling zone, a sterile filling space, where filling needles (mandrels) are lowered and used to inflate the plastic to form the container within the mold. Following the formation of the container, the mandrel is used to fill the container with liquid. Following filling, the mandrels are retracted and a secondary top mold seals the container. All actions take place inside a sterile shrouded chamber inside the machine. The product is then discharged to a non-sterile area for labeling, packaging and distribution. BFS technology reduces personnel intervention, making it a more robust method for the aseptic preparation of sterile pharmaceuticals. BFS is used for the filling of vials for parenteral preparations and infusions, eye drops and inhalation products. Generally, the plastic containers are made up of polyethylene and polypropylene.

It should be emphasized that the term capsule can also refer to a predefined volume within the same in which a flowable substance is placed. In other words, the predefined volume is sized and shaped to enclose a predefined volume of the substance. The term 'flowable' refers hereinafter to any liquid, gas, aerosol, powder and any combination thereof.

The term 'Substance' refers hereinafter to any flowable substance; e.g., gas, liquid or powder. The piercing could be relevant to the gas container, to the drug container (upper or lower area or both), or to both.

The term 'Obsessive-compulsive disorder (OCD)' refers hereinafter to a mental disorder in which a person feels the need to perform certain routines repeatedly (called "compulsions"), or has certain thoughts repeatedly (called "obsessions"). The person is unable to control either the thoughts or activities for more than a short period of time.

The term 'antiadherents' refers hereinafter to substance that reduce the adhesion between the powder (granules) and the punch faces and thus prevent sticking to tablet punches by offering a non-stick surface. They are also used to help protect tablets from sticking. The most commonly used is magnesium stearate.

The term 'Binders' refers hereinafter to substances that hold the ingredients in a tablet together. Binders ensure that tablets and granules can be formed with required mechanical strength, and give volume to low active dose tablets. Binders are usually:

Saccharides and their derivatives:
  Disaccharides: sucrose, lactose;
  Polysaccharides and their derivatives: starches, cellulose or modified cellulose such as microcrystalline cellulose and cellulose ethers such as hydroxypropyl cellulose (HPC);
  Sugar alcohols such as xylitol, sorbitol or mannitol;
Protein: gelatin;
Synthetic polymers: polyvinylpyrrolidone (PVP), polyethylene glycol (PEG).

Binders are Classified According to their Application:
  Solution binders are dissolved in a solvent (for example water (www.en.Wikipedia.org/wiki/Water or alcohol (www.en.wikipedia.org/wiki/Ethanol can be used in wet granulation processes). Examples include gelatin, cellulose, cellulose derivatives, polyvinylpyrrolidone, starch, sucrose and polyethylene glycol.
  Dry binders are added to the powder blend, either after a wet granulation step, or as part of a direct powder compression (DC) formula. Examples include cellulose, methyl cellulose, polyvinylpyrrolidone and polyethylene glycol.
  The term 'coatings' refers hereinafter to tablet coatings protect tablet ingredients from deterioration by moisture in the air and make large or unpleasant-tasting tablets easier to swallow. For most coated tablets, a cellulose ether hydroxypropyl methylcellulose (HPMC) film coating is used which is free of sugar and potential allergens. Occasionally, other coating materials are used, for example synthetic polymers, shellac, corn protein zein or other polysaccharides. Capsules are coated with gelatin.

The term 'enterics' refers hereinafter to substances that control the rate of drug release and determine where the drug will be released in the digestive tract. Materials used for enteric coatings include fatty acids, waxes, shellac, plastics, and plant fibers.

The term 'disintegrants' refers hereinafter to substances that expand and dissolve when wet causing the tablet to break apart in the digestive tract, or in specific segments of the digestion process, releasing the active ingredients for absorption. They ensure that when the tablet is in contact with water, it rapidly breaks down into smaller fragments, facilitating dissolution.

Examples of Disintegrants Include:
  Crosslinked polymers: crosslinked polyvinylpyrrolidone (crospovidone), crosslinked sodium carboxymethyl cellulose (croscarmellose sodium).
  The modified starch sodium starch glycolate.
  The term 'flavors' refers hereinafter to substances that can be used to mask unpleasant tasting active ingredients and improve the acceptance that the patient will complete a course of medication. Flavorings may be natural (e.g. fruit extract) or artificial.
  For example, to improve:
  a bitter product-mint, cherry or anise may be used
  a salty product-peach, apricot or liquorice may be used
  a sour product-raspberry or liquorice may be used
  an excessively sweet product-vanilla may be used
  The term 'glidants' refers hereinafter to substances that are used to promote powder flow by reducing interparticle friction and cohesion. These are used in combination with lubricants as they have no ability to reduce wall friction. Examples include silica gel, fumed silica, talc, and magnesium carbonate. However, some silica gel Glidants such as Syloid® 244 FP and Syloid®XDP are multi-functional and offer several other performance benefits in addition to reducing interparticle friction including moisture resistance, taste marketing etc.
  The term 'Lubricants' refers hereinafter to substances that prevent ingredients from clumping together and from sticking to the tablet punches or capsule filling machine. Lubricants also ensure that tablet formation and ejection can occur with low friction between the solid and die wall.
  Common minerals like talc or silica, and fats, e.g. vegetable stearin, magnesium stearate or stearic acid are the most frequently used lubricants in tablets or hard gelatin capsules. Lubricants are agents added in small quantities to tablet and capsule formulations to improve certain processing characteristics. While lubricants are often added to improve manufacturability of the drug products, it may also negatively impact the product quality. For example, extended mixing of lubricants during blending may results in delayed dissolution and softer tablets, which is often referred to as "over-lubrication". Therefore, optimizing lubrication time is critical during pharmaceutical development.

There are three roles identified with lubricants as follows:
  True lubricant role:
    To decrease friction at the interface between a tablet's surface and the die wall during ejection and reduce wear on punches & dies.
    Anti-adherent role:
  Prevent sticking to punch faces or in the case of encapsulation, lubricants
  Prevent sticking to machine dosators, tamping pins, etc.
  Glidant role:
  Enhance product flow by reducing interparticulate friction. There are two major types of lubricants:
  Hydrophilic
  Generally poor lubricants, no glidant or anti-adherent properties.
  Hydrophobic
  Most widely used lubricants in use today are of the hydrophobic category. Hydrophobic lubricants are generally good lubricants and are usually effective at relatively low concentrations. Many also have both anti-adherent and glidant properties. For these reasons, hydrophobic lubricants are used much more frequently than hydrophilic compounds. Examples include magnesium stearate.

The term 'preservatives' refers hereinafter to substances that is added to products such as food products, beverages, pharmaceutical drugs, paints, biological samples, cosmetics, wood, and many other products to prevent decomposition by microbial growth or by undesirable chemical changes. Some typical preservatives used in pharmaceutical formulations are
  Antioxidants like vitamin A, vitamin E, vitamin C, retinyl palmitate, and selenium
  The amino acids cysteine and methionine
  Citric acid and sodium citrate
  Synthetic preservatives like the parabens: methyl paraben and propyl parabe The term 'sorbents' refers hereinafter to substances that are used for tablet/capsule moisture-proofing by limited fluid sorbing (taking up of a liquid or a gas either by adsorption or by absorption) in a dry state. For example, desiccants absorb water, drying out (desiccating) the surrounding materials.

The term 'sweeteneers' refers hereinafter to substances that are added to make the ingredients more palatable, especially in chewable tablets such as antacid or liquids like cough syrup. Sugar can be used to mask unpleasant tastes or smells, but artificial sweeteners tend to be preferred, as natural ones tend to cause tooth decay.

The term 'vehicles' refers hereinafter to the bulk excipient that serves as a medium for conveying the active ingredient. Petrolatum, dimethyl sulfoxide and mineral oil are common vehicles.

The term 'Obesity' refers hereinafter to is a medical condition in which excess body fat has accumulated to an extent that it may have a negative effect on health. People are generally considered obese when their body mass index (BMI), a measurement obtained by dividing a person's weight by the square of the person's height, is over 30 kg/m², the range 25-30 kg/m² is defined as overweight. It is further evaluated in terms of fat distribution via the waist-hip ratio and total cardiovascular risk factors. BMI is closely related to both percentage body fat and total body fat. In children, a healthy weight varies with age and sex. Obesity in children and adolescents is defined not as an absolute number but in relation to a historical normal group, such that obesity is a BMI greater than the 95th percentile. The reference data on which these percentiles were based date from 1963 to 1994, and thus have not been affected by the recent increases in weight. BMI is defined as the subject's weight divided by the square of their height and is calculated as follows: $BMI=m/h^2$, where m and h are the subject's weight and height respectively.

Any BMI≥35 or 40 kg/m² is severe obesity.

A BMI of ≥35 kg/m² and experiencing obesity-related health conditions or ≥40-44.9 kg/m² is morbid obesity.

A BMI of >45 or 50 kg/m² is super obesity.

The term 'Binge eating episodes' or 'Binge eating disorder (BED)' refers hereinafter to a severe and treatable eating disorder characterized by recurrent episodes of eating large quantities of food (often very quickly and to the point of discomfort); a feeling of a loss of control during the binge; experiencing shame, distress or guilt afterwards; and not regularly using unhealthy compensatory measures (e.g., purging) to counter the binge eating. It is the most common eating disorder in the United States.

BED is one of the newest eating disorders formally recognized in the DSM-5. Before the most recent revision in 2013, BED was listed as a subtype of EDNOS (now referred to as OSFED). The change is important because some insurance companies will not cover eating disorder treatment without a DSM diagnosis.

Diagnostic Criteria

Recurrent episodes of binge eating. An episode of binge eating is characterized by both of the following: Eating, in a discrete period of time (e.g., within any 2-hour period), an amount of food that is definitely larger than what most people would eat in a similar period of time under similar circumstances. A sense of lack of control over eating during the episode (e.g., a feeling that one cannot stop eating or control what or how much one is eating).

The binge eating episodes are associated with three (or more) of the following: Eating much more rapidly than normal. Eating until feeling uncomfortably full. Eating large amounts of food when not feeling physically hungry. Eating alone because of feeling embarrassed by how much one is eating; and, Feeling disgusted with oneself, depressed, or very guilty afterward.

Marked distress regarding binge eating is present. The binge eating occurs, on average, at least once a week for a period of about 3 months or more. The binge eating is not associated with the recurrent use of inappropriate compensatory behaviors (e.g., purging) as in bulimia nervosa and does not occur exclusively during the course of bulimia nervosa or anorexia nervosa.

The term 'administration on demand' or 'on demand' refers hereinafter to the administration of Topiramate only when required. More specifically upon sensing e.g., urge for a binge eating episode. Most specifically, immediately thereafter (e.g., within minutes thereafter).

The term 'condition' refers hereinafter to at least one selected from (i) frequent and recurrent binge episodes, (ii) behavioral syndromes associated with physiological disturbances and physical factors (F50-F59 under fifth chapter of the ICD-10: Mental and behavioral disorders or by DSM-5:

Diagnostic and Statistical Manual of Mental Disorders scale (American Psychiatric Association. Diagnostic and Statistical Manual of Mental Disorders, Fourth Edition, Text Revision. Washington, DC, American Psychiatric Association 2000), (iii) obesity; (iv) OCD; (v) psychiatric conditions and mental disorders; (vi) migraines; (vii) pain; and, (viii) any combination thereof. In DSM-5, BED is defined as ≥1 binge eating episode per week over a ≥3-month period. Binge eating episodes are defined as eating in a discrete period of time an amount of food that is definitely larger than most people would eat in a similar period under similar circumstances and with a sense of lack of control over eating during the episode]).

The term 'topiramate' refers hereinafter to Topiramate is a sulfamate-substituted monosaccharide.

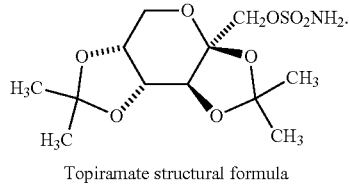

Formula 1

Topiramate structural formula

Topiramate is an anticonvulsant drug mainly used for the treatment of different types of seizures and for the prophylactic treatment of migraines. It is also indicated (or used off label) for the treatment of bipolar disorder, post-traumatic stress disorder, mood instability disorder, binge-eating disorders, bulimia nervosa and obesity.

Its unique biochemical profile may underlie both its clinical utility and its unique side effects, which include negative effects on cognition, paresthesia, spontaneous glaucoma, weight loss, renal stones, and acidemia. Most, if not all, of the pharmacodynamic properties of topiramate appear to be dose-related within the clinically relevant dosing range of 15-400 mg/day. Tolerance develops to several of the adverse effects of topiramate, which has fostered the practice of initiating therapy at a low dose (15 or 25 mg/day) followed by a gradual increase over a period of weeks to a dose level that is effective and well tolerated.

Topiramate is also proposed its use as a mood stabilizer and have reported its efficacy in reducing impulsiveness and improving mood regulation, possibly via its antagonism to glutamatergic transmission in the lateral hypothalamus, although this indication is still controversial. Weight loss is a side effect consistently reported in the medical literature in patients treated with topiramate. Given its potential role in stabilizing mood and reducing impulse control problems and weight, topiramate has been proposed as a treatment for obese patients with binge eating disorder (BED). The term 'side effect' refers hereinafter to an effect, whether therapeutic or adverse, that is secondary to the one intended; although the term is predominantly employed to describe adverse effects, it can also apply to beneficial, but unintended, consequences of the use of a drug.

The term 'plurality' hereinafter refers to an integer greater than or equal to one. The term 'olfactory epithelium' hereinafter refers to a specialized epithelial tissue inside the nasal cavity. The olfactory epithelium lies in the upper top portion of the nasal cavity. The term 'substance' hereinafter refers to any substance capable of flowing. Such a substance can be a granular material, including a powder; a liquid; a gel; a slurry; a suspension; and any combination thereof.

The term 'gas' refers to any fluid that can be readily compressed. Gases as used herein include, but are not limited to, air, nitrogen, oxygen, carbon dioxide, helium, neon, xenon and any combination thereof.

The term 'channel' hereinafter refers to a passageway allowing passage of a fluid through at least a portion of a mixing mechanism. The channel can be disposed within a portion of the mixing mechanism, forming a closed bore; it can be on an exterior of a portion of the mixing mechanism, forming a groove on the portion of the mixing mechanism, and any combination thereof.

The term 'fluid' refers to any substance or mixtures of substances that continually deforms (flows) under an applied shear stress, or external force. This term refers to gas, liquids, particulate or granulated solids (powders), aerosols, and any mixtures and combinations thereof.

The term 'about' refers hereinafter to a range of 25% below or above the referred value.

The term 'biologic' or 'biologic response modifier' hereinafter refers to material manufactured in or extracted from biological sources such as a genetically engineered protein derived from human genes, or a biologically effective combination of such proteins. All pressures herein are gauge pressures, relative to atmospheric pressure. Pressure units will be written herein using the standard abbreviation for "gauge', namely, "g". For example, atmospheric pressure is 0 barg and a pressure of 1 bar above atmospheric is 1 barg.

The term 'release time' refers hereinafter to the time for the drug and carrier gas to substantially completely exit the device. Typically, the release time is affected by the combination of the Volume of substance, volume of pressurized gas, pressure of pressurized gas, the orifice diameter, the activation time of the valve that reflects the time for the device to reconfigure from the ACTIVE configuration to the INACTIVE configuration or vice versa and any combination thereof.

The terms 'the device', 'the present device', 'the SipNose device' and 'SipNose' will be used interchangeably to refer to a device were the pre-aerosolized mixture of gas and substance exits the device with a significant driving force as a mixture of aerosol and pre-aerosolized material (fluid or powder). When the pre-aerosolized material hits the walls of the nasal passages, it "explodes" into a fine aerosol that is capable of being driven by the pressure deep into the nasal passages to deposit in the desired region.

The term "cannabinoid" refers hereinbelow to any of the diverse chemical compounds that act on cannabinoid receptors on cells in the brain, act on orthosteric or allosteric sites and modulate endocannabinoid activity. They include the phytocannabinoids found in cannabis, hempseed oil, other plants, and synthetic cannabinoids manufactured artificially. They include the phytocannabinoids delta-9-tetrahydrocannabinol (THC), cannabidiol (CBD), cannabinol (CBN) cannabigerol (CBG), cannabigerol (CBG), cannabichromene (CBC), cannabicyclol (CBL), canabivarol (CBV), tetrahydrocannabivarin (THCV), cannabidivarin (CBDV), cannabichromevarin (CBCV), cannabigerol monoethyl ether (CBGM), or the like; or mixtures or combinations thereof. Other botanical cannabimimetics include N-alkylamides from Echinacea and B-caryophyllene. They include mixtures of phytocannabinoids separated from the plant by extraction techniques and high purity cannabinoids obtained by purification from natural sources or via synthesis.

The term 'Aptar' refers to a UDS-powder commercially available dispenser by AptarGroup, Inc., see currently available web site: www.pharma.aptar.com/en-us under "dispensing solutions".

The term 'Optinose' refers to a commercially available Onzetra product, loaded with topiramate instead of sumatriptan by OptiNose, Inc., see currently available web site: www.onzetrahcp.com.

In all of the embodiments of the device shown hereinbelow, identical numbers refer to identical functions. All figures shown herein are illustrative and none is to scale.

The present invention teaches a device for delivering a predetermined amount of a substance, preferably comprising a medication or combination of medications, into a body orifice of a subject, the orifice comprising any of the body's natural orifices, including a nostril, the mouth, the ear, the throat, the urethra, the vagina, the rectum and any combination thereof.

In preferred embodiments of the device, the device comprises a delivery mechanism and a medicament capsule, as described hereinbelow. The device can apply a broad range of drugs and materials to the nasal cavity for local effect, deliver a broad range of drugs and materials through the nasal cavity to the systemic circulation, deliver a broad range of drugs and materials through the nasal cavity to the central nerve system (CNS) the brain, spinal cord and associated nerves, and any combination thereof.

The drugs to be applied could be, but are not limited to, pharmaceuticals, natural compounds, biologics, hormones, peptides, proteins, viruses, cells, stem cells, cells secreation/secrotomes and any combination thereof.

However, it should be emphasized that the device can be provided alone as well as in combination with a capsule.

In some cases, the capsule would be provided with a known medicament within the same and in other cases the capsule would be 'filled' with the medicament just before use.

In some embodiments of the present invention, the device operating characteristics and the substance characteristics can be jointly optimized to maximize uptake of the substance at the desired site. In preferred variants of such embodiments, uptake is further optimized by exploiting synergies between delivery characteristics generated by the device and by the formulation or composition of the delivered material In some embodiments, the substance comprises one or more agents to optimize delivery through the mucosal membrane by means of mucoadhesive agent and/or a permeability enhancer agent and/or a particulate formulation in the nanoparticle or microparticle range, and any combination thereof. In such embodiments, the combination of the device and substance enhance the delivery of the active agent to the target area (nasal epithelium and more specifically olfactory epithelium) and from there to the target tissue (for example the brain).

A non-limiting example is a composition comprising a drug to be delivered and at least one chemical permeation enhancer (CPE). In a preferred embodiment, the composition contains two or more CPEs which, by using a nasal delivery device, affect delivery of the drug in an additive manner or behave synergistically to increase the permeability of the epithelium, while providing an acceptably low level of cytotoxicity to the cells. The concentration of the one or more CPEs is selected to provide the greatest amount of overall potential (OP). Additionally, the CPEs are selected based on the treatment. CPEs that behave primarily by transcellular transport are preferred for delivering drugs into epithelial cells. CPEs that behave primarily by paracellular transport are preferred for delivering drugs through epithelial cells. Also provided herein are mucoadhesive agents that enable the extension of the exposure period of the target tissue/mucus membrane to the active agent, for the enhancement of delivery of the active agent to and through the mucous membrane.

In contrast to prior-art nasal delivery devices and technologies, the devices of the present invention can produce a fine aerosol in the nasal cavity or other desired body orifice at the target area and at the location of the target tissue instead of producing the aerosol only within the device or immediately after exit from the device. Utilizing the pressure as a driving force and the air as a carrier allows the material to be released from the nozzle as a mixture of aerosol and a pre-aerosolized state. The properties of the resultant aerosol are typically dependent on the properties of the device and of the medium into which the device is discharged. The properties of the device which affect the aerosol characteristics are the delivery pressure, the volume of the delivery gas, the characteristics of its orifice and time to activate the valve that reflects the time for the device to reconfigure from the ACTIVE configuration to the INACTIVE configuration or vice versa and any combination thereof.

In some embodiments, the aerosol properties are fairly independent of the delivered substance, while, in other embodiments, the pressure, volume, orifice characteristics, and delivered substance properties can be co-optimized.

In prior-art devices the aerosol is produced in proximity exit of the device. Typically, the aerosol comprises a wide "fan" of aerosol and a low driving force. Therefore, large droplets typically deposit very close to the exit from the device, while smaller droplets tend to quickly contact the walls of the passage, so that deposition is typically predominantly close to the delivery end of the device, with little of the substance reaching desired sites deeper in the body orifice, such as the middle and superior turbinates of the nose.

Figure 1F:
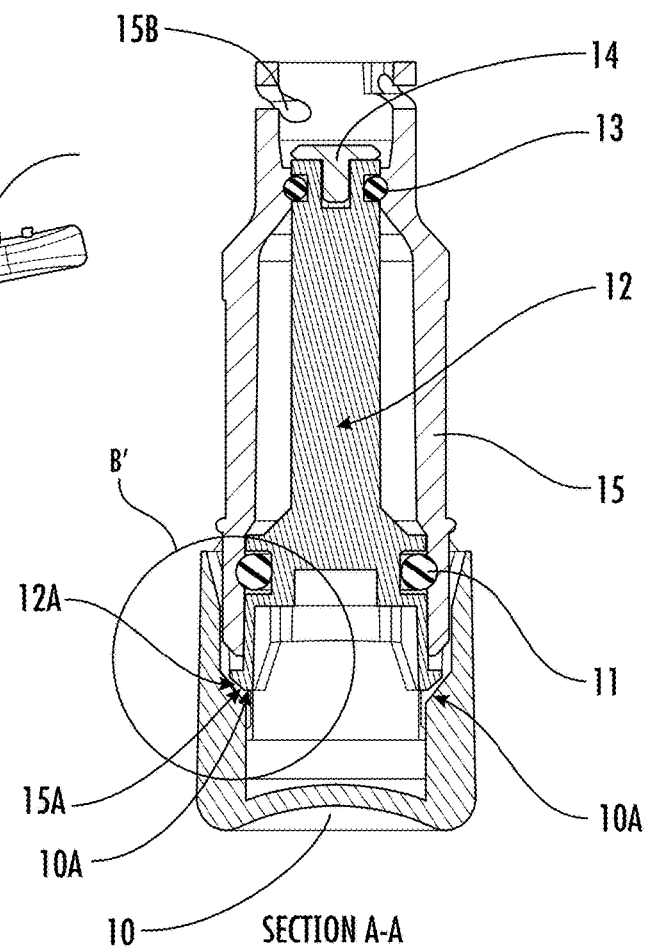
Figure 1G:
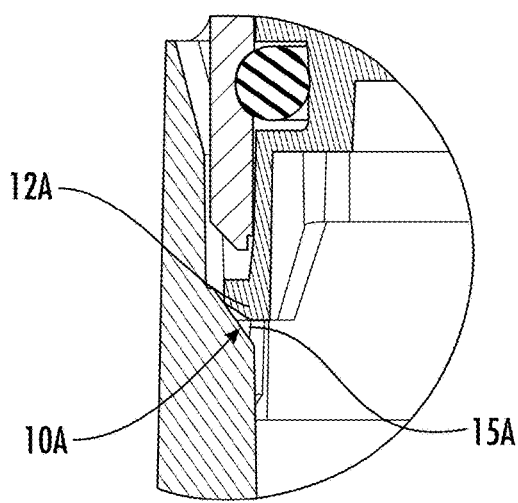
Figure 1H:
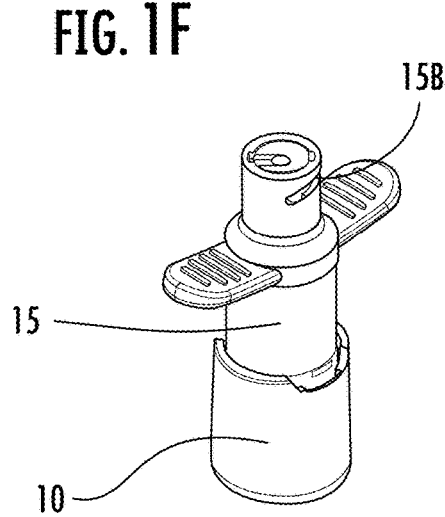
Figure 1I:
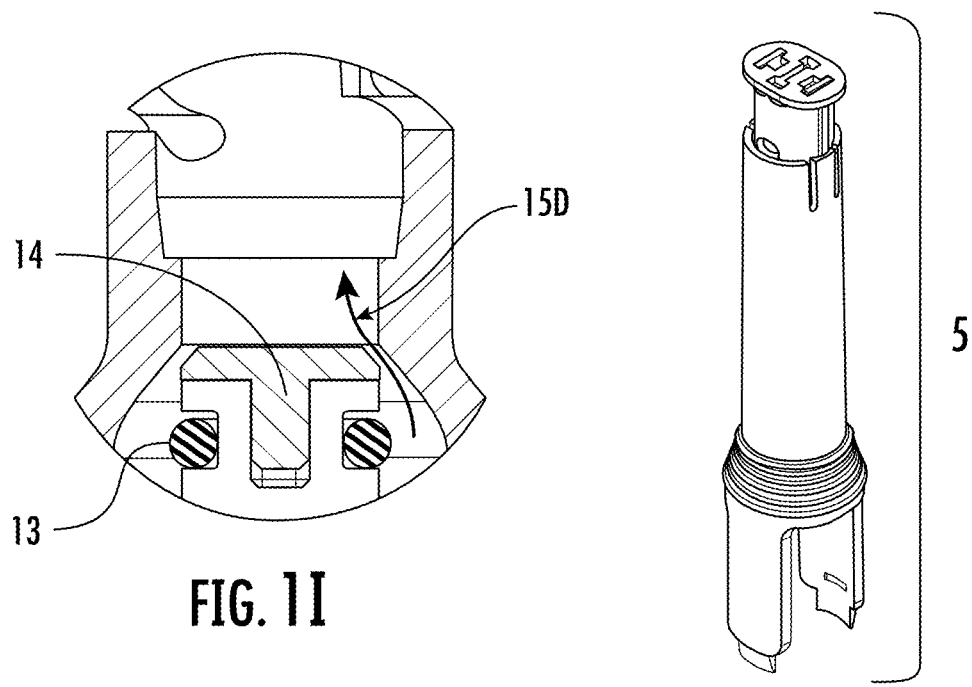
Figure 1J:
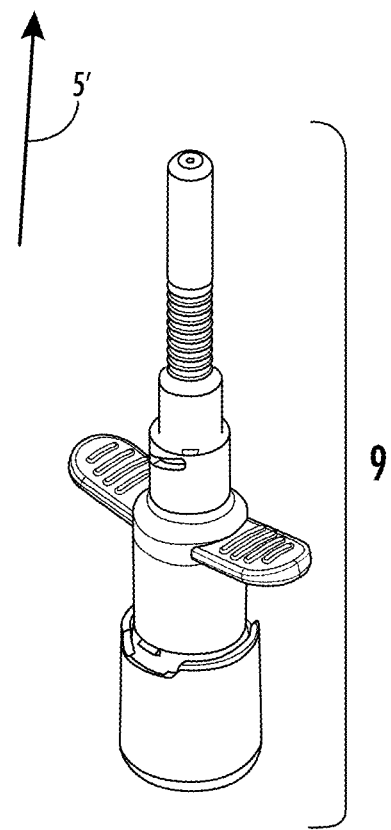
Figure 1O:
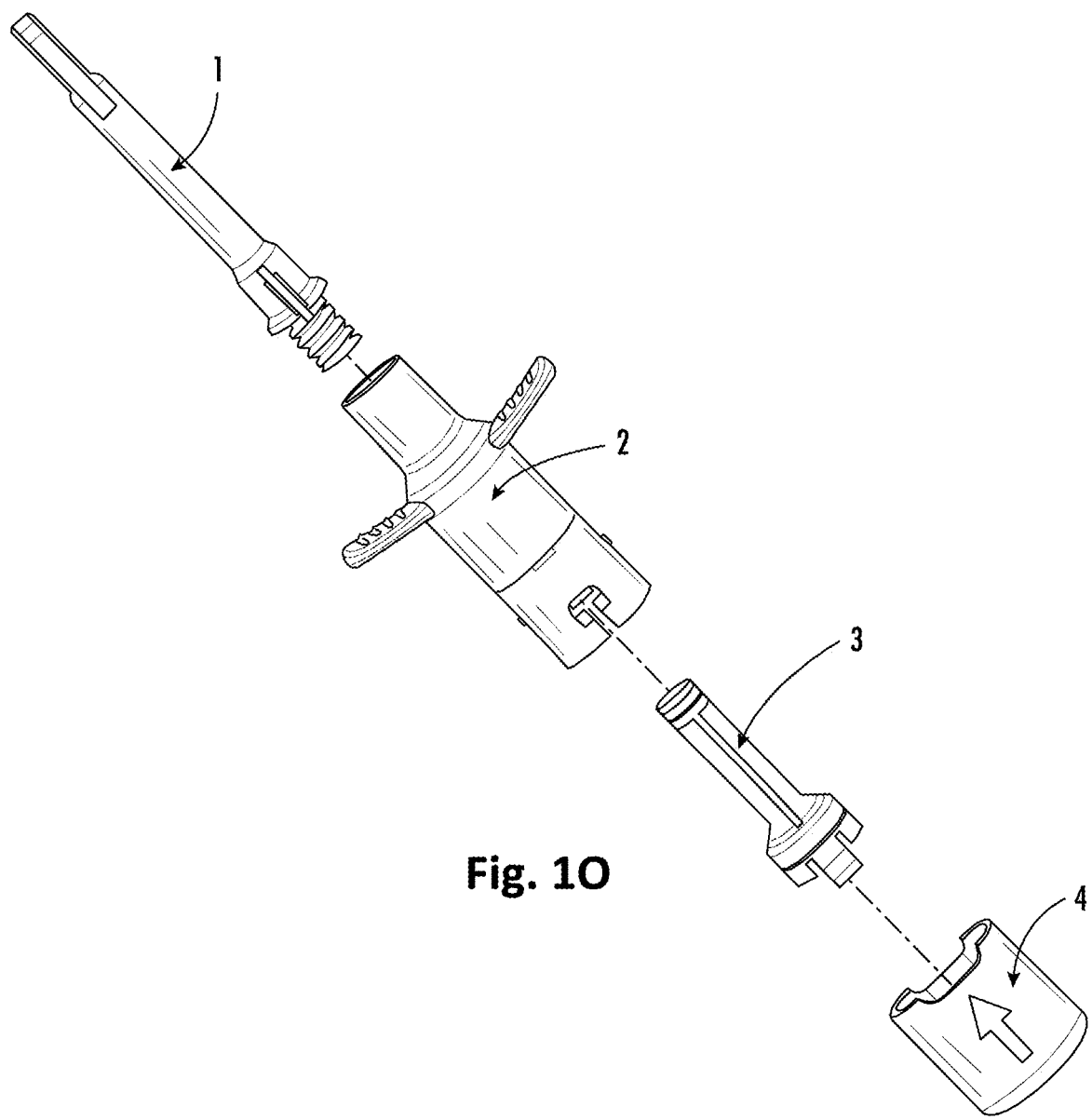
Figure 1P:
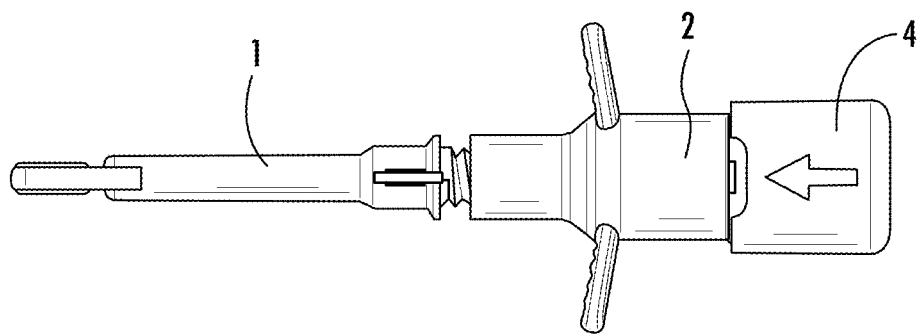
Figure 1S:
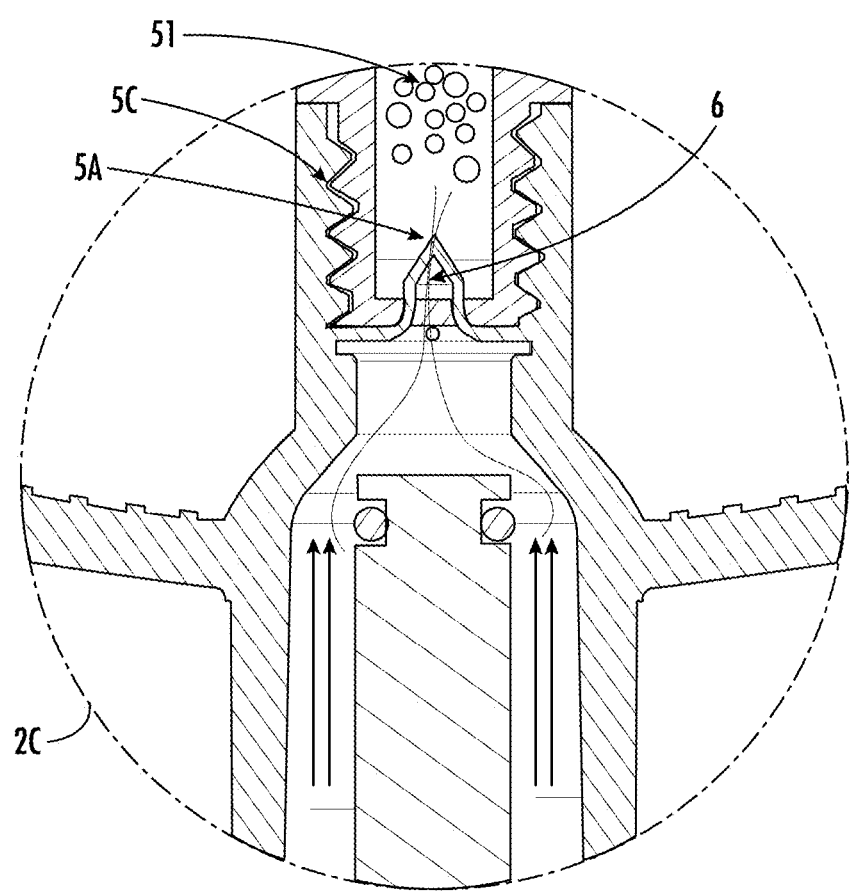
Figure 1T:
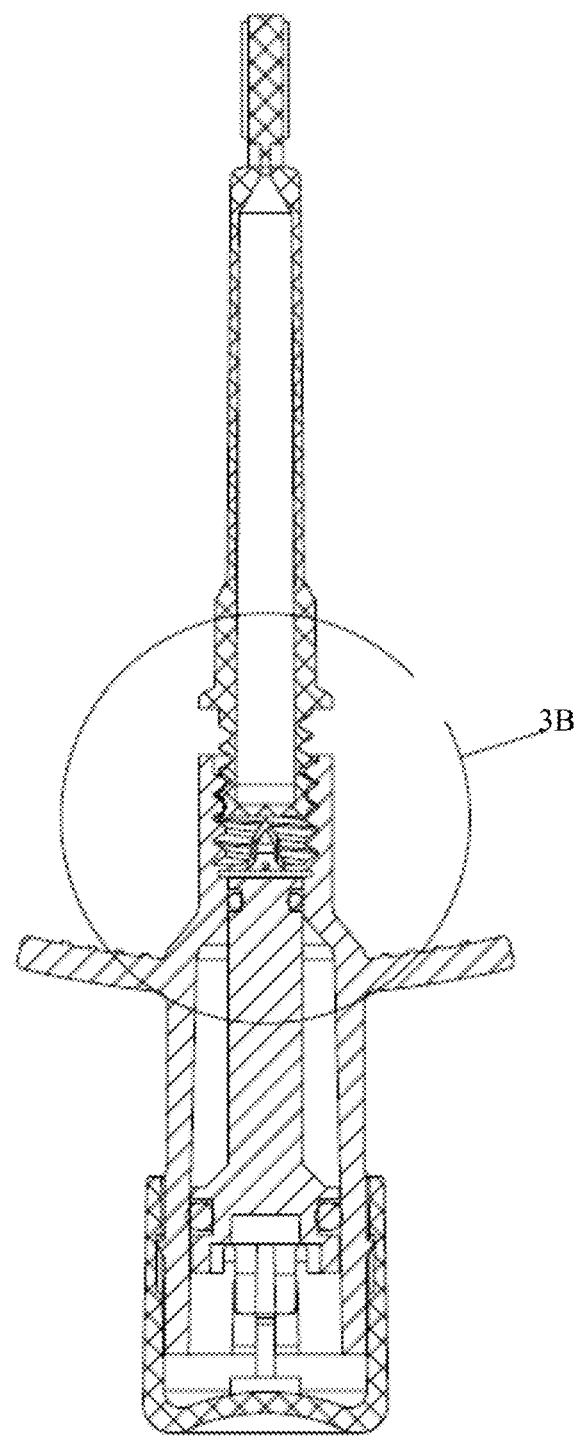
Figure 1U:
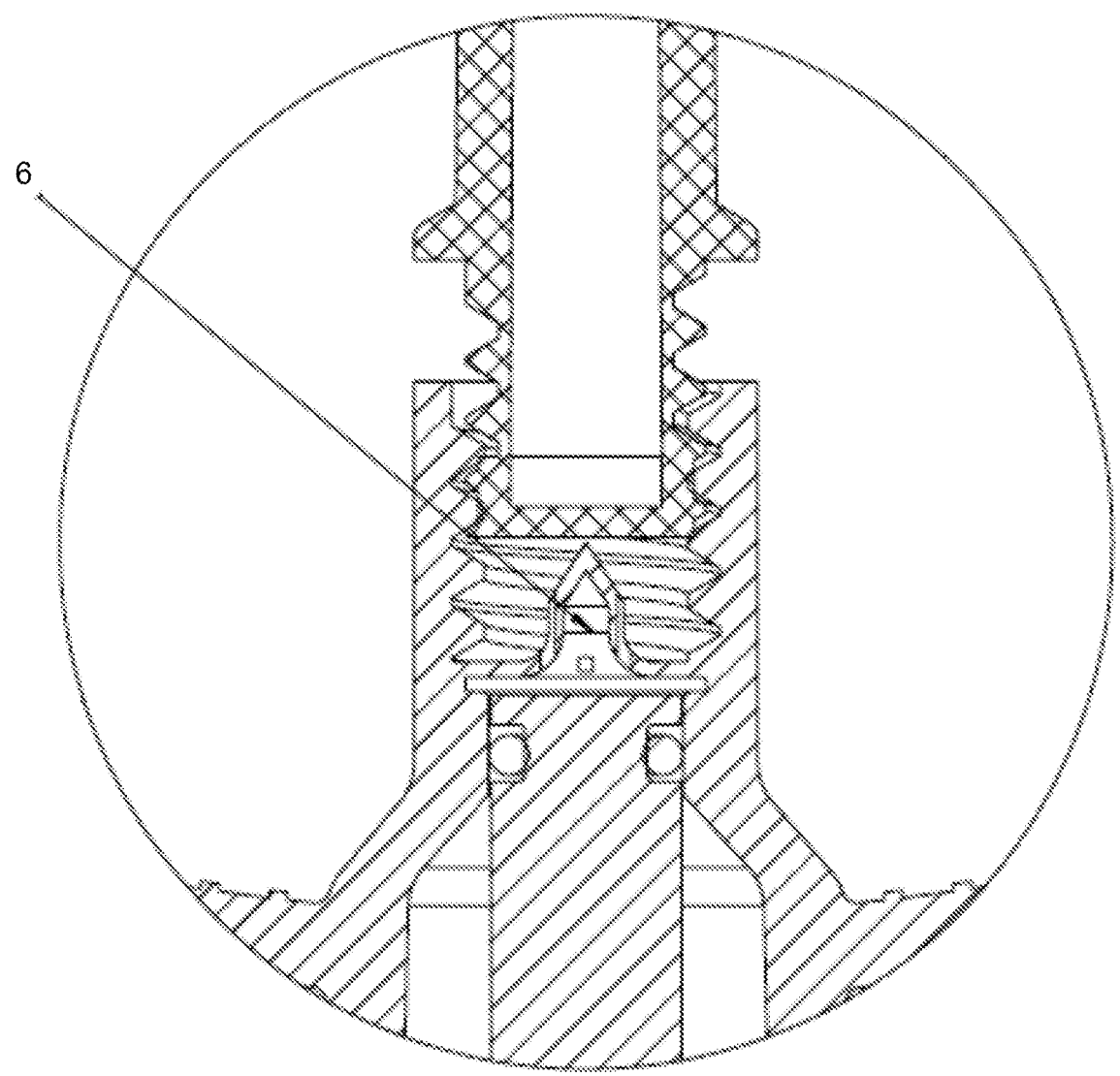
Figure 1V:
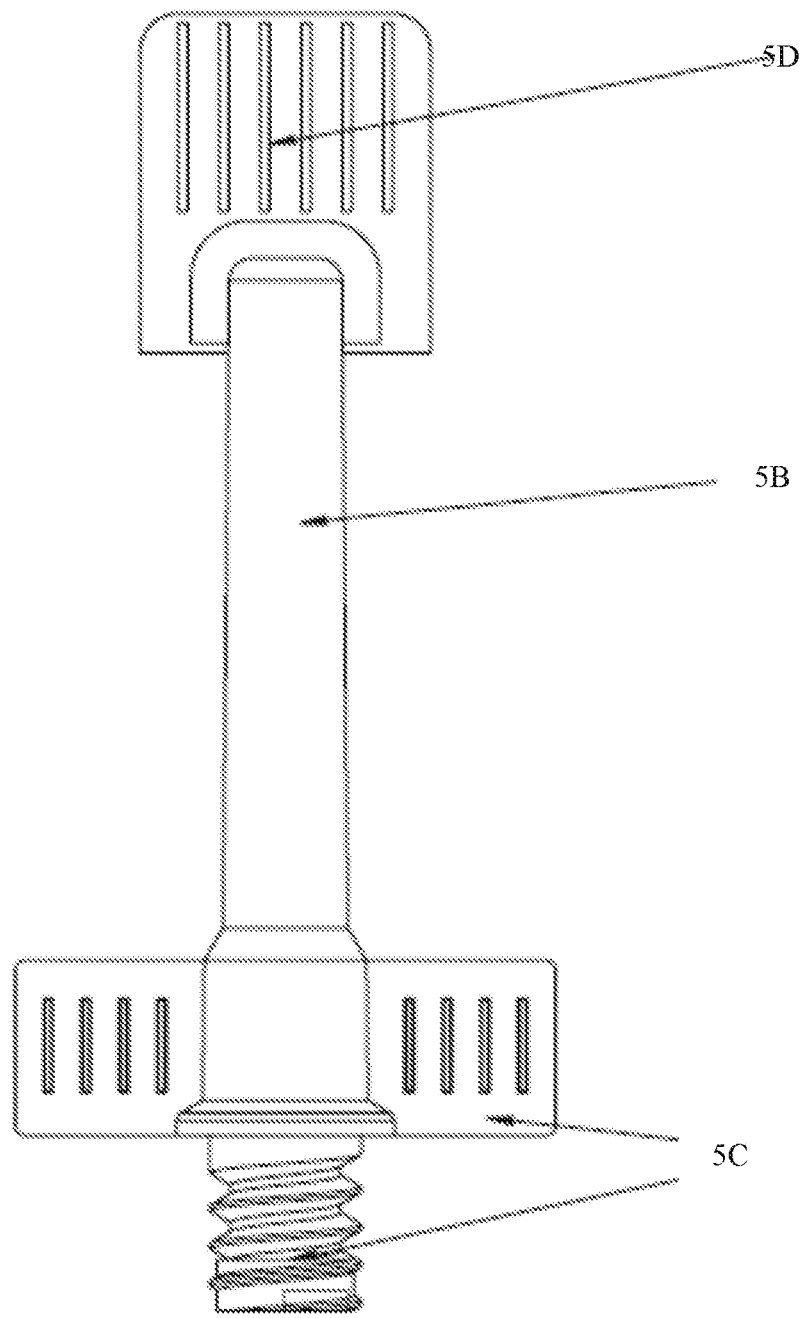
Figure 1W:
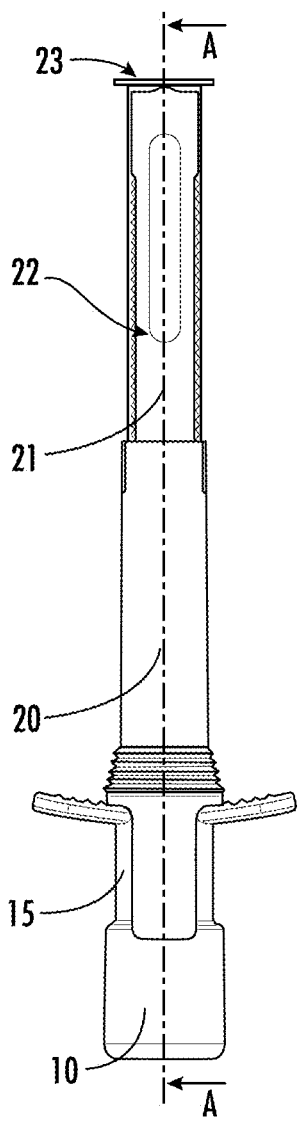
Figure 1X:
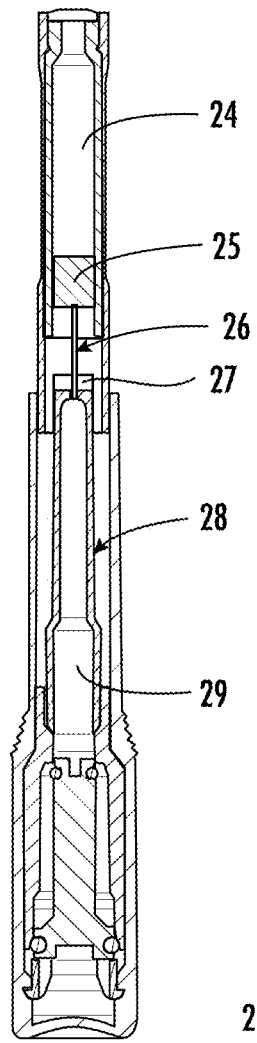
Figure 1Y:
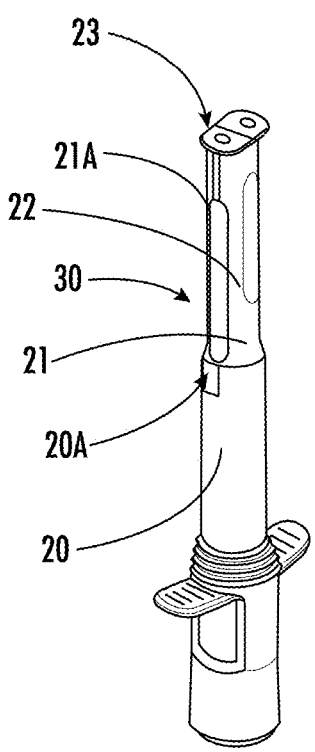
Figures 1A, 1Z:
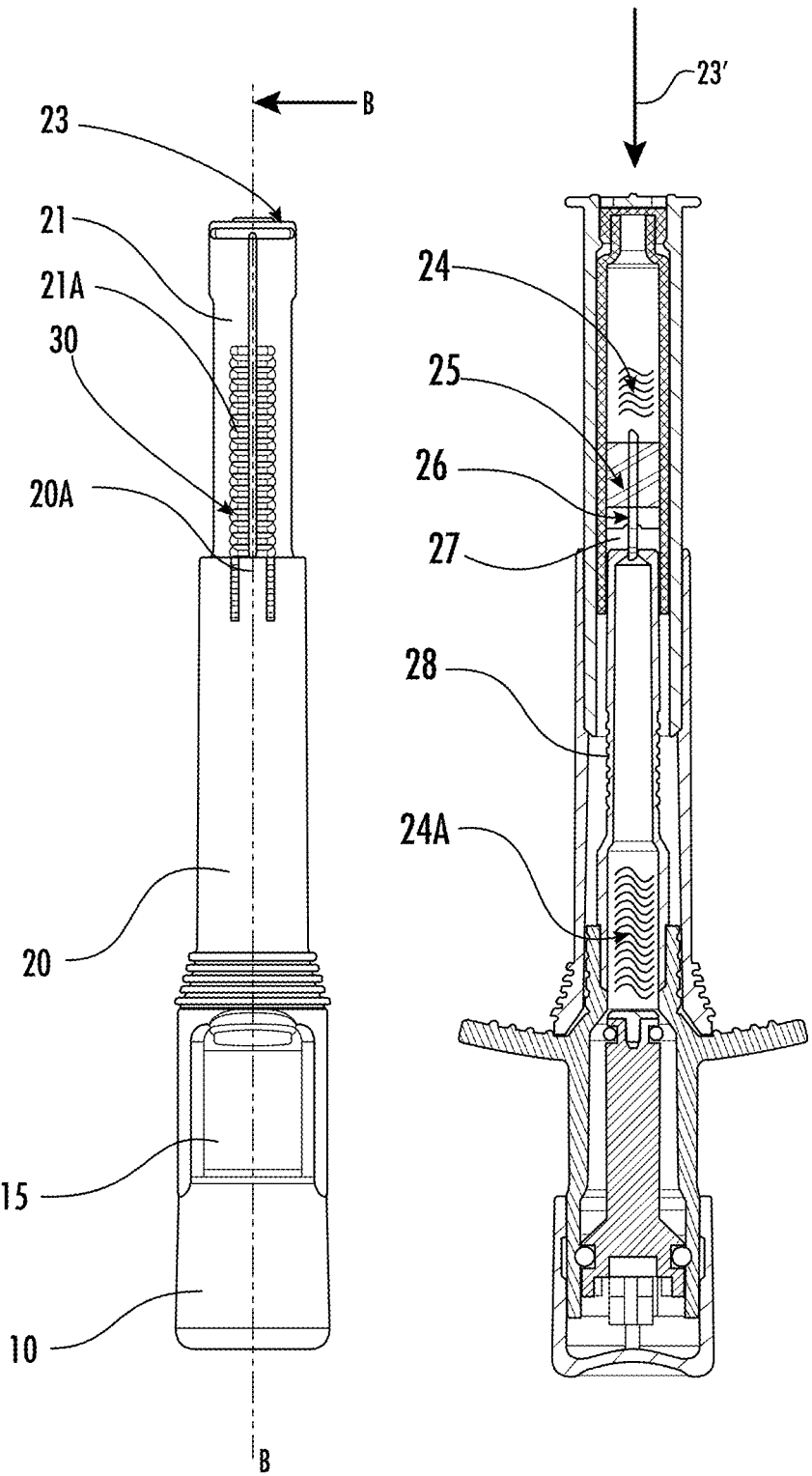
Figure 1A:
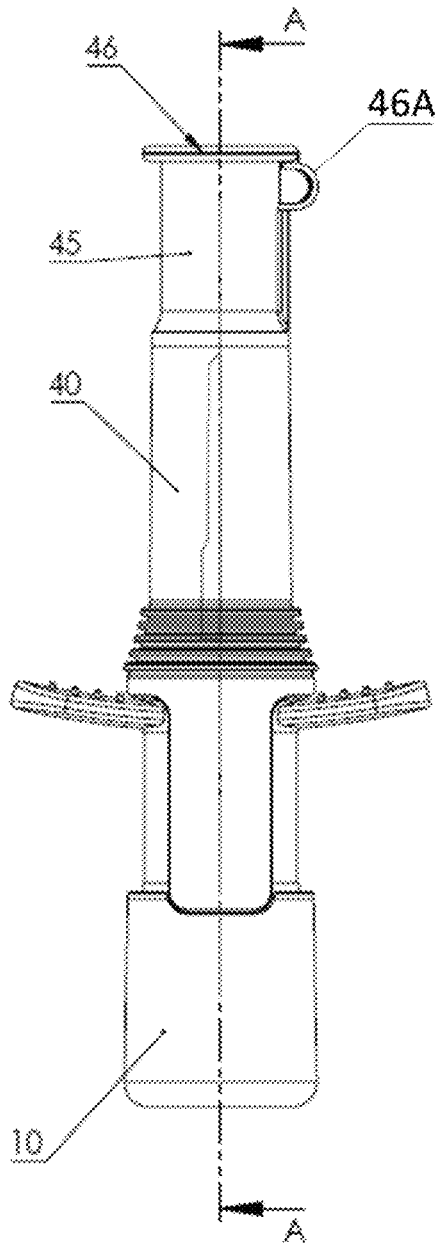
Figure 1A:
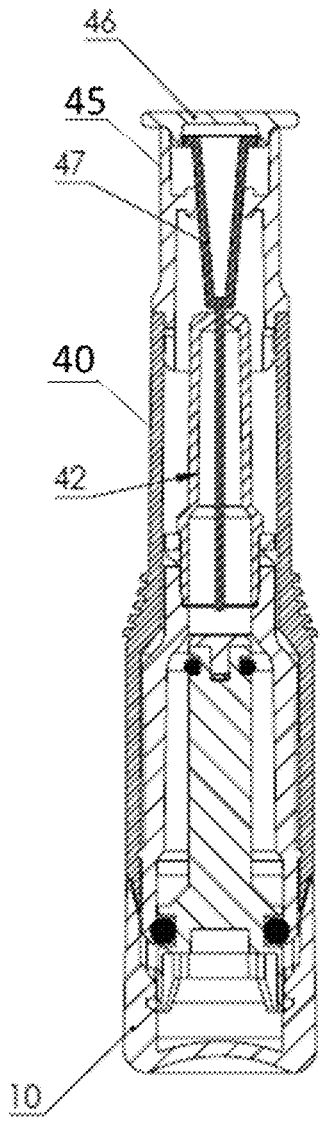
Figure 1A:
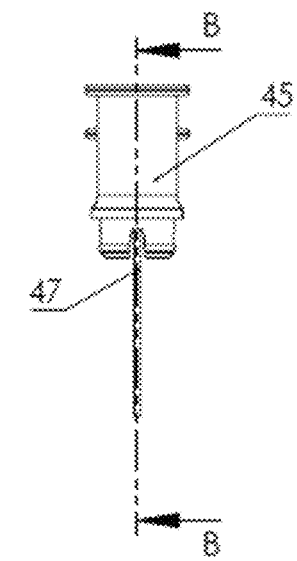
Figure 1A:
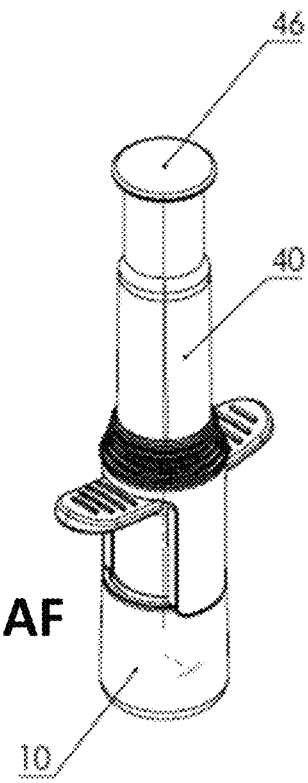
Figure 1A:
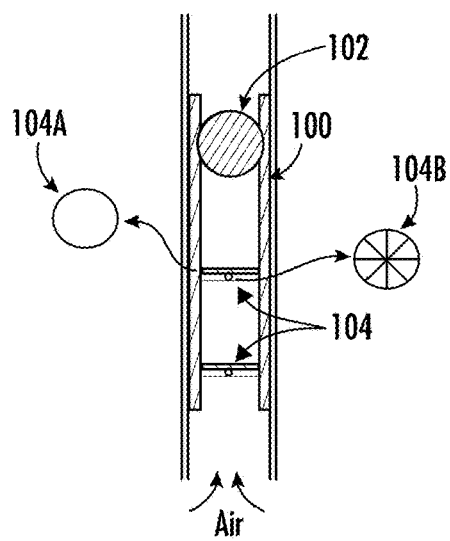
Figure 1A:
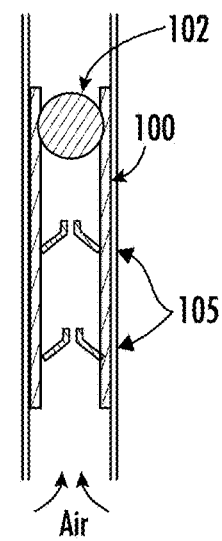
Figure 1A:
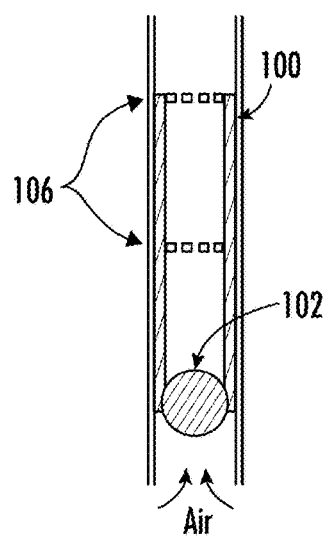
Figure 1A:
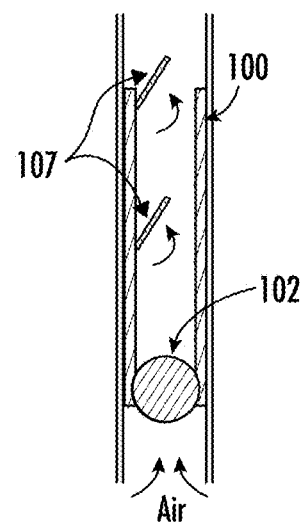
Figure 1A:
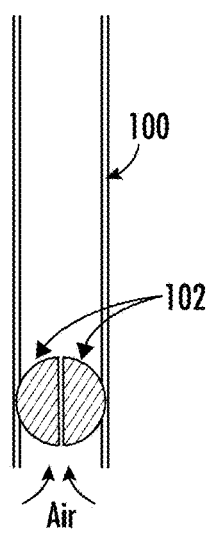
Figure 1A:
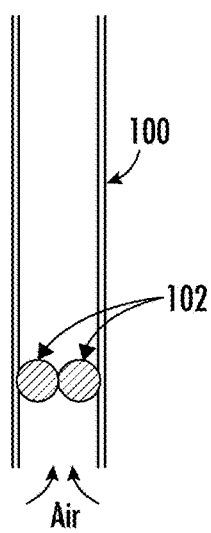
Figure 1A:
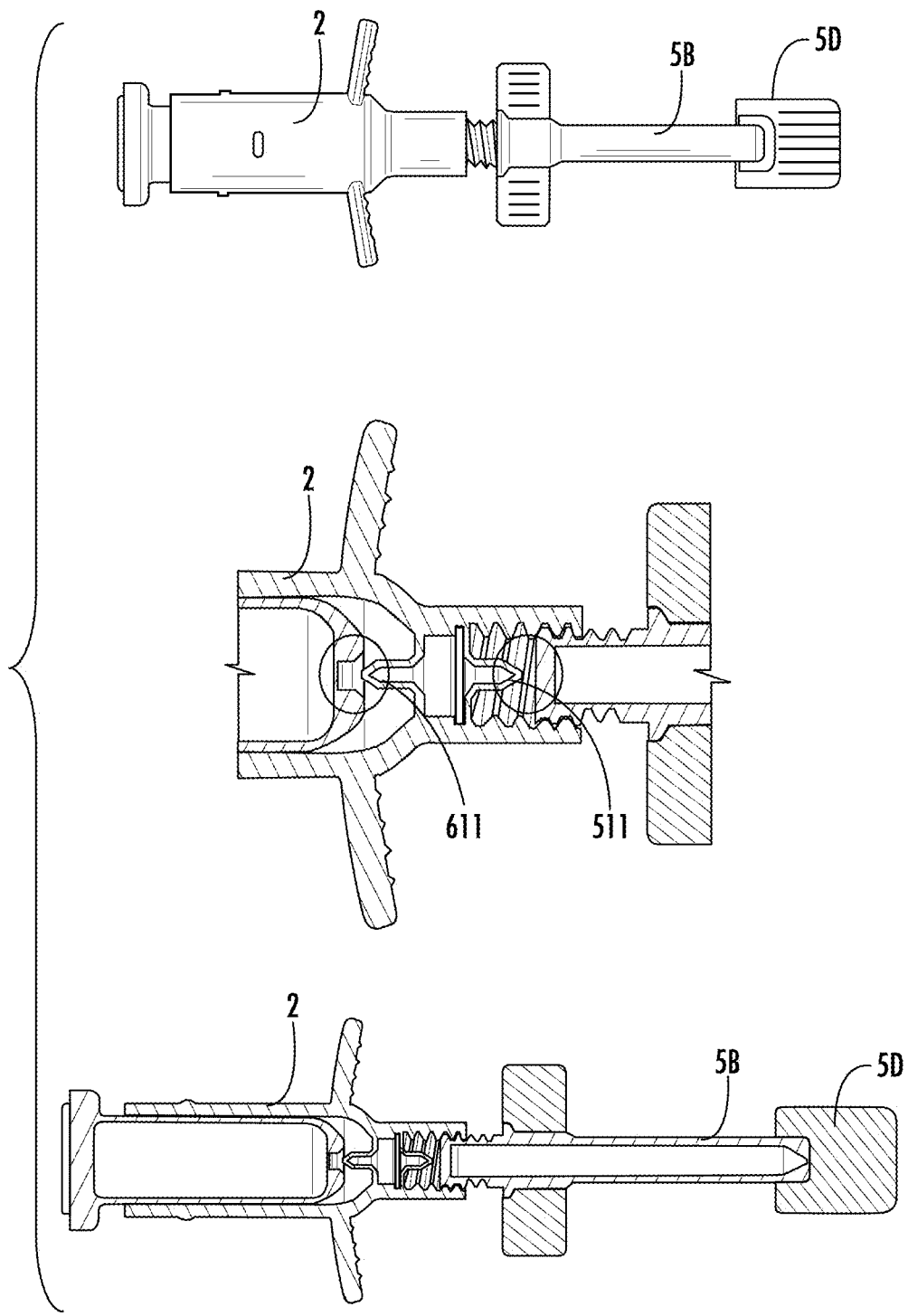
Figure 1A:
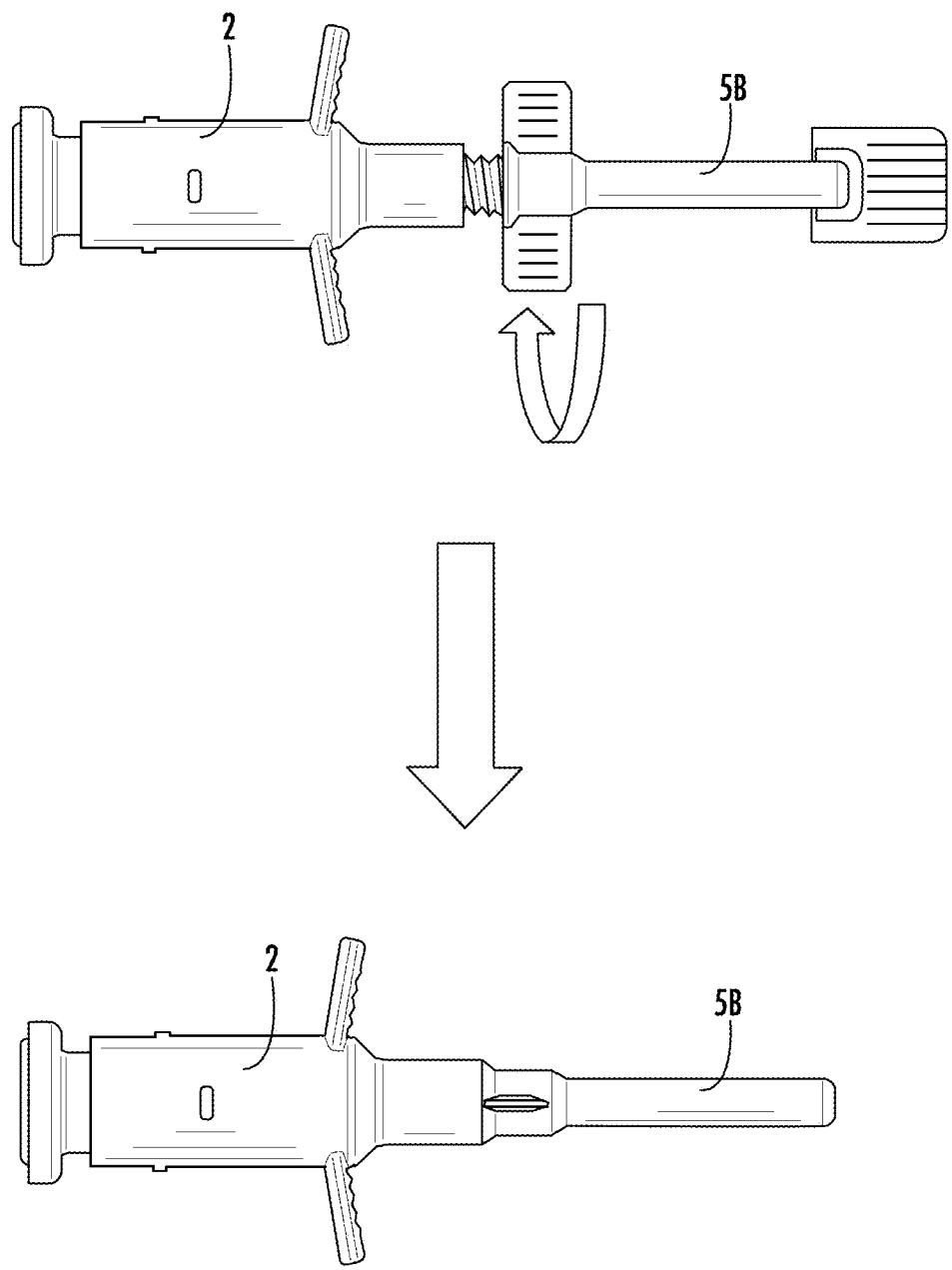
Figure 1A:
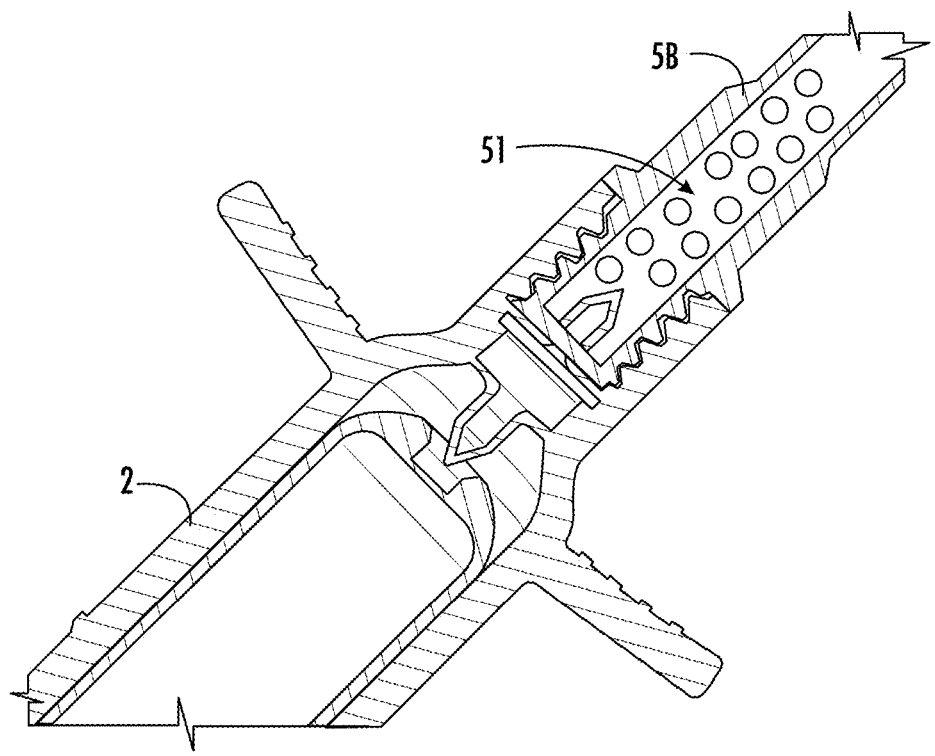

Reference is now made to FIG. 1A, disclosing a device according to one embodiment of the present invention. The BFS is separable from the rest of the device. The device comprises, inter alia, a BFS nose piece (1), a pressurized-fluid container (2), an air chamber gate (3) and an activation mechanism base (4). It should be emphasized that the BFS is merely an example and not mandatory.

It is well in the scope of the invention wherein the pressurized fluid is accommodated within container (2) for a relatively long time, e.g., by having a pre-pressurized container in a fluid connection (with a capsule (e.g., a BFS) enclosing the substance and releasing the same, or alternatively a container suitable for pressuring the fluid in situ within the container, e.g., by introducing a pump or piston mechanism that pressurizes ambient air in the container in a first step and accommodating the pressurized fluid for a relatively short time, then allowing the fluid to flow.

It is well in the scope of the invention wherein at least one of the above is provided in an intermittent manner, e.g., by train of n pulses, n is an integer equal to or greater than 2, e.g., 2, 5, 10, 30 or more. Pulses are provided by various mechanisms selected in a non-limiting manner from a series of pressurizing events (pulsating piston for example and/or a series of volume changes within the container); a series of releases of pressurized fluid, by having rapid opening and closing actions of the valve and/or applying blowable lips or reed(s) at the end of the orifice, e.g., as those provided in a mouthpiece of a wind instrument.

The pulses can be identical, e.g., same pressure, same period of time, same volume etc. Additionally, or alternatively, at least one pulse can different for at least one other pulse in e.g., pressure, time, volume, etc. It is well within the scope of the invention wherein the fingerprint of the pulses is of increasing pressure, increasing time; and/or increasing pressure decreasing time; and/or decreasing pressure same time and so on and so forth.

The device of the present invention referenced hereinafter as SipNose's intranasal (IN) Delivery Device (See FIGS. 1A and 1C-1H, device) produces a fine aerosol delivered to the targeted area of the nasal cavity, the upper nasal cavity. In oppose to commercial nasal devices, the SipNose's aerosol (See FIG. 1B) is created before it exits from the device. Utilizing the pressure as a driving force and the air as a carrier allows the drug to be released from the nozzle and efficiently delivered to the target area to be absorbed by the target tissue. The plume angle is the total angle subtended by the plume. The SipNose IN Delivery Device creates a mono or bi-Modal spray pattern. If a bi-Modal spray pattern is achieved the initial spray portion has a narrow plume geometry that then develops to a wider plume geometry spray (initial portion and steady state portion). If mono-Modal spray is achieved, the plume geometry is similar to the steady state aerosol portion of the bi-Modal spray pattern.

It is another object of the present invention to disclose the device a s disclosed in any of the above, wherein at least one of the following is true: (a) The body orifice is a nasal cavity, the mouth, the throat, an ear, the vagina, the rectum, the urethra, and any combination thereof. (b) The pressurized fluid is selected from a group consisting of air, nitrogen, oxygen, carbon dioxide, helium, neon, xenon, HFC and any combination thereof. (c) During dispensing of the at least one substance, a mixture of the predetermined volume $V_{gas}$ [ml] of the pressurized gas with the predetermined volume $V_{sub}$ [ml] of the substance entrained within it forms a plume of aerosol; the aerosol having a predetermined distribution, the distribution being either homogeneous or heterogeneous, the heterogeneous distribution is selected from a group consisting of: an arbitrary distribution, a distribution in which the density of the at least one substance within the mixture follows a predetermined pattern, and any combination thereof; characteristics of the aerosol selected from a group consisting of: particle size, particle shape, particle distribution, and any combination thereof, are determinable from characteristics of the device selected from a group consisting of: the predetermined volume of the pressurized gas, the predetermined volume of the substance, the predetermined pressure of the pressurized gas, the predetermined orifice size, and any combination thereof. (d) At least one the substance is selected from a group consisting of a gas, a liquid, a powder, an aerosol, a slurry, a gel, a suspension and any combination thereof. (e) At least one the substance is stored under one of the followings: an inert atmosphere; under vacuum and a pressure above ambient pressure to prevent reactions during storage. (f) A dose-response curve is substantially linear for brain concentration of the substance when administered intranasally via the device. (g) A dose-response curve for brain concentration having a fit selected from a group consisting of logarithmic, parabolic, exponential, sigmoid, power-low, and any combination thereof; of the substance when administered intranasally via the device.

It is an embodiment of the invention wherein a unit dose device for delivering a predetermined amount $M_{sub}$ of at least one substance, within at least one body cavity of a subject is utilized. The unit dose device comprises at least one predefined volume sized and shaped for containing the predetermined amount $M_{sub}$ of the at least one substance; a delivery end for placement in proximity to the body cavity, the delivery end being in fluid communication with the container; the delivery end comprises at least one orifice of diameter D; at least one valve mechanically connectable to the container, characterized by at least two configurations: (i) an active configuration in which the valve enables delivery of predetermined amount $M_{sub}$ of the substance from the container to the body cavity via the delivery end; and, (ii) an inactive configuration, in which the valve prevents delivery of the predetermined amount $M_{sub}$ of the substance from the container to the body cavity; the valve is reconfigurable from the inactive configuration to the active configuration within a predetermined period of time, dT, in response to activation of the same; and The unit dose as defined above, wherein the unit dose device has a configuration selected from a group consisting of configured to deliver a single unit dose or configured to deliver two-unit doses.

It is according to yet another embodiment of the invention wherein the unit dose device is configured to deliver the predetermined amount $M_{sub}$ of the substance and the predetermined volume $V_{gas}$ of the pressurized gas through the orifice of diameter D in (a) pressure rate of dP gas/dT; (b) volume rate of $dV_{gas}/dT$; and (c) amount rate of $dM_{sub}/dT$; and at least one of the following being held true: $P_{gas}$ is in a range of 0 to 10 barg; $V_{gas}$ is in a range of 1 to 50 ml; D is in a range of 0.2 to 6 mm; $dP_{gas}/dT$ is greater than 0.001 barg/ms; the amount rate $dM_{sub}/dT$ is greater than 0.0001 ml/ms or greater than 0.0001 mg/ms; the volume rate $dV_{gas}/dT$ is greater than 0.001 ml/ms; dT is in a range of 0 to 500 millisecond; and any combination thereof.

It is according to yet another embodiment of the invention wherein a fluid tight chamber configured to contain predetermined volume $V_{gas}$ of pressurized gas at a predetermined pressure, $P_{gas}$. It is according to yet another embodiment of the invention wherein the pressurized gas, once the valve is reconfigured from the inactive configuration to the active configuration, is configured to entrain the substance and deliver the same via the orifice in the delivery end. It is according to yet another embodiment of the invention wherein the predetermined amount $V_{sub}$ is more than 100 µl, specifically more than 600 µl preferably approx. 1000 µl of a liquid substance per transition to the active configuration and no more than 7 gr of a powder substance per transition to the active configuration. FIGS. 2-4 disclose plasma and brain concentrations of topiramate in rabbits (delivered intranasally), as an example of one embodiment of the invention.

Example 1—Different Embodiments of the Device of the Present Invention

Treatment of pain & central nervous system is found useful by utilizing a device of the present invention, see items 1-4, FIG. 1A, for the delivery of various medicaments.; e.g., treatment of chronic conditions such as Alzheimer's, Parkinson's, depression, pain, seizures, epilepsy and acute migraine, conscious sedation and sleep aids. As shown in FIG. 1A, the device comprises, inter alia, a BFS nose piece (1), a pressurized-fluid container (2), an air chamber gate (3) and an activation mechanism base (4).

FIGS. 1A and 1C-1H shows an embodiment of the body (10, 15) of a nasal delivery device, with FIG. 1D showing the exterior of the body and FIG. 1C showing an exploded view.

The nosepiece is not shown. The body comprises a base (10), an air chamber gate (12) with a first gate O-ring (11) at its proximal end and a second gate O-ring (13) at its distal end. The distal end of the air chamber gate (12) is covered by a container base cover (14) which comprises a biocompatible material to ensure that substance that is to contact living tissue only contacts biocompatible material before the contact with living tissue. The compressed gas chamber (15) will fit over the air chamber gate (12), with the first gate O-ring (11) and the second gate O-ring (13) providing airtight seals before activation so that compressed gas is storable between the air chamber gate (12) and the compressed gas chamber (15). In that sense, the base cover (14) also performs as a sealing member that prevents any leakage of the pressurized gas from escaping form the seal the compressed gas chamber (15) (with the second gate O-ring (13)). The base cover (14) is also the separator of the compressed gas from the drug contained within the drug contained within the nose piece (as will be illustrated hereinafter).

As will be disclosed hereinafter, there are two main embodiments to the nose piece: The first is a pierceable drug container in the nosepiece, where there is a puncturing element that punctures the drug container and once the compressed gas is released from the compressed gas chamber (15), the same entrains the drug and deliver the same to the nasal cavity. The second is an open end nose piece, in which the drug is disposed. In this embodiment, the base cover (14) is adapted to seal (along with second gate O-ring, 13), the compressed gas chamber (15); separate the compressed gas from the drug contained within the drug contained within the nose piece; and, provide a sealing for the drug container within the nose piece. As the nose piece is an open-ended enclosure, the base cover (14) seals the same and prevents any drug from leaking therefrom (see. FIGS. 4-6 and 10-12).

The compressed gas chamber (15) is connectable at its distal end with a nose piece (not shown). The distal portion of the compressed gas chamber (15) comprises activation holders (15C)

As shown in FIGS. 1C-1H, the base of the device forms the activation button (10); to activate, the activation button (10) is pressed upward while the compressed gas chamber (gas chamber (15) is held stationary by fingers on the activation holders (15C). The nosepiece is attachable to the compressed gas chamber (15) by means of the nose piece connector slot(s) (15C); a protuberance(s) on the nose piece engages with the nose piece connector slot(s) (15C); permitting fast and easy replacement of the nose piece.

As shown in FIGS. 1E-1H, the activation button (10) comprises a gate anchor (10A), a shoulder on which the air chamber gate stopper (12A) rests before activation. This to prevent movement of the air chamber gate (12) before activation. The first gate O-ring (11), at the proximal end of the gate anchor (10A) and the second gate O-ring (13), at its distal end, provide airtight seals before activation so that compressed gas is storable between the air chamber gate (12) and the compressed gas chamber (15). The distal end of the air chamber gate (12) is covered by a drug container base cover (14) which comprises a biocompatible material to ensure that substance that is to contact living tissue only contacts biocompatible material before the contact with living tissue. The compressed gas chamber (15) is connectable at its distal end with a nose piece (not shown) by means of the nose piece connector slot (15B).

FIG. 1G, the enlargement of the area within the circle B' of FIG. 1F, clearly shows the gate anchor (10A), with the air chamber gate stopper (12A) resting on it at an end (15A) of the compressed gas chamber (15).

Figure 1B:
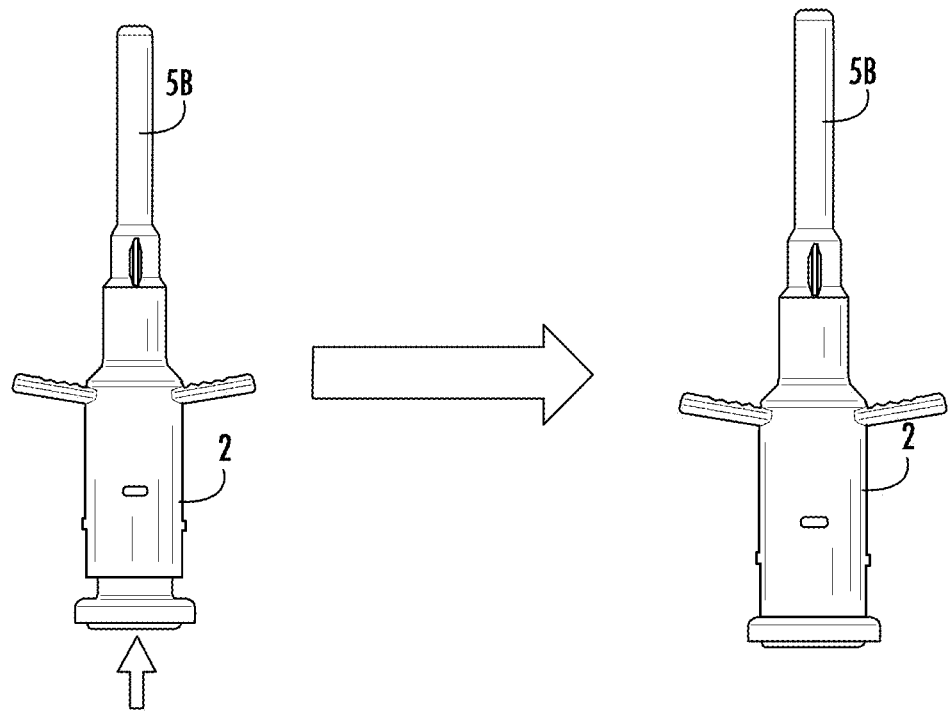
Figure 1B:
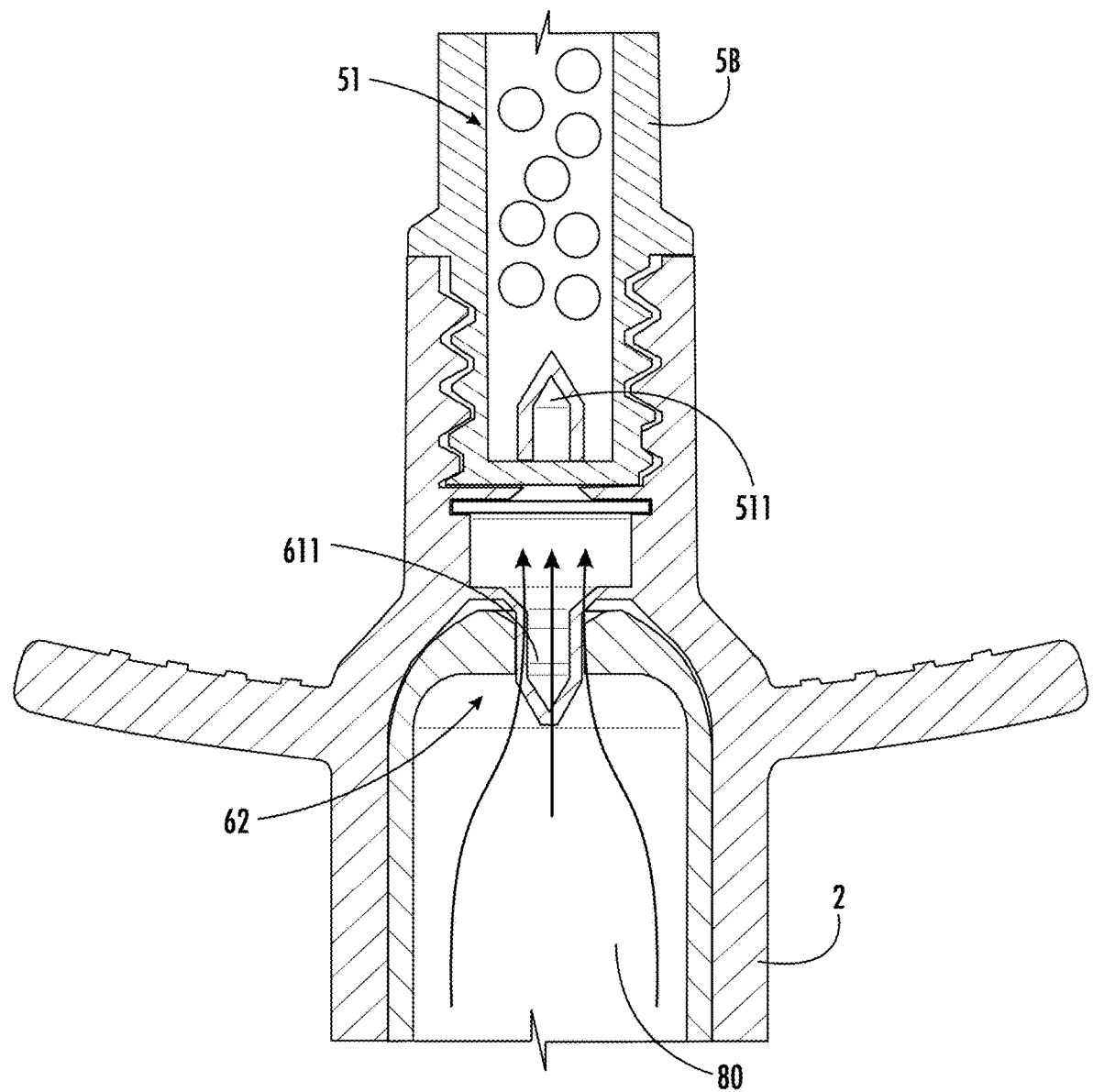

FIG. 1I, the enlargement of the area within the circle C of FIG. 1B, clearly shows the distal end of the air chamber gate (12), the drug container base cover (14), the second gate O-ring (13) and the gap (17, FIG. 1B) permitting air to escape (arrow, 15D) from the compressed gas chamber into the intermediate space and then to the nose piece (not shown).

FIG. 1J illustrates removal of the nose piece cover or medicine chamber (5) from an aerosol delivery device (1) by pulling the medicine chamber (5) away from the aerosol delivery device (9) in the direction denoted by the arrow 5'.

FIG. 1K-1N illustrates another embodiment of the device of the present invention in which the device disclosed is with a replaceable nose piece preloaded with a single dose of a medicament. The medicament can comprise one or more substances, as disclosed above. The device further comprises a nose piece cover with a removable top. FIGS. 1K and 1N show the exterior of the device with the nose piece cover in place, with FIG. 1K showing it from the side and FIG. 1M showing a perspective view. FIG. 1L shows a cross section taken along the line A-A in FIG. 1K and FIG. 1M provides a partially exploded view.

FIGS. 1K and 1N show an activation button (10) and compressed gas chamber (15), as disclosed above. The nose piece cover (40) has a removable orifice closure (41) at its distal end.

FIG. 1L shows a cross-section of the device. The nose piece cover (40) has a reversibly removable nose piece orifice cover (41). The nose piece (42), which comprises an integral drug volume (43), has, at its distal end, a nose piece cover pin (41A) to protect the distal end of the nose piece. The nose piece (42) is reversibly connectable to the compressed gas chamber (15) by means of a nose piece connecting pin (42A) which slots into a connector slot (15B, FIG. 1M) at the distal end of the compressed gas chamber (15)

FIG. 1M shows a partially-exploded view of the device. The nose piece (42) is reversibly connectable to the compressed gas chamber (15) by means of a nose piece connecting pin (42A) which slots into a connector slot (15B) at the distal end of the compressed gas chamber (15). The activation button (10) is shown at the proximal end of the compressed gas chamber (15). The removable orifice closure (41) is shown separated from the nose piece cover (40). By this means, only the removable orifice closure (41) needs to be removed to replace a nose piece (28); there is no need to remove the entire nose piece cover (40). The safety lock (2A) to prevent accidental activation of the device is also shown.

Reference is now made to FIG. 1 O-1V, disclosing a device according to one embodiment of the present invention. FIG. 1O shows an exploded view of the device, while FIG. 1P shows the device fully assembled. As shown in FIG. 1O, the device comprises, inter alia, a BFS nose piece (1), a pressurized-fluid container (2), an air chamber gate (3) and an activation mechanism base (4).

In the FIG. 1O, the base (4), an air chamber gate (3) has with a first gate O-ring at its proximal end and a second gate O-ring at its distal end (not shown).

The pressurized-fluid container (2) will fit over the air chamber gate (3), with the first gate O-ring and the second gate O-ring providing airtight seals before activation so that compressed gas is storable between the air chamber gate (3) and the pressurized-fluid container (2).

As will be disclosed hereinafter, the pierceable drug container (1) (e.g., BFS) in the nosepiece, where there is a puncturing element that punctures the drug container and once the compressed gas is released from the pressurized-fluid container (2), the same entrains the drug and deliver the same to the nasal cavity.

As shown in the FIGS. 1Q-1V. the base of the device forms the activation button (4); to activate, the activation button (4) is pressed upward, then the air chamber gate (3) is drawn downwardly, which removes the sealing of the upper O-ring. The movement of the air chamber gate (3) opens a gap between the pressurized-fluid container (2) and the BFF nose piece (1), allowing the pressurized-fluid to escape from container 2, enter BFF nose piece (1), and entrain the substance to the nasal cavity.

Reference is now made to FIGS. 1Q-1R, disclosing a device according to another embodiment of the present invention. FIG. 1R depicts a cross section along the line D: D of the device as shown in FIG. 1Q. The area within the circle 2C in FIG. 1R is shown enlarged in FIG. 1S, where the device's spike is disclosed (6). Also seen in FIG. 1S is a BSF lower BFS point at which the needle punctures the BFS (5A), BSF nosepiece which contain the drug (51) and an activation screw mechanism (5C).

Reference is now made to FIGS. 1T-1V, disclosing a device according to another embodiment of the present invention. FIG. 1T shows a cross-section of the device. FIG. 1U shows an enlarged view of the area inside the circle 3B of FIG. 1T. The piercing member (6) can be clearly seen. FIG. 1V shows the exterior of the nosepiece, showing the activation screw mechanism (5C) that is tightened in order to drive the bottom of the drug container against the spike and thereby pierce the drug container; the nosepiece cover (5D) and the main body of the nosepiece (5B).

According to this embodiment, after introducing the BFS, namely securing the BFS to the device, here by turning the nosepiece of the BFS clockwise. Upon rotation of the nosepiece, the piercing member 6 (shown in FIG. 1S), pierces the drug compartment (the BFS). A further step is removing (e.g., breaking) the cap, the image at the bottom presents the device after breaking the cap. The drug (51) is presented in cross section view of FIG. 1S.

Then, once the button at the base of the device is pushed. Such push actuates the base and releases the pressurized fluid. The same can be achieved by either (a) second piercing member that pierces the container [then the pressurized fluid (air, nitrogen etc.) flows from its container to the drug-containing BFS and carries the drug (liquid phase, solid powder particles etc.) (51) outwardly]; or, (b) moving the base cover (as described in FIGS. 1C-1D).

One should also note that this example is shown for the same invention but with another kind of pressurized gas container and a different way of compressed gas discharge (by puncturing the container rather than the gate that is shown in the previous figures.

According to another embodiment, the vial comprises a mixing mechanism. According to another embodiment, the mixing mechanism is comprises at least two balls adapted to mix the predetermined volume $V_{sub}$ [ml] of the at least one substance and the predetermined volume $V_{PF}$ of the pressurized fluid by means of the predetermined pressure, $P_{PF}$, of the pressurized fluid.

It is the believe of the inventors of the present invention that the unique aerosol created by the aid of the SipNose device (the pressurized gas carrier at predefined volume and pressure and the relatively small delivery time) enables the superior delivery results (will be described extensively in Example 5).

According to another embodiment of the present invention, which illustrates a dose adjustment mechanism which comprises (a) at least one second drug container enclosing a secondary substance volume $V_{dose}$ of said at least one substance; and, (b) at least one loading needle adapted to load from said second drug container, said volume $V_{sub}$ [ml or mg] of said at least one substance to said delivery end, where said secondary substance volume, $V_{dose}$ is larger than or equivalent to said predetermined volume $V_{sub}$ [ml or mg] of said at least one substance, such that when said valve is configured from said inactive configuration to said active configuration, said predetermined volume $V_{gas}$ [ml] of said pressurized gas enters from said fluid tight chamber into said delivery end to entrain said secondary substance volume $V_{sub}$ and deliver the same via said orifice in said delivery end.

FIG. 1W-1Y shows an embodiment of the device with the primary drug container in the nose piece cover. The medicament or substance is delivered from the primary drug container to a secondary drug volume in the nose piece. The nose piece cover can then be removed and the device activated to aerosolize and deliver the drug.

FIG. 1W shows the exterior of the device. It comprises an activation button (10), a compressed gas chamber (15), and a nosepiece (not shown) protected by a nose piece cover (20). In the distal portion of the nose piece cover (20) is a primary drug container (not shown) in a drug container housing (21). The drug container housing is slidable relative to the nose piece cover (20). The embodiment also comprises an indicator window (22) to determine the quantity of drug remaining in the primary drug container and a safety lock (23).

FIG. 1X shows a cross-section of the device, taken along the line A-A in FIG. 1W. The base and aerosol generation and delivery mechanism are similar to those disclosed above. The device comprises a nose piece (28) with an integral drug volume (29) in its proximal portion. The deliverable substance is stored in a primary drug container (24) in the distal portion of the nose piece cover (20). The primary drug container (24) is sealed at its proximal end by a plunger stopper (25). A loading needle (26) is fixed to the nose piece cover (20), with a needle adaptor (27) to guide the loading needle's (26) proximal end so that the proximal end of the needle adaptor (27) passes through the orifice at the tip of the nose piece (28). As shown in FIG. 1X, unless drug is being loaded into the integral drug volume (29), the needle does not pierce the plunger stopper (25) and the primary drug container (24) remains sealed.

FIG. 1Y shows a perspective view of the device. The drug container housing (21) can be seen, as well as the nose piece cover (20), which terminates at its proximal end in a safety lock (23) to prevent unwanted activation of the device. Movement of the drug container housing (21) relative to the nose piece cover (20) is controlled by a volume scale (30), in this embodiment a ratchet comprising a toothed rack (21A) on the drug container housing (21) and a pin (20A) on the nose piece cover (20). When the nose piece cover (20) is pressed downward relative to the drug container housing (21), the distance traveled and, therefore, the amount of drug to be dispensed, is controllable by the volume scale (30); each "click" will dispense a predetermined volume of the drug.

FIG. 1Z-1AB shows the embodiment of the device of FIG. 7 during loading of the drug into the integral drug volume (29) from the primary drug container (24).

FIG. 1Z shows the exterior of the device. It comprises an activation button (10), a compressed gas chamber (15), and a nosepiece (not shown) protected by a nose piece cover (20). In the distal portion of the nose piece cover (20) is a primary drug container (not shown) in a drug container housing (21). The drug container housing is slidable relative to the nose piece cover (20). The embodiment also comprises an indicator window (22) to determine the quantity of drug remaining in the primary drug container and a safety lock (23). The volume scale (30), here a ratchet, allows adjustment of the size of the dose.

FIG. 1AA shows a cross-section of the device, taken along the line B-B in FIG. 1Z. The base and aerosol generation and delivery mechanism are similar to those disclosed above. As shown in FIG. 1AA, a drug or medicament (24A) is being loaded from the primary drug container into the integral drug volume (29). Loading is activated by pressing the primary drug container (24) proximally (denoted by the arrow 23'). It then slides along the nose piece (28). The loading needle (26) is steadied by the needle adaptor (27). Pressing the primary drug container (24) proximally forces the loading needle (26) through the plunger stopper (25) and into the primary drug container (24). Drug (24A) can then flow through the loading needle (26) into the integral drug volume (29). Releasing the primary drug container (24) will cause it to move distally and remove the loading needle (26) from the plunger stopper (25). The nose piece cover (20) can then be removed and a dose of the drug can be administered.

FIG. 1AB shows a perspective view of the device. The drug container housing (21) can be seen, as well as the nose piece cover (20), which terminates at its proximal end in a safety lock (23) to prevent unwanted activation of the device. Movement of the drug container housing (21) relative to the nose piece cover (20) is controlled by the volume scale (30), in this embodiment a ratchet comprising a toothed rack (21A) on the drug container housing (21) and a pin (20A) on the nose piece cover (20). When the nose piece cover (20) is pressed downward relative to the drug container housing (21), the distance traveled and, therefore, the amount of drug to be dispensed, is controllable by the volume scale (30); each "click" will dispense a predetermined volume of the drug.

FIG. 1AC-1AF illustrates a device which can be loaded with a medicament, drug or substance via a syringe. FIGS. 1AC and 1AF show the exterior of the device, FIG. 1AC from the side and FIG. 1AF from an angle. FIG. 1AD shows a cross section taken along the line A-A in FIG. 1AC and FIG. 1AE shows the loading needle.

As shown in FIG. 1AC, the device comprises an activation button (10) and compressed gas chamber, as disclosed above. The nose piece cover (40) comprises a drug loading adaptor (45) and a reversibly removable drug loading adaptor cap (46) at its distal end. In the embodiment shown, the drug loading adaptor cap (46) is attached to the nose piece cover (40) by an integral flexible strip (46A), to prevent the drug loading adaptor cap (46) from getting lost.

As shown in FIG. 1AD a drug loading needle (47) is held firmly within the drug loading adaptor (45). The drug loading needle (47) extends from the top of the nose piece cover (40) through the distal end of the nose piece (42) to a drug storage volume near the proximal end of the nose piece (42). The distal portion of the drug loading needle (47) is configured by means of shape and size to accept the delivery end of a syringe (not shown). During storage and transport, the drug loading needle (47) is retained firmly in place with its distal portion help firmly between the closed drug loading adaptor cap (46) and the distal tip of the nose piece (42).

FIG. 1AE shows the drug loading adaptor (45) with the drug loading needle (47) extending proximally therefrom.

FIG. 1AF shows the nose piece cover (40), the drug loading adaptor cap (46) and the drug delivery device with activation button (10).

FIG. 12AG-12AJ shows the device of FIG. 1AC-1AF with a syringe in place. The syringe can be a proprietary syringe, with a tip matched in shape and size to the opening in the distal portion of the drug loading needle (47) or it can be a commercial syringe with a tip that fits into the opening in the distal portion of the drug loading needle (47).

FIG. 12AG-12AJ shows an embodiment of the body of FIGS. 1AC-1AF, as assembled, before activation. FIG. 1AG shows the exterior of the body, while. FIG. 1AH shows a cross-section taken along the line A-A in FIG. 1AG. FIG. 1AI is an enlarged view of the circled section B in FIG. 1AH, while FIG. 1AJ is a perspective view of the body of FIG. 1AG. Activation is by compressing the upper end of the device toward its base, by holding the activation holders (15C) with the fingers and the bottom of the base (10) with the thumb, and bringing the fingers toward the thumb. FIG. 1AG shows a side view of the device with a loading syringe (48) in place. The drug loading adaptor cap (46) is open and the tip (not shown) of the loading syringe (48) is resting in the distal portion of the drug loading adaptor (45) and nose piece cover (40), with the nose piece cover in communication with the activation button (10) and compressed gas chamber (15) of the delivery device.

FIG. 1AH shows a cross-section of the set-up of FIG. 1AG, taken along the line A-A. The loading syringe (48) is resting in the distal portion of the drug loading needle (47). The drug (49) is contained within the loading syringe (48); compression (arrow) of the loading syringe will force the drug out of the loading syringe (48). The proximal portion of the drug loading needle (47) passes through the nose piece (42). The nose piece (42) is attached, either reversibly or fixedly, to the activation button (10) and compressed gas chamber (15) of the delivery device.

FIG. 1AI-1AJ shows how a loading syringe (48), in place in a drug loading adaptor (45), is connectable to a drug delivery device, comprising nose piece (42), compressed gas chamber (15) and activation button (10). FIG. 1AI shows the loading syringe (48) in place in a drug loading adaptor (45), with the drug loading adaptor (45) in position to be attached to the delivery device. FIG. 1AJ shows the loading syringe (48) and drug loading adaptor (45), with the drug loading adaptor cap (46) open, attached to the compressed gas chamber (15) and activation button (10) of the delivery device.

According to another embodiment, a mixing mechanism is provided. FIGS. 1AK-1AW show embodiments of multi-compartment capsules, with exemplary embodiments of the separators configured to subdivide the capsules into compartments.

FIG. 1AK shows a plunger-type barrier (101) between compartments. In this exemplary embodiment, there is one plunger (101). In other embodiments, more or fewer plungers (101) can be present. The plunger (101) comprises a hole or slot small enough to prevent passage of substance therethrough, but wide enough to allow passage of compressed air therethrough. When the device is activated, compressed gas (curved arrows at bottom) enters the capsule (10). The pressure forces the plunger (101) upward, forcing substance above the plunger (101) out of the top of the capsule. Substance below the plunger (101) will be forced upward by the compressed air, to mix with the substance above the plunger in a nose piece (not shown). The plunger (101) passes through the top of the capsule into an intermediate space (10A) below the nosepiece (not shown; a shoulder or other barrier (not shown) prevents the plunger (101) from exiting the nosepiece. The hole or slot (101A) in the plunger (101) is narrow enough to prevent substance leakage during storage, and wide enough to allow compressed gas passage during activation, wiping the substance from the container during activation. The hole or slot (101A) in the plunger (101) can be designed in many ways to allow delivery that is very efficient, having a residual volume of less than 15% of the original volume. The plunger (101) can be made either from a flexible materials such as, but not limited to, silicone, rubber, flexible plastic or from a hard material such as, but not limited to, a polymer such as Delrin®, a plastic, nylon, metal and any combination thereof.

FIG. 1AL shows ball-type barriers (102) between compartments. The balls (102) provide both a separation function, before activation, and a mixing function during activation. In this exemplary embodiment, there are 3 balls (103). In other embodiments, more or fewer balls (103) can be present. When the device is activated, compressed gas (curved arrows at bottom) enters the capsule (10). The pressure forces the balls (102) upward, forcing substance above the topmost ball (102) out of the top of the capsule. The topmost ball (102) passes through the top of the capsule into an intermediate space (10A) below the nosepiece (not shown; a shoulder or other barrier (not shown) prevents the balls (102) from exiting the nosepiece. The substance between the first and second balls can then pass through the top of the capsule (10) into the nosepiece (not shown, and mix with the first substance. The second ball (102) can then enter the intermediate space (10A), and similarly with all balls (102) in the capsule (10) until the capsule (10) is empty.

Ball-type barriers (102) are useful when mixing of several components should occur only upon delivery, when one or more substance should be maintained at low humidity, when the viscosity of the substance varies significantly, and any combination thereof. In addition, contact between the ball (102) and the walls of the capsule (10) can also ensure effective release of the substance from the open end capsule (10). Examples of substances which tend to cling to walls include, but are not limited to, oils and some powders. The barriers can be balls, as in the embodiment shown, angular dividers or any other shape which can be easily moved by the released compressed gas (low-friction contacts), and still provide effective sealing between the elements to avoid mixing during, for example, shipment and storage.

According to another embodiment, the balls can also act as sealing to the open-end nosepiece (or delivery end or capsule) from both ends thereof. Once the pressurized fluid (gas) are extracted from their container (or chamber) they move the first ball from one end of the nosepiece, enter the same, mix the substance (by means of the ball and the air), remove the second ball (positioned on the second end of the nosepiece), entrain the substance and deliver the same to the nasal cavity. Thus, the mixing balls can act as sealing to the nosepiece.

FIG. 1AM shows an embodiment with linked drug containers (103) within the capsule (10). In this exemplary embodiment, there are 3 linked drug containers (103). In other embodiments, more or fewer linked drug containers (103) can be present. The linked drug containers (103) are sealed by frangible membranes. A single frangible membrane can seal the top of one drug container (103) and the bottom of the adjacent drug container (103), separate frangible membranes (103) can be used for adjacent ends of drug containers, and any combination thereof. When the device is activated, compressed gas (curved arrows at bottom) enters the capsule (10). The pressure bursts the membranes, allowing mixing and exit into the nosepiece of the substance s within the linked drug containers (103).

In a preferred embodiment, each drug containers (103) is made of a soft thin sheet. The sheet can be a polymeric membrane, a continuous sheet or any other form which is thin enough to be easily torn when desired by the released of the compressed air. All drug containers (103) are connected to each other during manufacturing. Mixing occurs only during activation, with the compressed gas tearing the membranes/sheets dividing the compartments. Once the membranes are torn, the substance s are exposed to the compressed gas, mixed and delivered.

FIG. 1AN shows an embodiment with sets of membranes (104) containing two layers (104A, 104B) within the capsule (10). In this exemplary embodiment, there are 4 sets of two-layer membranes (104A, 104B). In other embodiments, more or fewer sets of two-layer membranes (104A, 104B) can be present. The lower membrane (104B) is reticulated, with portions separable from each other, and the upper membrane (104A), frangible. When the device is activated, compressed gas (curved arrows at bottom) enters the capsule (10). The pressure causes the separable portions of the lower membrane (104B) to rotate upward, tearing the upper membrane (104A) and allowing mixing and exit into the nosepiece of the substance s within the capsule (10).

This embodiment differs from the previous one in that: (a) the drug containers do not form one unit; (b) the separate zones are separated from each other by membrane which is composed of two layers: one provides the rigidity of the membrane and is made of a rigid material, and the other one is a continuous flexible sheet which seals against the lower rigid part during until activation and which opens when air is pressed against its lower side The membranes (104A, 104B) open only one way, when air presses against their lower side during activation, allowing mixing of the substances during delivery.

FIG. 1AO shows an embodiment with duckbill valves (105) within the capsule (10). In this exemplary embodiment, there are 4 duckbill valves (105). In other embodiments, more or fewer duckbill valves (105) can be present. When the device is activated, compressed gas (curved arrows at bottom) enters the capsule (10). The pressure causes the duckbill valves (105) to rotate upward, allowing exit and mixing of the substance s within the capsule (10).

FIG. 1AP shows an embodiment with frangible membranes (106) within the capsule (10). In this exemplary embodiment, there are 4 frangible membranes (106). In other embodiments, more or fewer frangible membranes (106) can be present. When the device is activated, compressed gas (curved arrows at bottom) enters the capsule (10). The pressure causes the frangible membranes (106) to tear, allowing mixing and exit into the nosepiece (not shown) of the substances within the capsule (10).

FIG. 1AQ shows an embodiment with bendable membranes (107) within the capsule (10). In this exemplary embodiment, there are 4 bendable membranes (107). In other embodiments, more or fewer bendable membranes (107) can be present. When the device is activated, compressed gas (curved arrows at bottom) enters the capsule (10). The pressure causes the bendable membranes (107) to rotate upward (curved arrows in middle) about connection points between the bendable membranes (107) and the capsule (10) wall, allowing mixing and exit into the nosepiece (not shown) of the substances within the capsule (10).

These exemplary embodiments allow holding the substances separate during storage and mixing the substances only upon activation and delivery. In some embodiments, the device or the substances therein can be configured to generate a temperature change, either heating or cooling, during mixing and delivery. The device can further be configured so that components for creating a temperature change in the device are not released with the delivered substances.

Heating and cooling can be triggered by mechanical force, by pressure, by chemical reaction and any combination thereof. This can be done inside the drug capsule, around the drug capsule, or outside the device itself in its packaging, to be triggered right before activation of the device.

Such temperature change can be generated during activation (short time temperature change) or prior to activation (long time temperature change). Long time temperature changes require a temperature activation separated from the delivery activation.

Either option, or at least the long time temperature change, further requires proper device sealing to allow temperature to be maintained inside the device and to allow equilibration prior delivery. Such options can further include a temperature indicator, such as by a color change in a dedicated control window, to allow the user to know that the device is ready for activation.

A temperature change can be an increase in temperature, a decrease of temperature, or both.

A temperature change can be useful for example for:
Substance mixing
Dissolution of one substance in another
Absorption of a substance or mixture of substances in tissue, for example, a delivery temperature regulated with respect to the temperature of the nasal passages.
Effective scattering of a substance or mixture of substances on tissue, for example, to create a flat, thin, uniform layer in the nasal passages and hence improve absorption
Affect the viscosity of a substance or mixture of substances (both increase and decrease of viscosity can occur).
Affect nature of a substance or mixture of substances. For example: polymerization can be initiated only during delivery, or during or after contact with tissue.

One embodiment comprises two heating agents. These heating agents are in compartments of a capsule. Upon activation of the device, or upon activation of heating (for example, buy pressing a button), a membrane separating the two compartments is torn, allowing the heating agents to mix and to generate heat within the device. Other membranes are not torn by this activity, which keeps the heating agents in a sealed compartment-sealed so as to prevent delivery of heating agent delivery but allow gas passage to other compartments. Passage of the compressed gas then delivers the heated substances or other desired substances. Mixing, as disclosed above, can occur during delivery.

FIG. 1AR shows an embodiment with sets of membranes (104) containing two layers (104A, 104B) and a mixing ball (102) within the capsule (10). In this exemplary embodiment, there are 2 sets of two-layer membranes (104A, 104B) and a single mixing ball (102) at the top of the capsule (10). In other embodiments, more or fewer sets of two-layer membranes (104A, 104B) and more or fewer mixing balls (102) can be present; the mixing balls (102) can be at any desired location within the capsule (10). The lower membrane (104B) is reticulated, with portions separable from each other, and the upper membrane (104A), frangible. When the device is activated, compressed gas (curved arrows at bottom) enters the capsule (10). The pressure causes the separable portions of the lower membrane (104B)

to rotate upward, tearing the upper membrane (104A) and allowing mixing and exit into the nosepiece of the substances within the capsule (10). Further mixing is provided by the mixing ball (102). As disclosed above, a shoulder or other stopper in the nosepiece (not shown) prevents the mixing ball (102) from exiting the nosepiece (not shown).

FIG. 1AS shows an embodiment with duckbill valves (105) and a mixing ball (102) within the capsule (10). In this exemplary embodiment, there are 2 duckbill valves (105) and a single mixing ball (102) at the top of the capsule (10). In other embodiments, more or fewer duckbill valves (105) can be present and more or fewer mixing balls (102) can be present; the mixing balls (102) can be at any desired location within the capsule (10). When the device is activated, compressed gas (curved arrows at bottom) enters the capsule (10). The pressure causes the duckbill valves (105) to rotate upward, allowing exit and mixing of the substances within the capsule (10). Further mixing is provided by the mixing ball (102). As disclosed above, a shoulder or other stopper in the nosepiece (not shown) prevents the mixing ball (102) from exiting the nosepiece (not shown).

FIG. 1AT shows an embodiment with frangible membranes (105) and a mixing ball (102) within the capsule (10). In this exemplary embodiment, there are 4 frangible membranes (105) and a single mixing ball (102) at the top of the capsule (10). In other embodiments, more or fewer frangible membranes (105) can be present and more or fewer mixing balls (102) can be present; the mixing balls (102) can be at any desired location within the capsule (10). When the device is activated, compressed gas (curved arrows at bottom) enters the capsule (10). The pressure causes the frangible membranes (105) to tear, allowing mixing and exit into the nosepiece (not shown) of the substances within the capsule (10). Further mixing is provided by the mixing ball (102). As disclosed above, a shoulder or other stopper in the nosepiece (not shown) prevents the mixing ball (102) from exiting the nosepiece (not shown).

FIG. 1AU shows an embodiment with bendable membranes (107) and a mixing ball (102) within the capsule (10). In this exemplary embodiment, there are 4 bendable membranes (107) and a single mixing ball (102) at the top of the capsule (10). In other embodiments, more or fewer bendable membranes (107) can be present and more or fewer mixing balls (102) can be at any desired location within the capsule (10). When the device is activated, compressed gas (curved arrows at bottom) enters the capsule (10). The pressure causes the bendable membranes (107) to rotate upward (curved arrows in middle) about connection points between the bendable membranes (107) and the capsule (10) wall, allowing mixing and exit into the nosepiece (not shown) of the substances within the capsule (10). Further mixing is provided by the mixing ball (102). As disclosed above, a shoulder or other stopper in the nosepiece (not shown) prevents the mixing ball (102) from exiting the nosepiece (not shown).

FIG. 1AV shows an embodiment with two half balls (102). In this exemplary embodiment, there is one pair of half-balls (102). In other embodiments, more pairs of half-balls (102) can be present. When the device is activated, compressed gas (curved arrows at bottom) enters the capsule (10). The pressure causes the half-balls (102) to move upward. They will separate and tumble as they move, allowing gas to pass between and around them thus mixing and delivering the substance. As disclosed above, a shoulder or other stopper in the nosepiece (not shown) prevents the mixing ball (102) from exiting the nosepiece (not shown).

FIG. 1AW shows an embodiment with two attached mixing balls (102). In other embodiments, more mixing balls (102) can be present. When the device is activated, compressed gas (curved arrows at bottom) enters the capsule (10). The pressure causes the mixing balls (102) to move upward, thus causing efficient mixing of the substances. As disclosed above, a shoulder or other stopper in the nosepiece (not shown) prevents the mixing ball (102) from exiting the nosepiece (not shown).

The mixing balls need not be spherical; any shape that will provide good sealing during storage and low-friction movement during activation can be used.

Reference is now made to another embodiment of the present device. Reference is now made to FIGS. 1AX-1BB disclosing a device according to another embodiment of the present invention. FIG. 1AX illustrates a side view (image on the top) of a pre-used device carrying a piercable container (e.g., BFS). Images on the middle and in the bottom are cross sections of the same, showing the piercable container (e.g., BFS) nosepiece and air container before contact. FIG. 1AY shows the second step after introducing the BFS, namely securing the BFS to the device, here by turning the nosepiece of the BFS clockwise. Upon rotation of the nosepiece, the piercing member 511 (shown in FIG. 1AZ), pierces the drug compartment. A further step is removing (e.g., breaking) the cap, the image at the bottom presents the device after breaking the said cap. The drug (51) is presented in cross section view of FIG. 1AZ. In FIG. 1ABA, a button at the base of the device is pushed. Such push actuates the base and a second piercing member 611 pierces the container 80. Subsequently, as depicted in FIG. 1ABB, pressurized fluid (air, nitrogen etc.) flows from its container (62) to the drug-containing (e.g., BFS) and carries the drug (liquid phase, solid powder particles etc.) (51) outwardly.

One should also note that this example is shown for the same invention but with another kind of pressurized gas container and a different way of compressed gas discharge (by puncturing the container rather than the gate that is shown in the previous figures.

Example 2—Binge Eating Disorder (BED) and Obesity

The following example illustrates the use of Intranasal delivery of Topiramate to treat BED and obesity. The device could be any of the described above or any other device that utilize intranasal delivery.

Obesity is a medical condition in which excess body fat has accumulated to an extent that it may have a negative effect on health. People are generally considered obese when their body mass index (BMI), a measurement obtained by dividing a person's weight by the square of the person's height, is over 30 kg/m$^2$, the range 25-30 kg/m$^2$ is defined as overweight. It is further evaluated in terms of fat distribution via the waist-hip ratio and total cardiovascular risk factors. BMI is closely related to both percentage body fat and total body fat. In children, a healthy weight varies with age and sex. Obesity in children and adolescents is defined not as an absolute number but in relation to a historical normal group, such that obesity is a BMI greater than the 95th percentile. The reference data on which these percentiles were based date from 1963 to 1994, and thus have not been affected by the recent increases in weight. BMI is defined as the subject's weight divided by the square of their height and is calculated as follows: BMI=m/h$^2$, where m and h are the subject's weight and height respectively.

Any BMI ≥35 or 40 kg/m² is severe obesity.
A BMI of ≥35 kg/m² and experiencing obesity-related health conditions or ≥40-44.9 kg/m² is morbid obesity.
A BMI of ≥45 or 50 kg/m² is super obesity.

Obesity is a leading preventable cause of death worldwide, with increasing rates in adults and children.

Binge eating disorder (BED) is the most common eating disorder and was newly recognized in 2013 in the fifth edition of the Diagnostic and Statistical Manual of Mental Disorders (DSM-5). BED is frequently associated with obesity and the metabolic syndrome, as well as with other psychiatric diseases, such as mood (49%), anxiety (41%), and substance use (22%) disorders. BED is highly prevalent and carries a high burden of mental and physical illness and disability. However, BED is frequently under-recognized and under-treated.

Topiramate is an anticonvulsant drug used for the treatment of epilepsy and prophylaxis of migraine. It is used as a mood stabilizer and there are reports of its efficacy in reducing impulsiveness and improving mood regulation, possibly via its antagonism to glutamatergic transmission in the lateral hypothalamus, although this indication is still controversial. Weight loss is a side effect consistently reported in the medical literature in patients treated with topiramate. Given its potential role in stabilizing mood and reducing impulse control problems and weight, topiramate has been proposed as a treatment for obese patients with BED, see Leombruni, Paolo, Luca Lavagnino, and Secondo Fassino. "Treatment of obese patients with binge eating disorder using topiramate: a review." *Neuropsychiatric disease and treatment* 5 (2009): 385.

It was stated in the art that clinical efficacy in humans could be achieved by administering P.O. from 100 mg and up to 400 mg topiramate, CAS No. 7240-79-4, elimination half-life of about 19 to 25 hours, sold under the brand name Topamax, Trokendi X R, Qudexy X R, etc., and provided with $C_{max}$ of 1.73 (µg/ml) in plasma as the minimum concentration that a therapeutic effect is shown, see Doose D R, et al. *J Clin Pharmacol* 1996; 36:884-91. Topiramate is known to have very common adverse effects (i.e., >10% incidence) including dizziness, weight loss, paraesthesia, somnolence, nausea, diarrhea, fatigue, nasopharyngitis, depression and seizures, if treatment is not ended gradually; hence its high-dose routine use is not recommended.

The inventors of the present invention have discovered that intranasal delivery of Topiramate could be helpful in effective delivery thereof to the brain and hence alleviate symptoms of BED and obesity with reduced adverse effects.

Figure 2A:
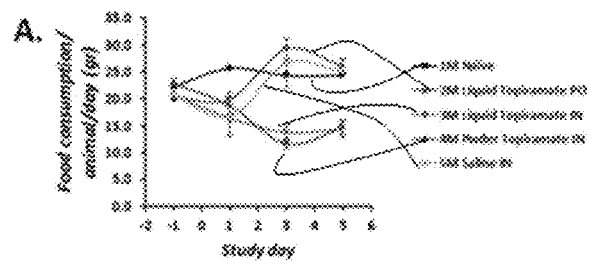
FIGS. 2a-2b demonstrate rats testing for treatment of topiramate to BED and their food consumption.
Figure 2B:
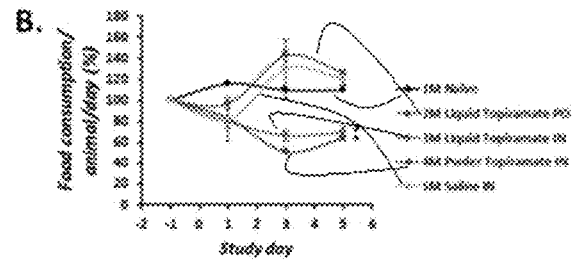

Reference is now made to FIGS. 2a-2b, illustrating food consumption in testing with rats after administration of topiramate IN vs. PO.

An efficacy of IN administration of topiramate testing was performed in 38 rats. All rats were fed ad libitum a commercial rodent diet (Teklad Certified Global 18% Protein Diet, Envigo cat #2018SC). All rats had free access to sterilized and acidified drinking water (pH between 2.5 and 3.5).

All rats were examined by the Attending Veterinarian (AV) in order to determine being fit for the study before the experimental phase initiation. Animals were inspected daily for any signs of morbidity of mortality.

The rats were administered twice a day, 6 hours apart, to 9 rats in each group, at a dose of 0.78 mg (0.39 mg in 2 nostrils), which is comparable to 25 mg per nostril (50 mg total) in humans. Two times a day to a total of 1.56 mg per day per animal. In the liquid nasal samples the administration was performed IN via SipNose's dedicated device at doses of 78 µL out of 10 mg/ml stock, or orally, after dilution to a dose volume of 200 µL. Food consumption was monitored two days before study initiation and daily during the study. Three (3) animals per group were sacrificed 45 minutes after the first dosing of the first day, and six animals per group were sacrificed after 6 consecutive days of dosing, via CO2 asphyxiation.

The food consumption of the rats was verified. Food consumption was evaluated daily for each group (A and B) of rats (3 cages, 2 animals per cage), starting two days before treatment.

As depicted in FIGS. 2a-2b, increased food consumption was observed for each group (A and B) for: sub-groups 1 which refers to the Naïve (non-treated sub-groups); sub-groups 2 which refers to the rats which were PO administrated with topiramate; and, sub-groups 5 which refers to the rats which were IN administered with saline.

A reduced food consumption was observed for: sub-groups 3 which refers to the rats which were IN administrated with liquid topiramate; and, sub-groups 4 which refers to the rats which were N administration with powder topiramate).

The reduced food consumption was statistically significant (p<0.005). This provides further a proof of concept exemplary that intranasal (IN) delivery of topiramate can alleviate BED and/or Obesity syndromes.

Figure 3A:
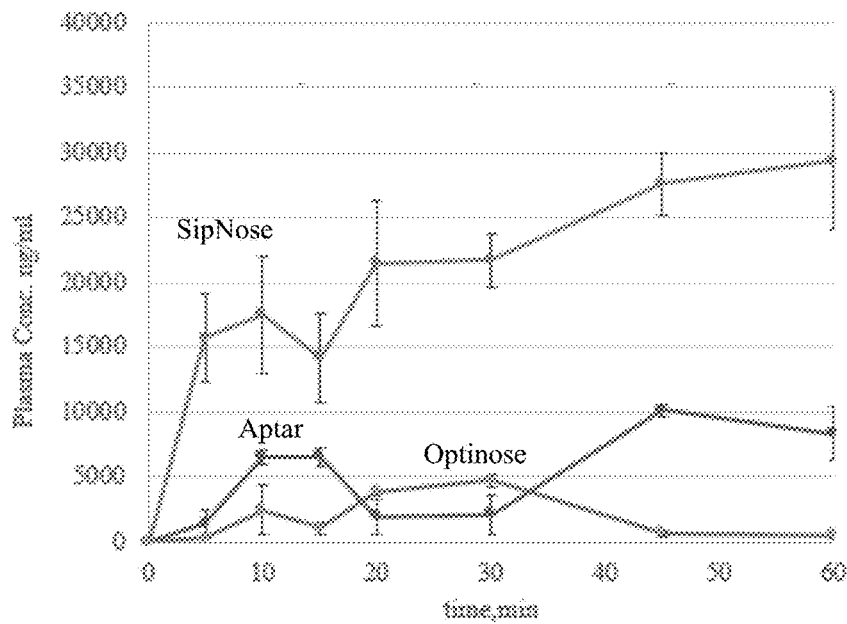
FIGS. 3a-3c disclose plasma and brain concentrations of topiramate in rabbits, as an example of yet another embodiment of the invention.
Figure 3B:
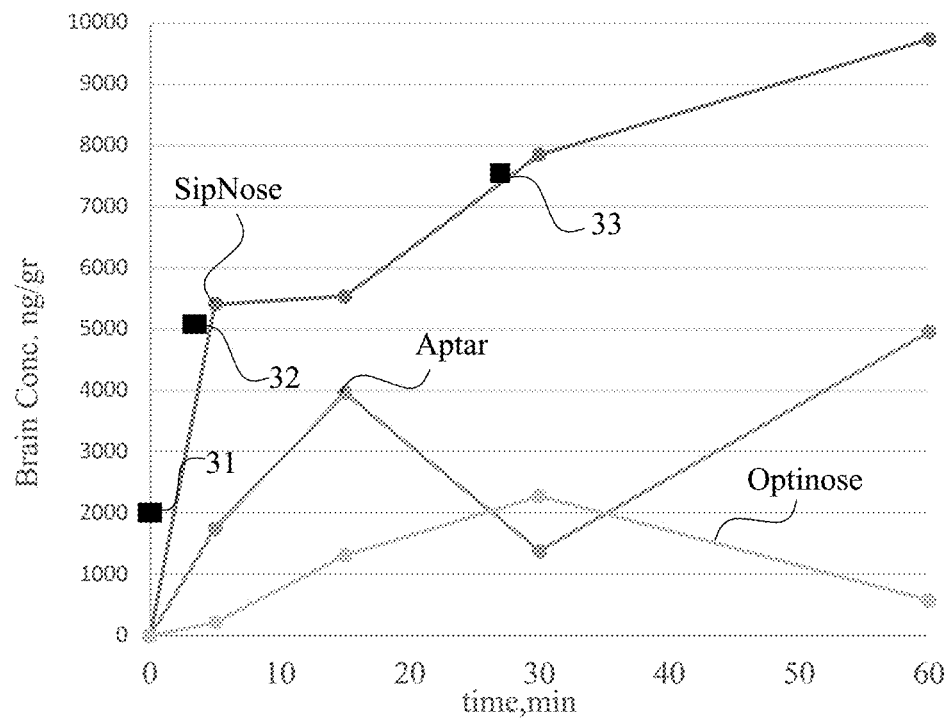
Figure 3C:
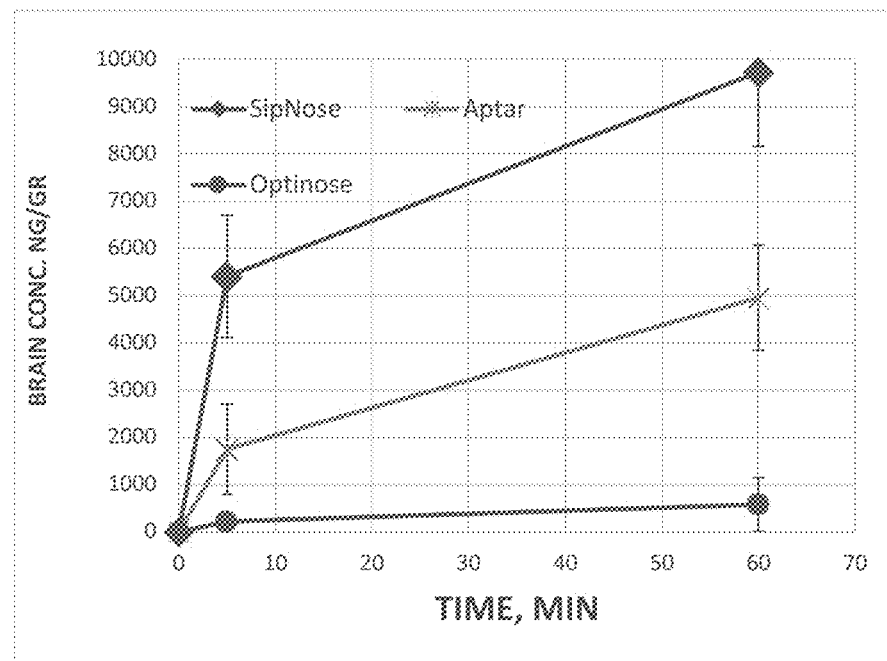

Reference is now made to FIGS. 3a-3c presenting plasma and brain concentrations of topiramate in rabbits after intranasal administration of the substance by three different nose to brain dispensers: the SipNose device, Aptar and Optinose devices. All demonstrate the ability to deliver topiramate to the plasma and to the brain via the intranasal route.

Figure 5:
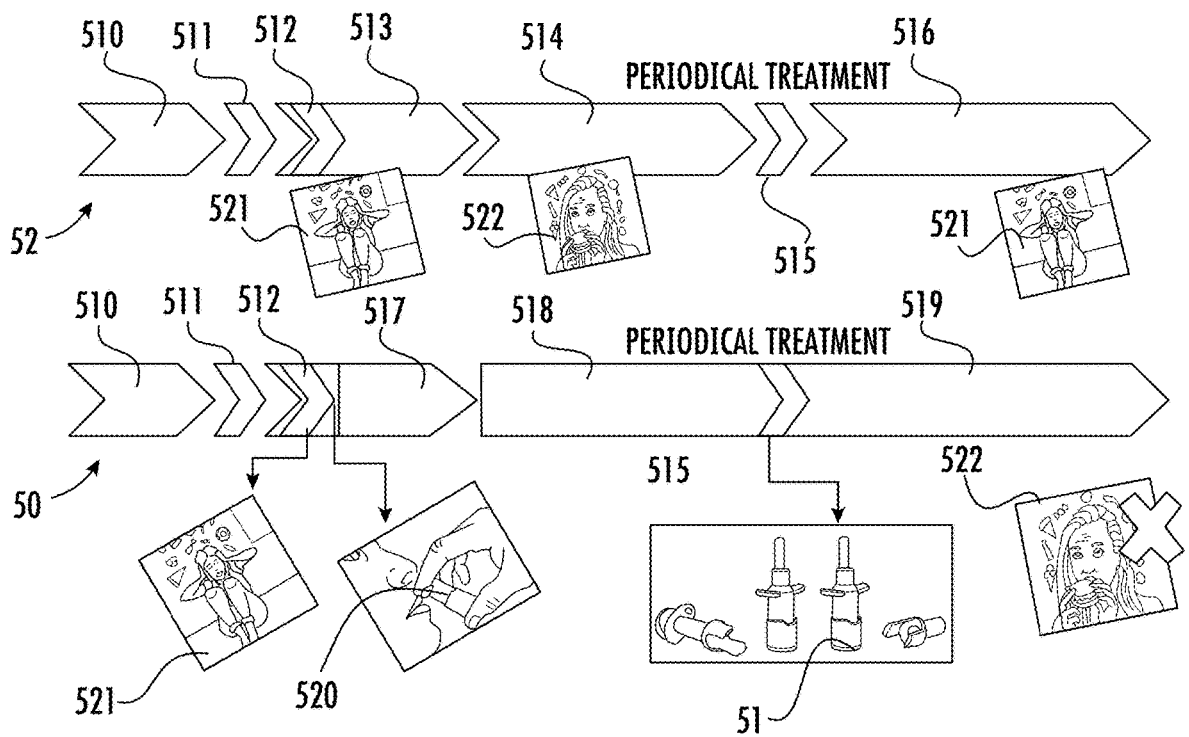
FIG. 5 discloses etiology of BED treated by (i) protocols and means of the prior art, and (ii) by means and methods of a few embodiments of the present invention.

Reference is now made to FIG. 5, schematically depicting etiology of BED in a patient provided conventional treatment (upper timeline 52), namely a routine of periodical P.O. administrations (i.e., oral administration) of topiramate (100 mg or more), or without a conventional treatment as of the wish to avoid side effects. Urge (511) for eating happens after a period of time (510) whose length varies from one patient to another. After a short lag, the patient, who was educated for self-awareness, recognizes he/she is experiencing such an urge but has no control nor a way to reduce or stop the urge to binge or the binge episode. Based on literature in the field where 1.73 (µg/ml) plasma concentration is accepted to reflects a concentration in which topiramate is effective (for example as an anti-epileptic therapy), the understanding is that when and if a patient is immediately (namely, in a period of time shorter than 30 min) administered a therapeutically effective dose of topiramate, so that $C_{max}$ (plasma) is equal to or greater than 1.73 (µg/ml), the binge will be over without tension (513), without un controlled eating (522) with no emotional breakdown thereof (516). Nevertheless, as the kinetics of topiramate passage to the CNS is much slower than 30 min when administered P.O only when high plasma concentrations of the medicament in blood are continuously maintained by periodical treatment (515), the number and severity of the binges will be reduced, but of course with patient bearing and, in many cases, the high drug concentration will cause the unwanted adverse effects described hereinabove.

The present invention discloses a novel technology for highly effective IN topiramate delivery, which not only decreases the number and severity of binges without causing these very common side effects, but further effectively fights the binge and effectively eliminates binge eating and BED. Lower timeline 50 presents pre-urge time (510) and an urge 511 of which the patient becomes aware (512). As one of the following is being held true, two different scenarios can be defined: On Demand—once an urge is sensed—immediately intranasally administrating Topiramate; and, Periodically & On Demand—a combination of periodically PO administration of topiramate (most likely at a low maintenance concentration that is yet non-active but also bear no side effects) and once an urge is sensed—immediately intranasally administrating Topiramate (most probably lower concentration that those that would be needed if IN topiramate is being taken alone).

As mentioned above, the inventors of the present invention have discovered that intranasal delivery of Topiramate could be helpful in effective delivery thereof to the brain and hence alleviate symptoms of BED and obesity. As will be illustrated hereinbelow, intranasal delivery will be shown to be effective to deliver topiramate to the brain to alleviate symptoms of BED and obesity. Also, it will be illustrated hereinbelow that the SipNose device has superiority in such delivery (in terms of delivery time to the brain and the amount/concentration reaching thereof).

POST-URGE TOPIRAMATE nose to brain, N2B, ADMINISTRATION-On Demand need.

As described above, the inventors of the present invention have discovered that intranasal delivery of Topiramate could be helpful in effective delivery thereof to the brain and hence alleviate symptoms of BED and obesity.

Once an urge is sensed-immediately intranasally administrating Topiramate.

Reference is now made to FIG. 3a illustrating preclinical trials of rabbit's plasma concentration of Topiramate vs. time (where topiramate administration was given at time 0) by the SipNose device as well as devices by Aptar and Optinose.

The objective of the study is to evaluate the pharmacokinetic (PK) profile in plasma and brain following a single intranasal administration of topiramate with SipNose device in comparison to other nasal devices (Aptar and Optinose commercial pumps).

A total of 36 rabbits will be utilized and divided into three cycles of 12 animals (Females rabbits, each >2.5 kg at study initiation). Each cycle will test a different device. Each cycle will be divided into 4 groups (with 2-3 time points per group for plasma sampling prior termination).

Each cycle will represent the administration with each specific device (Aptar, SipNose and Optinose). Twelve animals per cycle will be divided into four subgroups, according to the following table:

Animal were administered via Aptar pump device on Day 1 (Cycle1), via SipNose's novel intranasal delivery on Day 2 (Cycle 2), and via Optinose device on Day 3 (Cycle 3). Each cycle was divided into 4 subgroups.

All animals were connected to a Venflon at the ear for blood draining at the required PK time points. About 2-3 ml of blood was taken for each time point, from which plasma was separated and aliquoted into two aliquots. All animals were sampled at baseline (BL) before dosing, and then at one additional time point (except for the 5 min termination animals) as detailed in the Table above, and final bleeding will be right before termination. Brain will be perfused with saline, harvested, and snap frozen at termination for further analysis by the Sponsor.

Blood Collection and plasma preparation—blood samples were collected through the ear veins (~2-3 ml per sample) into K2-EDTA tubes on ice, at time-points according to groups. K2-EDTA tubes with the collected blood at each time point will be kept on ice and the blood was centrifuged (2000 g for 10 min) at 4° C. within 30 min after sampling.

Termination—the animals were anesthetized by intramuscular (IM) injection of Ketamine/Xylazine 35/5 mg/kg. If required, Ketamine only at dose of 17.5 mg/kg was added. After anesthesia the animals were placed on a heating pad. Brain was perfused with saline during 4-8 min, and then Pentobarbital overdose (150 mg/kg, IV) was given as specified at the Ethics Committee approval. Finally, the head was skinned and the skull cap removed without disturbing the brain. The brain (with the olfactory bulb and olfactory nerve) was removed from the skull and snap frozen and will be kept at (−60)-(−90)0C until sent to the bioanalytical lab for analysis.

Reference is now made to FIGS. 3A-3B. As can be seen from FIG. 3A, the plasma concentration increases post intranasal administration.

It is noted that FIG. 3a also illustrates the superiority of the Sipnose device as, e.g., at 5 minutes the SipNose device reached concentration of 15000 ng/ml while the Aptar device reached concentration of 2500 ng/ml and the Optinose device reached concentration of less than 1000 ng/ml.

Reference is now made to FIG. 3b illustrating rabbit's brain concentration of Topiramate vs. time (where topiramate administration was given at time 0) by the SipNose device as well as devices by Aptar and Optinose. As can be seen the brain concentration increases post intranasal administration. Thus, intranasal delivery of topiramate can be a viable route to deliver the same to the brain and thus alleviate the BED symptoms. FIG. 3c illustrates the same

| Group | Dose (mg/kg); duration | Total animal | Blood PK | Termination | Brain PK |
|---|---|---|---|---|---|
| Cycle 1 IF | Single IN Topiramate (30 mg in each nostril), Commercial pump #1 (Aptar) | 3 | BL, 5 min | 5 min | 5 min |
| | | 3 | BL, 10 min, 15 min | 15 min | 15 min |
| | | 3 | BL, 20 min, 30 min | 30 min | 30 min |
| | | 3 | BL, 45 min, 60 min | 60 min | 60 min |
| Cycle 2 2F | Single IN Topiramate (30 mg in each nostril), SipNose device | 3 | BL, 5 min | 5 min | 5 min |
| | | 3 | BL, 10 min, 15 min | 15 min | 15 min |
| | | 3 | BL, 20 min, 30 min | 30 min | 30 min |
| | | 3 | BL, 45 min, 60 min | 60 min | 60 min |
| Cycle 3 3F | Single IN Topiramate (30 mg in each nostril), Commercial pump #2 (Optinose) | 3 | BL, 5 min | 5 min | 5 min |
| | | 3 | BL, 10 min, 15 min | 15 min | 15 min |
| | | 3 | BL, 20 min, 30 min | 30 min | 30 min |
| | | 3 | BL, 45 min, 60 min | 60 min | 60 min |
| Total # of Animals | | N = 36 | | | | results as in FIG. 3a with only time points of 0, 5 and 60 minutes (to illustrate the trends).

FIG. 3c, again, clearly demonstrates SipNose device's superiority. It is the believe of the inventors of the present invention that the SipNose device's superiority is a result of it's very effective delivery, namely configured to flow pressurized fluid thereby to deliver a substance (here e.g., topiramate) intranasally such that the brain concentration is greater than 2,000 ng/ml in less than 2 minutes, $\Delta t<2$ min, see point 31 in FIG. 3b; additionally or alternatively, the pressurized fluid flow is delivered by a SipNose device intranasally such that the brain concentration is greater than 5,000 ng/ml in less than 5 minutes, $\Delta t<5$ min, (see point 32 in FIG. 3b); additionally or alternatively, the pressurized fluid flow is delivered intranasally by a SipNose device such that the brain concentration is greater than 7,500 ng/ml in less than 30 minutes, $\Delta t<30$ min; (see point 33 in FIG. 3b).

Only in the SipNose device, substance' brain concentration after 2 min was 27% of its concentration after 30 min., and similarly, after 5 min was 73% of its concentration after 30 min. this fast buildup of topiramate in brain overcomes the need for a repeated Periodically topiramate treatment that is accepted for topiramate therapy when topiramate is given systemically via P.O administration, and most probably also for injectable systemic topiramate.

Referring again to point 31, namely nose to brain administration that resulted in 2,000 ng/ml topiramate in the brain in less than two minutes, is extremely fast, mainly when comparing to weeks of slowly brain concentration buildup that is accepted in topiramate therapeutics and is needed in order to allow the desired effective concentrations to be present in the brain at the time of need by systemic buildup via the plasma (following P.O administration). The dose shown in the rabbits study correlates with a dose of 540 mg in humans, i.e., about three times more than the required clinically-effective dose (180 mg), as defined above, that will result in a plasma concentration of about 1.73 (µg/ml). As dose response linearity was shown in clinical study with the SipNose device on 8 healthy volunteers in a phase 1 clinical study having 3 consecutive cohorts with three different IN topiramate doses, it is known that same behavior of the graph will be seen in lower concentrations, thus those results reflect rate and time to pick also in ⅓ of the given topiramate concentrations. The efficacy of this treatment is greater than any other commercially available device and is higher than ever reported in the art due to the unique specification of the SipNose device which utilizes air pressure to entrain the substance (here Topiramate) and deliver the same. The herein presented unique, rapid emission which carries the substrate as a defined narrow plume via the body cavity (here, nose to brain labyrinth) is characterized by one or more of a set of parameters. It is noted that as the emission is rapid, but is not irritating due to employing pressures below those likely to cause pain.

The brain delivery of substance is provided in a time shorter than 30 minutes (and in fact shorter than five and even two minutes) so the urge can be withstood without experiencing a binge which without the treatment will follow the urge. More than that, the high efficacy allows a delivery of the substrate at very low dose; thus, drug adverse effects are effectively decreased, and essentially hindered.

Thus, according to this embodiment, once an urge is detected (by self-awareness of the user), the device of the present invention can be used to deliver a therapeutically effective dose of topiramate such that an effective concentration of topiramate reaches the brain so as to enable the binge to be over without tension, without uncontrolled eating and with no emotional breakdown.

It should be emphasized that this course of treatment is treated merely by the use of the present invention without the periodical oral administrations.

The motivation for such course of treatment stems from the side effects of the periodical oral administrations which includes inter alia the following tingling in arms and legs, increased bleeding (such as nosebleeds), increased bruising, loss of appetite, nausea, a change in the way foods taste, diarrhea, nervousness, upper respiratory tract infection, speech problems, tiredness, dizziness, slowed reactions, trouble with memory, abdominal pain, fever, eye problems (such as double vision, blurred vision, and uncontrolled eye movements) and any combination thereof.

It should be noted that from the literature, topiramate plasma concentrations known to be effective, are at the range of 1.8 ug/ml (as stated above about 1.73 (µg/ml)) (see Doose D R, et al. J Clin Pharmacol 1996; 36; 884-91.

Figure 4A:
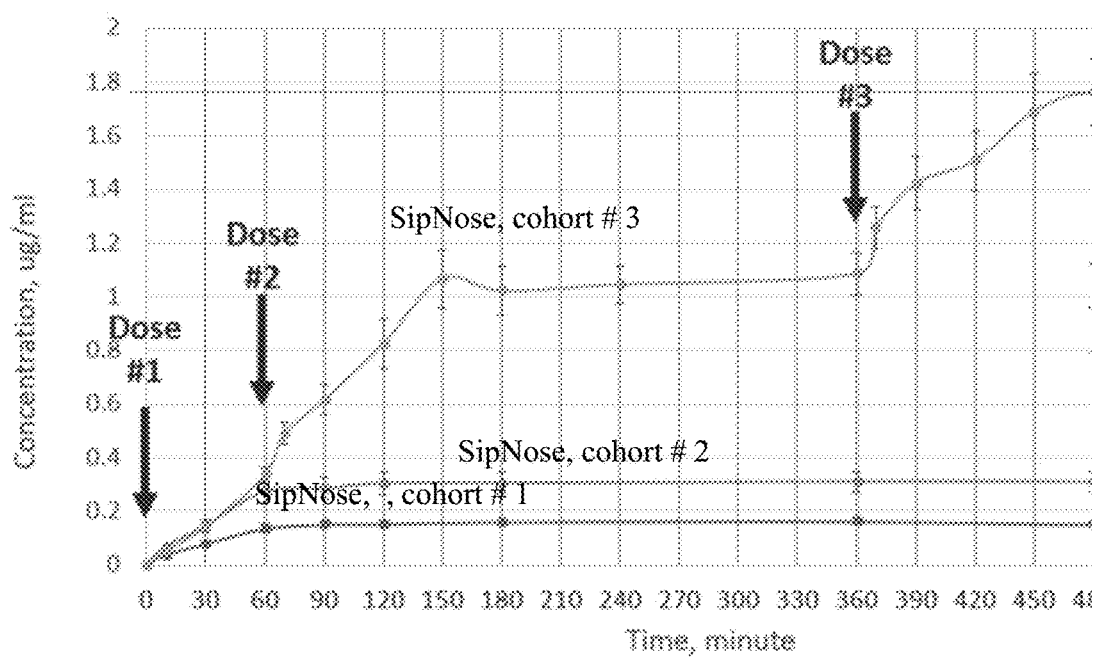
FIGS. 4a-4b disclose aerosol comparison of the plum geometry of the SipNose invention and commercial nasal pump.

FIG. 4A, As was shown in a clinical trial that a dose of (60 mg+60 mg+60 mg) 180 mg given via SipNose intranasal device achieves plasma concentrations of 1.8 ug/ml (plasma). The Maximal concentration is observed 60 min following administration in cohort #1 and #2.1.8 ug/ml was achieved 60 min following Dose #3 administration in cohort #3 (3×60 mg=180 mg). A dose response linear dependency is shown between the 3 cohorts in three different topiramate concentrations.

FIG. 3 illustrates, in Rabbit studies, a dose that is equivalent to a human dose of 540 mg Topiramate. Maximal achieved concentration in plasma following the SipNose device administration is 30 µg/ml (=30000 ng/ml).

Assuming giving the human equivalent of 180 mg; the expected plasma concentrations for effective topiramate are 10 µg/ml. This value of 10 µg/ml was only achieved by the SipNose device administration. All other devices, even with a 540 mg equivalent human dose, did not achieve that value.

Furthermore, from the plasma concentration information, we can try and assume the brain concentrations needed for effectiveness of Topiramate (as those are not indicated in literature). For the SipNose device: for 30 µg/ml plasma concentrations following SipNose administration of topiramate; Brain concentrations are at the level of 10 µg/g. This is for 540 mg Human Equivalent Dose (HED) of topiramate, thus for 180 mg human equivalent dose, brain concentrations would be: 3.3 µg/g.

SipNose device administration achieves this concentration faster than 5 min following administration and stays above this concentration for longer than 1 hour.

All other devices do not show consistence concentrations above 3.3 µg/g even at the high dose that was given (540 mg HED). 15 min following the Aptar device administration there is an episodic value above 3.3 µg/g of topiramate in brain, but this does not last for long and drops down to ineffective concentrations. If we look at the trend of topiramate concentrations in the brain in FIG. 3C, with the Aptar device, only after 35-40 min post the urge, the concentration riches the 3.3 µg/gr. This time course is not fast enough and thus will not be effective in stopping the binge.

Thus, while all devices enable the delivery of topiramate to the brain, only the SipNose device enables the high concentration buildup in relatively small amount of time (less than 5 minutes).

Combination of (i) Post-Urge (on Demand) and (ii) Pre-Urge Periodical Topiramate N2B Administration According to another embodiment of the present invention intranasal delivery of topiramate can be combined with periodically administration of medicament (e.g., topiramate). As described above, the intranasal delivery of the topiramate reaches the brain. The use of the SipNose device provides high concentration within a couple of minutes.

According to another embodiment of the present invention, a formula, where the API is topiramate, is delivered.

The formula will also include excipients adapted to provide at least one selected from a group consisting of (a) better absorption via the mucosal tissue; (b) faster elimination from the systemic circulation and/or CNS (and more specifically brain) circulation; (c) better user experience (for example as smell added to the formulation, or such as effecting sensation at the time of delivery); (d) better efficacy (for example by adding smells that reduce appetite); (e) increase the stability of the active compound/s; (f) increase the solubility of the active compound/s; (g) increase hygroscopic (in case of dry powder formulation); (h) reduction of aggregation of the powder drug; (i) reduction of sensitivity to light; (j) optimize the plume geometry and/or the particle side distribution to optimize delivery to the target tissue; (k) reduction of the rate of solubility of the active compound in the case of mixing two components at the time of administration; (l) prolong the rate of solubility of the active compound in the case where a slow release of the active compound is desirable; (m) contribution to slow release of the drug in other means (for example biologic glue, adhesive means) that allow the slow release and controlled release manner of the active compound.

The excipients are selected from a group consisting of (a) chemical permeation enhancer (CPE) selected from a group consisting of Zwitterionic, palmityldimethyl, ammonio propane sulfonate (PPS) or a structural analogs, polysorbate 20, 40, 60, or 80, Hyaluronic acid (also referred to as HA or hyaluronan), poly(ethylene glycol), poly(lactic acid), poly (glycolic acid), poly Acrylic Acid and Poly-(N-isopropylacrylamide), or other biopolymers such as chitosan and alginate; cyclodextrin and modified cyclodextrin, such as but not limited to Captisol®;

(b) Permeation enhancers selected from a group containing: a fatty acid, a medium chain glyceride, surfactant, steroidal detergent, an acyl carnitine, Lauroyl-DL-carnitine, an alkanoyl choline, an N-acetylated amino acid, esters, salts, bile salts, sodium salts, nitrogen-containing rings, and derivatives. The enhancer can be an anionic, cationic, zwitterionic, nonionic or combination of both. Anionic can be but not limit to: sodium lauryl sulfate, sodium decyl sulfate, sodium octyl sulfate, N-lauryl sarcosinate, sodium carparate. Cationic can be but not limit to: Cetyltrimethyl ammonium bromide, decyltrimethyl ammonium bromide, benzyldimethyl dodecyl ammonium chloride, myristyltimethyl ammonio chloride, deodecyl pridinium chloride. Zwitterionic can be but not limit to: decyldimethyl ammonio propane sulfonate, palmityldimethyl ammonio propane sulfonate, fatty acid, butyric, caproic, caprylic, pelargonic, capric, lauric, myristic, palmitic, stearic, arachidic, oleic, linoleic, linolinic acid, their salts, derivatives and any combinations or glyceride, monoglyceride, a diglyceride, or triglyceride of those fatty acids. Bile acids or salts, including conjugated or un conjugated bile acids, such as but not limited to: cholate, deoxycholate, tauro-cholate, glycocholate, taurodexycholate, ursodeoxycholate, tauroursodeoxycholate, chenodexycholate and their derivates and salts and combinations. Permeation enhancer as comprises a metal chelator, such as EDTA, EGTA, a surfactant, such as sodium dodecyl sulfate, polyethylene ethers or esters, polyethylene glycol-12 lauryl ether, salicylate polysorbate 80, nonylphenoxypolyoxyethylene, dioctyl sodium sulfosuccinate, saponin, palmitoyl carnitine, lauroyl-l-carnitine, dodecyl maltoside, acyl carnitines, alkanoyl cjolline and combinations. Other include but not limited, 3-nitrobenzoate, zoonula occulden toxin, fatty acid ester of lactic acid salts, glycyrrhizic acid salt, hydroxyl beta-cyclodextrin, N-acetylated amino acids such as sodium N-[8-(2-hydroxybenzoyl)amino] caprylate and chitosan, salts and derivates and any combinations;

(c) surfactant of water-in-oil, oil-in-water; emulsions, double emulsions, micro-emulsions, Nano-emulsions of the following (all or parts of the) surfactants, oils, co-surfactants, aqueous phase; to allow-better absorption in the mucosal tissue, better permeation and absorption in the target cells, better stability of the encapsulated drug/active ingredient;

(d) antiadherents selected from magnesium stearate;

(e) binders selected from a group consisting of Saccharides and their derivatives, Disaccharides: sucrose, lactose, Polysaccharides and their derivatives: starches, cellulose or modified cellulose such as microcrystalline cellulose and cellulose ethers such as hydroxypropyl cellulose (HPC), Sugar alcohols such as xylitol, sorbitol or mannitol, Protein: gelatin, polyvinylpyrrolidone (PVP), polyethylene glycol (PEG), gelatin, cellulose, cellulose derivatives, polyvinylpyrrolidone, starch, sucrose and polyethylene glycol, cellulose, methyl cellulose, polyvinylpyrrolidone and polyethylene glycol;

(f) Coatings selected from a group consisting of cellulose ether hydroxypropyl methylcellulose (HPMC), occasionally, synthetic polymers, shellac, corn protein zein, polysaccharides, gelatin;

(g) Enterics selected from a group consisting of fatty acids, waxes, shellac, plastics, and plant fibers;

(h) Disintegrants selected from a group consisting of Crosslinked polymers: crosslinked polyvinylpyrrolidone (crospovidone), crosslinked sodium carboxymethyl cellulose (croscarmellose sodium), modified starch sodium starch glycolate;

(i) Flavors;

(j) Glidants selected from a group consisting of silica gel, fumed silica, talc, and magnesium carbonate, silica gel Glidants such as Syloid® 244 FP and Syloid®;

(k) Lubricants selected from a group consisting of talc or silica, fats, vegetable stearin, magnesium stearate or stearic acid;

(l) Preservatives selected from a group consisting of antioxidants, vitamin A, vitamin E, vitamin C, retinyl palmitate, and selenium, amino acids cysteine and methionine, Citric acid and sodium citrate, parabens: methyl paraben and propyl parabe;

(m) Sorbents;

(n) Sweeteners;

(o) Vehicles selected from a group consisting of Petrolatum, dimethyl sulfoxide and mineral oil are common vehicles.

According to another embodiment of the present invention, a combination of (a) a post-urge (On Demand) AND (ii) periodical topiramate nose to brain administration.

The method comprises two sets of steps: the first is a routine (periodic) delivery of one or more substances (for example topiramate) within at least one body cavity, to treat BED or obesity. The periodic treatment can be via oral delivery, intranasal delivery and any combination thereof. This periodic loading of sub-effective concentrations allows the second set of step, namely a post-urge (on demand) administration, providing an intranasal delivery of topiramate via the direct nose to brain route. In this case, the periodical oral administration of a drug (topiramate or other) is given in a low concentration which is below effective and below side effect-causing concentration. At the urge to binge, a small intranasal dose will be given and will act very fast in order to insure cessation of the binge in seconds/few minutes time period.

Example 3—Clinical Trial

In order to demonstrate the efficiency of the intranasal delivery of topiramate to treat BED, a clinical trial was performed.

The clinical trial was conducted at Hadassah medical center, Israel, after approval by the local IRB and the ministry of health. In the test, the blood PK following the intranasal administration in escalating doses was analyzed, together with establishing its safety and acceptance by users.

This study was designed to be a single center, open label study. All topiramate doses in all 3 cohorts were administered by a trained study staff. The study consisted of 3 study cohorts with 3 dosing days for each subject: Cohort #1: Subjects were administered with total of 30 mg IN (intranasal) dose of topiramate, 15 mg in each nostril. Cohort #2: Subjects were administered with total of 60 mg IN dose of topiramate, 30 mg in each nostril. Cohort #3: Subjects were administered with total of 180 mg IN dose of topiramate by 3 repeated doses of 60 mg within one day. The size of each dose, the total number of doses per day and the time interval between consecutive doses in this cohort was approved by the Safety Monitoring Committee.

In cohort #3 the subjects were administered with three doses: Dose #1:60 mg (30 mg in each nostril). Dose #2:60 mg, 1 hr after Dose #1 (30 mg in each nostril). Dose #3:60 mg, 5 hr after Dose #2 (30 mg in each nostril).

Reference is made again to FIG. 4A showing plasma concentration of the clinical trial results (cohort #1-3) using the SipNose device.

FIG. 4A illustrates that the Plasma concentrations of topiramate following dry-powder topiramate IN administration reflect the absorption of the IN topiramate to the systemic circulation. As can be seen, the Topiramate concentrations are shown to be in the range of expected clinical values (from ~0.16 µg/ml in cohort #1, to 0.3 µg/ml in cohort #2 and up to 2 µg/ml in cohort #3).

Figure 4B:
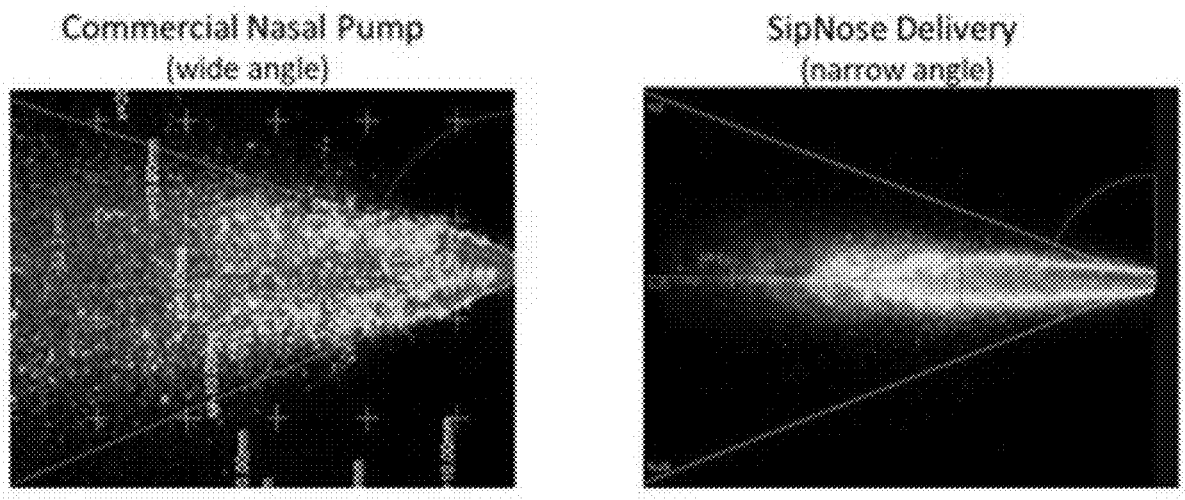

The aerosol's unique profile of the substance plume, when the SipNose device is used as shown in FIG. 4B is the reason for the significantly increased substance plasma concentration and potential (not shown) brain concentrations. The unique aerosol allows a new and surprising method of treatment of indications related to e.g., binge-related indications, central nervous system indications, pain, etc. This unique aerosol's profile will be further disclosed in Example 5. According to another embodiment of the present invention, as Topiramate (or Topiramate-based formulation) is light sensitive, said Topiramate (or Topiramate-based formulation) will be enclosed is a light protected foil.

Example 4—Different Medicament Administered Via the Use of the Present Invention The following merely lists some of the treatment that could utilize the SipNose device:
Treating OCD (Obsessive Compulsive Disorder)/psychiatric conditions and mental disorders, migraines or pain: with Antidepressants such as clomipramine (Anafranil®), fluoxetine (Prozac®), fluvoxamine (Luvox®), paroxetine (Paxil®), sertraline (Zoloft®), Ketamine, Esketamine; Selective serotonin reuptake inhibitors (SSRIs), such as citalopram (Celexa®), escitalopram oxalate (Lexapro®), fluoxetine (Prozac®), fluvoxamine (Luvox®), paroxetine HCI (Paxil®), and sertraline (Zoloft®); Selective serotonin & norepinephrine inhibitors (SNRIs), such as desvenlafaxine (Khedezla®), desvenlafaxine; ccinate (Pristiq®), duloxetine (Cymbalta®), lev omilnacipran (Fetzima®), and venlafaxine (Effexor®); Novel serotonergic drugs such as vortioxetine (Trintellix®-formerly called Brintellix®) or vilazodone (Viibryd®); Older tricyclic antidepressants, such amitriptyline (Elavil®), imipramine (Tofranil®), nortriptyline (Pamelor®), and doxepin (Sinequan®). Drugs that are thought to affect mainly dopamine and norepinephrine such as bupropion (Wellbutrin®). Monoamine oxidase inhibitors (MAOIs), such as isocarboxazid (Marplan®), phenelzine (Nardil®), selegiline (EMSAM®), and tranylcypromine (Parnate®). Tetracyclic antidepressants that are noradrenergic and specific serotonergic antidepressants (NaSSAs), such as mirtazapine (Remeron®). L-methylfolate (Deplin®) Migraines: Topiramate; sumatriptan (Imitrex®, Alsuma®, Imitrex® STATdose System®, Sumavel® DosePro®, Zecuity®, Treximet®); rizatriptan (Maxalt®, Maxalt-MLT®); eletriptan (Relpax®); zolmitriptan (Zomig®, Zomig-ZMT®); naratriptan Amerge®); almotriptan (Axert®); frovatriptan (Frova®).

Corticosteroids are anti-inflammatory agents with a wide variety of effects on several inflammatory mediators. Over the past few years, steroids have found a place in the treatment of infectious diseases. Dexamethasone is an established treatment of acute viral-induced laryngitis and *Haemophilus influenzae* type b-induced meningitis in children. Intranasal corticosteroids decrease the inflammatory reaction in the nasal cavity and shorten the duration and decrease the severity of symptoms in upper respiratory tract virus infection. Coughs and colds can be treated by utilizing a non-BFS/FFS-device for the delivery of various medicaments, such as fluticasone propionate, see Puhakka, Tuomo, et al. "The common cold: effects of intranasal fluticasone propionate treatment." *Journal of Allergy and Clinical Immunology* 101.6 (1998): 726-731.

Vaccine adjuvants potentiate the immune response to specific antigens and are therefore the subject of considerable interest and study within the medical community. Cancer, allergic diseases, asthma, and chronic infections such as coronavirus, SARS-associated coronavirus, HIV, HCV, HBV, HSV, COVID-19 or coronavirus, and *H. pylori* are relevant condition in this sense to treat. Hepatitis, for example, is a systemic disease that predominantly affects the liver. The disease is typified by the initial onset of symptoms such as anorexia, nausea, vomiting, fatigue, malaise, arthralgias, myalgias, and headaches, followed by the onset of jaundice. The application further states that, in the United States, about 20% of patients with chronic hepatitis die of liver failure, and a further 5% develop hepatitis B-associated carcinoma. Vaccines, immunotherapy and antivirals can be administered by the device of the present invention, for the delivery of various medicaments, including thiosemicarbazones.

Pulmonary endothelial prostacyclin appears to be involved in the pathogenesis of chronic obstructive pulmonary disease (COPD). prostacyclin ($PGI_2$), a vasodilatory prostanoid released by pulmonary endothelial cells (ECs), is reduced in lung tissue of patients with emphysema. Furthermore, iloprost, a $PGI_2$ analog, protected against cigarette smoke extract-induced EC apoptosis. Beraprost, another prostacyclin analog, reduced emphysema formation, inflammation, and apoptosis when given as pretreatment prior to cigarette smoke in a murine model of COPD, see Lammi, Matthew R., et al. "Treatment with intranasal iloprost reduces disease manifestations in a murine model of previously established COPD." *American Journal of Physiology-Lung Cellular and Molecular Physiology* 310.7 (2016): L630-L638. Asthma and COPD can be treated by utilizing the SipNose of the present invention for the delivery of various medicaments, including Iloprost.

Example 5

Investigation of the Aerosol Dose Delivery Characteristics of the Sipnose Device Example 5.1 Topiramate's and Saline's Aerosol Materials & Equipment The investigations of the aerosol characteristics were performed using a Malvern Spraytec instrument and the spray pattern and plume geometry were measured using an Oxford Laser Envision system. The SipNose device was tested with Topiramate API (Manufacturer: MSN; Batch No. TI0020516, Exp. Date: April 2019), and with Saline (0.9% NaCl Teva pharmaceuticals, Lot No: K61229 Exp. Date January 2020) as a control. As the SipNose delivery systems are a single dose disposable product, each of the tests detailed in the report was done on a separate ("new") device and reflects consistency between different devices. Two different fill volumes (100 µl and 200 µl) were tested with the Saline solutions, and 30 mg dry topiramate powder was tested with devices pressurized to 5 bar. The delivery system was mounted in a holder throughout the measurements to reduce movements at the time of activation. All devices were actuated manually (and not by an automated pump) to reflect potential use by users.

Delivered Dose

The determination of the delivered dose was performed to investigate dose consistency and the reproducibility of the dose released from the disposable delivery system. Theoretically, measuring the released dose by activating the device into a collecting container would be the straightforward way to do it, but aerosol evaporation makes this challenging and inconsistent. Delivered dose measurements were done by calculations based on measuring the residual amount of drug (by weight) in the device following activation. The procedure for the delivered dose determination was as follows:

The device parts were weighted (empty) $\{M_{emp}\}$; The device was filled with compressed air (at 5 bar); The device parts were weighed to note the weight of the air in the device $\{M_{air}\}$; The dose (liquid or powder drug) was inserted into the transparent nose piece (which is also the drug container) with a syringe and needle; The device was weighed to note the weight of the pre-filled device with the air and drug $\{M_{air}+d\}$; The dose was released into an aero-chamber; The device was weighed to note the weight of the device following the activation ($M_{res}$) which reflects the device weigh without air (100% release of discharge air in each activation) and with the residual drug that was not released; and the released dose was calculated by subtracting the weight of the device after release ($M_{res}$) from the weight of the device before release ($M_{air}+d$) minus the air weight.

Figure 6:
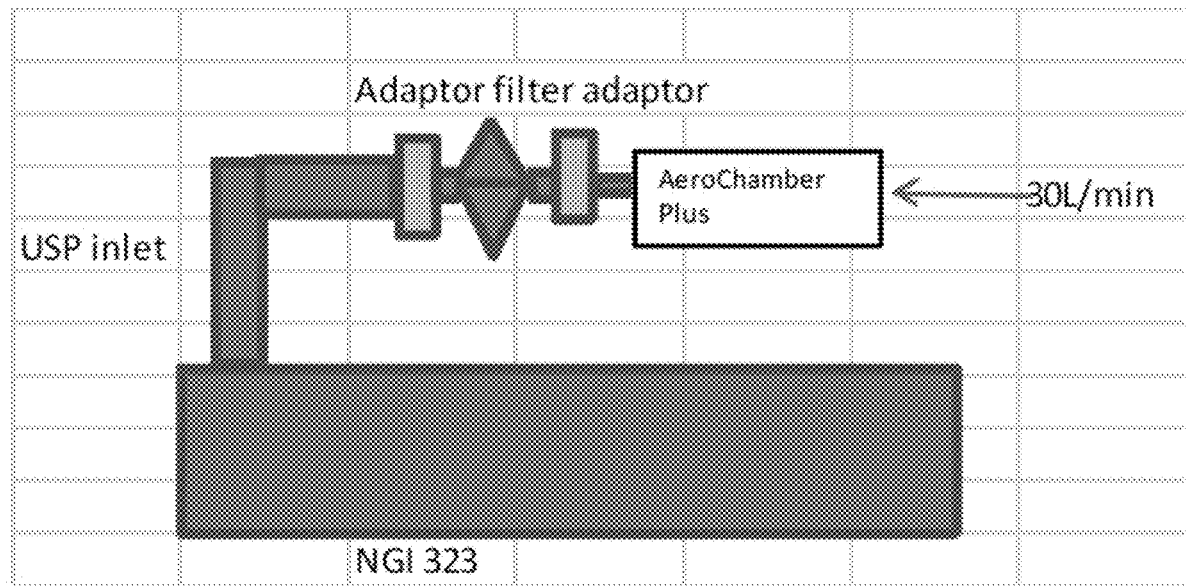
FIGS. 6-43 depict the results of topiramate, saline and midazolam spraying and the plume thereof provided by a device and methods according to an embodiment of the invention.
Figure 7:
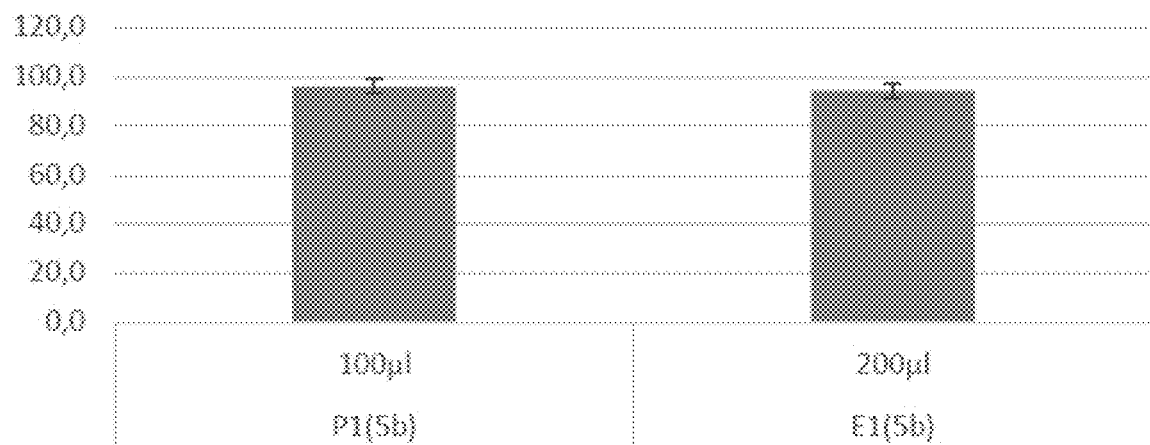

The set-up for determination of the delivered dose determination is schematically illustrated in FIG. 6. A Next Generation Impactor (NGI) fitted with a USP inlet was used for generation a stable 30 lpm air flow. The dose from the delivery device was released into an AeroChamber Plus® and a filter was connected prior to the USP inlet. Acceptance criteria for delivered dose measurements for the SipNose delivery system and in accordance with the guidelines is defined as: verification of device spray weight delivery for potential drug products, with acceptance criteria of the spray weight of the individual sprays to within 15% of the target weight and their mean weight to within 10% of the target weight.

Laser Diffraction

The investigation of the droplet size characteristics was performed using a Malvern Spraytec instrument equipped with software version 3.30. The instrument was used in a rapid collection mode using a dedicated SOP Stare device SOP1.ssop. The investigations were done at a distance of 3 cm from the laser beam and 6 cm from the collecting lens following the guideline recommendations for measurements to be performed within a range of 2 to 7 cm from the orifice. The instrument is verified once a year and the latest verification was performed May 22, 2018 by Malvern Sweden.

All investigations were done in repeats of 5. The devices were tested at 5 bar. Relative Humidity (RH) and temperature were recorded once during each of the experimental days. RH varied between 46% and 67% and the temperature was between 23 degrees C. and 24 degrees C. The results from the measurements are presented as the mean of the droplet size distribution at the point where the aerosol enters the laser beam and triggers the data collection, which corresponds to the time point where 1% obscuration of the laser beam occurs, to the time point where the obscuration once again falls to 1% obscuration, i.e. when almost all aerosol is cleared from the laser beam detection area.

Sample placement: horizontally in front of the laser beam at a distance of 3 cm from the beam and 6 cm from the lens. Laser trigger condition: sample collection triggered when transmission drops 1% from 100%; Beam width: 1 cm. Acceptance criteria for laser diffraction measurements for the SipNose delivery system is defined as: Mono or bi-Modal spray pattern with an initial peak (higher peak) with DV50 higher than 100 µm and a steady state portion (lower peak) with DV50 lower than 100 µm (between 20-100 µm). When mono-modal, only the lower peak is present. The overall D50 calculated for each aerosol release shows droplet size averages between 50 and 250 µm. Also, less than 10% of the droplets in the overall D10 calculations are below 10 µm.

Spray Pattern and Plume Geometry

The investigation of the aerosol plume geometry and spray pattern characteristics were performed using an Oxford Laser Envision system (300 W fishtail IR laser and camera) equipped with camera software version PFV.3541 and Envision Patternate software version 1.3.1 using calibration file "Calib_stare_C1S000100" using a NIST calibrated 11 cm×11 cm grid. Calculations were done for both spray pattern and plume geometry including 95% in both investigations, i.e. 97.5% on each side of the total overlay droplets visible in the spray. The laser was mounted so that the IR fishtail was spread vertically which allowed for the spray pattern/plume geometry to be captured vertically as the device was mounted in a horizontal position. All spray pattern investigations were done at a distance of 6 cm from the exit of the nozzle i.e. the exit of the nozzle was positioned 6 cm from laser fishtail. All plume geometry measurements were done in such a way that the tip of the nozzle was visible in the picture. This allowed the origin of the aerosol spray to be defined for the calculation of the spray angle. For plume geometry, the angle and width at 6 cm was also calculated by the software. For the spray pattern, the software calculated the smallest and largest pattern diameter at 6 cm, where the point of origin was chosen to be the device nozzle, the point where the aerosol leaves the device. The oblongation index was then calculated in Excel (largest pattern diameter divided by smallest pattern diameter). Three to four disposable devices with formulation were activated and measured for each drug volume. The acceptance criteria, defined by SipNose, for spray pattern and plume geometry of the total overlay droplets visual in the spray measured for the SipNose delivery system in accordance to guidelines, are defined as:

Aerosol pattern an ellipsoid of relatively uniform density, where the short axis and the long axis are no longer than 4 cm and the ratio between the longest and the shortest axes (Oblongation) is in the range of 1.5±1; and/or Plume angle of 35°±10 is accepted for aerosol release when measured from the device nozzle as the origin, and the width of the plume at 6 cm from the nozzle should be at the range of 3±1.5. and more specifically, it is noted by the inventors of the present invention that the bi-modal spray pattern, comprising a first pattern and a second pattern; further wherein the first pattern is characterized by (a) Plume angle is in the range of °4±°5; (b) width of plume at 6 cm from the nozzle is in the range of 4 mm±3 mm; and, the second pattern is characterized by (a) Plume angle is in the range of 35°±10; (b) width of plume at 6 cm from the nozzle is in the range of 30±10 mm; further wherein the mean particle's size in the first pattern is larger than the mean particle's size in the second pattern.

The results shown below contain both aerosol characteristics and the delivered dose for saline (100 μl and 200 μl) and topiramate dry powder (30 mg) with pressurized devices with 5 bars.

Reference is now made to FIG. 7 illustrating that all saline dose (100 μl and 200 μl) was delivered.

Saline—Delivered Dose Determination

The mean values and standard deviations are presented in Table 1 and in FIG. 7. All individual data are presented in Table 2. Both 100 μl dose and 200 μl dose were released from a device pressurized to 5 bars.

TABLE 1

Mean Values for residue volumes (%) following aerosol release. Delivered mass in % of loaded mass

| Drug Name | Sample (X bar) | Volume μl | Mean | SD | RSD % |
|---|---|---|---|---|---|
| Saline | P1(5b) | 100 μl | 96.1 | 3.2 | 3.3 |
| | E1(5b) | 200 μl | 94.3 | 3.0 | 3.2 |

TABLE 2

Individual Values for saline at 5 bar.

| Sample (x bar) | # | Drug Name | Volume | Empty-before g | with Air g | With Drug g | After dosing g |
|---|---|---|---|---|---|---|---|
| P1(5b) | 1 | Saline | 100 | 8.5492 | 8.5651 | 8.6621 | 8.5504 |
| | 2 | Saline | 100 | 8.5254 | 8.54 | 8.643 | 8.527 |
| | 3 | Saline | 100 | 8.6404 | 8.6559 | 8.759 | 8.6429 |
| | 4 | Saline | 100 | 8.55 | 8.5652 | 8.6657 | 8.5525 |
| | 5 | Saline | 100 | 8.5228 | 8.5386 | 8.6402 | 8.532 |
| | 6 | Saline | 100 | 8.5382 | 8.553 | 8.6585 | 8.545 |
| E1(5b) | 1 | Saline | 200 | 8.5455 | 8.56 | 8.7589 | 8.5523 |
| | 2 | Saline | 200 | 8.5267 | 8.542 | 8.7474 | 8.533 |
| | 3 | Saline | 200 | 8.534 | 8.549 | 8.754 | 8.556 |
| | 4 | Saline | 200 | 8.5078 | 8.523 | 8.7302 | 8.524 |
| | 5 | Saline | 200 | 8.5139 | 8.5293 | 8.7378 | 8.522 |
| | 6 | Saline | 200 | 8.5242 | 8.539 | 8.743 | 8.5344 |

| Sample (x bar) | Air loaded mg | Drug Loaded mg | Drug residue mg | drug released mg | Delivered mass % of loaded | Mean | SD | RSD % |
|---|---|---|---|---|---|---|---|---|
| P1(5b) | 15.9 | 97.0 | 1.2 | 95.8 | 98.8 | 96.1 | 3.2 | 3.3 |
| | 14.6 | 103.0 | 1.6 | 101.4 | 98.4 | | | |
| | 15.5 | 103.1 | 2.5 | 100.6 | 97.6 | | | |
| | 15.2 | 100.5 | 2.5 | 98 | 97.5 | | | |
| | 15.8 | 101.6 | 9.2 | 92.4 | 90.9 | | | |
| | 14.8 | 105.5 | 6.8 | 98.7 | 93.6 | | | |
| E1(5b) | 14.5 | 198.9 | 6.8 | 192.1 | 96.6 | 94.3 | 3.0 | 3.2 |
| | 15.3 | 205.4 | 6.3 | 199.1 | 96.9 | | | |
| | 15.0 | 205.0 | 22.0 | 183 | 89.3 | | | |
| | 15.2 | 207.2 | 16.2 | 191 | 92.2 | | | |
| | 15.4 | 208.5 | 8.1 | 200.4 | 96.1 | | | |
| | 14.8 | 204.0 | 10.2 | 193.8 | 95.0 | | | |

The mean results for dose release for Saline formulation is 97 µl±3.3 for 100 µl intended dose and 193.25 µl±6.3 for 200 µl intended dose. For both intended doses (100 and 200 µl), the released dose results pass the acceptance criterion (less than 10% of target weight not delivered).

Droplet Size Determination by Malvern Spraytec

The droplet size distribution values for the Malvern Spraytec measurements are outlined in Table 3 below and typical Graphs are seen in FIGS. 8 to 11.

TABLE 3

Individual results for Malvern Spraytec

| Run | Label | Volume (ul) | Pressure (Bar) | Average Dv(50) (um) | Average Dv(10) (um) | Actuation time (ms) |
|---|---|---|---|---|---|---|
| 1 | Saline E1 | 200 | 5 | 45.9 | 15.3 | 54 |
| 2 | Saline E1 | 200 | 5 | 78.6 | 18.1 | 60 |
| 3 | Saline E1 | 200 | 5 | 64.8 | 16.6 | 49 |
| 4 | Saline E1 | 200 | 5 | 61.4 | 16.7 | 69 |
| 5 | Saline E1 | 200 | 5 | 60 | 14.8 | 50 |
| 6 | Saline E1 | 200 | 5 | 49.8 | 16.4 | 68 |
| 1 | Saline P1 | 100 | 5 | 86.7 | 23.4 | 54 |
| 2 | Saline P1 | 100 | 5 | 76.3 | 18.5 | 38 |
| 3 | Saline P1 | 100 | 5 | 75.2 | 19.7 | 54 |
| 4 | Saline P1 | 100 | 5 | 125 | 22.5 | 49 |
| 5 | Saline P1 | 100 | 5 | 86.3 | 20 | 45 |
| 6 | Saline P1 | 100 | 5 | 48.8 | 13.7 | 50 |

| Run | Mean Dv(50) (um) | SD | Mean Actuation time(ms) | SD | Mean Dv(10) (um) | SD |
|---|---|---|---|---|---|---|
| 1 | 60.08 | 11.61 | 58.33 | 8.78 | 16.32 | 1.16 |
| 2 | | | | | | |
| 3 | | | | | | |
| 4 | | | | | | |
| 5 | | | | | | |
| 6 | | | | | | |
| 1 | 83.05 | 24.75 | 48.33 | 6.09 | 19.63 | 3.44 |
| 2 | | | | | | |
| 3 | | | | | | |
| 4 | | | | | | |
| 5 | | | | | | |
| 6 | | | | | | |

Figure 8:
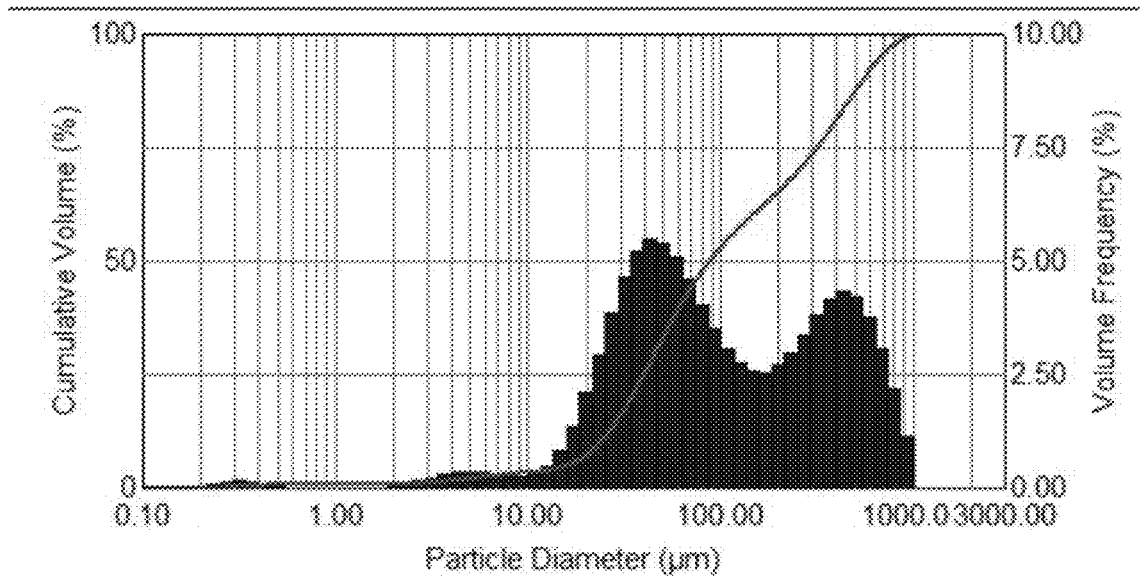
Figure 9:
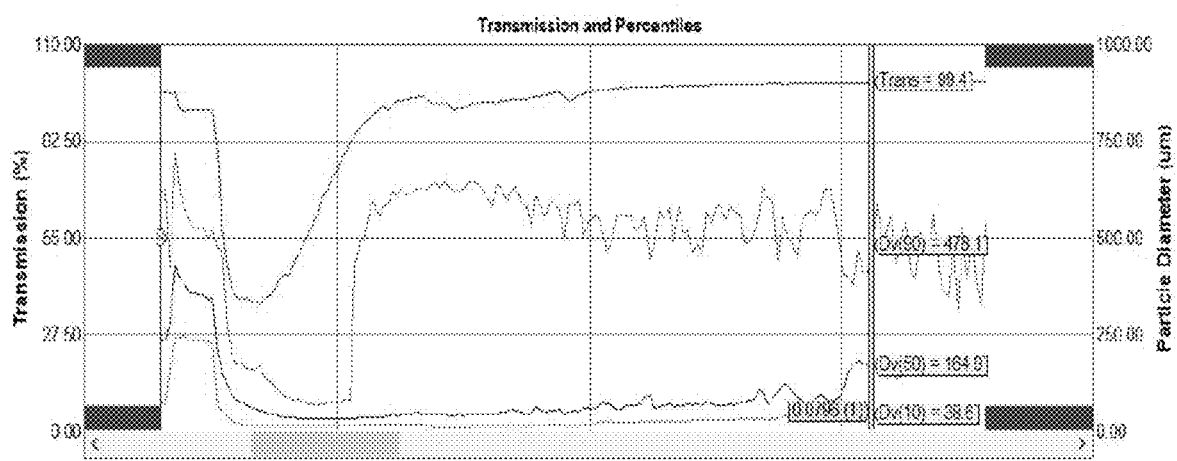
Figure 10:
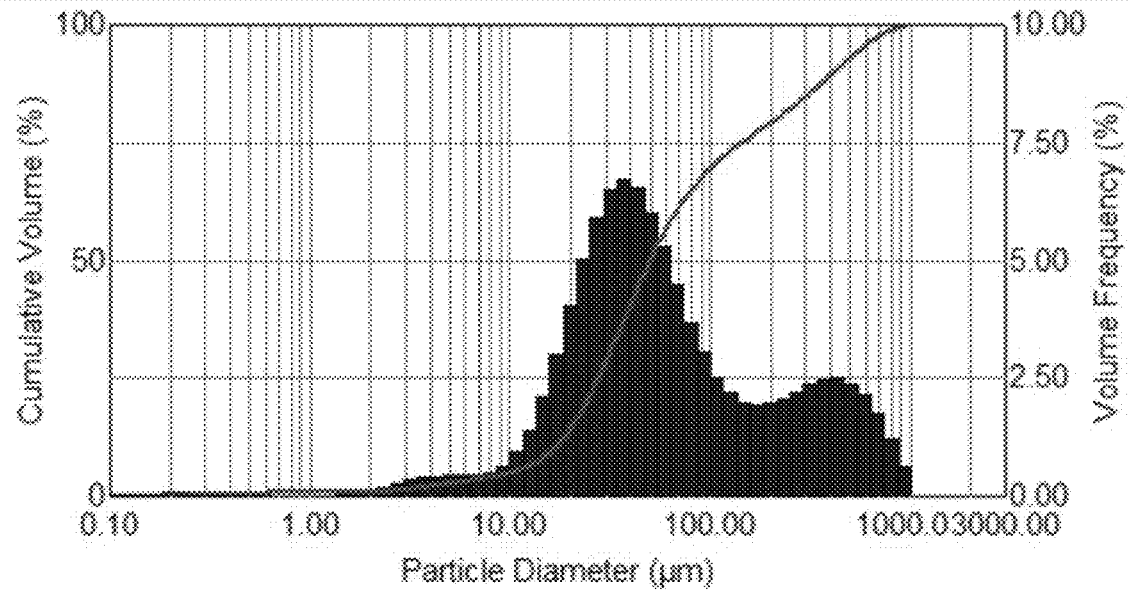
Figure 11:
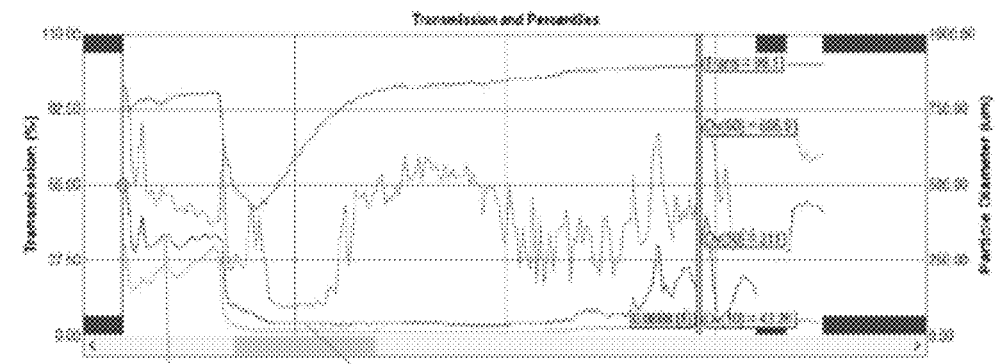

FIG. 8 shows, for Saline, an example of mean droplet size distribution for 100 µl fill volume (run 1). FIG. 9 shows, for Saline, an example of Dv(10), Dv(50) and Dv(90) vs. time for 100 µl fill volume (run 5). FIG. 10 shows, for Saline, an example of mean droplet size distribution for 200 µl fill volume (run 1). FIG. 11 shows, for Saline, an example of Dv(10), Dv(50) and Dv(90) vs. time for 200 µl fill volume (run 1).

The particle size distribution for both fill volumes shows a bimodal behavior with Dv(50) values of one peak above 100 µm and of the other below 100 µm, as seen in both 100 µl and 200 µl doses (FIG. 8 and FIG. 10). In the time sequenced distributions, there is an initial stable part with a higher transmission around 90 to 95% that is shorter for the 100 µl Saline fill volume than for the 200 µl Saline fill volume. Following this initial stable part is a time period where the transmission drops markedly and then again increases up to 99%. The Dv(50) value of the 100 µl Saline fill volume was found to be (60.1±11.6) and, for the 200 µl fill volume, it was found to be (83.0±24.7), while the Dv(10) value for the 100 µl Saline fill volume was found to be 19.6±3.4 and, for the 200 µl fill volume, it was found to be 16.3±1.2; both pass the acceptance criteria.

Spray Pattern and Plume Geometry by Oxford Laser Envision

TABLE 4

Oxford Laser spray pattern results for saline

| Spray Pattern Run | Label | Volume (ul) | Pressure (Bar) | Short Axis (cm) |
|---|---|---|---|---|
| 1 | Saline E1 | 200 | 5 | 2.21 |
| 2 | Saline E1 | 200 | 5 | 2.19 |
| 3 | Saline E1 | 200 | 5 | 2.16 |
| 4 | Saline E1 | 200 | 5 | 1.99 |
| 1 | Saline P1 | 100 | 5 | 2.47 |
| 2 | Saline P1 | 100 | 5 | 2.28 |
| 3 | Saline P1 | 100 | 5 | 2.36 |
| 4 | Saline P1 | 100 | 5 | 2.06 |

| Spray Pattern Run | Long Axis (cm) | Oblongation | Mean | SD | SD % |
|---|---|---|---|---|---|
| 1 | 3.33 | 1.51 | 1.51 | 0.050 | 3.28 |
| 2 | 3.39 | 1.55 | | | |
| 3 | 3.34 | 1.55 | | | |
| 4 | 2.87 | 1.44 | | | |
| 1 | 3.51 | 1.42 | 1.52 | 0.171 | 11.22 |
| 2 | 3.36 | 1.47 | | | |
| 3 | 3.33 | 1.41 | | | |
| 4 | 3.65 | 1.77 | | | |

Figure 12:
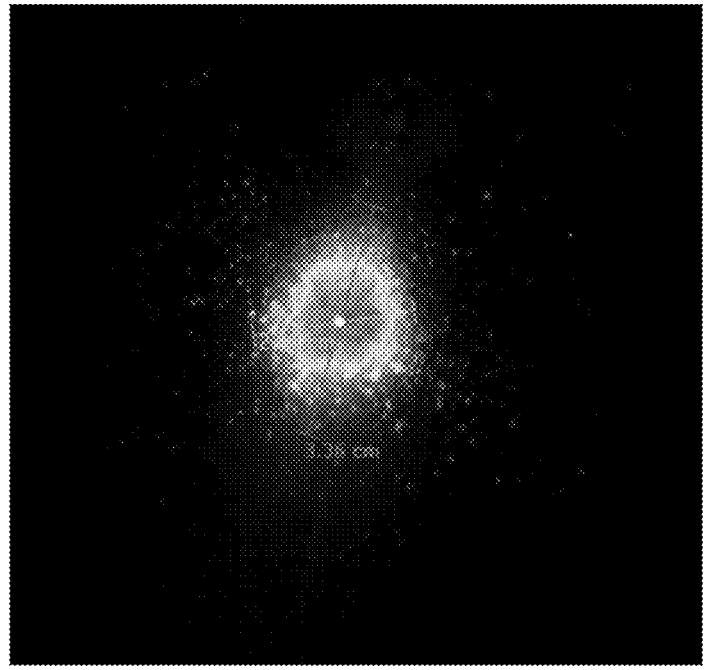
Figure 13:
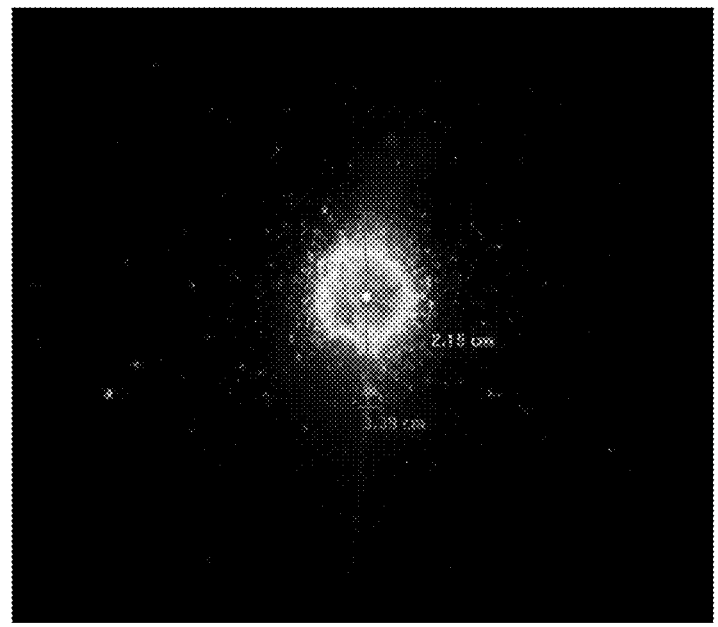

FIG. 12 discloses, for Saline, an example of the spray pattern results for 100 µl (run 2). FIG. 13 discloses, for Saline, an example of the spray pattern results for 200 µl (run 2)

Plume Geometry

TABLE 5

Oxford Laser plume geometry results for saline

| Plume Geometry Run | Label | Volume (ul) | Pressure (Bar) | Angle (Deg) | Width (at 6 cm) |
|---|---|---|---|---|---|
| 1 | Saline E1 | 200 | 5 | 38.4 | 2.59 |
| 2 | Saline E1 | 200 | 5 | 36.4 | 2.43 |
| 3 | Saline E1 | 200 | 5 | 38.8 | 2.39 |
| 1 | Saline P1 | 100 | 5 | 41.8 | 2.85 |
| 2 | Saline P1 | 100 | 5 | 44.4 | 2.86 |
| 3 | Saline P1 | 100 | 5 | 35.9 | 2.54 |

| Run | Volume | Angle Mean | Angle SD | Angle SD % | Width Mean | Width SD | Width SD % |
|---|---|---|---|---|---|---|---|
| 1-3 | 200 | 37.87 | 1.29 | 3.40 | 2.49 | 0.14 | 5.68 |
| 1-3 | 100 | 40.70 | 4.36 | 10.70 | 2.75 | 0.18 | 6.62 |

Figure 14:
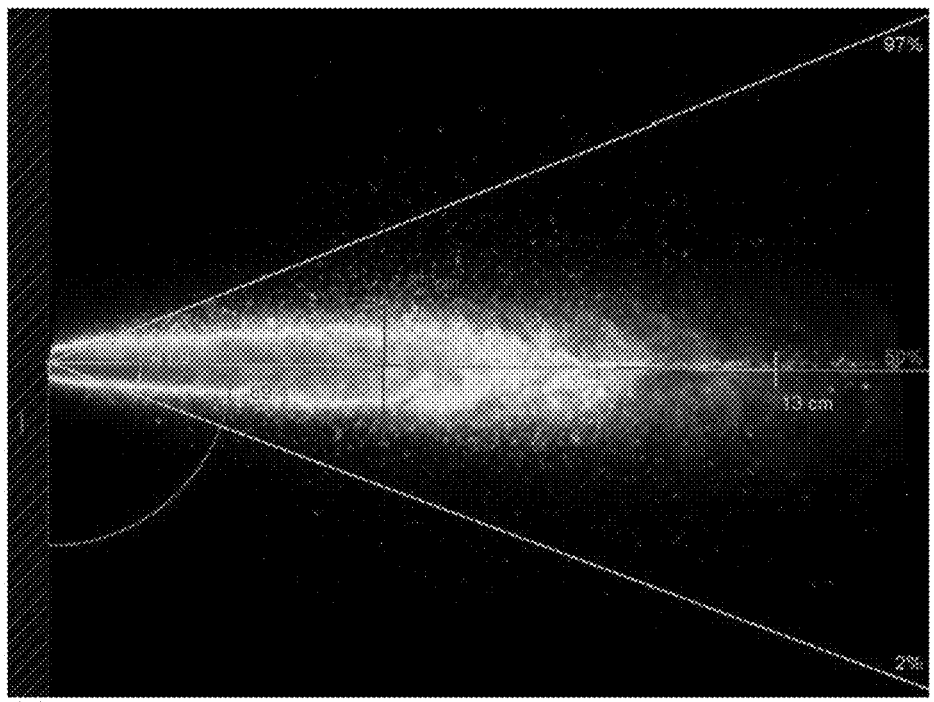
Figure 15:
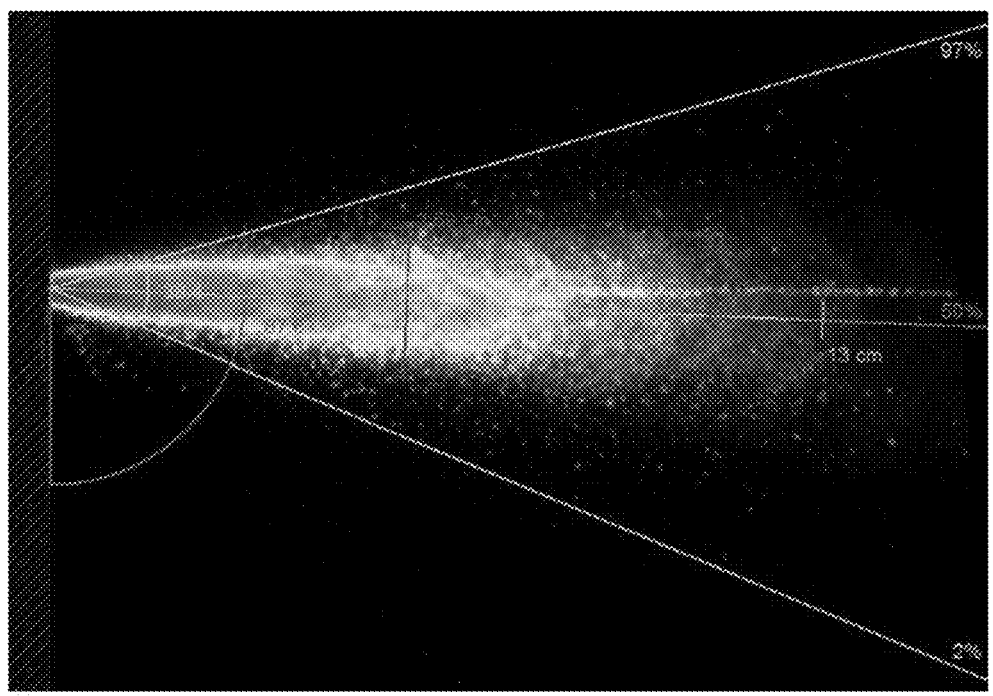

FIG. 14 discloses, for Saline, an example of the Spray Pattern results for 100 µl saline (run 1). FIG. 15 discloses, for Saline, an example of the Spray Pattern results for 200 µl saline (run 1).

The overall (total) spray pattern oblongation indexes for the saline 100 μl and 200 μl are 1.52±0.17 and 1.51±0.015 respectively and thus pass the acceptance criteria. The overall (total) plume geometry angle is 40.7±4.36 degrees for the 100 μl fill volume and 37.87±1.29 degrees for the 200 μl fill volume, with width at 6 cm from the nozzle of 2.49±0.14 cm and 2.75±0.18 cm; thus, they pass all acceptance criteria. More specifically, a bi-modal spray pattern is noted, comprising a first pattern and a second pattern; further wherein the first pattern is characterized by (a) Plume angle is in the range of °4±°5; (b) width of plume at 6 cm from the nozzle is in the range of 4 mm±3 mm; and, the second pattern is characterized by (a) Plume angle is in the range of 35°±10; (b) width of plume at 6 cm from the nozzle is in the range of 30±10 mm; further wherein the mean particle's size in the first pattern is larger than the mean particle's size in the second pattern.

Figure 16:
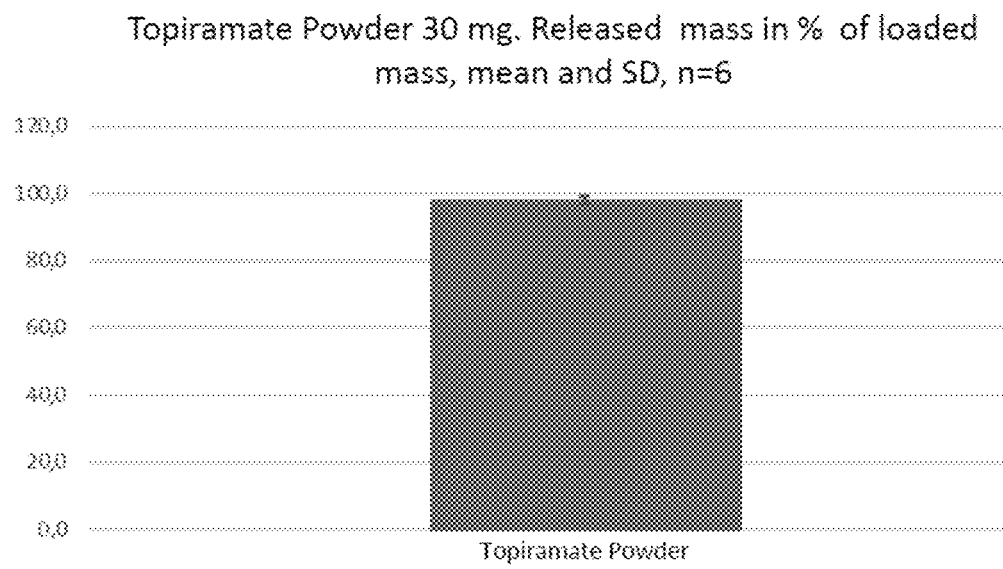

Example 5.2 Aerosol Created from Topiramate Dry Powder Investigation of the Aerosol when Topiramate Dose is Delivered-Characteristics for the Sipnose Nasal Delivery Device The mean values and standard deviations of released dose following activation of SipNose devices loaded with the topiramate powder (n=6), are presented Table 6 and in FIG. 16. All individual data are presented in Table 7.

TABLE 6

Mean Values of the delivered mass in %.

| Drug Name | Sample (X bar) | Weight mg | % Mean | SD | RSD % |
|---|---|---|---|---|---|
| Topiramate Powder | G1(5b) | 30 | 98.3 | 1.5 | 1.5 |

FIG. 16 discloses a plot of mean values of released mass in % for topiramate. As can be seen almost 100% topiramate was delivered.

TABLE 7

Individual topiramate values for the 5 bars investigation.

| Sample (x bar) | # | Drug Name | Weight | Empty- before g | with Air g | With Drug g | After dosing g |
|---|---|---|---|---|---|---|---|
| G1(5b) | 1 | Topiramate | 30 mg | 8.5167 | 8.532 | 8.5613 | 8.5167 |
| | 2 | Powder | 30 mg | 8.5174 | 8.532 | 8.561 | 8.5175 |
| | 3 | | 30 mg | 8.5 | 8.516 | 8.5473 | 8.501 |
| | 4 | | 30 mg | 8.5216 | 8.536 | 8.569 | 8.522 |
| | 5 | | 30 mg | 8.5259 | 8.542 | 8.573 | 8.527 |
| | 6 | | 30 mg | 8.526 | 8.5415 | 8.5741 | 8.5266 |

| # | Air loaded mg | Drug Loaded mg | Drug residue mg | drug released mg | Delivered mass % of loaded | Mean | SD | RSD % |
|---|---|---|---|---|---|---|---|---|
| 1 | 15.3 | 29.3 | 0.0 | 29.3 | 100.0 | 98.3 | 1.5 | 1.5 |
| 2 | 14.6 | 29.0 | 0.1 | 28.9 | 99.7 | | | |
| 3 | 16.0 | 31.3 | 1.0 | 30.3 | 96.8 | | | |
| 4 | 14.4 | 33.0 | 0.4 | 32.6 | 98.8 | | | |
| 5 | 16.1 | 31.0 | 1.1 | 29.9 | 96.5 | | | |
| 6 | 15.5 | 32.6 | 0.6 | 32 | 98.2 | | | |

The mean results for dose release for topiramate dry powder formulation is 30.5±1.49 for the 30 mg intended dose under a pressure of 5 bars. Released dose results pass the acceptance criteria (losses less than 10% of target weight).

Droplet Size Determination by Malvern Spraytec

TABLE 8

Individual results for Malvern Spraytec

| Run | Label | Weight mg | Pressure (Bar) | Average Dv(50) (um) | Average Dv(10) (um) | Actuation time(ms) |
|---|---|---|---|---|---|---|
| 1 | Topi G1 | 30 | 5 | 42.3 | 12 | 24 |
| 2 | Topi G1 | 30 | 5 | 124.7 | 13.4 | 30 |
| 3 | Topi G1 | 30 | 5 | 116.4 | 12.4 | 29 |
| 4 | Topi G1 | 30 | 5 | 132.5 | 13.6 | 37 |
| 5 | Topi G1 | 30 | 5 | 79.2 | 12.3 | 20 |

| Run | Mean Dv(50) (um) | SD | Mean Actuation time(ms) | SD | Mean Dv(10) (um) | SD |
|---|---|---|---|---|---|---|
| 1 | 99.02 | 37.72 | 28.00 | 6.44 | 12.74 | 0.71 |
| 2 | | | | | | |
| 3 | | | | | | |
| 4 | | | | | | |
| 5 | | | | | | |

Figure 17:
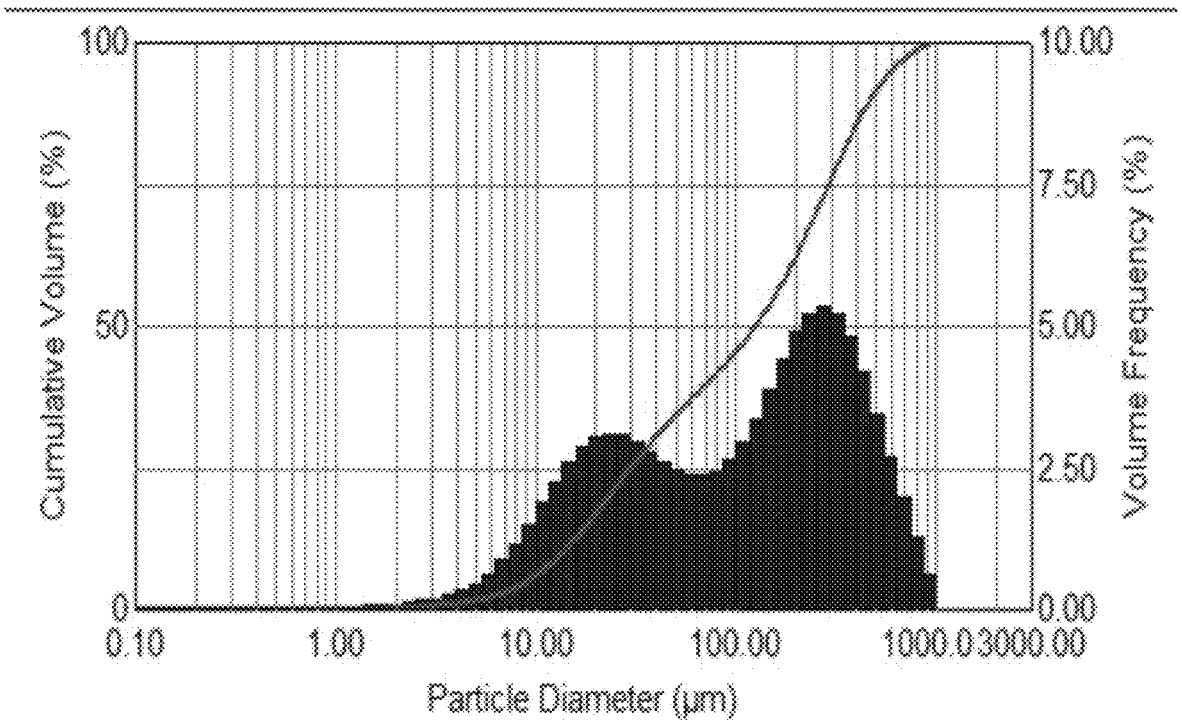
Figure 18:
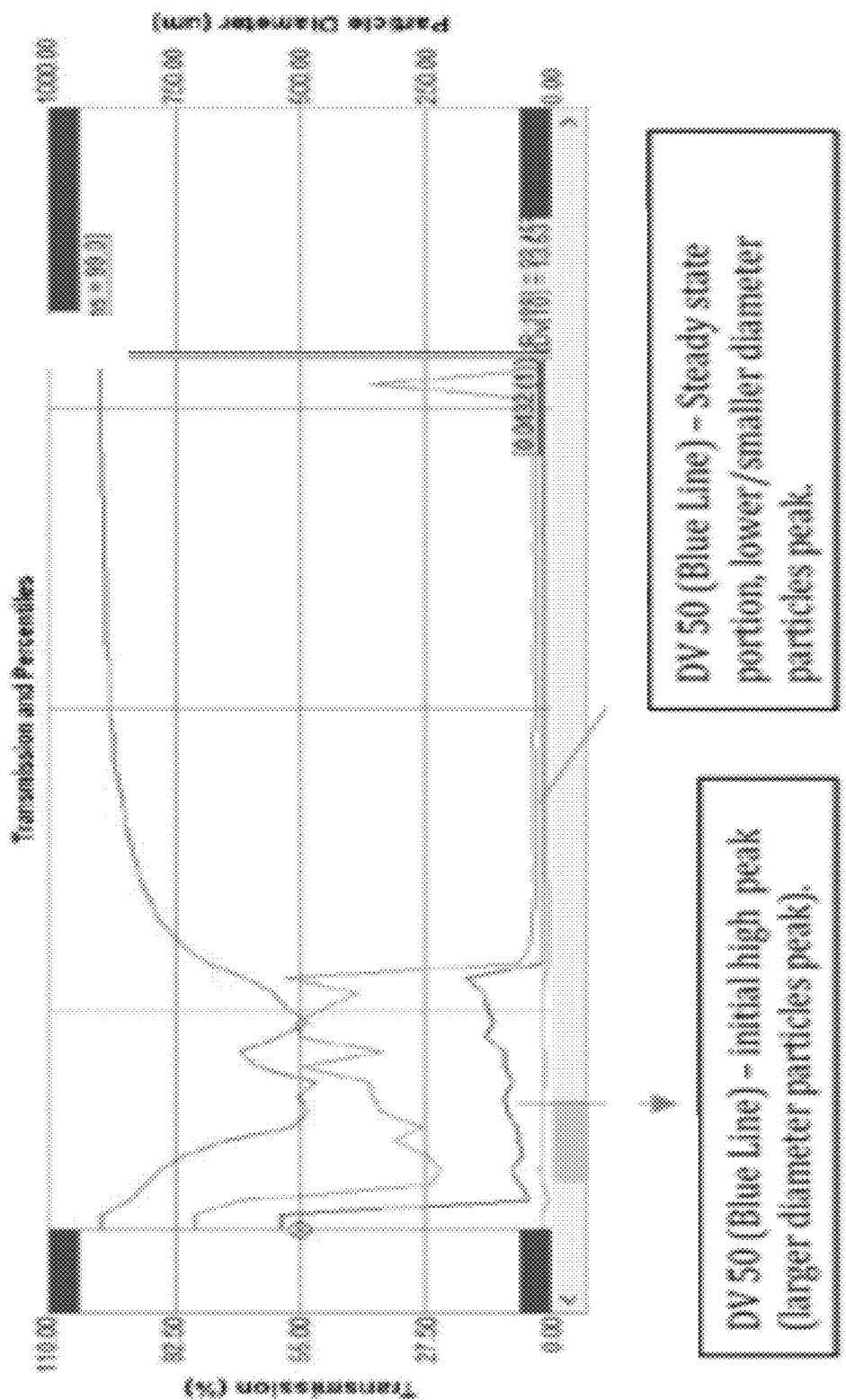

FIG. 17 shows, for topiramate, an example of mean droplet size distribution for a 30 mg fill volume (run 5, 5 Bar). FIG. 18 shows, for topiramate, an example of Dv(10), Dv(50) and Dv(90) vs. time for a 30 mg dry powder (run 1, 5 Bar).

The particle size distributions for a 30 mg topiramate dose show a bimodal behavior similar to that shown in the liquid formulations, with one peak above 100 μm and one below 100 μm. The Dv(50) value (indicated by an arrow in FIG. 18 and by original text stating "blue line") for the 30 mg topiramate (99.02±37.7) and the DV(10) value of 12.74±0.71) both pass the acceptance criteria for particle size distribution for the SipNose delivery system.

Spray Pattern and Plume Geometry as Measured by the Oxford Laser Envision

TABLE 9

Oxford Laser spray pattern results for topiramate.
Spray Pattern

| Run | Label | Weight (mg) | Pressure (Bar) | Short axis (cm) | Long axis (cm) | Oblongation | Mean | SD | SD % |
|---|---|---|---|---|---|---|---|---|---|
| 1 | Topi G1 | 30 | 5 | 2.48 | 3.64 | 1.47 | 1.48 | 0.128 | 8.64 |
| 2 | Topi G1 | 30 | 5 | 2.72 | 3.79 | 1.39 | | | |
| 3 | Topi G1 | 30 | 5 | 2.28 | 3.78 | 1.66 | | | |
| 4 | Topi G1 | 30 | 5 | 2.46 | 3.4 | 1.38 | | | |

Comment: no weigh data present

Figure 19:
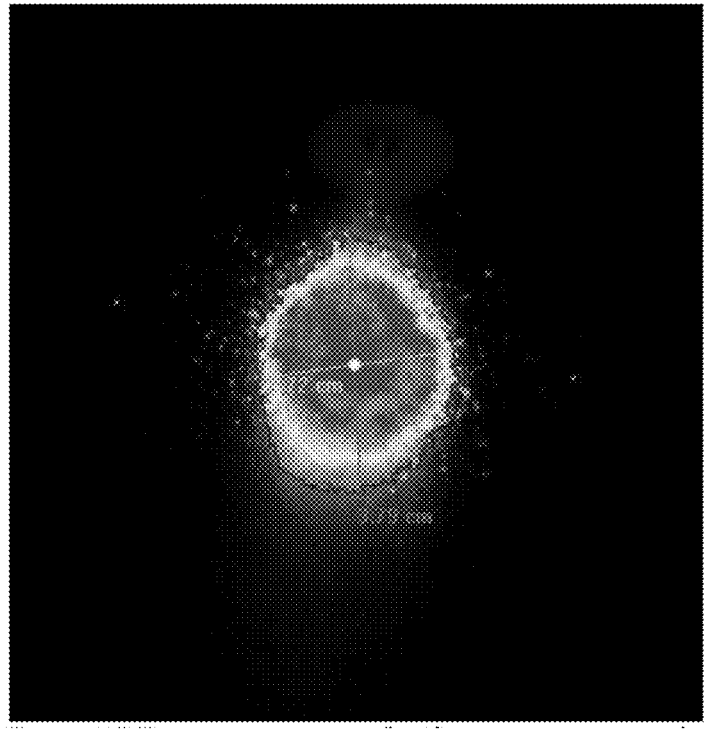
Figure 20:
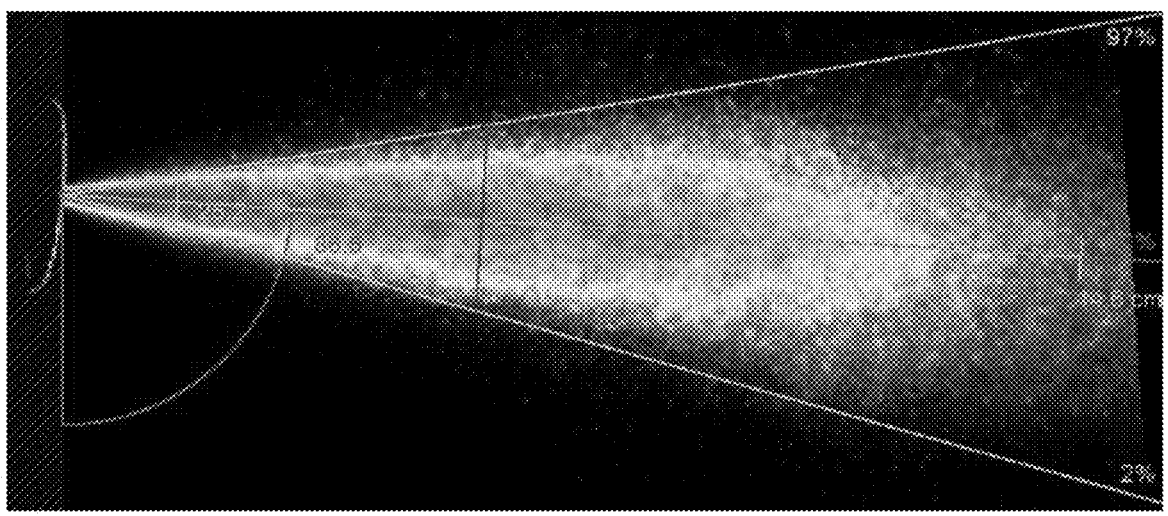

FIGS. 19-20 show, for topiramate, an example of the spray pattern results for a 30 mg fill (run 2).
Plume Geometry

TABLE 10

Oxford Laser plume geometry results for topiramate
Plume Geometry

| Run | Label | Weigt (mg) | Pressure (Bar) | Angle (Deg) | Width (at 6 cm) |
|---|---|---|---|---|---|
| 1 | Topi G1 | 31.25 | 5 | 25.1 | 2.52 |
| 2 | Topi G1 | 31.39 | 5 | 25.2 | 2.52 |
| 3 | Topi G1 | 29.21 | 5 | 26.1 | 2.78 |
| 4 | Topi G1 | 30.46 | 5 | 25.8 | 2.84 |

| Run | Angle | | | Width | | |
|---|---|---|---|---|---|---|
| | Mean | SD | SD % | Mean | SD | SD % |
| 1 | 25.55 | 0.48 | 1.88 | 2.67 | 0.17 | 6.35 |
| 2 | | | | | | |
| 3 | | | | | | |
| 4 | | | | | | |

The overall (total) plume geometry results for topiramate: FIG. 20 shows, for topiramate, an example of the plume geometry results for a 30 mg fill (run 2). The overall (total) spray pattern oblongation index for the 30 mg topiramate powder was, on average, 1.48±0.13. Thus, this passes the acceptance criterion. The plume geometry angle mean values has a mean of 25.5±0.48 degrees for the 30 mg dose, with a width of 2.7±0.17 cm measured at a distance of 6 cm from the device orifice, thus these also pass the acceptance criteria. more specifically, it is noted by the inventors of the present invention that the bi-modal spray pattern, comprising a first pattern and a second pattern; further wherein the first pattern is characterized by (a) Plume angle is in the range of °4±°5; (b) width of plume at 6 cm from the nozzle is in the range of 4 mm±3 mm; and, the second pattern is characterized by (a) Plume angle is in the range of 35°±10; (b) width of plume at 6 cm from the nozzle is in the range of 30±10 mm; further wherein the mean particle's size in the first pattern is larger than the mean particle's size in the second pattern.

Example 5.3 Aerosol created from Midazolam
Investigation of the Aerosol when Midazolam Dose is Delivered-Characteristics for the Sipnose Nasal Delivery Device Materials and Equipment
As in EXAMPLE 5.2
Results
The results below, containing both aerosol characteristics and delivered dose for saline and midazolam with the specified drug volumes (100 μl and 200 μl for saline and 200 μl-800 μl for midazolam) and specified pressures (5 and 6 bars) as defined.
Saline—Delivered Dose Determination
The mean values and standard deviations are presented in Table 11 and in FIG. 21. All individual data are presented in Table 11. Both the 100 μl dose and 200 μl dose were released using a pressurized device of 5 bar.

TABLE 11

Mean Values for delivered mass (%) following aerosol release.
Delivered mass in % of loaded mass

| Drug Kame | Sample (X bar) | Volume μl | Mean | SD | RSD % |
|---|---|---|---|---|---|
| Saline | P1(5b) | 100 μl | 96.1 | 3.2 | 3.3 |
| | E1(5b) | 200 μl | 94.3 | 3.0 | 3.2 |

Figure 21:
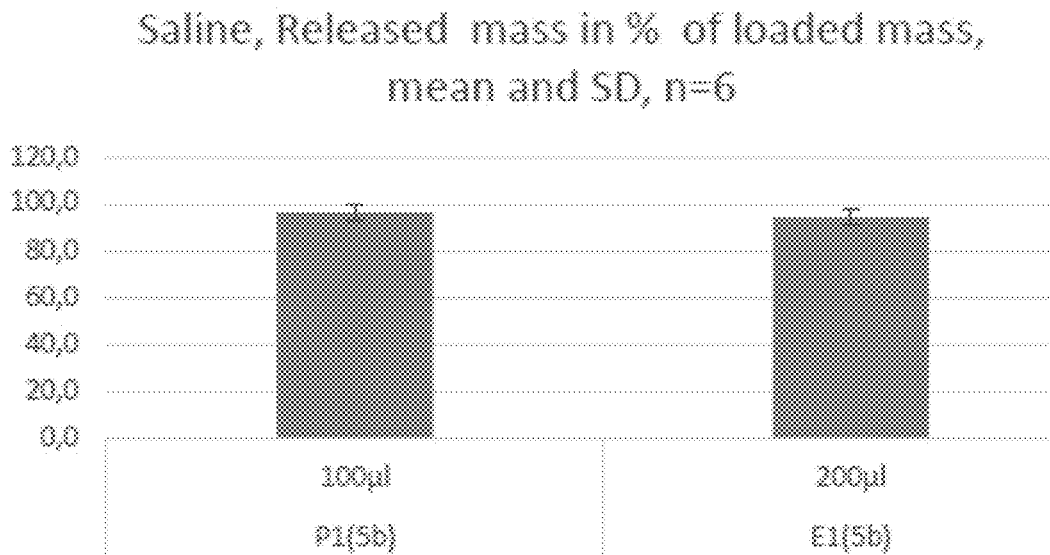

FIG. 21 shows a plot of mean values of released mass in % for saline. As illustrated, almost 100% was delivered.

TABLE 12

Individual values for saline at 5 bars.

| Sample (bar) | # | Drug Name | Volume (ml) | Empty - before (g) | With Air (g) | With Drug (g) | After Dosing (g) |
|---|---|---|---|---|---|---|---|
| P1 (5) | 1 | Saline | 100 | 8.5492 | 8.5651 | 8.6621 | 8.5504 |
| | 2 | Saline | 100 | 8.5254 | 8.54 | 8.643 | 8.527 |
| | 3 | Saline | 100 | 8.6404 | 8.6559 | 8.759 | 8.6429 |
| | 4 | Saline | 100 | 8.55 | 8.5652 | 8.6657 | 8.5525 |
| | 5 | Saline | 100 | 8.5288 | 8.5386 | 8.6402 | 8.532 |
| | 6 | Saline | 100 | 8.5382 | 8.553 | 8.6585 | 8.545 |

TABLE 12-continued

| | | Individual values for saline at 5 bars. | | | | | |
|---|---|---|---|---|---|---|---|
| E1 (5) | 1 | Saline | 200 | 8.5455 | 8.56 | 8.7589 | 8.5523 |
| | 2 | Saline | 200 | 8.5267 | 8.542 | 8.7474 | 8.533 |
| | 3 | Saline | 200 | 8.534 | 8.549 | 8.754 | 8.556 |
| | 4 | Saline | 200 | 8.5078 | 8.523 | 8.7302 | 8.524 |
| | 5 | Saline | 200 | 8.5139 | 8.5293 | 8.7378 | 8.522 |
| | 6 | Saline | 200 | 8.5242 | 8.539 | 8.743 | 8.5344 |

| Sample (bar) | # | Air loaded (mg) | Drug loaded (mg) | Drug residue (mg) | Drug released (mg) | Delivered (mass % of loaded) | Mean | SD | RSD % |
|---|---|---|---|---|---|---|---|---|---|
| P1 (5) | 1 | 15.9 | 97.0 | 1.2 | 95.8 | 98.8 | 96.1 | 3.2 | 3.3 |
| | 2 | 14.6 | 103.0 | 1.6 | 101.4 | 98.4 | | | |
| | 3 | 15.5 | 103.1 | 2.5 | 100.6 | 97.6 | | | |
| | 4 | 15.2 | 100.5 | 2.5 | 98 | 97.5 | | | |
| | 5 | 15.8 | 101.6 | 9.2 | 92.4 | 90.9 | | | |
| | 6 | 14.8 | 105.5 | 6.8 | 98.7 | 93.6 | | | |
| E1 (5) | 1 | 14.5 | 198.9 | 6.8 | 192.1 | 96.6 | 94.3 | 3.0 | 3.2 |
| | 2 | 15.3 | 205.4 | 6.3 | 199.1 | 96.9 | | | |
| | 3 | 15.0 | 205.0 | 22.0 | 183 | 89.3 | | | |
| | 4 | 15.2 | 207.2 | 16.2 | 191 | 92.2 | | | |
| | 5 | 15.4 | 208.5 | 8.1 | 200.4 | 96.1 | | | |
| | 6 | 14.8 | 204.0 | 10.2 | 193.8 | 95.0 | | | |

The mean results for dose release for the Saline formulation is 97 µl±3.3 for a 100 µl intended dose and 193.25 µl±6.3 for a 200 µl intended dose. For both intended doses (100 and 200 µl), the released dose results pass the acceptance criterion (less than 10% difference from target dose).

Droplet Size Determination by the Malvern Spraytec

The droplet size distribution values from the Malvern Spraytec measurements are outlined in Table 13 below and typical Graphs are seen in FIG. 22-25.

TABLE 13

Individual saline results for Malvern Spraytec.

| Run | Label | Volume (ul) | Pressure (Bar) | Average Dv(50) (um) | Average Dv(10) (um) | Actuation time(ms) | Mean Dv(50) (um) | SD | Mean Actuation time(ms) | SD | Mean Dv(10) (um) | SD |
|---|---|---|---|---|---|---|---|---|---|---|---|---|
| 1 | Saline E1 | 200 | 5 | 45.9 | 15.3 | 54 | 60.08 | 11.61 | 58.33 | 8.78 | 16.32 | 1.16 |
| 2 | Saline E1 | 200 | 5 | 78.6 | 18.1 | 60 | | | | | | |
| 3 | Saline E1 | 200 | 5 | 64.8 | 16.6 | 49 | | | | | | |
| 4 | Saline E1 | 200 | 5 | 61.4 | 16.7 | 69 | | | | | | |
| 5 | Saline E1 | 200 | 5 | 60 | 14.8 | 50 | | | | | | |
| 6 | Saline E1 | 200 | 5 | 49.8 | 16.4 | 68 | | | | | | |
| 1 | Saline P1 | 100 | 5 | 86.7 | 23.4 | 54 | 83.05 | 24.75 | 48.33 | 6.09 | 19.63 | 3.44 |
| 2 | Saline P1 | 100 | 5 | 76.3 | 18.5 | 38 | | | | | | |
| 3 | Saline P1 | 100 | 5 | 75.2 | 19.7 | 54 | | | | | | |
| 4 | Saline P1 | 100 | 5 | 1.25 | 22.5 | 49 | | | | | | |
| 5 | Saline P1 | 100 | 5 | 86.3 | 20 | 45 | | | | | | |
| 6 | Saline P1 | 100 | 5 | 48.8 | 13.7 | 50 | | | | | | |

Figure 22:
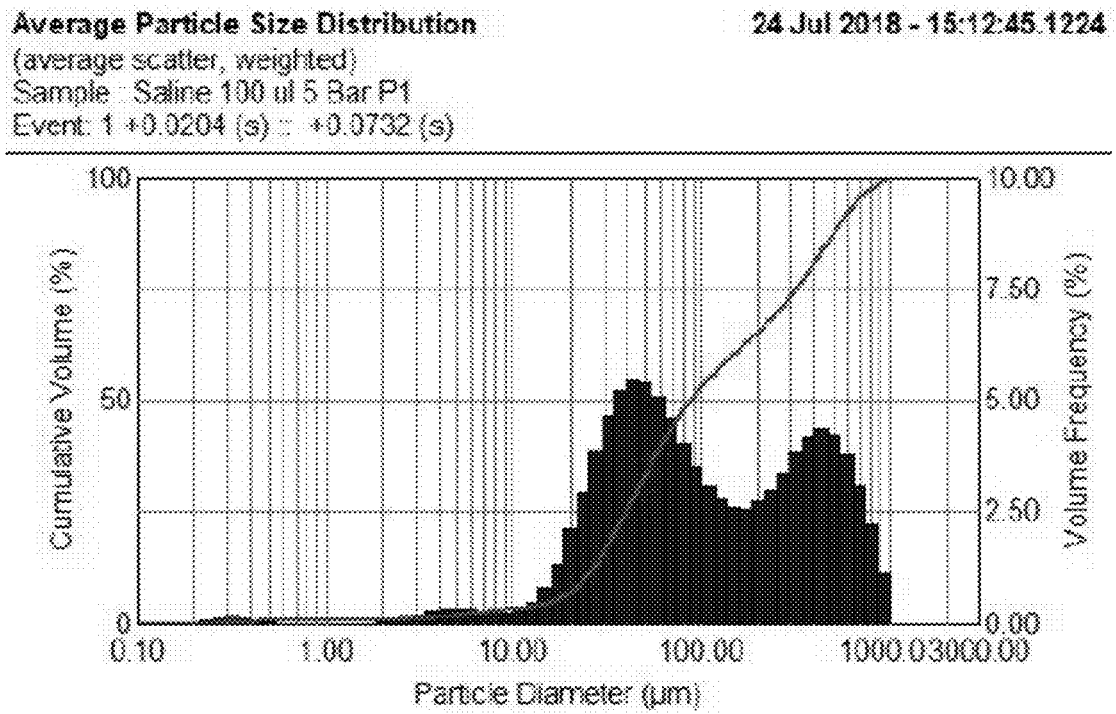
Figure 23:
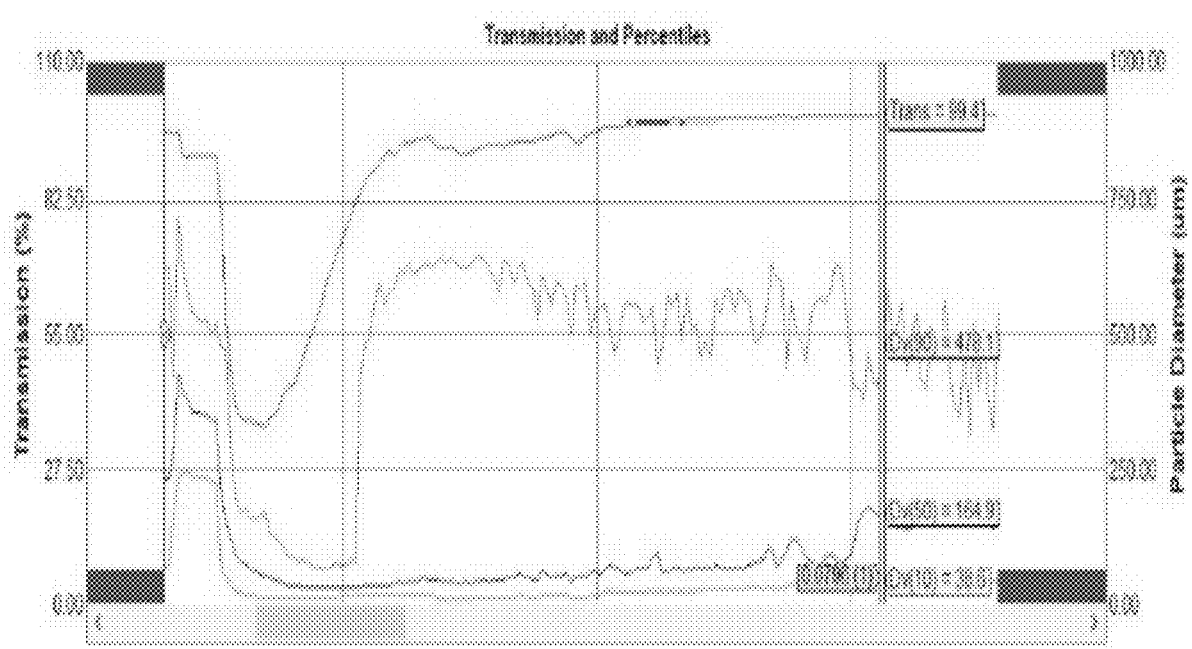
Figure 24:
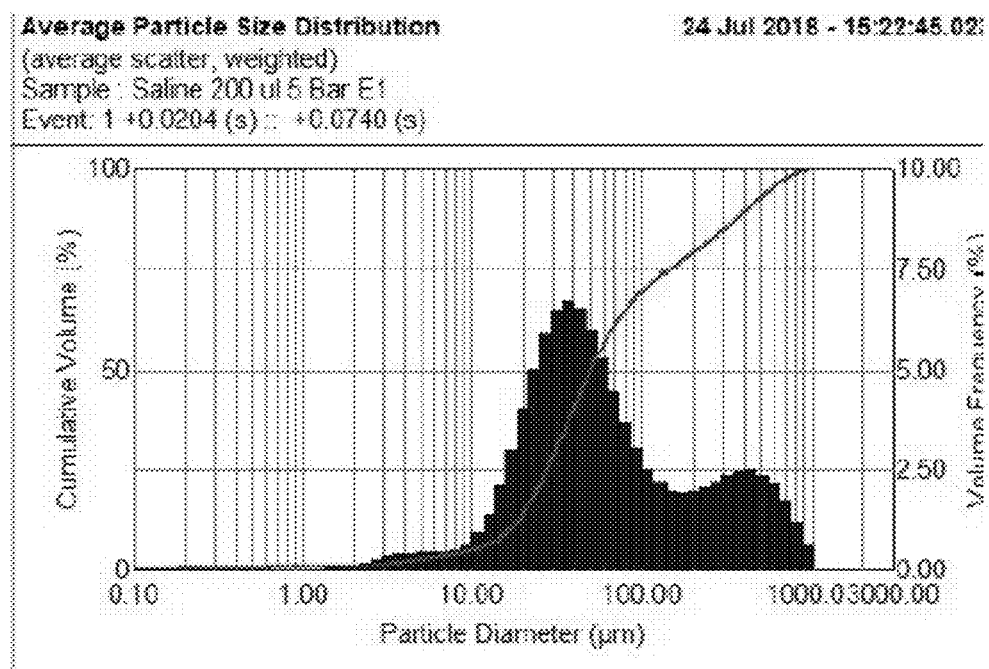
Figure 25:
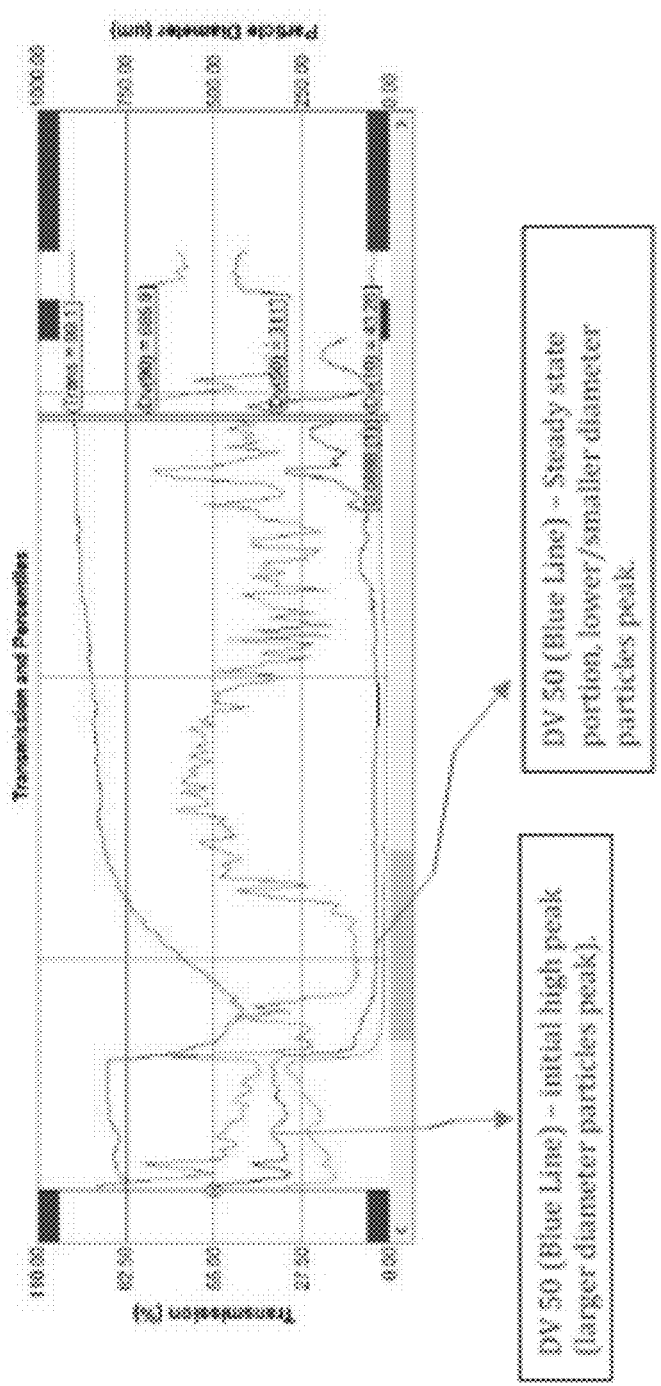

FIG. 22 shows, for Saline an example of mean droplet size distribution for a 100 µl fill volume. FIG. 23 shows, for Saline, an example of Dv(10), Dv(50) and Dv(90) vs. time for a 100 µl fill volume. FIG. 24 shows, for Saline, an example of mean droplet size distribution for a 200 µl fill volume. FIG. 25 shows, for Saline, an example of Dv(10), Dv(50) and Dv(90) vs. time for a 200 µl fill volume. The particle size distribution for both fill volumes shows a bimodal behavior with one peak above 100 µm and one below 100 µm as seen in both 100 µl and 200 µl doses. In the time sequenced distributions there is an initial stable part with a higher transmission around 90 to 95% that is shortest for 100 µl Saline fill volume as compared to the 200 µl Saline fill volume. Following this initial stable part comes a time period where the transmission drops markedly and then again increase up to 99%. The Dv(50) value of the 100 µl Saline fill volume (60.1 µm±11.6) and the 200 µl fill volume (83.0 µm±24.7) and the Dv(10) value of the 100 µl Saline fill volume was found to be 19.6±3.4 and for the 200 µl fill volume was found to be 16.3 µm±1.2; both pass the acceptance criteria.

Spray Pattern and Plume Geometry by Oxford Laser Envision

TABLE 14

Oxford Laser spray pattern results for saline.
Spray Pattern

| Run | Label | Volume (ul) | Pressure (Bar) | Short axis (cm) | Long axis (cm) | Oblongation | Mean | SD | SD % |
|---|---|---|---|---|---|---|---|---|---|
| 1 | Saline E1 | 200 | 5 | 2.21 | 3.33 | 1.51 | 1.51 | 0.050 | 3.28 |
| 2 | Saline E1 | 200 | 5 | 2.19 | 3.39 | 1.55 | | | |
| 3 | Saline E1 | 200 | 5 | 2.16 | 3.34 | 1.55 | | | |
| 4 | Saline E1 | 200 | 5 | 1.99 | 2.87 | 1.44 | | | |
| 1 | Saline P1 | 100 | 5 | 2.47 | 3.51 | 1.42 | 1.52 | 0.171 | 11.22 |
| 2 | Saline P1 | 100 | 5 | 2.28 | 3.36 | 1.47 | | | |
| 3 | Saline P1 | 100 | 5 | 2.36 | 3.33 | 1.41 | | | |
| 4 | Saline P1 | 100 | 5 | 2.06 | 3.65 | 1.77 | | | |

Figure 26:
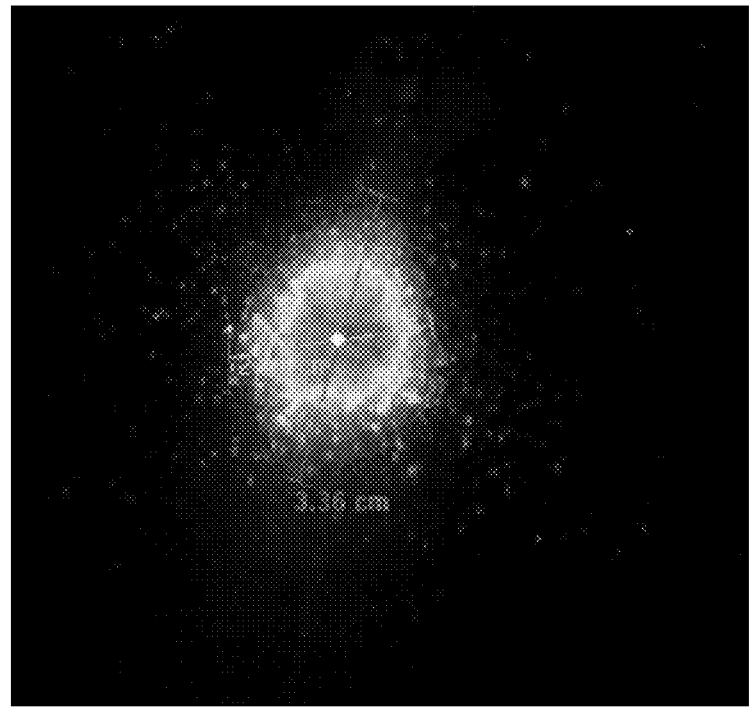
Figure 27:
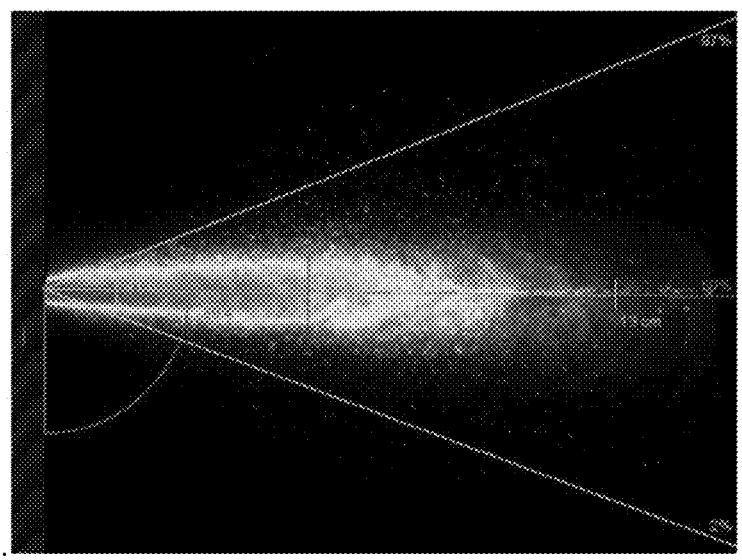

FIG. 26 shows, for saline, an example of spray pattern results for 100 μl. FIG. 27 shows, for saline, an example of spray pattern results for 200 μl.

Plume Geometry

TABLE 15

Oxford Laser plume geometry results for saline.
Plume Geometry

| Run | Label | Volume (ul) | Pressure (Bar) | Angle (Deg) | Width (at 6 cm) | Angle Mean | SD | SD % | Width Mean | SD | SD % |
|---|---|---|---|---|---|---|---|---|---|---|---|
| 1 | Saline E1 | 200 | 5 | 38.4 | 2.59 | 37.87 | 1.29 | 3.40 | 2.49 | 0.14 | 5.68 |
| 2 | Saline E1 | 200 | 5 | 36.4 | 2.43 | | | | | | |
| 3 | Saline E1 | 200 | 5 | 38.8 | 2.39 | | | | | | |
| 1 | Saline P1 | 100 | 5 | 41.8 | 2.85 | 40.70 | 4.36 | 10.70 | 2.75 | 0.18 | 6.62 |
| 2 | Saline P1 | 100 | 5 | 44.4 | 2.86 | | | | | | |
| 3 | Saline P1 | 100 | 5 | 35.9 | 2.54 | | | | | | |

FIG. 26 shows, for overall (total) spray pattern, an example of results for 100 μl saline. FIG. 27 shows, for overall (total) spray pattern, an example of results for 200 μl saline. The spray pattern oblongation indexes for the saline 100 μl and 200 μl are 1.52±0.17 and 1.51±0.015, respectively, and thus pass the acceptance criterion. The overall (total) plume geometry angle is 40.7±4.36 degrees for the 100 μl fill volume and 37.87±1.29 degrees for the 200 μl fill volume, with a width at 6 cm from the nozzle of 2.49±0.14 cm and 2.75±0.18 cm; thus, the device passes all acceptance criteria. More specifically, it is noted by the inventors of the present invention that the bi-modal spray pattern, comprising a first pattern and a second pattern; further wherein the first pattern is characterized by (a) Plume angle is in the range of °4±°5; (b) width of plume at 6 cm from the nozzle is in the range of 4 mm±3 mm; and, the second pattern is characterized by (a) Plume angle is in the range of 35°±10; (b) width of plume at 6 cm from the nozzle is in the range of 30±10 mm; further wherein the mean particle's size in the first pattern is larger than the mean particle's size in the second pattern.

Midazolam Formulation—Delivered Dose Determination

The mean values and standard deviations are presented in Table 16. All individual data are presented in Table 17

TABLE 16

Mean values of the delivered mass in % for midazolam.
Delivered mass in % of loaded mass

| Drug Name | Sample (X bar) | Volume μl | Mean | SD | RSD % |
|---|---|---|---|---|---|
| Midazoalm | Y1(5b) | 200 | 93.5 | 3.3 | 3.6 |
| | Y1(6b) | 200 | 93.8 | 2.6 | 2.8 |
| | W1(5b) | 400 | 93.5 | 2.5 | 2.7 |
| | W1(6b) | 400 | 94.4 | 3.8 | 4.1 |
| | T1(5b) | 600 | 94.3 | 1.5 | 1.6 |
| | T1(6b) | 600 | 94.7 | 2.1 | 2.2 |
| | U1(5b) | 800 | 94.8 | 1.9 | 2.0 |
| | U1(6b) | 800 | 94.6 | 2.1 | 2.3 |

Figure 28:
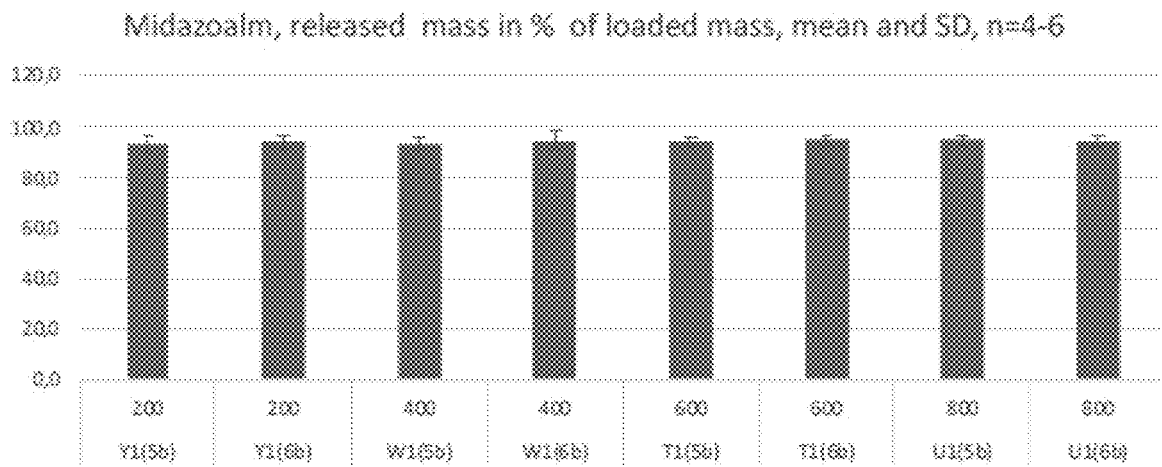

FIG. 28 shows, for a plot of mean values of released mass in % for midazolam 200 μl to 800 μl.

TABLE 17

Individual values for 200-800 μl midazolam; with 5 bar and 6 bar pressures

| Sample (bar) | Drug # | Drug Name | Volume (ml) | Empty - before (g) | With Air (g) | With Drug (g) | After Dosing (g) |
|---|---|---|---|---|---|---|---|
| Y1 (5b) | 1 | Midazolam | 200 | 8.8913 | 8.90603 | 9.1217 | 8.91648 |
| | 2 | | | 8.9039 | 8.91922 | 9.12131 | 8.9222 |

TABLE 17-continued

Individual values for 200-800 μl midazolam; with 5 bar and 6 bar pressures

|  |  |  |  |  |  |  |  |
|---|---|---|---|---|---|---|---|
|  | 3 |  |  | 8.8894 | 8.90464 | 9.1067 | 8.8965 |
|  | 4 |  |  | 8.8733 | 8.88784 | 9.08607 | 8.8793 |
|  | 5 |  |  | 8.8789 | 8.8937 | 9.0998 | 8.8903 |
|  | 6 |  |  | 8.8788 | 8.8944 | 9.0992 | 8.8915 |
| Y1 (6b) | 1 | Midazolam | 200 | 8.864 | 8.882 | 9.087 | 8.872 |
|  | 2 |  |  | 8.8888 | 8.906 | 9.113 | 8.905 |
|  | 3 |  |  | 8.8741 | 8.891 | 9.0879 | 8.882 |
|  | 4 |  |  | 8.8891 | 8.908 | 9.1236 | 8.9084 |
| W1 (5b) | 1 | Midazolam | 400 | 8.8763 | 8.8911 | 9.28976 | 8.9006 |
|  | 2 |  |  | 8.88081 | 8.89559 | 9.2978 | 8.9069 |
|  | 3 |  |  | 8.8569 | 8.38718 | 9.2699 | 8.8914 |
|  | 4 |  |  | 8.8818 | 8.89723 | 9.30461 | 8.8905 |
|  | 5 |  |  | 8.88571 | 8.90107 | 9.30512 | 8.9229 |
|  | 6 |  |  | 8.868 | 8.8823 | 9.2878 | 8.8942 |
| W1 (6b) | 1 | Midazolam | 400 | 8.8633 | 8.881 | 9.292 | 8.864 |
|  | 2 |  |  | 8.8722 | 8.8904 | 9.304 | 8.91 |
|  | 3 |  |  | 8.8886 | 8.9074 | 9.3218 | 8.8916 |
|  | 4 |  |  | 8.874 | 8.8909 | 9.3 | 8.901 |
| T1 (5b) | 1 | Midazolam | 600 | 8.91864 | 8.9349 | 9.5391 | 8.9544 |
|  | 2 |  |  | 8.9007 | 8.89145 | 9.5324 | 8.93953 |
|  | 3 |  |  | 8.89785 | 8.91264 | 9.52766 | 8.9165 |
|  | 4 |  |  | 8.91403 | 8.9283 | 9.5388 | 8.9441 |
|  | 5 |  |  | 8.9215 | 8.9369 | 9.5538 | 8.96327 |
|  | 6 |  |  | 8.90902 | 8.9235 | 9.5231 | 8.951 |
| T1 (6b) | 1 | Midazolam | 600 | 8.9045 | 8.921 | 9.523 | 8.918 |
|  | 2 |  |  | 8.883 | 8.9 | 9.5 | 8.917 |
|  | 3 |  |  | 8.88 | 8.8971 | 9.514 | 8.921 |
|  | 4 |  |  | 8.892 | 8.909 | 9.5174 | 8.932 |
| U1 (5b) | 1 | Midazolam | 800 | 8.91637 | 8.93003 | 9.7435 | 8.96922 |
|  | 2 |  |  | 8.87642 | 8.8911 | 9.7063 | 8.938 |
|  | 3 |  |  | 8.86607 | 8.8819 | 9.6903 | 8.9138 |
|  | 4 |  |  | 8.89065 | 8.9069 | 9.7185 | 8.929 |
|  | 5 |  |  | 8.9113 | 8.9266 | 9.72042 | 8.92985 |
|  | 6 |  |  | 8.88098 | 8.8961 | 9.69 | 8.91247 |
| U1 (6b) | 1 | Midazolam | 800 | 8.877 | 8.894 | 9.699 | 8.9105 |
|  | 2 |  |  | 8.894 | 8.912 | 9.708 | 8.931 |
|  | 3 |  |  | 8.887 | 8.905 | 9.724 | 8.921 |
|  | 4 |  |  | 8.8992 | 8.9162 | 9.7167 | 8.9678 |

| Sample (bar) | # | Air loaded (mg) | Drug loaded (mg) | Drug residue (mg) | Drug released (mg) | Delivered (mass % of loaded) | Mean | SD | RSD % |
|---|---|---|---|---|---|---|---|---|---|
| Y1 (5b) | 1 | 14.7 | 215.7 | 25.2 | 190.49 | 88.3 | 93.5 | 3.3 | 3.6 |
|  | 2 | 15.3 | 202.1 | 18.3 | 183.79 | 90.9 |  |  |  |
|  | 3 | 15.2 | 202.1 | 7.1 | 194.96 | 96.5 |  |  |  |
|  | 4 | 14.5 | 198.2 | 6.0 | 192.23 | 97.0 |  |  |  |
|  | 5 | 14.8 | 206.1 | 11.4 | 194.7 | 94.5 |  |  |  |
|  | 6 | 15.6 | 204.8 | 12.7 | 192.1 | 93.8 |  |  |  |
| Y1 (6b) | 1 | 18.0 | 205.0 | 8.0 | 197 | 96.1 | 93.8 | 2.6 | 2.8 |
|  | 2 | 17.2 | 207.0 | 16.2 | 190.8 | 92.2 |  |  |  |
|  | 3 | 16.9 | 196.9 | 7.9 | 189 | 96.0 |  |  |  |
|  | 4 | 18.9 | 215.6 | 19.3 | 196.3 | 91.0 |  |  |  |
| W1 (5b) | 1 | 14.8 | 398.7 | 24.3 | 374.36 | 93.9 | 93.5 | 2.5 | 2.7 |
|  | 2 | 14.8 | 402.2 | 26.1 | 376.12 | 93.5 |  |  |  |
|  | 3 | 14.9 | 398.1 | 34.5 | 363.6 | 91.3 |  |  |  |
|  | 4 | 15.4 | 407.4 | 8.7 | 398.68 | 97.9 |  |  |  |
|  | 5 | 15.4 | 404.1 | 37.2 | 366.86 | 90.8 |  |  |  |
|  | 6 | 14.3 | 405.5 | 26.2 | 379.3 | 93.5 |  |  |  |
| W1 (6b) | 1 | 17.7 | 411.0 | 0.7 | 410.3 | 99.8 | 94.4 | 3.8 | 4.1 |
|  | 2 | 18.2 | 413.6 | 37.8 | 375.8 | 90.9 |  |  |  |
|  | 3 | 18.8 | 414.4 | 27.4 | 387 | 93.4 |  |  |  |
|  | 4 | 16.9 | 409.1 | 27.0 | 382.1 | 93.4 |  |  |  |
| T1 (5b) | 1 | 16.3 | 604.2 | 35.8 | 568.44 | 94.1 | 94.3 | 1.5 | 1.6 |
|  | 2 | 14.4 | 617.9 | 39.4 | 578.47 | 93.6 |  |  |  |
|  | 3 | 14.8 | 615.0 | 18.6 | 596.37 | 97.0 |  |  |  |
|  | 4 | 14.3 | 610.5 | 30.1 | 580.43 | 95.1 |  |  |  |
|  | 5 | 15.4 | 616.9 | 41.8 | 575.13 | 93.2 |  |  |  |
|  | 6 | 14.5 | 599.6 | 42.0 | 557.62 | 93.0 |  |  |  |
| T1 (6b) | 1 | 16.5 | 602.0 | 13.5 | 588.5 | 97.8 | 94.7 | 2.1 | 2.2 |
|  | 2 | 17.0 | 600.0 | 34.0 | 566 | 94.3 |  |  |  |
|  | 3 | 17.1 | 616.9 | 41.0 | 575.9 | 93.4 |  |  |  |
|  | 4 | 17.0 | 608.4 | 40.0 | 568.4 | 93.4 |  |  |  |
| U1 (5b) | 1 | 13.7 | 813.5 | 52.8 | 760.62 | 93.5 | 94.8 | 1.9 | 2.0 |
|  | 2 | 14.7 | 815.2 | 61.6 | 753.62 | 92.4 |  |  |  |
|  | 3 | 15.8 | 808.4 | 47.7 | 760.67 | 94.1 |  |  |  |
|  | 4 | 16.0 | 811.6 | 18.1 | 773.45 | 95.3 |  |  |  |

TABLE 17-continued

Individual values for 200-800 μl midazolam; with 5 bar and 6 bar pressures

|  |  |  |  |  |  |  |  |  |  |
|---|---|---|---|---|---|---|---|---|---|
|  | 5 | 15.3 | 793.8 | 18.5 | 775.27 | 97.7 |  |  |  |
|  | 6 | 15.1 | 793.9 | 31.5 | 762.41 | 96.0 |  |  |  |
| U1 (6b) | 1 | 17.0 | 805.0 | 33.5 | 771.5 | 95.8 | 94.6 | 2.1 | 2.3 |
|  | 2 | 18.0 | 796.0 | 37.0 | 759 | 95.4 |  |  |  |
|  | 3 | 18.0 | 819.0 | 34.0 | 785 | 95.8 |  |  |  |
|  | 4 | 17.0 | 800.5 | 68.6 | 731.9 | 91.4 |  |  |  |

The mean results for dose release for the midazolam formulation varied between 93.5%±3.3 and 94.8±1.9 for 200 μl to 800 μl intended doses at a pressure of 5 bar and 93.8%±2.6 to 94.7%±2.1 for 200 μl to 800 μl intended doses at a pressure of 6 bar. In all of the above cases, the released dose results pass the acceptance criteria (less than 10% difference from the target dose). All doses were release with mean of less than 10% of target dose, which is very unique in the field, that same device and technology (with no change at all) can fit such a range of volumes, and particularly high volumes and be so efficient in releasing the aerosolized drug.

Droplet Size Determination by the Malvern Spraytec

Figure 29:
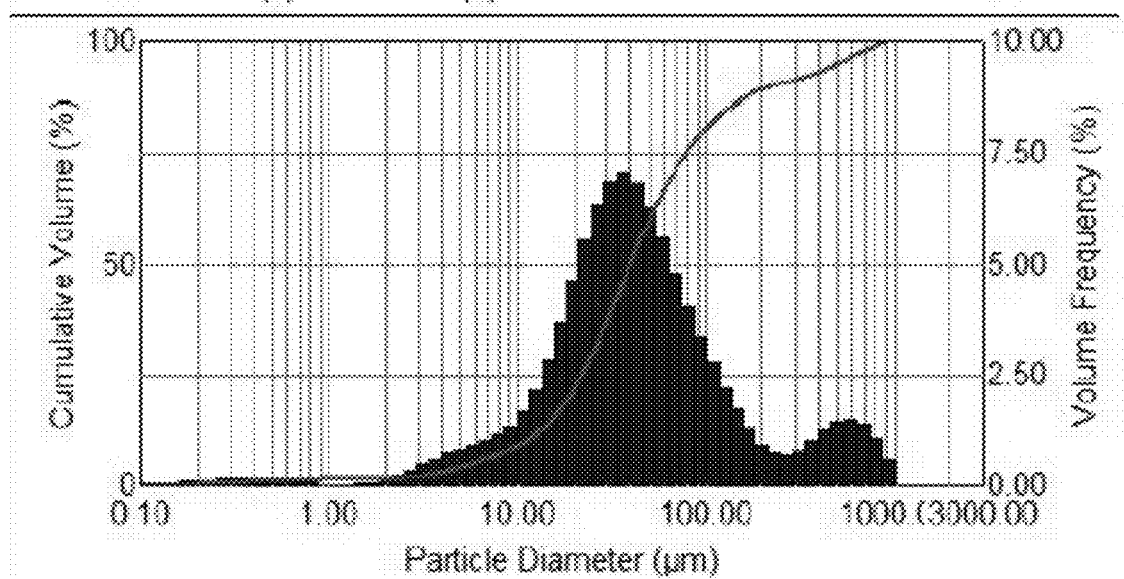
Figure 30:
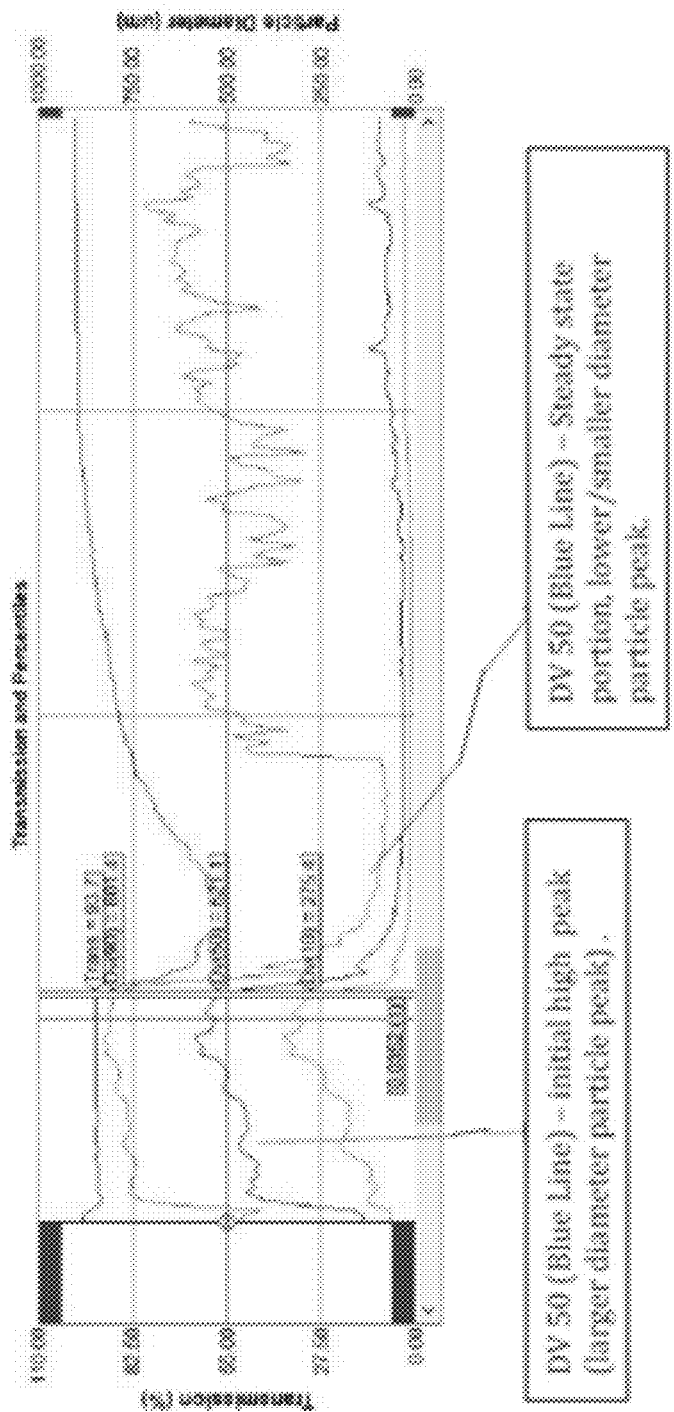
Figure 31:
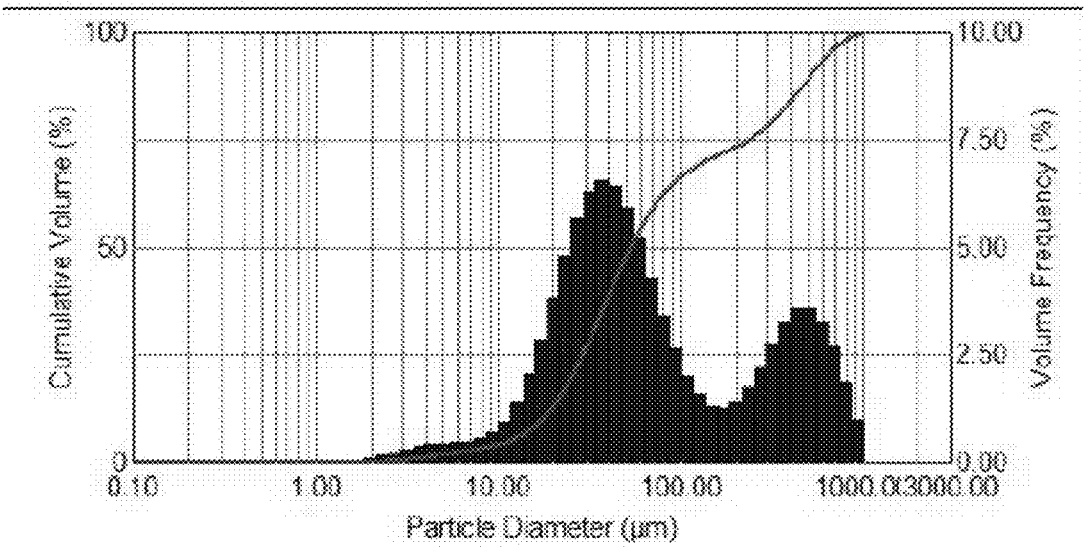
Figure 32:
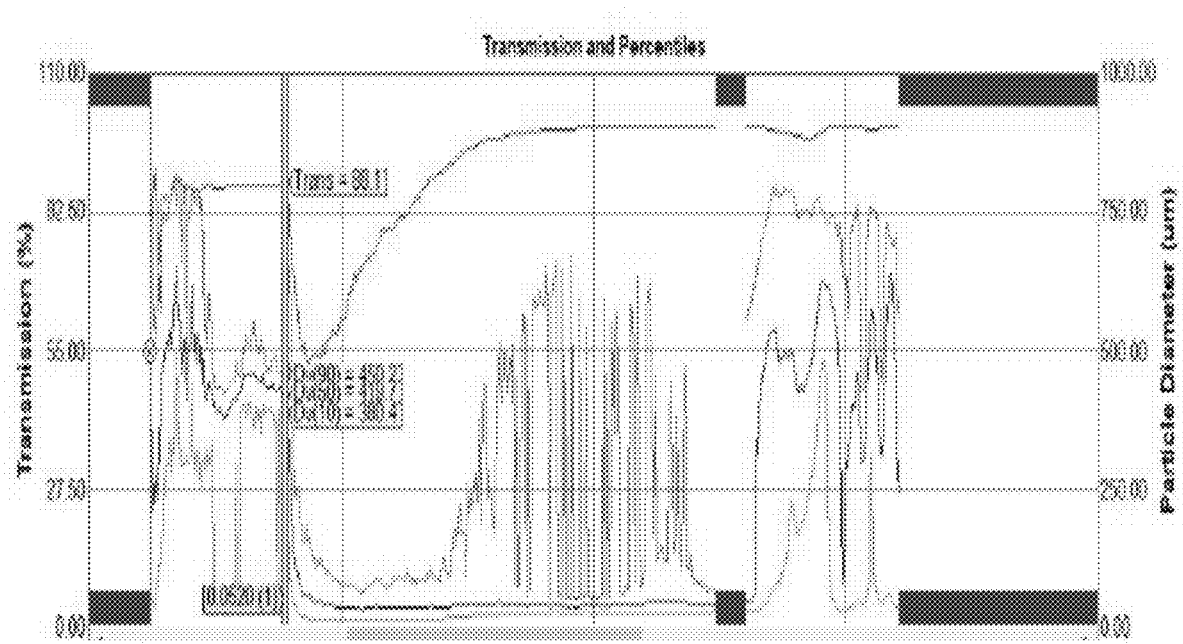
Figure 33:
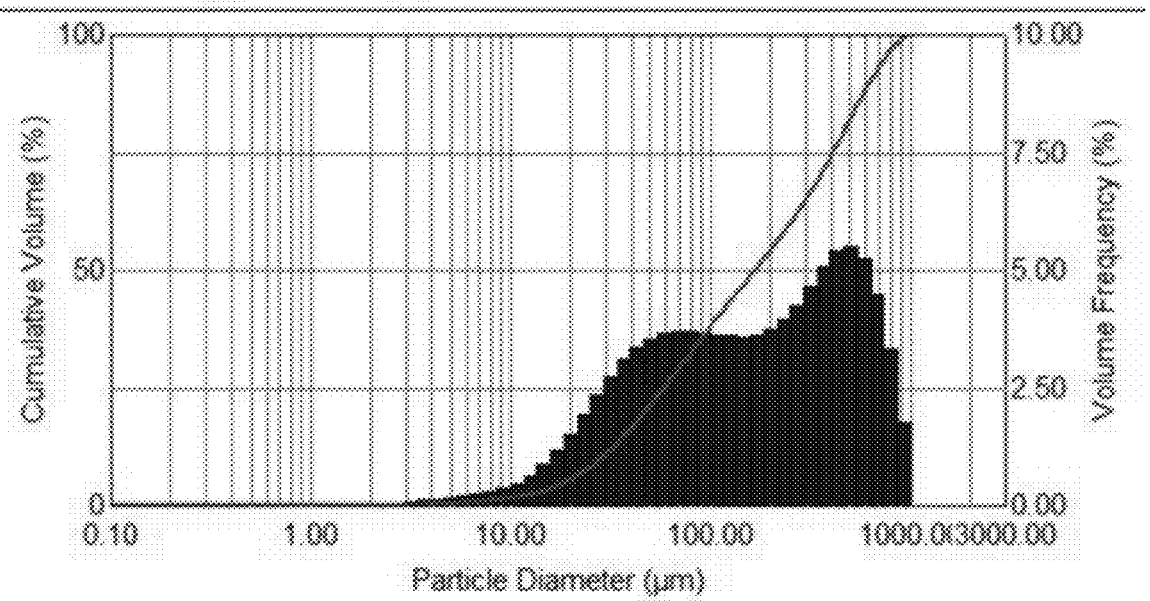
Figure 34:
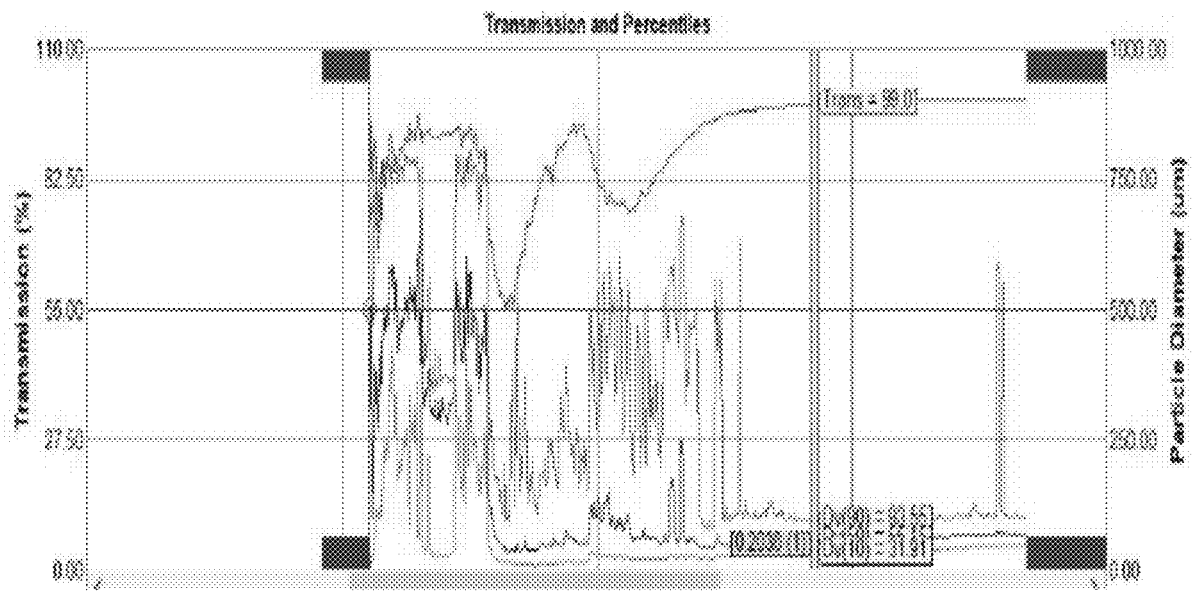
Figure 35:
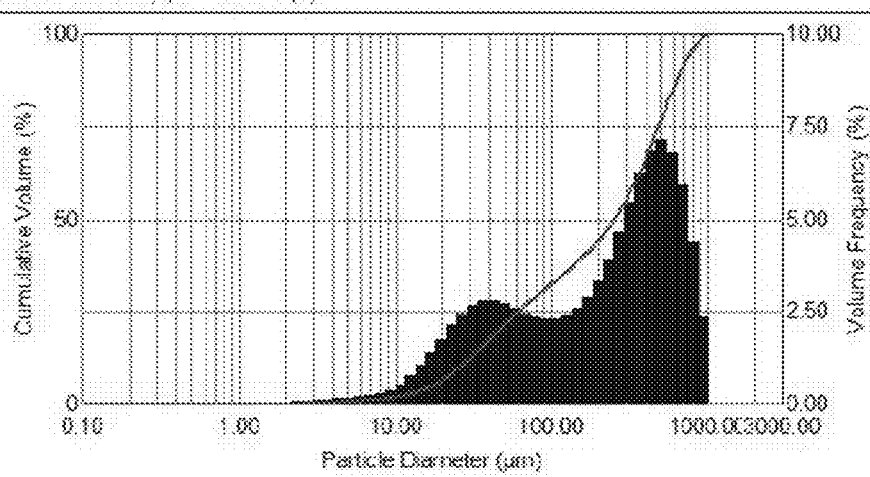
Figure 36:
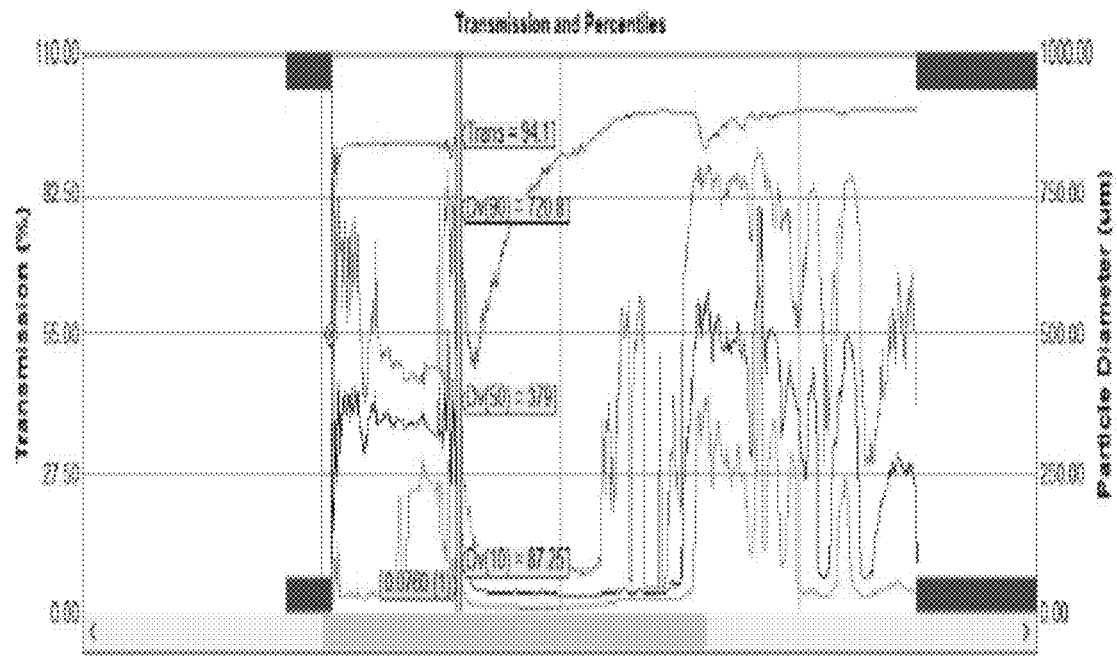
Figure 37:
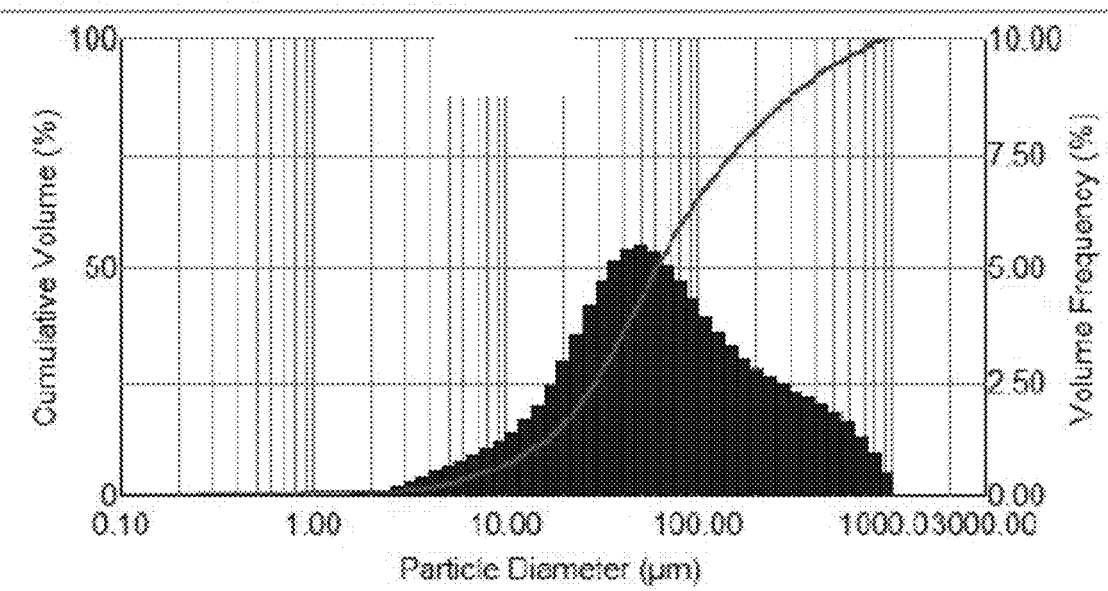
Figure 38:
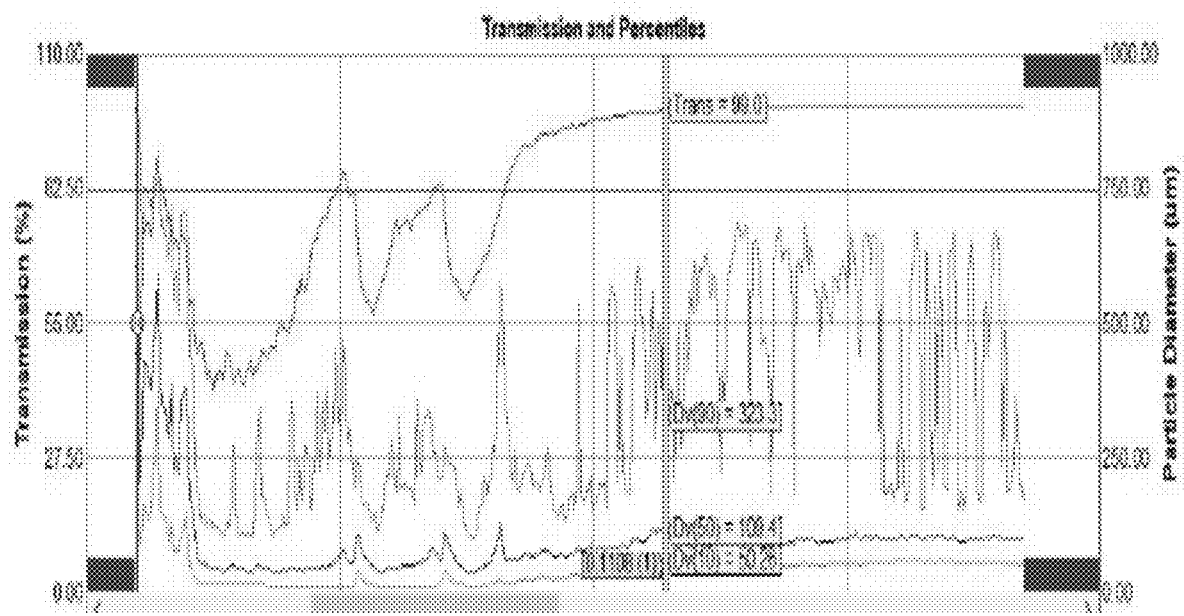
Figure 39:
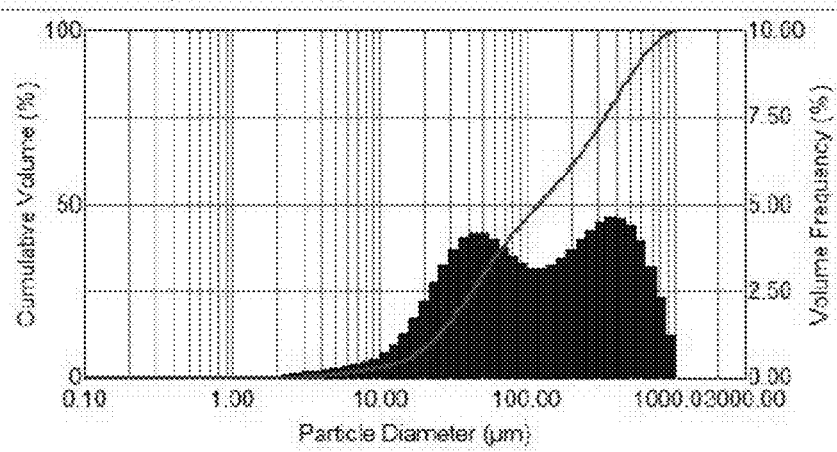
Figure 40:
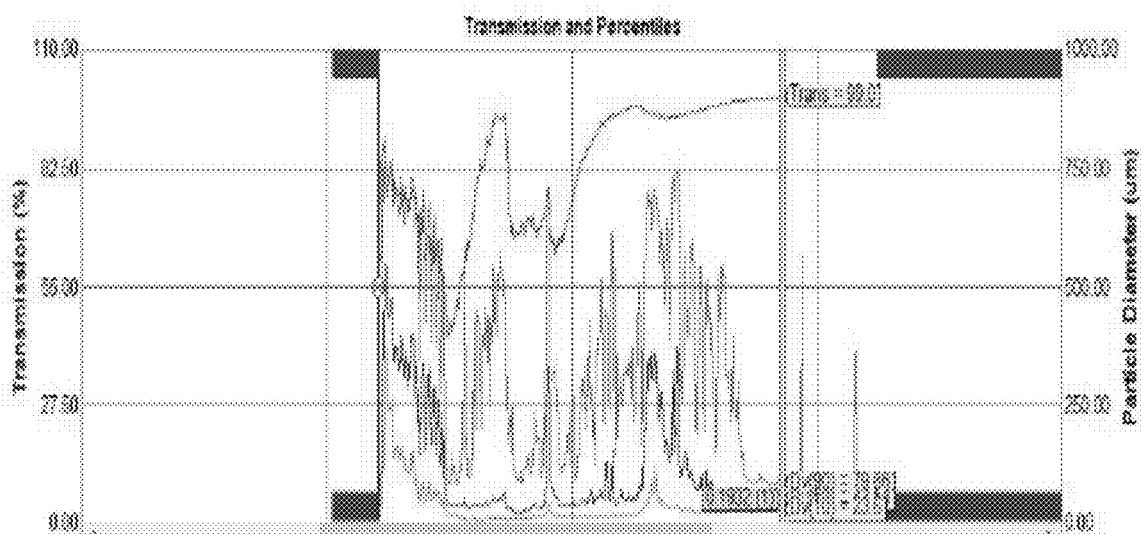

FIG. 29 shows, for midazolam, an example of mean droplet size distribution for 200 μl fill volume at 5 Bar. FIG. 30 shows, for midazolam, an example of Dv(10), Dv(50) and Dv(90) vs. time for 200 μl fill volume at 5 Bar. FIG. 31 shows, for midazolam, an example of mean droplet size distribution for 400 μl fill volume at 5 Bar. FIG. 32 shows, for midazolam, an example of Dv(10), Dv(50) and Dv(90) vs. time for 400 μl fill volume at 5 Bar. FIG. 33 shows, for midazolam, an example of mean droplet size distribution for 600 μl fill volume at 5 Bar. FIG. 34 shows, for midazolam, an example of Dv(10), Dv(50) and Dv(90) vs. time for 600 μl fill volume at 5 Bar. FIG. 35 shows, for midazolam, an example of mean droplet size distribution for 800 μl fill volume at 5 Bar. FIG. 36 shows, for midazolam, an example of Dv(10), Dv(50) and Dv(90) vs. time for 800 μl fill volume at 5 Bar. FIG. 37 shows, for midazolam, an example of mean droplet size distribution for 200 μl fill volume at 6 Bar. This exception where only one defined pick is seen also falls under the criteria of the SipNose aerosol as stated above-if a monomodal spray pattern is shown, the particle size and plume geometry are comparable to the steady state pick (second pick on a time scale of the bi-modal aerosol pattern). FIG. 38 shows, for midazolam, an example of Dv(10), Dv(50) and Dv(90) vs. time for 200 μl fill volume at 6 Bar. FIG. 39 shows, for midazolam, an example of mean droplet size distribution for 400 μl fill volume at 6 Bar. FIG. 40 shows, for midazolam, an example of Dv(10), Dv(50) and Dv(90) vs. time for 400 μl fill volume at 6 Bar.

Spray Pattern and Plume Geometry as Measured by the Oxford Laser Envision

TABLE 19

Spray Pattern; Individual results as measured by the Oxford Laser Envision Spray Pattern

| Run | Label | Volume (ul) | Pressure (Bar) | Short axis (cm) | Long axis (cm) | Oblongation | Mean | SD | SD % |
|---|---|---|---|---|---|---|---|---|---|
| 1 | Midazolam T1 | 600 | 6 | 2 | 3.13 | 1.57 | 1.59 | 0.092 | 5.76 |
| 2 | Midazolam T1 | 600 | 6 | 2.18 | 3.33 | 1.53 | | | |
| 3 | Midazolam T1 | 600 | 6 | 1.77 | 3.06 | 1.73 | | | |
| 4 | Midazolam T1 | 600 | 6 | 2.36 | 3.66 | 1.55 | | | |
| 1 | Midazolam U1 | 800 | 6 | 1.98 | 3.1 | 1.57 | 1.61 | 0.068 | 4.24 |
| 2 | Midazolam U1 | 800 | 6 | 2.05 | 3.44 | 1.68 | | | |
| 3 | Midazolam U1 | 800 | 6 | 2.46 | 3.77 | 1.53 | | | |
| 4 | Midazolam U1 | 800 | 6 | 1.87 | 3.08 | 1.65 | | | |
| 1 | Midazolam W1 | 400 | 6 | 2.07 | 3.19 | 1.54 | 1.53 | 0.178 | 11.62 |
| 2 | Midazolam W1 | 400 | 6 | 2.24 | 3.28 | 1.46 | | | |
| 3 | Midazolam W1 | 400 | 6 | 2.97 | 4.02 | 1.35 | | | |
| 4 | Midazolam W1 | 400 | 6 | 1.95 | 3.46 | 1.77 | | | |
| 1 | Midazolam Y1 | 200 | 6 | 1.94 | 3.2 | 1.65 | 1.57 | 0.062 | 3.93 |
| 2 | Midazolam Y1 | 200 | 6 | 1.82 | 2.89 | 1.59 | | | |
| 3 | Midazolam Y1 | 200 | 6 | 2.1 | 3.24 | 1.54 | | | |
| 4 | Midazolam Y1 | 200 | 6 | 1.6 | 2.41 | 1.51 | | | |

FIG. 39 shows, for midazolam, an example of Dv(10), Dv(50) and Dv(90) vs. time for a 600 μl fill volume, FIG. 40 shows, for midazolam, an example of Dv(10), Dv(50) and Dv(90) vs. time for a 400 μl fill volume at 6 bar. The particle size distribution for all fill volumes at (200 μl-800 μl) and 5 bar and 6 bar actuations, show a bimodal behavior with one peak above 100 μm and one peak below 100 μm. In the time sequence distributions, there is an initial stable part with a higher transmission around 90% to 95% that is slightly shorter for the 200 μl midazolam fill volume and increases with increasing fill volume. Following this initial stable part comes a time period where the transmission drops markedly and again increases up to 99%. The initial stable part seen in the 5 bar investigations is less pronounced in the 6 bar actuations. The Dv(50) values of the overall Dv(50) calculated for aerosol release of 200 μl, 400 μl and 600 μl (55.64 μm±67, 74.2 μm±22.8, 146 μm±59 μm respectively) at 5 bar, and for aerosol release of 200 μl and 400 μl (66.23 μm±8.7 and 156.75 μm±48.8 respectively) at 6 bars, all pass the acceptance criteria. Only the 800 μl volume at 5 bars (261 μm±94 μm) is slightly above the acceptance criterion (261 μm instead of 250 μm) and as 800 μl released dose is so unique in the field, acceptance criteria for those volumes were broaden to include the very mild change from all other volumes released. The Dv(10) values, that are the ones that are crucial for safety, for all volumes (200 μl, 400 μl and 600 μl and 800 μl) in both 5 bar and 6 bar actuations are all above 10 μm, thus all pass this acceptance criterion.

Plume Geometry

TABLE 20

Plume Geometry; individual results as measured by the Malvern Spraytec.
Plume Geometry

| Run | Label | Volume (ul) | Pressure (Bar) | Angle (Deg) | Width (at 6 cm) | Angle Mean | Angle SD | Angle SD % | Width Mean | Width SD | Width SD % |
|---|---|---|---|---|---|---|---|---|---|---|---|
| 1 | Midazolam N1 | 800 | 5 | 24.3 | 2.07 | 30.80 | 10.24 | 33.24 | 2.59 | 0.74 | 28.54 |
| 2 | Midazolam N1 | 800 | 5 | 25.5 | 2.27 | | | | | | |
| 3 | Midazolam N1 | 800 | 5 | 42.6 | 3.44 | | | | | | |
| 1 | Midazolam R1 | 200 | 5 | 25.6 | 2.16 | 29.57 | 3.95 | 13.36 | 2.39 | 0.28 | 11.74 |
| 2 | Midazolam R1 | 200 | 5 | 33.5 | 2.7 | | | | | | |
| 3 | Midazolam R1 | 200 | 5 | 29.6 | 2.3 | | | | | | |
| 1 | Midazolam T1 | 600 | 6 | 30.3 | 2.7 | 32.87 | 2.32 | 7.05 | 2.85 | 0.17 | 5.83 |
| 2 | Midazolam T1 | 600 | 6 | 34.8 | 3.03 | | | | | | |
| 3 | Midazolam T1 | 600 | 6 | 33.5 | 2.83 | | | | | | |
| 1 | Midazolam U1 | 800 | 6 | 31.5 | 2.62 | 30.57 | 2.34 | 7.67 | 2.60 | 0.16 | 6.02 |
| 2 | Midazolam U1 | 800 | 6 | 32.3 | 2.74 | | | | | | |
| 3 | Midazolam U1 | 800 | 6 | 27.9 | 2.43 | | | | | | |
| 1 | Midazolam W1 | 400 | 6 | 31.8 | 2.83 | 34.10 | 2.17 | 6.35 | 3.07 | 0.23 | 7.39 |
| 2 | Midazolam W1 | 400 | 6 | 34.4 | 3.11 | | | | | | |
| 3 | Midazolam W1 | 400 | 6 | 36.1 | 3.28 | | | | | | |
| 1 | Midazolam Y1 | 200 | 6 | 35.5 | 3.23 | 36.20 | 1.30 | 3.59 | 3.09 | 0.22 | 7.22 |
| 2 | Midazolam Y1 | 200 | 6 | 37.7 | 3.2 | | | | | | |
| 3 | Midazolam Y1 | 200 | 6 | 35.4 | 2.83 | | | | | | |

Figure 41:
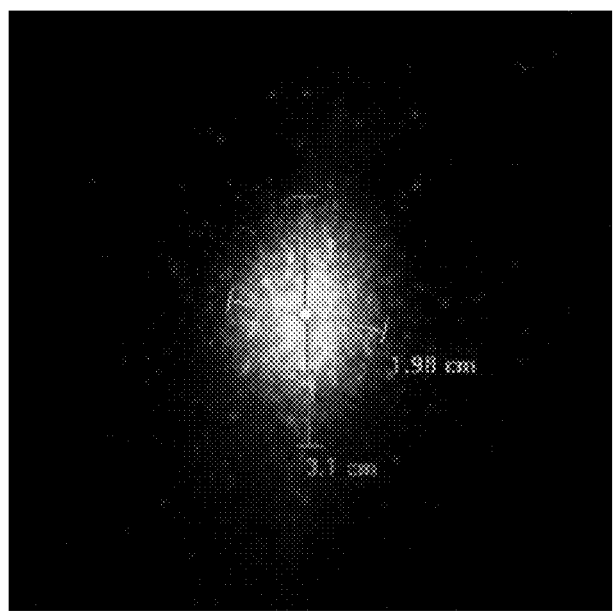
Figure 42:
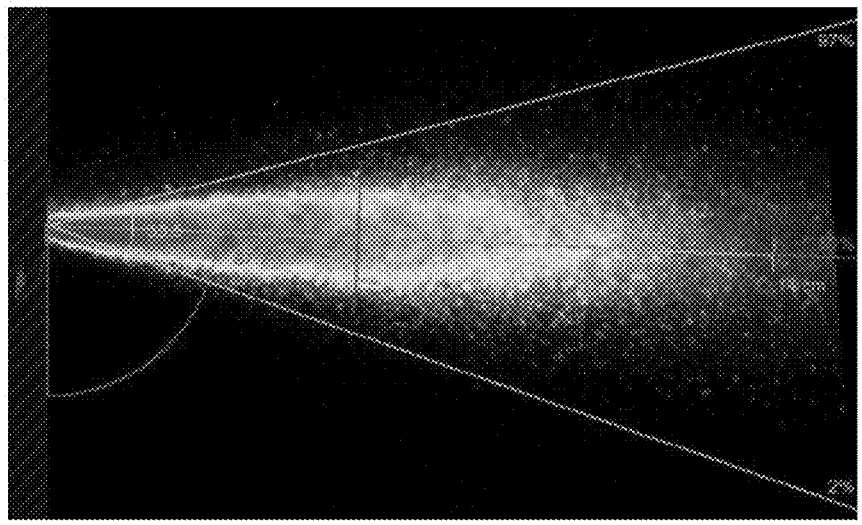
Figure 43:
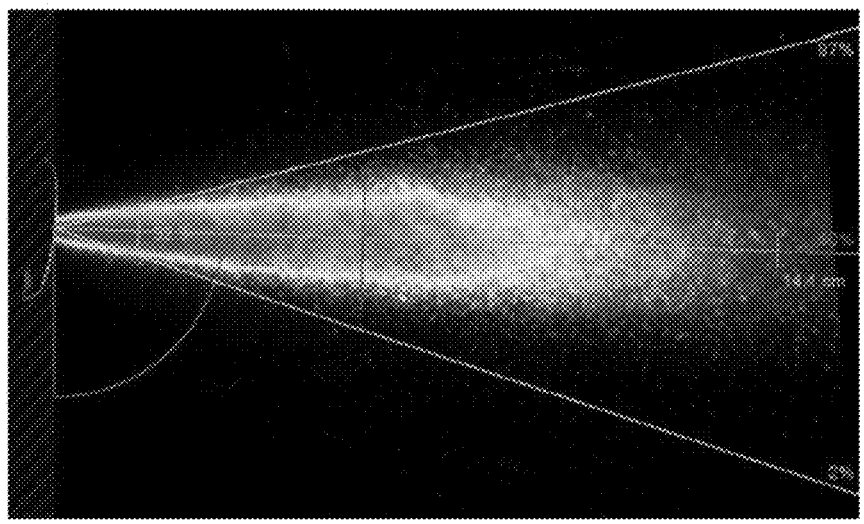

FIG. 41 shows, for plume geometry, an example of results for midazolam 200 µl. FIG. 42 shows, for plume geometry, an example of results for midazolam 200 µl saline. FIG. 43 shows, for plume geometry, an example of results for midazolam 800 µl saline. The overall spray pattern of the midazolam formulations has a mean oblongation index of around 1.6 with SD values that indicate no difference in the oblongation index between the four different fill volumes (200 µl, 400 µl and 600 µl and 800 µl) in the 5 bar and 6 bar pressures, and all pass the acceptance criteria, where short axis and long axis are no longer than 4 cm and the ratio between the longest to the shortest axes (oblongation) is in the range of 1.5±1. The overall (total) plume geometry has a mean of 30 degrees to 36 degrees for all fill volumes and for both 5 bar and 6 bar actuation pressure. All results passed the acceptance criteria for plume angle of 35°±10 (except for 800 µl at 5 bars which showed slightly lower values (30.8°±10 instead of 35°±10 and as stated above, specifically will be adapted and pass acceptance criteria). The overall (total) width of plume at 6 cm from the nozzle for all fill volumes and in both 5 bar and 6 bar actuation pressure are in a range of 3 cm±1, thus passing the acceptance criterion. More specifically, it is noted by the inventors of the present invention that the bi-modal spray pattern, comprising a first pattern and a second pattern; further wherein the first pattern is characterized by (a) Plume angle is in the range of °4±°5; (b) width of plume at 6 cm from the nozzle is in the range of 4 mm±3 mm; and, the second pattern is characterized by (a) Plume angle is in the range of 35°±10; (b) width of plume at 6 cm from the nozzle is in the range of 30±10 mm; further wherein the mean particle's size in the first pattern is larger than the mean particle's size in the second pattern.

The characteristics of the SipNose delivery devices showed to have reproducibility of dose released, spray plume geometry and droplet size distribution which satisfied the acceptance criteria. Since all the above parameters can affect delivery of the drug substance to the intended biological target, it was shown that 200 µl, 400 µl and 600 µl and 800 µl of midazolam show same general aerosol characteristics, thus delivery of those volumes via the SipNose delivery system is acceptable, with either 5 bar or 6 bar actuation pressure. All results and calculations in this report reflect that the SipNose device passes all the acceptance criteria for SipNose as a nasal delivery device for midazolam and in general any other liquid drug delivery, and is comparable to the performances with Saline as a control. All volumes release highly similar aerosol in terms of aerosol characteristics, which is very unique in the field, that same device and technology (with no change at all) can fit such a range of volumes, and particularly high volumes and be so efficient in releasing the aerosolized drug.

Example 6

Investigation of the Aerosol and Insulin and Dose Delivery Characteristics of the Sipnose Nasal Delivery Device
Materials & Equipment
  As in EXAMPLE 5.2
Results
  The results below, containing both aerosol characteristics and delivered doses corresponding insulin with specified drug volumes (100 µl and 200 µl) and specified pressures (5 and 6 bar) as defined.
Insulin Drug Solution—Delivered Dose Determination
  The mean values and standard deviations are presented below. All individual data are presented below.

TABLE 21

Mean values of the delivered mass in %.
Delivered mass in % of loaded mass

| Drug Name | Sample (X bar) | Volume µl | Mean | SD | RSD % |
|---|---|---|---|---|---|
| Insulin | A1(5b) | 100 µl | 93.8 | 2.7 | 2.8 |
| | B1(5b) | 200 µl | 95.9 | 0.5 | 0.5 |

TABLE 22

Individual Insulin values for 5 bars actuation.

| Sample (x bar) | # | Drug Name | Volume | Empty-before g | with Air g | With Drug g | After dosing g | Air loaded mg | Drug Loaded mg | Drug residue mg | drug released mg | Delivered mass % of loaded | Mean | SD | RSD % |
|---|---|---|---|---|---|---|---|---|---|---|---|---|---|---|---|
| A1(5B) | 1 | Insulin | 100 | 8.5313 | 8.54701 | 8.6487 | 8.535 | 15.7 | 102.7 | 3.7 | 98.99 | 96.4 | 93.8 | 2.7 | 2.8 |
| | 2 | Insulin | 100 | 8.565 | 8.5805 | 8.6777 | 8.5745 | 15.5 | 97.2 | 9.5 | 87.7 | 90.2 | | | |
| | 3 | Insulin | 100 | 8.53957 | 8.5551 | 8.6574 | 8.5488 | 15.5 | 102.3 | 9.2 | 93.07 | 91.0 | | | |
| | 4 | Insulin | 100 | 8.5313 | 8.547 | 8.646 | 8.5351 | 15.7 | 99.0 | 3.8 | 95.2 | 96.2 | | | |
| | 5 | Insulin | 100 | 8.52585 | 8.5414 | 8.5485 | 8.5324 | 15.5 | 107.1 | 6.6 | 100.55 | 93.9 | | | |
| | 6 | Insulin | 100 | 8.599 | 8.61454 | 8.7183 | 8.6039 | 15.5 | 103.8 | 4.9 | 98.86 | 95.3 | | | |
| B1(5B) | 1 | Insulin | 200 | 8.5169 | 8.5325 | 8.7375 | 8.5253 | 15.6 | 205.0 | 8.4 | 196.6 | 95.9 | 95.9 | 0.5 | 0.5 |
| | 2 | Insulin | 200 | 8.51042 | 8.5258 | 8.73075 | 8.5179 | 15.4 | 205.0 | 7.5 | 197.51 | 96.4 | | | |
| | 3 | Insulin | 200 | 8.5201 | 8.5356 | 8.7366 | 8.5283 | 15.5 | 201.0 | 8.2 | 192.8 | 95.9 | | | |
| | 4 | Insulin | 200 | 8.5259 | 8.5419 | 8.7397 | 8.5342 | 16.0 | 197.8 | 8.3 | 189.5 | 95.8 | | | |
| | 5 | Insulin | 200 | 8.5241 | 8.5398 | 8.7468 | 8.532 | 15.7 | 207.0 | 7.9 | 199.1 | 96.2 | | | |
| | 6 | Insulin | 200 | 8.5195 | 8.5349 | 8.7385 | 8.5299 | 15.3 | 203.6 | 10.3 | 191.3 | 94.9 | | | |

The mean result for dose release for insulin formulation is 95.73±4.80 μl for 100 μl intended dose and 194.80±3.56 μl for 200 μl intended dose with a pressure of 5 bars. In all of the above cases, the released dose results pass the acceptance criterion (losses less than 10% of target weight).

Droplet Size Determination by Malvern Spraytec

TABLE 23

Individual results for Malvern Spraytec for insulin.

| Run | Label | Volume (ul) | Pressure (Bar) | Average Dv(50) (um) | Average Dv(10) (um) | Actuation times(ms) | Mean Dv(50) (um) | SD | Mean Actuation time(ms) | SD | Mean Dv(10) (um) | SD |
|---|---|---|---|---|---|---|---|---|---|---|---|---|
| 1 | Insulin A1 | 100 | 5 | 66.6 | 19 | 43 | 64.45 | 1.59 | 50.83 | 7.73 | 18.15 | 0.78 |
| 2 | Insulin A1 | 100 | 5 | 63.7 | 17.9 | 46 | | | | | | |
| 3 | Insulin A1 | 100 | 5 | 66.3 | 16.8 | 62 | | | | | | |
| 4 | Insulin A1 | 100 | 5 | 63.2 | 18.8 | 57 | | | | | | |
| 5 | Insulin A1 | 100 | 5 | 63.9 | 18.1 | 44 | | | | | | |
| 6 | Insulin A1 | 100 | 5 | 63 | 18.3 | 53 | | | | | | |
| 1 | Insulin B1 | 200 | 5 | 71.5 | 18.2 | 67 | 66.17 | 6.67 | 71.50 | 8.24 | 16.92 | 1.68 |
| 2 | Insulin B1 | 200 | 5 | 75.1 | 19.3 | 82 | | | | | | |
| 3 | Insulin B1 | 200 | 5 | 56.1 | 14.8 | 68 | | | | | | |
| 4 | Insulin B1 | 200 | 5 | 63.9 | 16.1 | 64 | | | | | | |
| 5 | Insulin B1 | 200 | 5 | 63.5 | 15.7 | 66 | | | | | | |
| 6 | Insulin B1 | 200 | 5 | 66.9 | 17.4 | 82 | | | | | | |

The particle size distribution for 100 μl and 200 μl insulin dose volumes show a bimodal behavior with one peak above 100 μm and one below 100 μm. In the time sequence distributions, there is an initial stable part with a higher transmission around 90% to 95%. Following this initial stable part comes a time period where the transmission drops markedly and then again increases to 99%. The Dv(50) value of the 100 μl insulin volume (64.45 μm±1.59) and for the 200 μl insulin volume (66.17 μm±6.67) both pass the acceptance criterion. The Dv(10) value of the 100 μl insulin volume (18.15 μm±0.78) and for the 200 μl insulin volume (16.92 μm±1.68) also pass the acceptance criterion.

Spray Pattern and Plume Geometry as Measured by the Oxford Laser Envision

TABLE 24

Individual results for the spray pattern as measured by the Oxford Laser Envision Spray Pattern

| Run | Label | Volume (ul) | Pressure (Bar) | Short axis (cm) | Long axis (cm) | Oblongation | Mean | SD | SD % |
|---|---|---|---|---|---|---|---|---|---|
| 1 | Insulin A1 | 100 | 5 | 1.69 | 3.01 | 1.78 | 1.67 | 0.192 | 11.50 |
| 2 | Insulin A1 | 100 | 5 | 2.03 | 3.61 | 1.78 | | | |
| 3 | Insulin A1 | 100 | 5 | 2.37 | 3.43 | 1.45 | | | |
| 1 | Insulin B1 | 200 | 5 | 2.25 | 3.07 | 1.36 | 1.46 | 0.190 | 13.00 |
| 2 | Insulin B1 | 200 | 5 | 2.14 | 3.6 | 1.68 | | | |
| 3 | Insulin B1 | 200 | 5 | 2.25 | 3.02 | 1.34 | | | |

Plume Geometry

TABLE 25

Individual results as measured by the Malvern Spraytec
Plume Geometry

| Run | Label | Volume (ul) | Pressure ( linolinic acid, their salts; conjugated or un conjugated bile acids; cholate, deoxycholate, taurocholate, glycocholate, taurodexycholate, ursodeoxycholate, tauroursodeoxycholate, and chenodeoxycholate;

(c) at least one permeation enhancer comprising at least one of: a metal chelator, a surfactant, polyethylene ethers or esters, polyethylene glycol-12 lauryl ether, salicylate polysorbate 80, nonylphenoxypolyoxyethylene, dioctyl sodium sulfosuccinate, saponin, palmitoyl carnitine, lauroyl-1-carnitine, dodecyl maltoside, acyl carnitines, alkanoyl cjolline, 3-nitrobenzoate, zoonula occulden toxin, fatty acid ester of lactic acid salts, glycyrrhizic acid salt, hydroxyl beta-cyclodextrin, N-acetylated ammo acids, N-[8-(2-hydroxybenzoyl)amino]caprylate, and chitosan;

(d) surfactant of water-in-oil, oil-in-water; emulsions, double emulsions, micro-emulsions; Nano-emulsions of surfactants, oils, co-surfactants, aqueous phase;

(e) magnesium stearate;

(f) binders selected from a group consisting of: Saccharides, Disaccharides, Polysaccharides, Sugar alcohols, gelatin, polyvinylpyrrolidone (PVP), polyethylene glycol (PEG), cellulose starch, polyethylene glycol, methyl cellulose;

(g) Coatings selected from a group consisting of: cellulose ether, hydroxypropyl methylcellulose (HPMC), synthetic polymers, shellac, zein, polysaccharides, gelatin;

(h) Enterics selected from a group consisting of; fatty acids, waxes, shellac, plastics, and plant fibers;

(i) Disintegrants selected from a group consisting of: crosslinked polyvinylpyrrolidone (crospovidone), crosslinked sodium carboxymethyl cellulose (croscarmellose sodium), modified starch sodium starch glycolate);

(j) Flavors;

(k) Glidants selected from a group consisting of: silica gel, fumed silica, talc, and magnesium carbonate;

(l) Lubricants selected from a group consisting of: talc or silica, fats, vegetable stearin, magnesium stearate or stearic acid;

(m) Preservatives selected from a group consisting of: antioxidants, vitamin A, vitamin E, vitamin C, retinyl palmitate, and selenium, amino acids, Citric acid, sodium citrate, and parabens;

(n) Sorbents;

(o) Sweeteners;

(p) Vehicles selected from a group consisting of: Petrolatum, dimethyl sulfoxide, and mineral oil.

5. The device according to claim 1, wherein said fluid inlet port is configured by means of size and shape to interface with at least one puncturing member;

the at least one puncturing member being configured to, upon coupling to said fluid inlet port, to pierce the fluid inlet port, thereby providing said at least one substance in a fluid communication, by means of the activation mechanism, with at least one chamber configured to accept pressurized fluid at a volume $V_{PF}$ [ml] and a pressure $P_{PF}$ [barg];

wherein said activation mechanism, upon actuation within a period of time dT, the period of time dT being less than 500 milliseconds, enables said pressurized fluid to flow from said at least one chamber, via said fluid inlet port, such that the pressurized fluid entrains said at least one substance, erupts via said fluid discharging outlet port to within said body cavity in the form of the aerosol, such that a release time $dT_{release}$ of said volume $V_{sub}$ [ml or mg] of said at least one substance and said volume $V_{PF}$ [ml] of said pressurized fluid is less than 500 milliseconds.

6. The device according to claim 5, wherein at least one of the following is being held true:

a. the volume $V_{PF}$ is in a range of 1 to 50 ml;

b. the volume $V_{sub}$ is in a range of about 0.01 to about 7 ml or 0.1 mg to 7 g;

c. the pressure $P_{PF}$ is in a range of about 0 to about 10 barg;

further wherein at least one of the following is being held true:

a. the inlet diameter $D_{in}$ or the outlet diameter $D_{out}$ are in a range of 0.2 to 6 mm;

(c) a volume rate $dV_{sub}/dT$ or $dV_{sub}/dT_{release}$ is greater than 0.0001 ml/ms;

(d) said volume rate $dV_{sub}/dT$ or $dV_{sub}/dT_{release}$ is greater than 0.001 ml/ms;

(e) a volume rate $dV_{PF}/dT$ or $dV_{PF}/dT_{release}$ is greater than 0.001 ml/ms; and (f) said volume rate $dV_{PF}/dT$ or $dV_{PF}/dT_{release}$ is greater than 0.01 ml/ms.

7. The device according to claim 5, wherein said at least one vial comprises at least one of a pierceable container, a blow-fill-seal, or a form-fill-seal.

8. The device of claim 5, wherein said device is adapted to deliver at least one unit dose.

9. The device according to claim 1, wherein said device is adapted to deliver at least two substances such that the device is configured to deliver the at least one substance and at least other substance.

10. The device of claim 9, wherein said at least one other substance is selected from a group consisting of proteins; stem-cells; cells, cell secrotomes, organs; macro-molecules; RNA; neurotransmitters; receptor antagonists; hormones; Ketamine; Glucagon; substrates to treat one of the following: anaphylaxis, Parkinson, seizures and opioid overdose; epinephrine; atropine; metoclopramide; Naloxone; Esketamine; edaravone; valbenazine; deutetrabenazine; ocrelizumab; safinamide; nusinersen; daclizumab; pimavanserin; aripiprazole lauroxil; cariprazine; brexpiprazole; eslicarbazepine acetate; flutemetamol F18 injection; vortioxetine; dimethyl fumarate; gadoterate meglumine Dotarem [gadoterate meglumine]; Antibody mediated brain targeting drug delivery including; aducanumab, gantenerumab, bapineuzumab, solanezumab, ofatumumab CD20, BIIB033, LCN2, HMGB1; insulin; oxytocin; orexin-A; leptin; benzodiazepine; perillyl alcohol; camptothecin; phytochemicals including: curcumin and chrysin; nucleotides; olanzapine; risperidone; Venlafaxine; GDF-5; zonisamide; ropinirole; plant-originated and synthetically-produced terpenes and cannabinoids: Tetrahydrocannabinol and Cannabidiol; valproric acid; rivastigmine; estradiol; MFSD2 or MFSD2A or sodium-dependent lysophosphatidylcholine symporter, liposomes, lyophilic or water-miscible solvents, surfactants, cells fractions, zonisamide, GLPI agonists; lisdexamfetamine dimesylate; Dasotraline, phentermine; bupropion/naltrexone; methamphetamine; orlistat; bupropion; phendimetrazine; peripherally acting antiobesity agents; phentermine; diethylpropion; liraglutide; lorcaserin; chorionic gonadotropin; phendimetrazine; systemic; liraglutide; Lomaira; amphetamine; benzphetamine; cimetidine; desvenlafaxine; Equaline Acid Reducer; diethylpropion; Glucagon-like peptide-1 receptor agonists; Dulaglutide, Exenatide, Semaglutide, Lixisenatide; Antidepressants including: such as clomipramine, fluoxetine, fluvoxamine, paroxetine, sertraline; Selective serotonin reuptake inhibitors (SSRIs) including: citalopram, escitalopram oxalate; Selective serotonin & norepinephrine inhibitors (SNRIs) including: desvenlafaxine, duloxetine, levomilnacipran; serotonergic drugs including: vortioxetine or vilazodone; tricyclic antidepressants including: amitriptyline, imipramine, nortriptyline, and doxepin; bupropion; Monoamine oxidase inhibitors (MAOIs) including: isocarboxazid, phenelzine, selegiline, and tranylcypromine; Tetracyclic antidepressants that are noradrenergic and specific serotonergic antidepressants (NaSSAs) including: mirtazapine; L-methylfolate, sumatriptan; rizatriptan; eletriptan; zolmitriptan; naratriptan; almotriptan; frovatriptan, and any combination thereof.

11. The device of claim 9, wherein at least one said other substance is selected from a group consisting of a gas, a liquid, a powder, an aerosol, a slurry, a gel, a suspension and any combination thereof.

12. The device of claim 1, wherein said at least one vial is an open-ended nosepiece enclosing said volume $V_{sub}$ [ml or mg] of said at least one substance; said nosepiece comprising an open end and the at least one fluid discharging outlet port of diameter $D_{out}$ [mm], the at least one fluid discharging port of diameter $D_{out}$ [mm] being opposingly located to said open end; wherein said nosepiece is configured for placement in proximity to said body cavity.

13. The device of claim 12, additionally comprising a nosepiece cover configured to cover, in a sealable manner, at least partially said nosepiece.

14. The device of claim 13, wherein the base comprises at least one chamber configured to confine pressurized fluid at volume $V_{PF}$ [ml] and pressure $P_{PF}$ [barg]; wherein activation of said base releases said volume $V_{PF}$ [ml] of said pressurized fluid from said at least one chamber into said opened ended nosepiece to entrain said substance volume $V_{sub}$ and deliver the substance volume $V_{sub}$ via said fluid discharging outlet port in said nosepiece.

15. The device of claim 14, wherein said volume $V_{PF}$ [ml] of said pressurized fluid at said pressure $P_{PF}$ [barg] is released upon activation of said base, from said at least one chamber within a period of time dT, the period of time dT being less than 500 milliseconds, via said fluid inlet port, wherein the pressurized fluid entrains said at least one substance, erupts via said fluid discharging outlet port into said body cavity, such that a release time of said volume $V_{sub}$ [ml or mg] of said at least one substance and said volume $V_{PF}$ [ml] of said pressurized fluid, $dT_{release}$ is less than 500 milliseconds.

16. The device of claim 14, wherein said at least one chamber is a container adapted to hold said pressurized fluid at said pressure $P_{PF}$ for prolonged periods of time.

17. The device of claim 14, wherein said activation of said base is provided by at least one piercing member adapted to pierce said at least one chamber, such that said pressurized fluid flows from said at least one chamber to said at least one vial to entrain said at least one substance.

18. The device of claim 14, wherein said base comprises a sealing member adapted, when said base is coupled to said nosepiece, to seal said volume $V_{sub}$ [ml] of said at least one substance to prevent leakage thereof.

19. The device of claim 18, wherein said sealing member is adapted to seal said at least one chamber containing said volume $V_{PF}$ [ml] of pressurized fluid at said pressure $P_{PF}$ and prevent leakage thereof.

20. The device of claim 19, wherein said sealing member separates said nosepiece and said at least one chamber.

21. The device of claim 14, wherein said base additionally comprises a plunger interconnected with said sealing member.

22. The device of claim 21, wherein said sealing member is an O-ring.

23. The device of claim 22, wherein said activation of said base is provided by linearly moving said plunger, such that the sealing of said sealing member is removed, thus allowing said volume $V_{PF}$ of said pressurized fluid to enter said nosepiece and entrain said volume $V_{sub}$ substance to be delivered to said body cavity.

24. The device of claim 14, said pressurized fluid is selected from a group consisting of air, nitrogen, oxygen, carbon dioxide, helium, neon, xenon and any combination thereof.

25. The device of claim 14, wherein said at least one chamber is a container adapted to hold said pressurized fluid at said pressure $P_{PF}$ for prolonged periods of time.

26. The device of claim 14, wherein said activation of said base is provided by at least one piercing member adapted to pierce said at least one chamber, such that said pressurized fluid flows from said at least one chamber to said at least one vial to entrain said Topiramate.

27. The device of claim 14, wherein said nosepiece comprises a sealing member adapted to seal said volume $V_{sub}$ [ml] of said Topiramate and prevent leakage thereof.

28. The device of claim 27, wherein said sealing member is adapted to seal said at least one chamber containing said volume $V_{PF}$ [ml] of pressurized fluid at a pressure and prevent leakage thereof.

29. The device of claim 28, wherein said sealing member separates said nosepiece and said at least one chamber.

30. The device of claim 29, wherein said base additionally comprises a plunger interconnected with said sealing member.

31. The device of claim 30, wherein said sealing member is an O-ring.

32. The device of claim 31, wherein said activation of said base is provided by linearly moving said plunger, such that a sealing of said sealing member is removed.

33. The device of claim 13, wherein said nosepiece cover and said nosepiece are coupled to each other.

34. The device of claim 33, wherein said coupling between nosepiece cover and said nosepiece said is reversible.

35. The device of claim 13, wherein removal of said nosepiece cover results in piercing said nosepiece to provide said fluid discharging outlet.

36. The device of claim 13, wherein removal of said nosepiece cover is obtained by at least one action selected from a group consisting of sliding said nosepiece cover along said device, rotating said nosepiece cover around said device, rotating said nosepiece cover around a hinge on the exterior of said device and any combination thereof.

37. The device of claim 13, wherein said nosepiece cover comprises at least one nosepiece puncturing member adapted to pierce said nosepiece to enable said fluid discharging outlet.

38. The device of claim 13, wherein said nosepiece comprises the at least one fluid discharging outlet port throughout which said at least one substance exits said device, such that said nosepiece cover seals said at least one fluid discharging outlet port and removal thereof removes said seal.

39. The device of claim 12, wherein said at least one fluid discharging outlet port is positioned at least one position selected from a group consisting of (a) along the circumference of a longitudinal axis of said device so as to deliver said volume $V_{sub}$ [ml or mg] of said at least one substance to sides of said body cavity; (b) at the a distal-most end of said device; and any combination thereof.

40. The device of claim 12, additionally comprising at least one adjustable dose mechanism, comprising:

a. at least one second drug container enclosing a second volume $V_{dose}$ of said at least one substance; and, b. at least one loading needle adapted to load from said at least one second drug container, said volume $V_{sub}$ [ml] of said at least one substance to said nosepiece, where said second volume, $V_{dose}$ is larger than or equivalent to said volume $V_{sub}$ [ml] of said at least one substance, such that when said base is activated, said volume $V_{PF}$ [ml] of said pressurized fluid enters from said at least one chamber into said nosepiece to entrain said at least one substance volume $V_{sub}$ [ml] and deliver the at least one substance volume $V_{sub}$ [ml] via said fluid discharging outlet port in said nosepiece within said body cavity in the form of an aerosol, such that a release time of said volume $V_{sub}$ [ml] of said at least one substance and said volume $V_{PF}$ [ml] of said pressurized fluid, $dT_{release}$ is less than 500 milliseconds.

41. The device of claim 12, wherein said at least one vial comprises at least one mixing mechanism, the at least one mixing mechanism comprising at least two balls adapted to enable mixing of said volume $V_{sub}$ [ml or mg] of said at least one substance and said volume $V_{PF}$ of said pressurized fluid.

42. The device of claim 41, wherein said open-ended nosepiece or said at least one vial comprises at least one separator adapted to either (a) subdivide said at least one vial into at least two compartments; and\or (b) seal said open-ended nosepiece or said at least one vial.

43. The device of claim 42, wherein said separator is selected from a group consisting of; at least two balls, at least one plunger, at least one thin sheet, at least one frangible membrane, at least one duckbill valve, at least one bendable membrane, at least one temperature dependent membrane, at least one pressure dependent membrane, and any combination thereof.

44. The device of claim 43, wherein said at least one mixing mechanism is also said separator.

45. The device of claim 1, further comprising a safety latch, adapted to prevent accidental operation of said device.

46. The device of claim 1, additionally comprising at least one expandable portion, adapted to inflate before activation of said device.

* * * * *